(12) United States Patent
Hyde et al.

(10) Patent No.: US 11,294,344 B2
(45) Date of Patent: *Apr. 5, 2022

(54) ENERGY DISSIPATIVE CUSHIONING ELEMENTS

(71) Applicant: Deep Science, LLC, Bellevue, WA (US)

(72) Inventors: Roderick A. Hyde, Redmond, WA (US); Muriel Y. Ishikawa, Livermore, CA (US); Edward K. Y. Jung, Bellevue, WA (US); Royce A. Levien, Cambridge, MA (US); Robert W. Lord, Seattle, WA (US); Mark A. Malamud, Seattle, WA (US); Cameron Myhrvold, Medina, WA (US); Conor L. Myhrvold, Medina, WA (US); Nathan P. Myhrvold, Medina, WA (US); John D. Rinaldo, Jr., Bellevue, WA (US); Lowell L. Wood, Jr., Bellevue, WA (US); Victoria Y. H. Wood, Livermore, CA (US)

(73) Assignee: Deep Science, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,940

(22) Filed: Nov. 1, 2019

(65) Prior Publication Data

US 2020/0310376 A1    Oct. 1, 2020

Related U.S. Application Data

(63) Continuation of application No. 15/136,260, filed on Apr. 22, 2016, now Pat. No. 10,539,941, which is a
(Continued)

(51) Int. Cl.
*G05B 19/042* (2006.01)
*A41D 13/018* (2006.01)
(Continued)

(52) U.S. Cl.
CPC ........ *G05B 19/0428* (2013.01); *A01K 13/006* (2013.01); *A41D 13/018* (2013.01);
(Continued)

(58) Field of Classification Search
CPC ........................... A63B 2225/62; B60R 21/36
(Continued)

(56) References Cited

U.S. PATENT DOCUMENTS 3,398,406 A    8/1968   Waterbury
3,889,970 A    6/1975   Astheimer et al.
(Continued)

OTHER PUBLICATIONS

U.S. Appl. No. 11/136,339, filed May 24, 2005, Muriel Y. Ishikawa, et al.
(Continued)

*Primary Examiner* — Md Azad
(74) *Attorney, Agent, or Firm* — Foley & Lardner LLP

(57) ABSTRACT

An apparatus, method, computer program product, and/or system are described that determine an event, actuate a cushioning element in response to the determining the event, the cushioning element including one or more tension-bearing members, and dissipate at least some of an energy associated with a collision based on deforming at least one of the tension-bearing members during the collision, the deforming including substantially inelastically stretching the at least one of the tension-bearing members. Other example embodiments are also provided relating to actuatable cushioning elements.

14 Claims, 130 Drawing Sheets

Related U.S. Application Data continuation-in-part of application No. 11/136,339, filed on May 24, 2005, now Pat. No. 7,548,168, and a continuation-in-part of application No. 11/603,965, filed on Nov. 21, 2006, now Pat. No. 8,102,258, and a continuation-in-part of application No. 11/726,706, filed on Mar. 21, 2007, now Pat. No. 8,179,254, and a continuation-in-part of application No. 11/868,416, filed on Oct. 5, 2007, now Pat. No. 8,033,571, and a continuation-in-part of application No. 13/199,442, filed on Aug. 29, 2011, now Pat. No. 8,851,518, and a continuation-in-part of application No. 14/297,182, filed on Jun. 5, 2014, now Pat. No. 9,321,424.

(51) Int. Cl.

| | | |
|---|---|---|
| A63B 71/08 | (2006.01) | |
| A41D 13/11 | (2006.01) | |
| A63B 71/12 | (2006.01) | |
| A41D 13/05 | (2006.01) | |
| A43B 7/32 | (2006.01) | |
| A43B 3/00 | (2022.01) | |
| A01K 13/00 | (2006.01) | |
| B60R 19/20 | (2006.01) | |
| B60R 21/00 | (2006.01) | |
| B60R 21/36 | (2011.01) | |
| A43B 3/30 | (2006.01) | |
| A43B 3/34 | (2022.01) | |

(52) U.S. Cl.
CPC .............. *A41D 13/05* (2013.01); *A41D 13/11* (2013.01); *A43B 3/0036* (2013.01); *A43B 7/32* (2013.01); *A63B 71/081* (2013.01); *A63B 71/12* (2013.01); *A41D 2600/104* (2013.01); *A43B 3/30* (2013.01); *A43B 3/34* (2022.01); *A63B 2071/125* (2013.01); *A63B 2071/1241* (2013.01); *A63B 2071/1258* (2013.01); *A63B 2071/1266* (2013.01); *A63B 2225/62* (2013.01); *A63B 2230/00* (2013.01); *B60R 19/205* (2013.01); *B60R 21/36* (2013.01); *B60R 2021/0004* (2013.01); *G05B 2219/24015* (2013.01)

(58) Field of Classification Search
USPC ........................................................ 700/302
See application file for complete search history.

(56) References Cited

U.S. PATENT DOCUMENTS

| | | |
|---|---|---|
| 3,960,386 A | 6/1976 | Wallsten |
| 4,287,250 A | 9/1981 | Rudy |
| 4,817,902 A | 4/1989 | Mason |
| 4,825,625 A | 5/1989 | Hufford |
| 4,875,548 A | 10/1989 | Lorsbach |
| 4,977,623 A | 12/1990 | Demarco |
| 5,005,240 A | 4/1991 | Vrzalik |
| 5,052,065 A | 10/1991 | West |
| 5,054,811 A | 10/1991 | Unterforsthuber et al. |
| 5,150,767 A | 9/1992 | Miller |
| 5,181,697 A | 1/1993 | Rumer |
| 5,202,831 A | 4/1993 | Blackburn et al. |
| 5,203,427 A | 4/1993 | Williams et al. |
| 5,299,397 A | 4/1994 | Ahern |
| 5,308,113 A | 5/1994 | Moriset |
| 5,362,098 A | 11/1994 | Guill |
| 5,372,429 A | 12/1994 | Beaver et al. |
| 5,478,114 A | 12/1995 | Maurer et al. |
| 5,592,705 A | 1/1997 | West |
| 5,803,263 A | 9/1998 | Pozzo |
| 5,810,385 A | 9/1998 | Henseler et al. |
| 5,879,767 A | 3/1999 | Matsushima et al. |
| 5,881,407 A | 3/1999 | Chu Pt |
| 5,937,443 A | 8/1999 | Kageyama et al. |
| 5,945,912 A | 8/1999 | Guldbrand |
| 5,960,494 A | 10/1999 | Gilliland et al. |
| 6,125,478 A | 10/2000 | Alaloof |
| 6,139,052 A | 10/2000 | Preamprasitchai |
| 6,160,478 A | 12/2000 | Jacobsen et al. |
| 6,181,998 B1 | 1/2001 | Kanameda et al. |
| 6,219,605 B1 | 4/2001 | Bauer et al. |
| 6,231,075 B1 | 5/2001 | Otsu |
| 6,233,761 B1 | 5/2001 | Neff |
| 6,314,596 B1 | 11/2001 | Neff |
| 6,341,473 B1 | 1/2002 | Kovacs et al. |
| 6,359,568 B1 | 3/2002 | Johnson |
| 6,371,510 B1 | 4/2002 | Marriott et al. |
| 6,382,660 B1 | 5/2002 | Starner et al. |
| 6,396,427 B1 | 5/2002 | Mattes et al. |
| 6,419,262 B1 | 7/2002 | Fendt et al. |
| 6,447,006 B1 | 9/2002 | Hess et al. |
| 6,594,835 B2 | 7/2003 | West |
| 6,766,535 B2 | 7/2004 | Duhamell et al. |
| 6,769,571 B2 | 8/2004 | Mino |
| 6,792,342 B2 | 9/2004 | Breed et al. |
| 6,848,708 B2 | 2/2005 | Green et al. |
| 6,964,451 B1 | 11/2005 | Bergey |
| 7,017,195 B2 | 3/2006 | Buckman et al. |
| 7,018,495 B2 | 3/2006 | Kannankeril et al. |
| 7,025,376 B2 | 4/2006 | Dominissini |
| 7,032,924 B2 | 4/2006 | Brewster et al. |
| 7,209,221 B2 | 4/2007 | Breed et al. |
| 7,232,001 B2* | 6/2007 | Hakki .................. B60R 19/205 180/271 |
| 7,267,367 B2 | 9/2007 | Barvosa-Carter et al. |
| 7,320,379 B2 | 1/2008 | Gila et al. |
| 7,354,410 B2 | 4/2008 | Perry et al. |
| 7,356,358 B2 | 4/2008 | Sakai |
| 7,409,735 B2 | 8/2008 | Kramer et al. |
| 7,444,698 B2 | 11/2008 | Jackson, III |
| 7,481,453 B2 | 1/2009 | Breed |
| 7,506,892 B2 | 3/2009 | Klinkenberger et al. |
| 7,527,288 B2* | 5/2009 | Breed .................... B60R 21/013 280/735 |
| 7,548,168 B2 | 6/2009 | Ishikawa et al. |
| 7,806,221 B2 | 10/2010 | Mishra |
| 7,984,939 B2 | 7/2011 | Vodavoz |
| 8,102,258 B2 | 1/2012 | Hyde et al. |
| 8,851,518 B2 | 10/2014 | Hyde et al. |
| 2001/0049840 A1 | 12/2001 | Atanasio |
| 2002/0124882 A1 | 9/2002 | Russo |
| 2002/0179390 A1 | 12/2002 | Kitano et al. |
| 2003/0114972 A1 | 6/2003 | Takafuji et al. |
| 2004/0012179 A1* | 1/2004 | Pinsenschaum ...... B60R 21/239 280/739 |
| 2004/0049331 A1 | 3/2004 | Schneider |
| 2005/0100251 A1 | 5/2005 | Havens et al. |
| 2005/0154530 A1 | 7/2005 | Hosokawa et al. |
| 2006/0061076 A1* | 3/2006 | Webber ............. B60R 21/01546 280/736 |
| 2006/0131202 A1 | 6/2006 | Kramer |
| 2006/0169753 A1 | 8/2006 | Piucci et al. |
| 2006/0267779 A1 | 11/2006 | Ishikawa et al. |
| 2007/0036947 A1 | 2/2007 | Barwick |
| 2007/0182144 A1 | 8/2007 | Aranzulla et al. |
| 2007/0205590 A1 | 9/2007 | Klinkenberger et al. |
| 2008/0083640 A1 | 4/2008 | Liu |
| 2008/0117042 A1 | 5/2008 | Hyde et al. |
| 2008/0143521 A1 | 6/2008 | Hyde et al. |
| 2008/0251332 A1 | 10/2008 | Stuhmiller et al. |
| 2008/0307553 A1 | 12/2008 | Jbeili et al. |
| 2009/0008915 A1* | 1/2009 | Baumann ............ B60R 21/0132 280/734 |
| 2009/0261959 A1 | 10/2009 | Hyde et al. |
| 2009/0267366 A1* | 10/2009 | Vodavoz ................ B60R 19/36 293/132 |
| 2010/0004567 A1 | 1/2010 | Ishikawa et al. |
| 2010/0004819 A1 | 1/2010 | Katz et al. |
| 2010/0090450 A1 | 4/2010 | Webber |

(56) References Cited

U.S. PATENT DOCUMENTS

OTHER PUBLICATIONS

U.S. Appl. No. 11/603,965, filed Nov. 21, 2006, Roderick A. Hyde, et al.
U.S. Appl. No. 11/726,706, filed Mar. 21, 2007, Roderick A. Hyde, et al.
U.S. Appl. No. 11/868,416, filed Oct. 5, 2007, Roderick A. Hyde, et al.
U.S. Appl. No. 12/148,514, filed Apr. 19, 2008, Roderick A. Hyde, et al.
U.S. Appl. No. 12/454,180, filed May 12, 2009, Ishikawa, Muriel Y., et al.

* cited by examiner

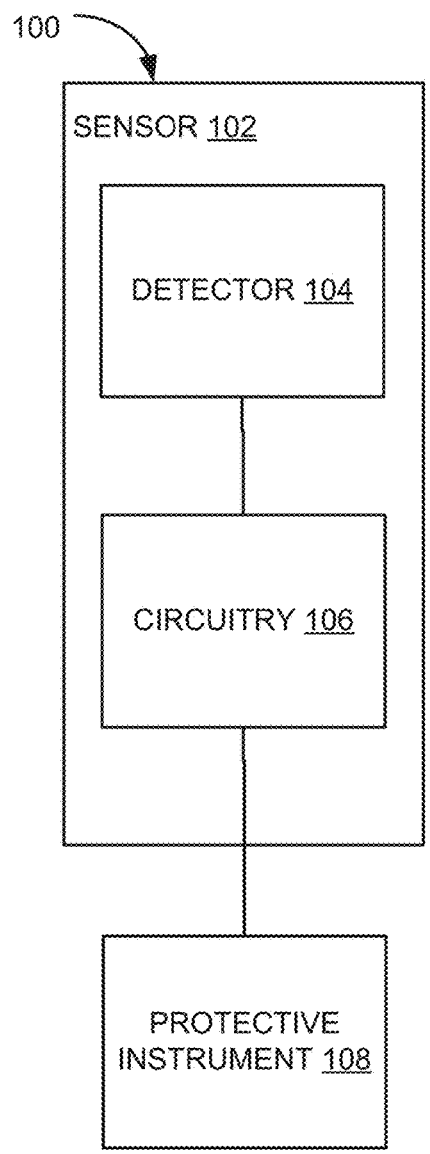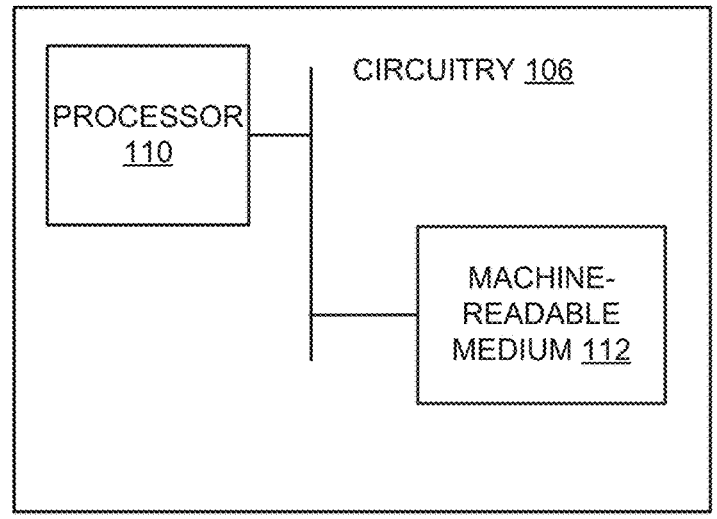
FIG. 1A
FIG. 1B

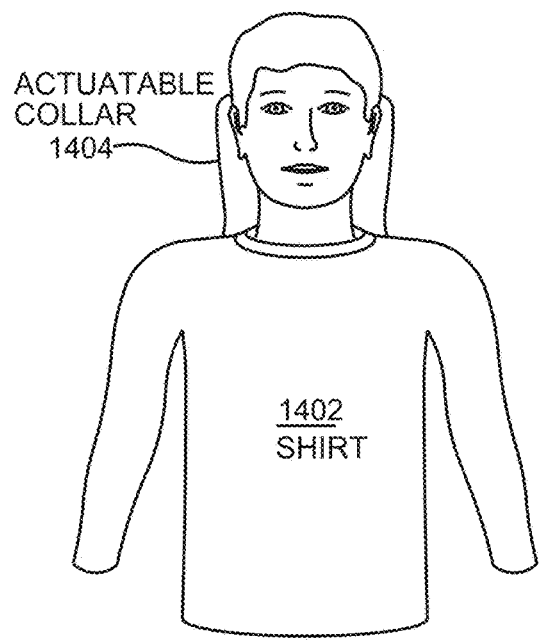
FIG. 14
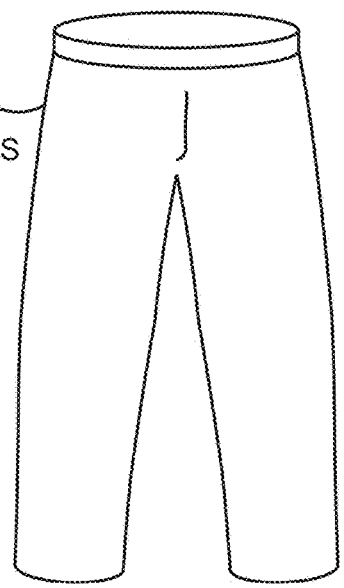
FIG. 15A
FIG. 15B

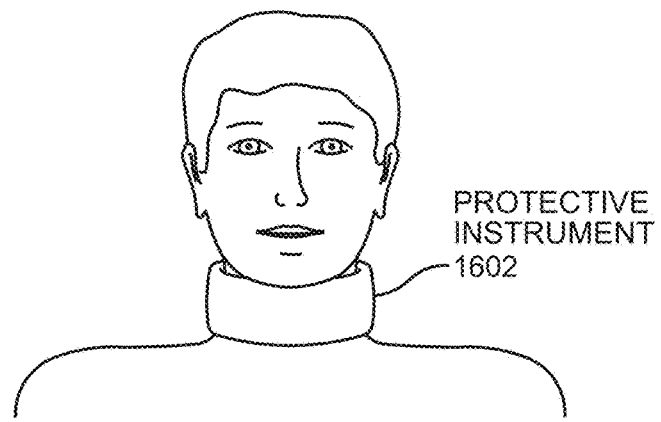
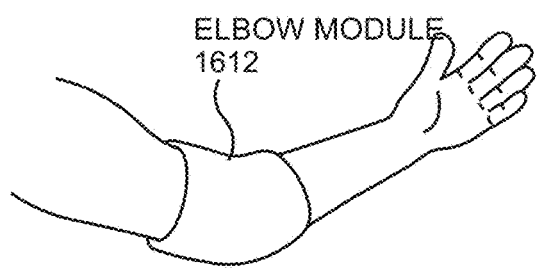
FIG. 16A
FIG. 16B
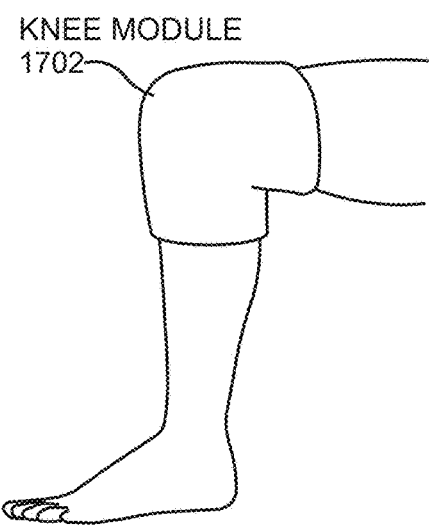
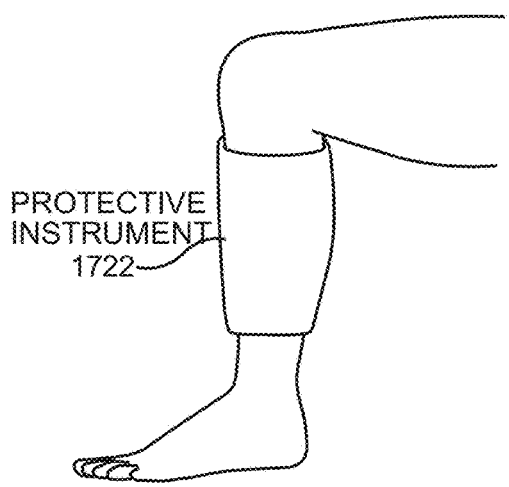
FIG. 17A
FIG. 17B

FIG. 45

Apparatus 2-2000

2-2010 At least two actuatable cushioning elements configured to provide cushioning support for an object, the at least two actuatable cushioning elements including:

2012 A first subset of actuatable cushioning elements enabled to actuate in response to an event during a first time period.

2014 A second subset of actuatable cushioning elements enabled to actuate in response to an event during a second time period.

FIG. 46

Apparatus

2-2010 At least two actuatable cushioning elements configured to provide cushioning support for an object, the at least two actuatable cushioning elements including:

2-2102 One or more actuatable cushioning elements that are two-point-five (2.5) centimeters in width or less in an unexpanded state.

2-2104 One or more actuatable cushioning elements that are five (5) centimeters in width or less in an unexpanded state.

2-2106 One or more actuatable cushioning elements that are eight (8) centimeters in width or less in an unexpanded state.

2-2012 A first subset of actuatable cushioning elements enabled to actuate in response to an event during a first time period.

2-2014 A second subset of actuatable cushioning elements enabled to actuate in response to an event during a second time period.

2-2300 A computer program product.

2-2302 A signal bearing medium.

2-2304 bearing:
- one or more instructions for enabling a first subset of actuatable cushioning elements for a first time period;
- one or more instructions for enabling a second subset of actuatable cushioning elements for a second time period;
- one or more instructions for determining an event; and
- one or more instructions for actuating, based on a time the event is determined, at least one of the first subset of actuatable cushioning elements or the second subset of actuatable cushioning elements to provide cushioning support for an object.

2-2306 a computer-readable medium 2-2308 a recordable medium 2-2310 a communications medium

FIG. 68

Apparatus 3-2000

3-2010 At least two actuatable cushioning elements configured to provide cushioning support for an object, the at least two actuatable cushioning elements including:

3-2012 A first subset of actuatable cushioning elements enabled to actuate in response to an event during a first time period.

3-2014 A second subset of actuatable cushioning elements enabled to actuate in response to an event during a second time period.

FIG. 69

Apparatus 3-2010 At least two actuatable cushioning elements configured to provide cushioning support for an object, the at least two actuatable cushioning elements including:

3-2102 One or more actuatable cushioning elements that are two-point-five (2.5) centimeters in width or less in an unexpanded state.

3-2104 One or more actuatable cushioning elements that are five (5) centimeters in width or less in an unexpanded state.

3-2106 One or more actuatable cushioning elements that are eight (8) centimeters in width or less in an unexpanded state.

3-2012 A first subset of actuatable cushioning elements enabled to actuate in response to an event during a first time period.

3-2014 A second subset of actuatable cushioning elements enabled to actuate in response to an event during a second time period.

Apparatus 3-2010 At least two actuatable cushioning elements configured to provide cushioning support for an object, the at least two actuatable cushioning elements including:

3-2212 Wherein the at least two actuatable cushioning elements comprise: at least one actuatable cushioning element of an expandable cushioning material.

3-2214 Wherein the at least two actuatable cushioning elements comprise: a plurality of actuatable portions of an expandable cushioning material.

3-2216 Wherein the at least two actuatable cushioning elements comprise:

3-2217 At least two re-usable actuatable cushioning elements.

3-2219 At least two disposable actuatable cushioning elements.

3-2012 A first subset of actuatable cushioning elements enabled to actuate in response to an event during a first time period.

3-2014 A second subset of actuatable cushioning elements enabled to actuate in response to an event during a second time period.

FIG. 71

3-2300 A computer program product.

3-2302 A signal bearing medium.

3-2304 bearing:
- one or more instructions for enabling a first subset of actuatable cushioning elements for a first time period;
- one or more instructions for enabling a second subset of actuatable cushioning elements for a second time period;
- one or more instructions for determining an event; and
- one or more instructions for actuating, based on a time the event is determined, at least one of the first subset of actuatable cushioning elements or the second subset of actuatable cushioning elements to provide cushioning support for an object.

3-2306 a computer-readable medium 3-2308 a recordable medium 3-2310 a communications medium

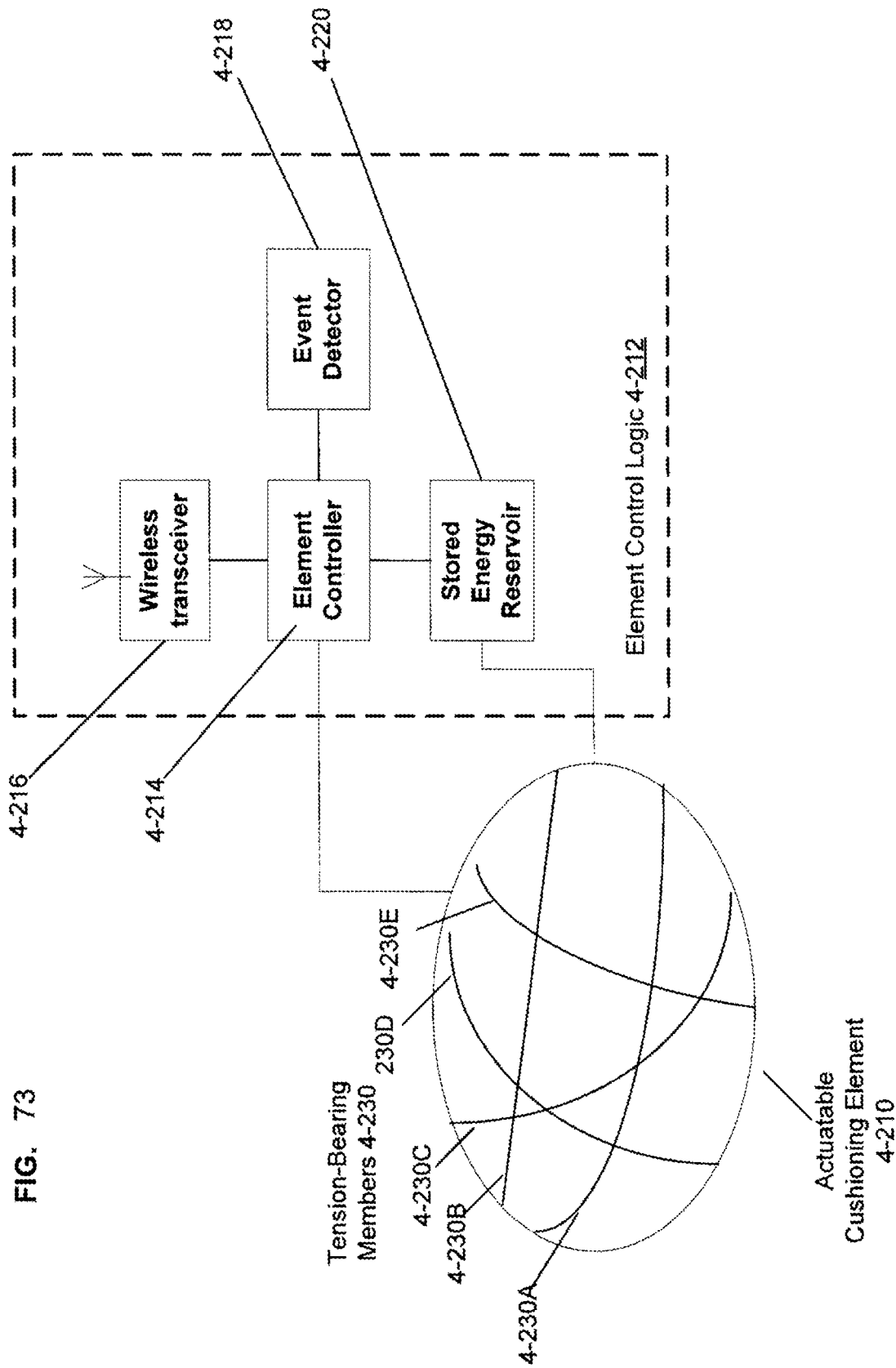

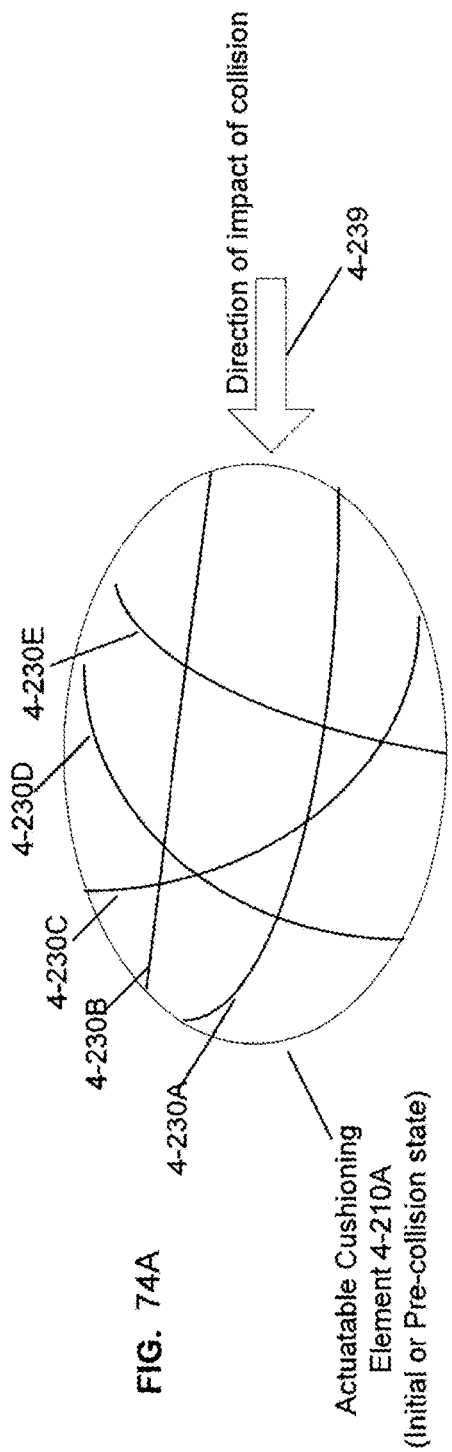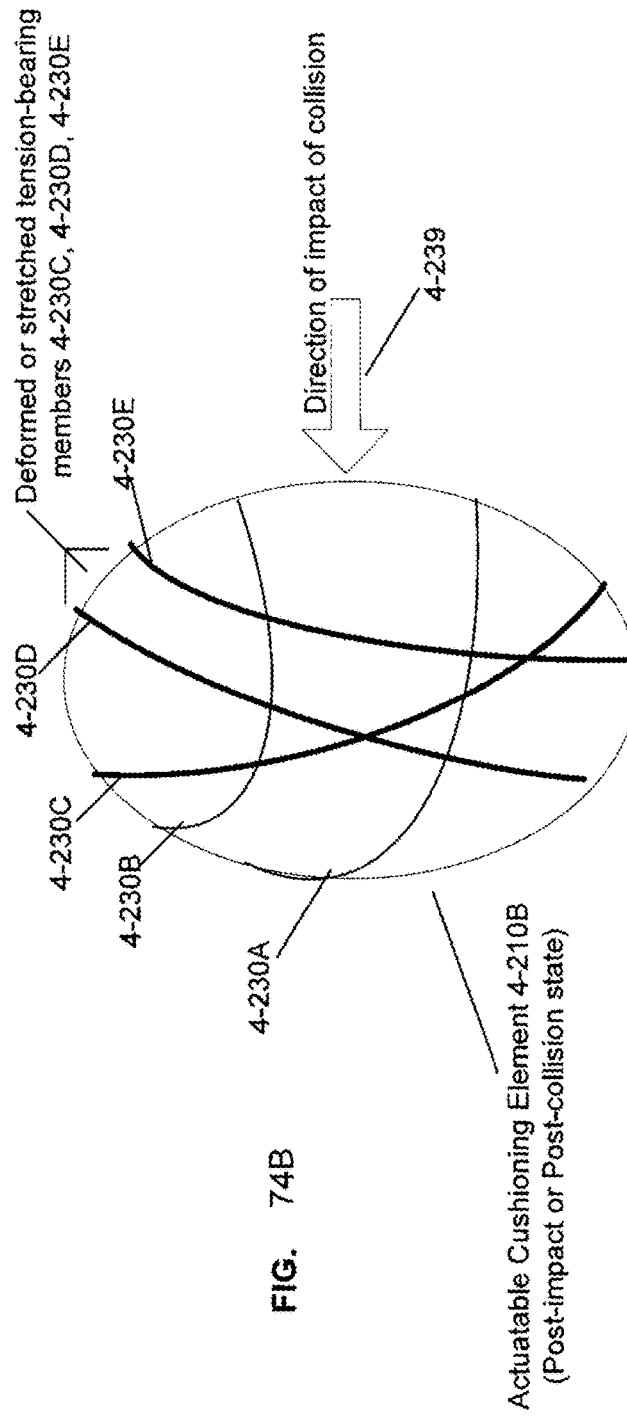
FIG. 74A
FIG. 74B

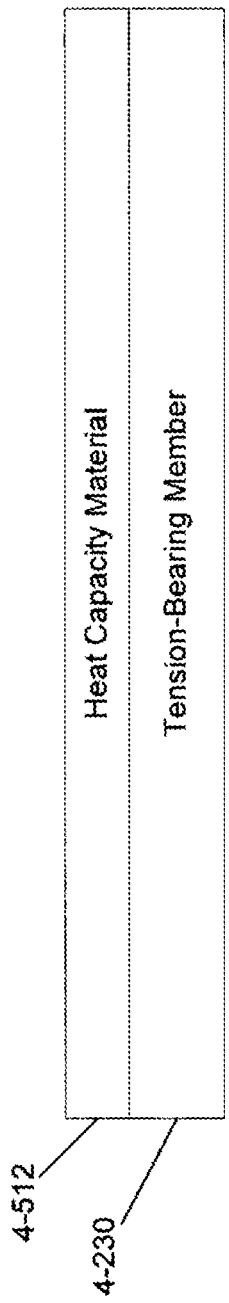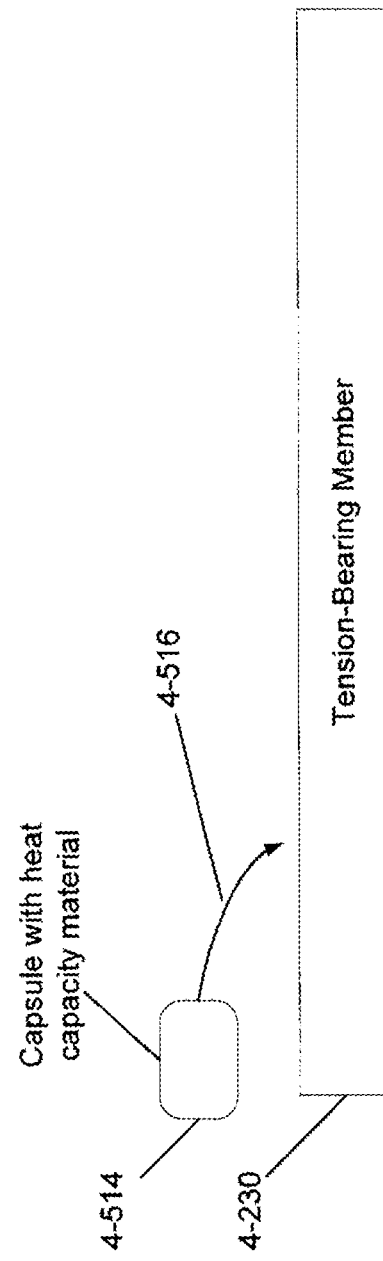
FIG. 76A
FIG. 76B

FIG. 88

4-1700 A computer program product.

4-1702 A signal bearing medium.

4-1704 bearing:
one or more instructions for determining an event;
one or more instructions for actuating a cushioning element in response to the determining the event, the cushioning element including one or more tension-bearing members; and
one or more instructions for providing control sufficient to cause dissipation at least some of an energy associated with a collision based on deforming at least one of the tension-bearing members during the collision, the deforming including substantially inelastically stretching the at least one of the tension-bearing members.

4-1706 a computer-readable medium 4-1708 a recordable medium 4-1710 a communications medium

FIG. 90

Apparatus 4-1900

4-1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

4-1912 A cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit.

4-1922 A heat capacity material associated with at least one of the tension-bearing members.

4-1924 A heat capacity material in contact with at least one of the one or more tension-bearing members to increase a work capacity of the at least one of the one or more tension-bearing members.

4-1930 An element controller configured to control the cushioning element.

4-1940 An event detector coupled to the element controller configured to detect an event.

FIG. 91

Apparatus 4-1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

4-2002 Wherein at least one of the one or more tension-bearing members comprises one or more polyaramid fibers.

4-2004 Wherein one or more of the tension-bearing members comprises at least one of a graphitic fiber, a carbon fiber, and/or natural fibers.

4-2006 Wherein one or more of the tension-bearing members comprises at least one of a poly-benzobisoxazole fiber, and/or a synthetic fiber.

4-2008 Wherein at least one of the one or more tension-bearing members lies on a surface of the cushioning element.

4-2010 Wherein at least one of the one or more tension-bearing members lies within an interior portion of the cushioning element.

4-2012 Wherein at least some of the tension-bearing members have different tension properties than other tension-bearing members.

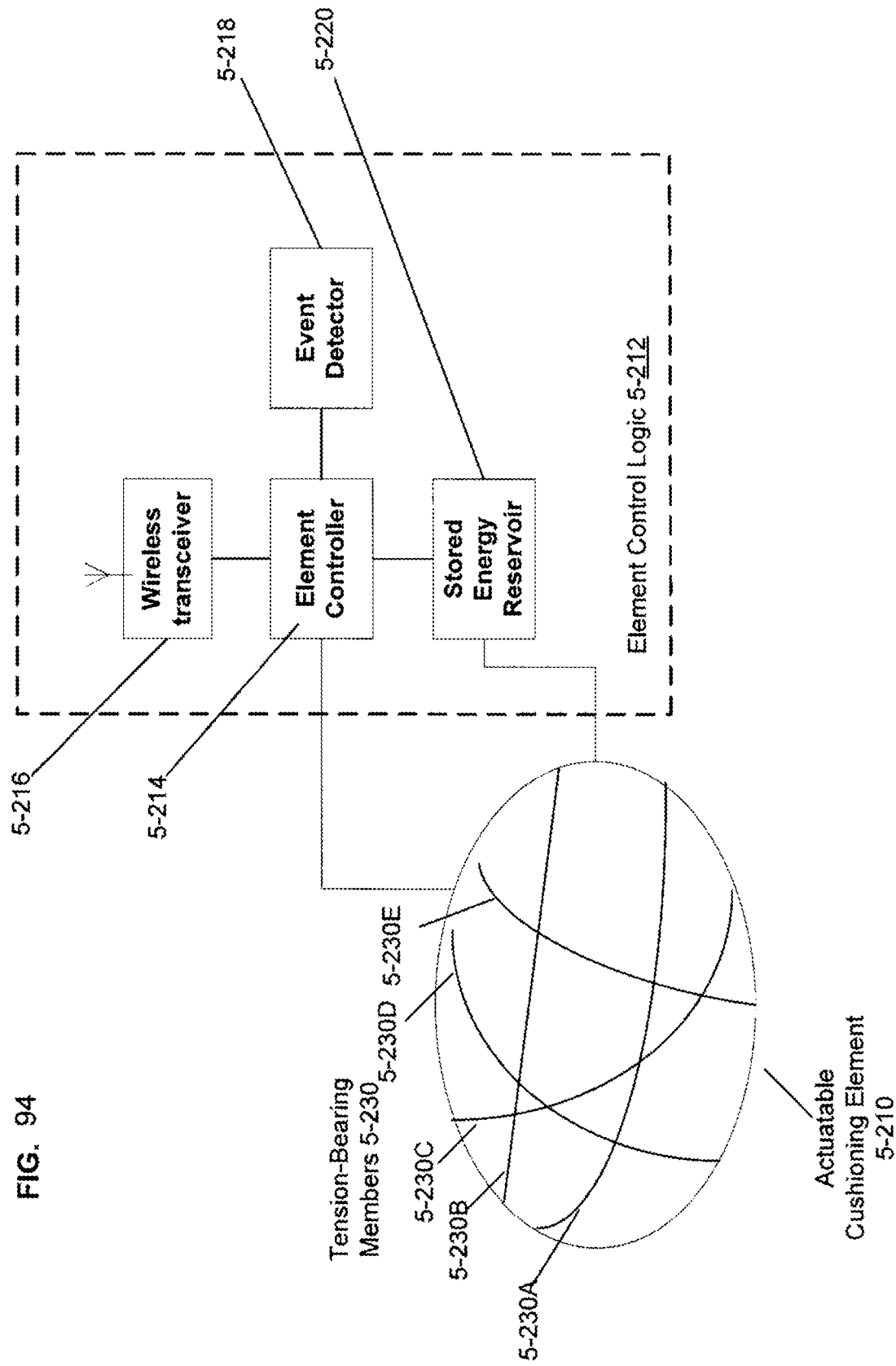

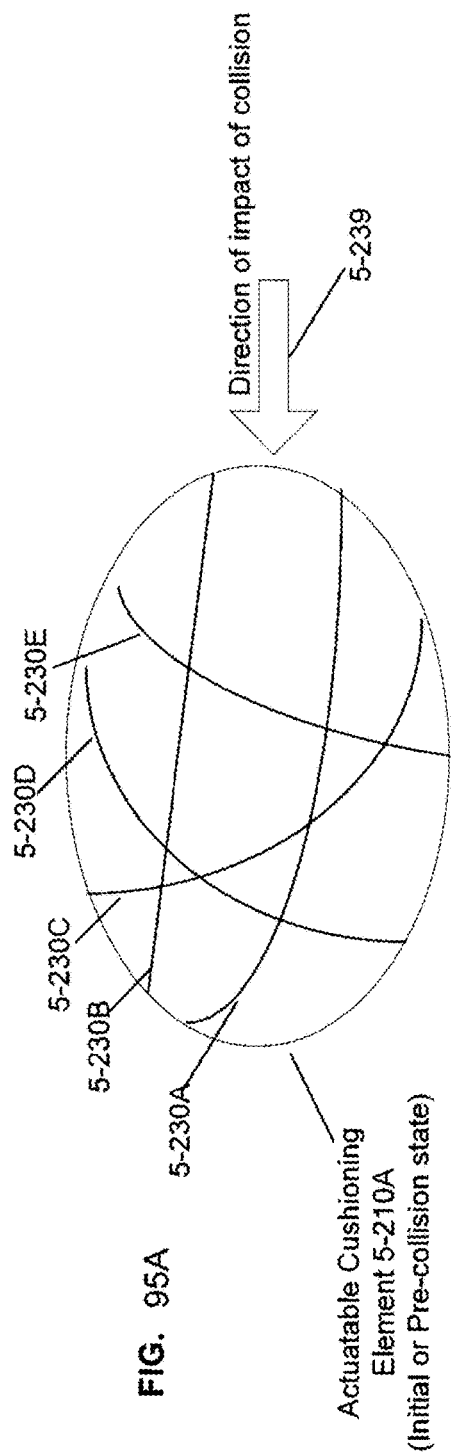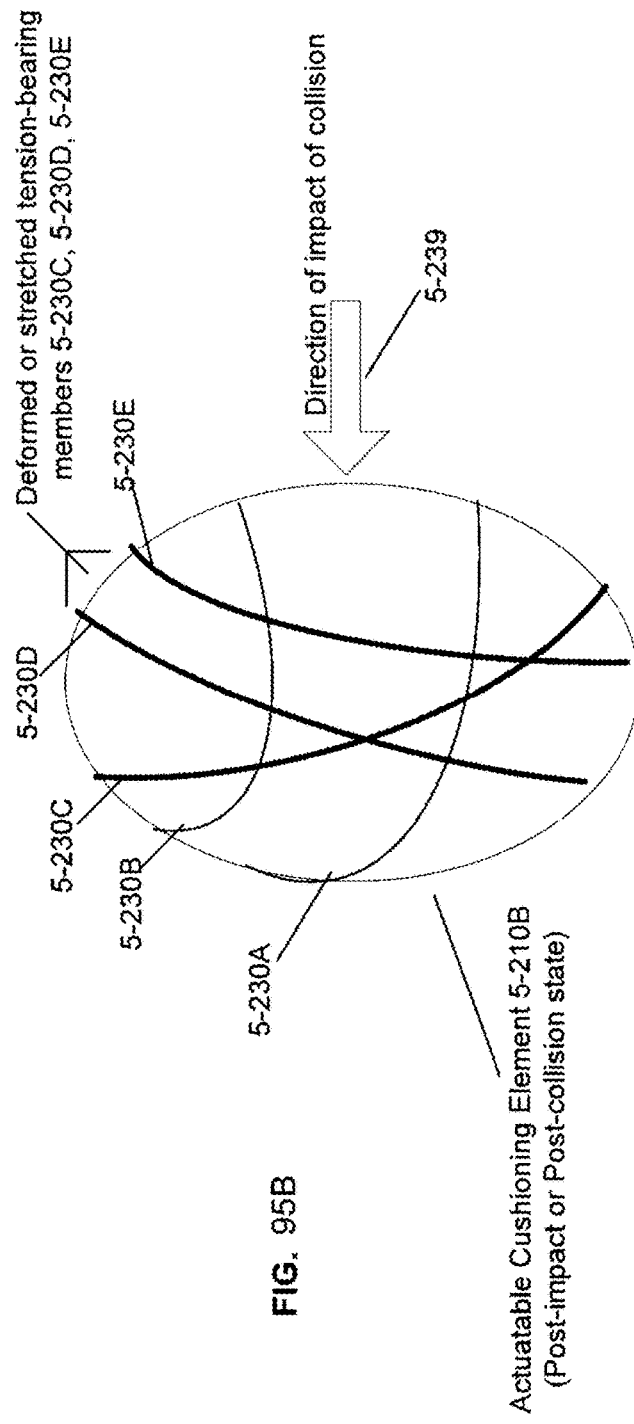

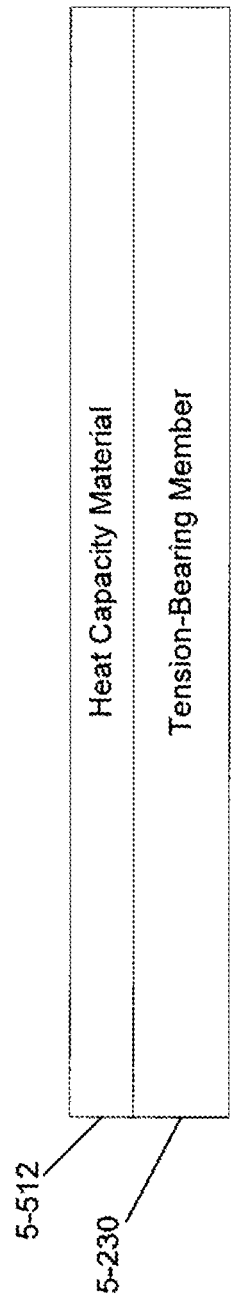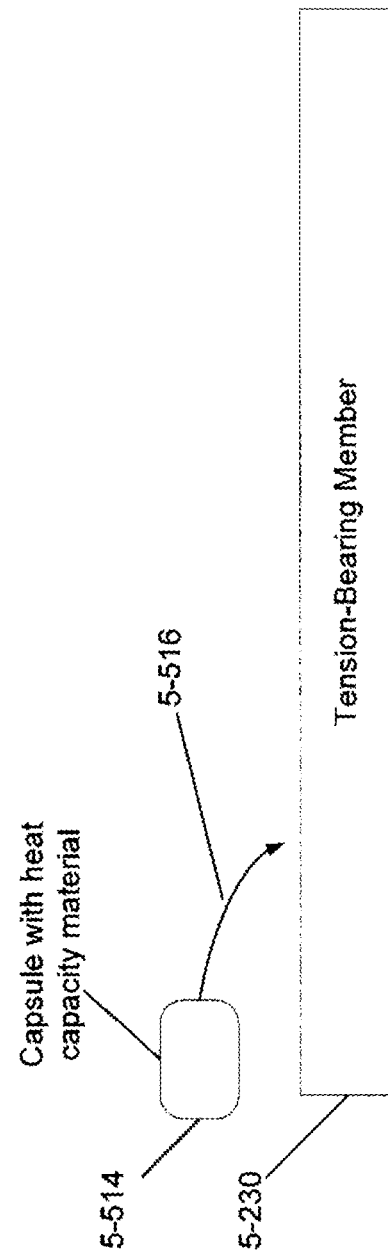
FIG. 97A
FIG. 97B

FIG. 109

5-1700 A computer program product.

5-1702 A signal bearing medium.

15-1704 bearing:
one or more instructions for determining an event;
one or more instructions for actuating a cushioning element in response to the determining the event, the cushioning element including one or more tension-bearing members; and
one or more instructions for providing control sufficient to cause dissipation at least some of an energy associated with a collision based on deforming at least one of the tension-bearing members during the collision, the deforming including substantially inelastically stretching the at least one of the tension-bearing members.

5-1706 a computer-readable medium 5-1708 a recordable medium 5-1710 a communications medium

FIG. 110

System 5-1810 A computing device 5-1812 One or more of a personal digital assistant (PDA), a laptop computer, a tablet personal computer, a networked computer, a computing system comprised of a cluster of processors, a workstation computer, and/or a desktop computer.

5-1820 One or more instructions that when executed on the computing device cause the computing device to:
(a) determine an event;
(b) actuate a cushioning element in response to the determining the event, the cushioning element including one or more tension-bearing members; and
(c) provide control sufficient to dissipate at least some of an energy associated with a collision based on deforming at least one of the tension-bearing members during the collision, the deforming including substantially inelastically stretching the at least one of the tension-bearing members.

FIG. 111

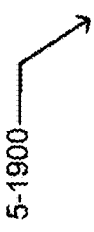

Apparatus 5-1900

5-1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

5-1912 A cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit.

5-1922 A heat capacity material associated with at least one of the tension-bearing members.

5-1924 A heat capacity material in contact with at least one of the one or more tension-bearing members to increase a work capacity of the at least one of the one or more tension-bearing members.

5-1930 An element controller configured to control the cushioning element.

5-1940 An event detector coupled to the element controller configured to detect an event.

FIG. 112

Apparatus 5-1900

5-1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

5-2002 Wherein at least one of the one or more tension-bearing members comprises one or more polyaramid fibers.

5-2004 Wherein one or more of the tension-bearing members comprises at least one of a graphitic fiber, a carbon fiber, and/or natural fibers.

5-2006 Wherein one or more of the tension-bearing members comprises at least one of a poly-benzobisoxazole fiber, and/or a synthetic fiber.

5-2008 Wherein at least one of the one or more tension-bearing members lies on a surface of the cushioning element.

5-2010 Wherein at least one of the one or more tension-bearing members lies within an interior portion of the cushioning element.

5-2012 Wherein at least some of the tension-bearing members have different tension properties than other tension-bearing members.

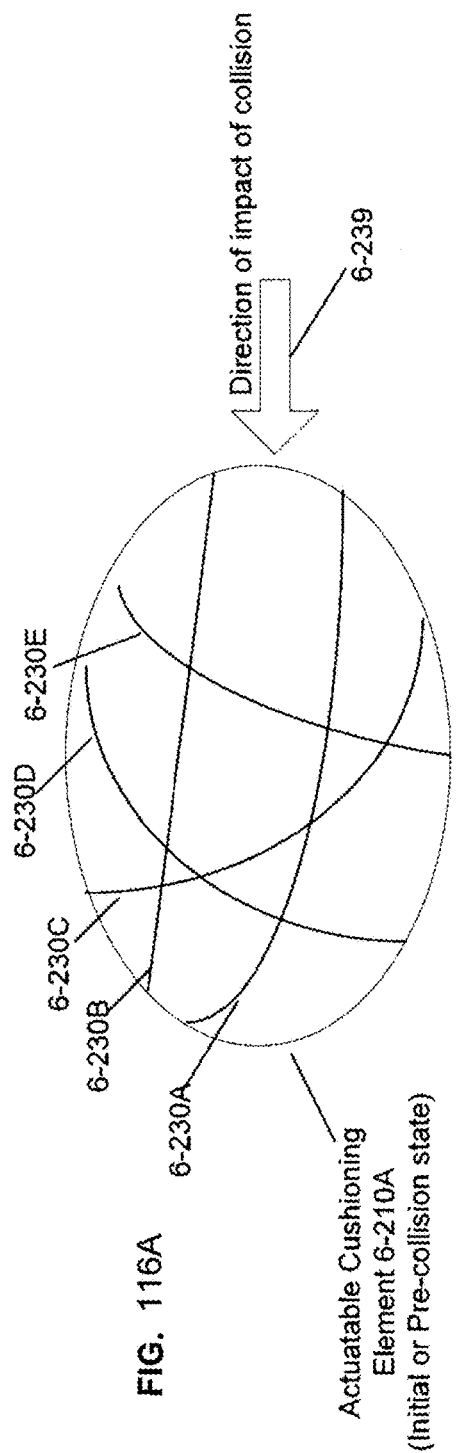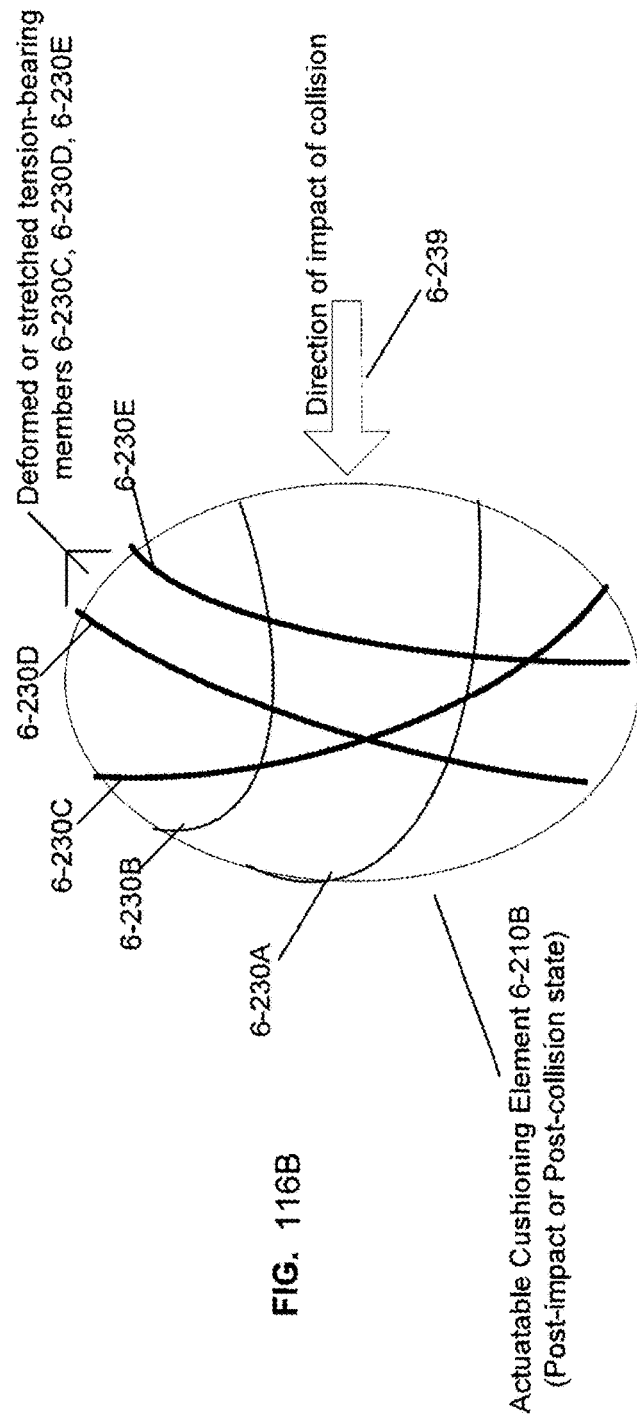

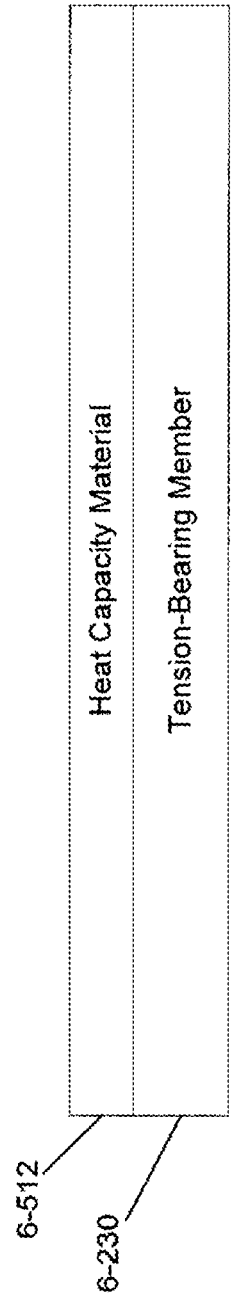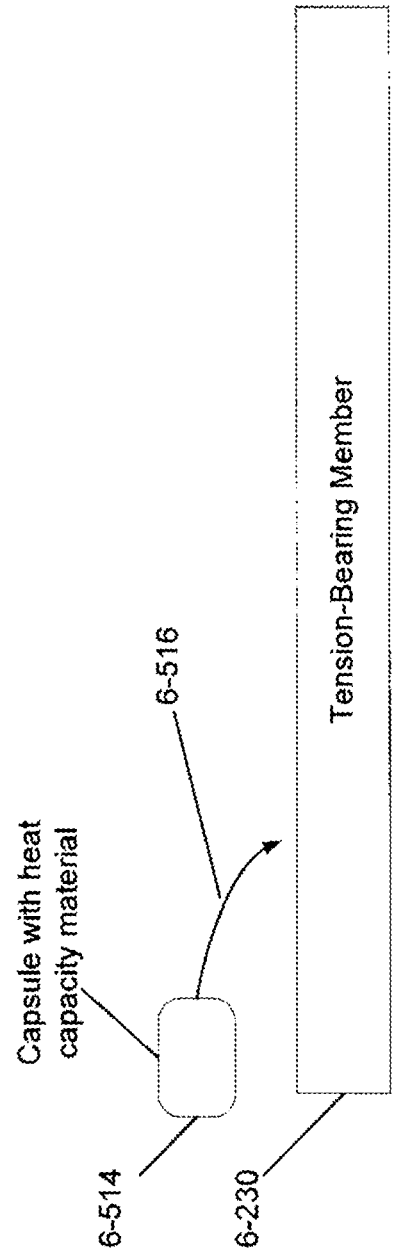
FIG. 118A
FIG. 118B

FIG. 130

6-1700 A computer program product.

6-1702 A signal bearing medium.

6-1704 bearing:
one or more instructions for determining an event;
one or more instructions for actuating a cushioning element in response to the determining the event, the cushioning element including one or more tension-bearing members; and
one or more instructions for providing control sufficient to cause dissipation at least some of an energy associated with a collision based on deforming at least one of the tension-bearing members during the collision, the deforming including substantially inelastically stretching the at least one of the tension-bearing members.

6-1706 a computer-readable medium 6-1708 a recordable medium 6-1710 a communications medium

Apparatus 6-1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

6-1912 A cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit.

6-1922 A heat capacity material associated with at least one of the tension-bearing members.

6-1924 A heat capacity material in contact with at least one of the one or more tension-bearing members to increase a work capacity of the at least one of the one or more tension-bearing members.

6-1930 An element controller configured to control the cushioning element.

6-1940 An event detector coupled to the element controller configured to detect an event.

FIG. 133

Apparatus 6-1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

6-2002 Wherein at least one of the one or more tension-bearing members comprises one or more polyaramid fibers.

6-2004 Wherein one or more of the tension-bearing members comprises at least one of a graphitic fiber, a carbon fiber, and/or natural fibers.

6-2006 Wherein one or more of the tension-bearing members comprises at least one of a poly-benzobisoxazole fiber, and/or a synthetic fiber.

6-2008 Wherein at least one of the one or more tension-bearing members lies on a surface of the cushioning element.

6-2010 Wherein at least one of the one or more tension-bearing members lies within an interior portion of the cushioning element.

6-2012 Wherein at least some of the tension-bearing members have different tension properties than other tension-bearing members.

ENERGY DISSIPATIVE CUSHIONING ELEMENTS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s). If any, listed below are incorporated by reference. In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 11/136,339, entitled WEARABLE/PORTABLE PROTECTION FOR A BODY, naming MURIEL Y. ISHIKAWA, EDWARD K. Y. JUNG, CAMERON A. MYHRVOLD, CONOR L. MYHRVOLD, NATHAN P. MYHRVOLD, LOWELL L. WOOD, JR. AND VICTORIA Y. H. WOOD as inventors, filed 24 May 2005, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/603,965, entitled ACTUATABLE CUSHIONING ELEMENTS, naming RODERICK A. HYDE, EDWARD K. Y. JUNG, ROYCE A. LEVIEN, ROBERT W. LORD, MARK A. MALAMUD, JOHN D. RINALDO, JR., AND LOWELL L. WOOD, JR. as inventors, filed 21 Nov. 2006, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/726,706, entitled ACTUATABLE CUSHIONING ELEMENTS, naming RODERICK A. HYDE, EDWARD K. Y. JUNG, ROYCE A. LEVIEN, ROBERT W. LORD, MARK A. MALAMUD, JOHN D. RINALDO, JR., AND LOWELL L. WOOD, JR. as inventors, filed 21 Mar. 2007, which is currently co-pending or is an application of which a currently co-pending application is entitled to the benefit of the filing date.

For purposes of the USPTO extra-statutory requirements, the present application constitutes a continuation-in-part of U.S. patent application Ser. No. 11/868,416, entitled ENERGY DISSIPATIVE CUSHIONING ELEMENTS, naming RODERICK A. HYDE, MURIEL Y. ISHIKAWA, LOWELL L. WOOD, JR. as inventors, filed 5 Oct. 2007, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,442, entitled ENERGY DISSIPATIVE CUSHIONING ELEMENTS, naming RODERICK A. HYDE, MURIEL Y. ISHIKAWA, LOWELL L. WOOD, JR. as inventors, filed 29 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/297,182, entitled ENERGY DISSIPATIVE CUSHIONING ELEMENTS, naming RODERICK A. HYDE, MURIEL Y. ISHIKAWA, LOWELL L. WOOD, JR. as inventors, filed 5 Jun. 2014, which is currently co-pending or is an application of which a currently co-pending application is entitled to the benefit of the filing date.

For purposes of the USPTO extra-statutory requirements, the present application constitutes a continuation-in-part of U.S. patent application Ser. No. 15/136,260, entitled ENERGY DISSIPATIVE CUSHIONING ELEMENTS, naming RODERICK A. HYDE, MURIEL Y. ISHIKAWA, EDWARD K. Y. JUNG, ROYCE A. LEVIEN, ROBERT W. LORD, MARK A. MALAMUD, CAMERON A. MYHRVOLD, CONOR L. MYHRVOLD, NATHAN P. MYHRVOLD, JOHN D. RINALDO, JR., LOWELL L. WOOD, JR., AND VICTORIA Y. H. WOOD as inventors, filed 22 Apr. 2016, which is currently co-pending or is an application of which a currently co-pending application is entitled to the benefit of the filing date.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

SUMMARY

In one embodiment, a method includes but is not limited to sensing a particular state of a body. In response to the sensing, protecting the body from an object by at least determining one or more protective specifics related to at least one protective action based upon specifics of the state. Additionally, at least one protective action is activated that includes at least the one or more protective specifics based on the determining. In addition to the foregoing, other method aspects are described in the claims, drawings, and text forming a part of the present application.

In a different embodiment, a method includes but is not limited to placing at least a portion of a system at least in part on a break associated with a body. The system that is placed on the break includes at least (1) a sensor that is substantially capable of sensing at least a particular state of a body; and (2) a protective instrument sub-system that activates a protective mode in response to the sensor sensing the particular state. The protective instrument sub-system includes at least two individually activatable portions. The system is configured to have at least a portion of the protective instrument sub-system located at least in part on the body. In addition to the foregoing, other method/system aspects are described in the claims, drawings, and text forming a part of the present application.

In another embodiment, a system includes but is not limited to a detector that is substantially capable of detecting at least a particular state of a body, in which the system is substantially configured for having the detector positioned on the body. The system also may include circuitry for determining one or more specifics associated substantially with at least one protective action based substantially upon the state. Additionally, the system may include a protective instrument that is activated substantially based on the determination performed by the circuitry. The system may be configured for having the protective instrument placed substantially on the body. In addition to the foregoing, other system aspects are described in the claims, drawings, and text forming a part of the present application.

In another embodiment, the system includes but is not limited to a detector that is substantially capable of detecting at least a particular state of a body passing through a vicinity where the sensor is substantially located. The system also includes at least circuitry that determines whether to send an activation signal to a protective instrument located substantially at a body based on at least information derived from the detecting of the detector. The activation signal is appropriate for activating a protective instrument that is substantially protecting the body from the object. In addition to the foregoing,
other system aspects are described in the claims, drawings, and text forming a part of the present application.

In another embodiment, a system includes but is not limited to circuitry that is substantially configured for receiving one or more signals from a detector, in which the one or more signals are associated substantially with at least a state of a body.
Additionally, the circuitry is configured for determining whether to send at least one activation signal to a protective instrument located substantially at the body based on at least information derived from the one or more signals received. The at least one activation signal being appropriate for protecting the body from the object. In addition to the foregoing, other system aspects are described in the claims, drawings, and text forming a part of the present application.

In an embodiment, a system includes but is not limited to a machine-readable medium carrying one or more instructions for implementing a machine-implemented method. The method includes analyzing results of sensing a state of a body. The method also includes determining whether to activate a protective mode based substantially on the analyzing. Additionally, the method includes, based substantially on the analyzing, determining one or more specifics associated with the protective mode. In addition to the foregoing, other system/method aspects are described in the claims, drawings, and text forming a part of the present application.

In another embodiment, a system is provided that includes but is not limited to a sensor that is substantially capable of sensing at least a particular state of a body. Additionally, the system includes a protective instrument sub-system that activates a protective mode in response to the sensor sensing the particular state. The protective instrument sub-system includes at least two portions that are capable of being independently activated. The system is configured to have at least a portion of the protective instrument sub-system located at least in part on the body. In addition to the foregoing, other system aspects are described in the claims, drawings, and text forming a part of the present application.

In another embodiment, the system includes but is not limited to at least two sensors for sensing at least one acceleration of a body or portions thereof, at least one stored energy reservoir, and at least two actuators located on or about one or more parts of the body. The inflatable bags may be inflated as a result oft the at least one reservoir releasing a stored energy-medium to at least one actuator respectively. The system also includes at least one processor that determines if one or more consequences of a measured acceleration history are likely to result in an adverse interaction that will impose damage to the body as a result of interaction with at least one of the one or more objects. The processors also determine an amount and/or a release rate-vs.-time-program of the stored energy medium to release to each of a set of one or more of the at least two actuators. The amounts of stored energy-medium released and which actuators are selected to be within the set are determined according to a model of the body and a model of physical laws that determine a manner in which the body is expected to move relative to the one or more objects. The processor sends one or more signals to release the stored energy medium based on at least the determining of the amount and/or the release rate-vs.-time-program. In addition to the foregoing, other system aspects are described in the claims, drawings, and text forming a part of the present application.

In addition to the foregoing, various other method and/or system and/or program product aspects are set forth and described in the teachings such as text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

An embodiment provides a method. In one implementation, the method includes but is not limited to enabling a first subset of actuatable cushioning elements for a first time period, enabling a second subset of actuatable cushioning elements for a second time period, determining an event, and actuating, based on a time the event is determined, at least one of the first subset of actuatable cushioning elements or the second subset of actuatable cushioning elements to provide cushioning support for an object. In addition to the foregoing, other method aspects are described in the claims, drawings, and text forming a part of the present disclosure.

An embodiment provides a method. In one implementation, the method includes but is not limited to determining an event, establishing a communication between two or more actuatable cushioning elements, and actuating a subset of the two or more actuatable cushioning elements in response to the communication between the two or more actuatable cushioning elements. In addition to the foregoing, other method aspects are described in the claims, drawings, and text forming a part of the present disclosure.

An embodiment provides a method. In one implementation, the method includes but is not limited to determining an event, and actuating a subset of two or more actuatable cushioning elements based on a random or pseudo-random function to provide cushioning support for an object. In addition to the foregoing, other method aspects are described in the claims, drawings, and text forming a part of the present disclosure.

An embodiment provides a method. In one implementation, the method includes but is not limited to determining an event, and actuating, based on the determining an event, a subset from 12 or more actuatable cushioning elements to provide cushioning support for an object. In addition to the foregoing, other method aspects are described in the claims, drawings, and text forming a part of the present disclosure.

An embodiment provides an apparatus. In one implementation, the apparatus includes but is not limited to at least two actuatable cushioning elements configured to provide cushioning support for an object, the actuatable cushioning elements including a first subset of actuatable cushioning elements enabled to actuate in response to an event during a first time period, and a second subset of actuatable cushioning elements enabled to actuate in response to an event during a second time period. In addition to the foregoing, other apparatus aspects are described in the claims, drawings, and text forming a part of the present disclosure.

An embodiment provides an apparatus. In one implementation, the apparatus includes but is not limited to at least two actuatable cushioning elements adapted for communication. The apparatus is configured to determine an event, and actuate, based upon communication between two or more of the actuatable cushioning elements, a subset of the actuatable cushioning elements in response to determining the event to provide cushioning support for an object. In addition to the foregoing, other apparatus aspects are described in the claims, drawings, and text forming a part of the present disclosure.

An embodiment provides an apparatus. In one implementation, the apparatus includes but is not limited to at least twelve actuatable cushioning elements. The apparatus is configured to determine an event, and actuate, based on the event, a subset of the actuatable cushioning elements to provide cushioning support for an object. In addition to the foregoing, other apparatus aspects are described in the claims, drawings, and text forming a part of the present disclosure.

An embodiment provides an apparatus. In one implementation, the apparatus includes but is not limited to at least two actuatable cushioning elements. The apparatus is configured to determine an event, and actuate a subset of two or more actuatable cushioning elements based on a random or pseudo-random function to provide cushioning support for an object. In addition to the foregoing, other apparatus aspects are described in the claims, drawings, and text forming a part of the present disclosure.

An embodiment provides a computer program product. In one implementation, the computer program product includes but is not limited to a signal bearing medium bearing one or more instructions for enabling a first subset of actuatable cushioning elements for a first time period, the signal bearing medium also bearing one or more instructions for enabling a second subset of actuatable cushioning elements for a second time period, the signal bearing medium also bearing one or more instructions for determining an event, and the signal bearing medium also bearing one or more instructions for actuating, based on a time the event is determined, at least one of the first subset of actuatable cushioning elements or the second subset of actuatable cushioning elements to provide cushioning support for an object. In addition to the foregoing, other computer program product aspects are described in the claims, drawings, and text forming a part of the present disclosure.

An embodiment provides a method. In one implementation, the method includes but is not limited to enabling a first subset of actuatable cushioning elements for a first time period, enabling a second subset of actuatable cushioning elements for a second time period, determining an event, and actuating, based on a time the event is determined, at least one of the first subset of actuatable cushioning elements or the second subset of actuatable cushioning elements to provide cushioning support for an object. In addition to the foregoing, other method aspects are described in the claims, drawings, and text forming a part of the present disclosure.

An embodiment provides a method. In one implementation, the method includes but is not limited to determining an event, establishing a communication between two or more actuatable cushioning elements, and actuating a subset of the two or more actuatable cushioning elements in response to the communication between the two or more actuatable cushioning elements. In addition to the foregoing, other method aspects are described in the claims, drawings, and text forming a part of the present disclosure.

An embodiment provides a method. In one implementation, the method includes but is not limited to determining an event, and actuating a subset of two or more actuatable cushioning elements based on a random or pseudo-random function to provide cushioning support for an object. In addition to the foregoing, other method aspects are described in the claims, drawings, and text forming a part of the present disclosure.

An embodiment provides a method. In one implementation, the method includes but is not limited to determining an event, and actuating, based on the determining an event, a subset from 12 or more actuatable cushioning elements to provide cushioning support for an object. In addition to the foregoing, other method aspects are described in the claims, drawings, and text forming a part of the present disclosure.

An embodiment provides an apparatus. In one implementation, the apparatus includes but is not limited to at least two actuatable cushioning elements configured to provide cushioning support for an object, the actuatable cushioning elements including a first subset of actuatable cushioning elements enabled to actuate in response to an event during a first time period, and a second subset of actuatable cushioning elements enabled to actuate in response to an event during a second time period. In addition to the foregoing, other apparatus aspects are described in the claims, drawings, and text forming a part of the present disclosure.

An embodiment provides an apparatus. In one implementation, the apparatus includes but is not limited to at least two actuatable cushioning elements adapted for communication. The apparatus is configured to determine an event, and actuate, based upon communication between two or more of the actuatable cushioning elements, a subset of the actuatable cushioning elements in response to determining the event to provide cushioning support for an object. In addition to the foregoing, other apparatus aspects are described in the claims, drawings, and text forming a part of the present disclosure.

An embodiment provides an apparatus. In one implementation, the apparatus includes but is not limited to at least twelve actuatable cushioning elements. The apparatus is configured to determine an event, and actuate, based on the event, a subset of the actuatable cushioning elements to provide cushioning support for an object. In addition to the foregoing, other apparatus aspects are described in the claims, drawings, and text forming a part of the present disclosure.

An embodiment provides an apparatus. In one implementation, the apparatus includes but is not limited to at least two actuatable cushioning elements. The apparatus is configured to determine an event, and actuate a subset of two or more actuatable cushioning elements based on a random or pseudo-random function to provide cushioning support for an object. In addition to the foregoing, other apparatus aspects are described in the claims, drawings, and text forming a part of the present disclosure.

An embodiment provides a computer program product. In one implementation, the computer program product includes but is not limited to a signal bearing medium bearing one or more instructions for enabling a first subset of actuatable cushioning elements for a first time period, the signal bearing medium also bearing one or more instructions for enabling a second subset of actuatable cushioning elements for a second time period, the signal bearing medium also bearing one or more instructions for determining an event, and the signal bearing medium also bearing one or more instructions for actuating, based on a time the event is determined, at least one of the first subset of actuatable cushioning elements or the second subset of actuatable cushioning elements to provide cushioning support for an object. In addition to the foregoing, other computer program product aspects are described in the claims, drawings, and text forming a part of the present disclosure.

An embodiment provides a method. In one implementation, the method includes but is not limited to: determining an event; actuating a cushioning element in response to the determining the event, the cushioning element including one or more tension-bearing members; and dissipating at least some of an energy associated with a collision based on deforming at least one of the tension-bearing members during the collision, the deforming including substantially inelastically stretching the at least one of the tension-bearing members. In addition to the foregoing, other method aspects are described in the claims, drawings, and text forming a part of the present disclosure.

An embodiment provides a computer program product. In one implementation, the computer program product includes but is not limited to a signal bearing medium bearing one or more instructions for determining an event; the signal bearing medium also bearing one or more instructions for actuating a cushioning element in response to the determining the event, the cushioning element including one or more tension-bearing members; and the signal bearing medium bearing one or more instructions for providing control sufficient to cause dissipation of at least some of an energy associated with a collision based on deforming at least one of the tension-bearing members during the collision, the deforming including substantially inelastically stretching the at least one of the tension-bearing members. In addition to the foregoing, other computer program product aspects are described in the claims, drawings, and text forming a part of the present disclosure.

An embodiment provides a system. In one implementation, the system includes but is not limited to: a computing device, and one or more instructions that when executed on the computing device cause the computing device to: determine an event; actuate a cushioning element in response to the determining the event, the cushioning element including one or more tension-bearing members; and provide control sufficient to dissipate at least some of an energy associated with a collision based on deforming at least one of the tension-bearing members during the collision, the deforming including substantially inelastically stretching the at least one of the tension-bearing members. In addition to the foregoing, other system aspects are described in the claims, drawings, and text forming a part of the present disclosure.

An embodiment provides an apparatus. In one implementation, the apparatus includes but is not limited to: a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. In addition to the foregoing, other apparatus aspects are described in the claims, drawings, and text forming a part of the present disclosure.

An embodiment provides a method. In one implementation, the method includes but is not limited to constructing a cushioning element including one or more tension-bearing members, at least one of the one or more tension-bearing members being configured to stretch during a collision, including being configured to stretch beyond an elastic limit, to dissipate at least some of a kinetic energy associated with the collision. In addition to the foregoing, other method aspects are described in the claims, drawings, and text forming a part of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

An embodiment provides a method. In one implementation, the method includes but is not limited to: determining an event; actuating a cushioning element in response to the determining the event, the cushioning element including one or more tension-bearing members; and dissipating at least some of an energy associated with a collision based on deforming at least one of the tension-bearing members during the collision, the deforming including substantially inelastically stretching the at least one of the tension-bearing members. In addition to the foregoing, other method aspects are described in the claims, drawings, and text forming a part of the present disclosure.

An embodiment provides a computer program product. In one implementation, the computer program product includes but is not limited to a signal bearing medium bearing one or more instructions for determining an event; the signal bearing medium also bearing one or more instructions for actuating a cushioning element in response to the determining the event, the cushioning element including one or more tension-bearing members; and the signal bearing medium bearing one or more instructions for providing control sufficient to cause dissipation of at least some of an energy associated with a collision based on deforming at least one of the tension-bearing members during the collision, the deforming including substantially inelastically stretching the at least one of the tension-bearing members. In addition to the foregoing, other computer program product aspects are described in the claims, drawings, and text forming a part of the present disclosure.

An embodiment provides a system. In one implementation, the system includes but is not limited to: a computing device, and one or more instructions that when executed on the computing device cause the computing device to: determine an event; actuate a cushioning element in response to the determining the event, the cushioning element including one or more tension-bearing members; and provide control sufficient to dissipate at least some of an energy associated with a collision based on deforming at least one of the tension-bearing members during the collision, the deforming including substantially inelastically stretching the at least one of the tension-bearing members. In addition to the foregoing, other system aspects are described in the claims, drawings, and text forming a part of the present disclosure.

An embodiment provides an apparatus. In one implementation, the apparatus includes but is not limited to: a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. In addition to the foregoing, other apparatus aspects are described in the claims, drawings, and text forming a part of the present disclosure.

An embodiment provides a method. In one implementation, the method includes but is not limited to constructing a cushioning element including one or more tension-bearing members, at least one of the one or more tension-bearing members being configured to stretch during a collision, including being configured to stretch beyond an elastic limit, to dissipate at least some of a kinetic energy associated with the collision. In addition to the foregoing, other method aspects are described in the claims, drawings, and text forming a part of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

An embodiment provides a method. In one implementation, the method includes but is not limited to: determining an event; actuating a cushioning element in response to the determining the event, the cushioning element including one or more tension-bearing members; and dissipating at least some of an energy associated with a collision based on deforming at least one of the tension-bearing members during the collision, the deforming including substantially inelastically stretching the at least one of the tension-bearing members. In addition to the foregoing, other method aspects are described in the claims, drawings, and text forming a part of the present disclosure.

An embodiment provides a computer program product. In one implementation, the computer program product includes but is not limited to a signal bearing medium bearing one or more instructions for determining an event; the signal bearing medium also bearing one or more instructions for actuating a cushioning element in response to the determining the event, the cushioning element including one or more tension-bearing members; and the signal bearing medium bearing one or more instructions for providing control sufficient to cause dissipation of at least some of an energy associated with a collision based on deforming at least one of the tension-bearing members during the collision, the deforming including substantially inelastically stretching the at least one of the tension-bearing members. In addition to the foregoing, other computer program product aspects are described in the claims, drawings, and text forming a part of the present disclosure.

An embodiment provides a system. In one implementation, the system includes but is not limited to: a computing device, and one or more instructions that when executed on the computing device cause the computing device to: determine an event; actuate a cushioning element in response to the determining the event, the cushioning element including one or more tension-bearing members; and provide control sufficient to dissipate at least some of an energy associated with a collision based on deforming at least one of the tension-bearing members during the collision, the deforming including substantially inelastically stretching the at least one of the tension-bearing members. In addition to the foregoing, other system aspects are described in the claims, drawings, and text forming a part of the present disclosure.

An embodiment provides an apparatus. In one implementation, the apparatus includes but is not limited to: a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. In addition to the foregoing, other apparatus aspects are described in the claims, drawings, and text forming a part of the present disclosure.

An embodiment provides a method. In one implementation, the method includes but is not limited to constructing a cushioning element including one or more tension-bearing members, at least one of the one or more tension-bearing members being configured to stretch during a collision, including being configured to stretch beyond an elastic limit, to dissipate at least some of a kinetic energy associated with the collision. In addition to the foregoing, other method aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

In the following, drawings, like reference numbers are sometimes used to refer to like elements. Although the following figures depict various examples of embodiments, the embodiments are not limited to the examples depicted in the figures.

FIG. 1A depicts a block diagram of an embodiment of a system that provides protection to a body from adverse interactions with objects.

FIG. 1B depicts a block diagram of an embodiment of circuitry used in the system of FIG. 1A.

FIG. 14 depicts a system that includes a shirt and collar for protecting parts of the body, within which any combination of systems of FIGS. 1-12A may be used.

FIG. 15A depicts a system that includes an example of a shirt and trousers for protecting parts of the body, within which any combination of systems of FIGS. 1-12A may be used.

FIG. 15B depicts an example of a jacket for protecting a body, within which any combination of systems of FIGS. 1-12A may be used.

FIG. 16A depicts an example of a protective instrument for protecting a neck of a body, within which any combination of systems of FIGS. 1-12A may be used.

FIG. 16B depicts an example of a module for protecting an elbow of a body, within which any combination of systems of FIGS. 1-12A may be used.

FIG. 17A depicts an example of a kneepad for protecting a knee of a body, within which any combination of systems of FIGS. 1-12A may be used.

FIG. 17B depicts a protective instrument for protecting a shin of a body, within which any combination of systems of FIGS. 1-12A may be used.

FIG. 45 illustrates an example apparatus in which embodiments may be implemented.

FIG. 46 illustrates an alternative embodiment of the example apparatus of FIG. 45.

FIG. 48 illustrates a partial view of an example computer program product that includes a computer program for executing a computer process on a computing device.

FIG. 68 illustrates an example apparatus in which embodiments may be implemented.

FIG. 69 illustrates an alternative embodiment of the example apparatus of FIG. 68.

FIGS. 70A and 70B illustrate an alternative embodiment of the example apparatus of FIG. 68.

FIG. 71 illustrates a partial view of an example computer program product that includes a computer program for executing a computer process on a computing device.

FIG. 73 illustrates an actuatable cushioning element according to an example embodiment.

FIG. 74A illustrates an actuatable cushioning element according to another example embodiment.

FIG. 74B illustrates an actuatable cushioning element of FIG. 74A in a post-collision state according to an example embodiment.

FIG. 76A is a diagram illustrating a tension-bearing member according to an example embodiment.

FIG. 76B is a diagram illustrating a tension-bearing member according to another example embodiment.

FIG. 88 illustrates a partial view of an example computer program product 4-1700.

FIG. 90 illustrates an example apparatus 4-1900 in which embodiments may be implemented.

FIG. 91 also illustrates alternative embodiments of the example apparatus 4-1900.

FIG. 94 illustrates an actuatable cushioning element according to an example embodiment.

FIG. 95A illustrates an actuatable cushioning element according to another example embodiment.

FIG. 95B illustrates an actuatable cushioning element of FIG. 95A in a post-collision state according to an example embodiment.

FIG. 97A is a diagram illustrating a tension-bearing member according to an example embodiment.

FIG. 97B is a diagram illustrating a tension-bearing member according to another example embodiment.

FIG. 106 illustrates an alternative embodiment of the example operational flow of FIG. 98.

FIG. 107 illustrates an alternative embodiment of the example operational flow of FIG. 98.

FIG. 108 illustrates an alternative embodiment of the example operational flow of FIG. 98.

FIG. 109 illustrates a partial view of an example computer program product 5-1700.

FIG. 110 illustrates an example system 5-1800.

FIG. 111 illustrates an example apparatus 5-1900 in which embodiments may be implemented.

FIG. 112 also illustrates alternative embodiments of the example apparatus 5-1900.

Figure 113:
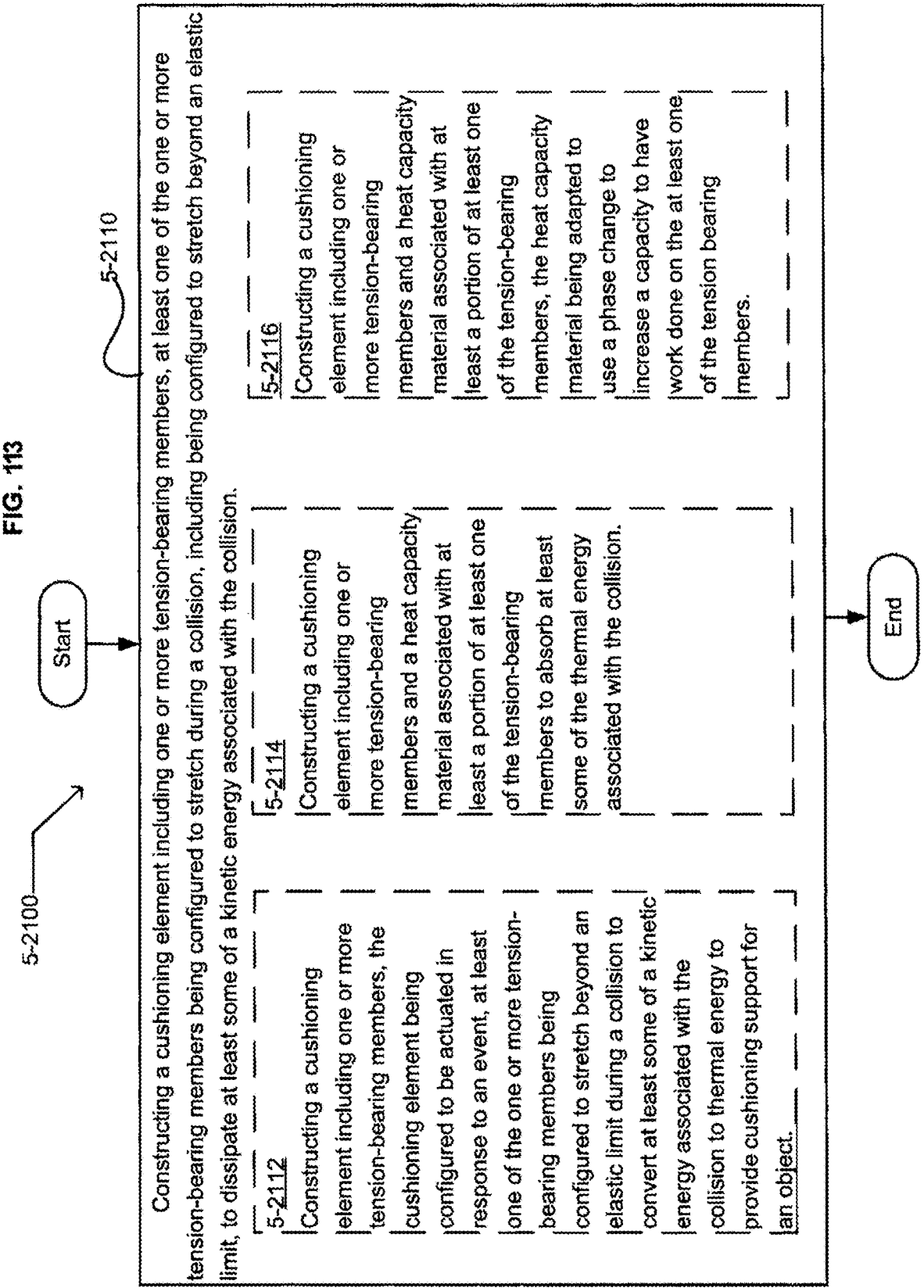

FIG. 113 illustrates an operational flow 5-2100 representing example operations related to cushioning elements.

Figure 114:
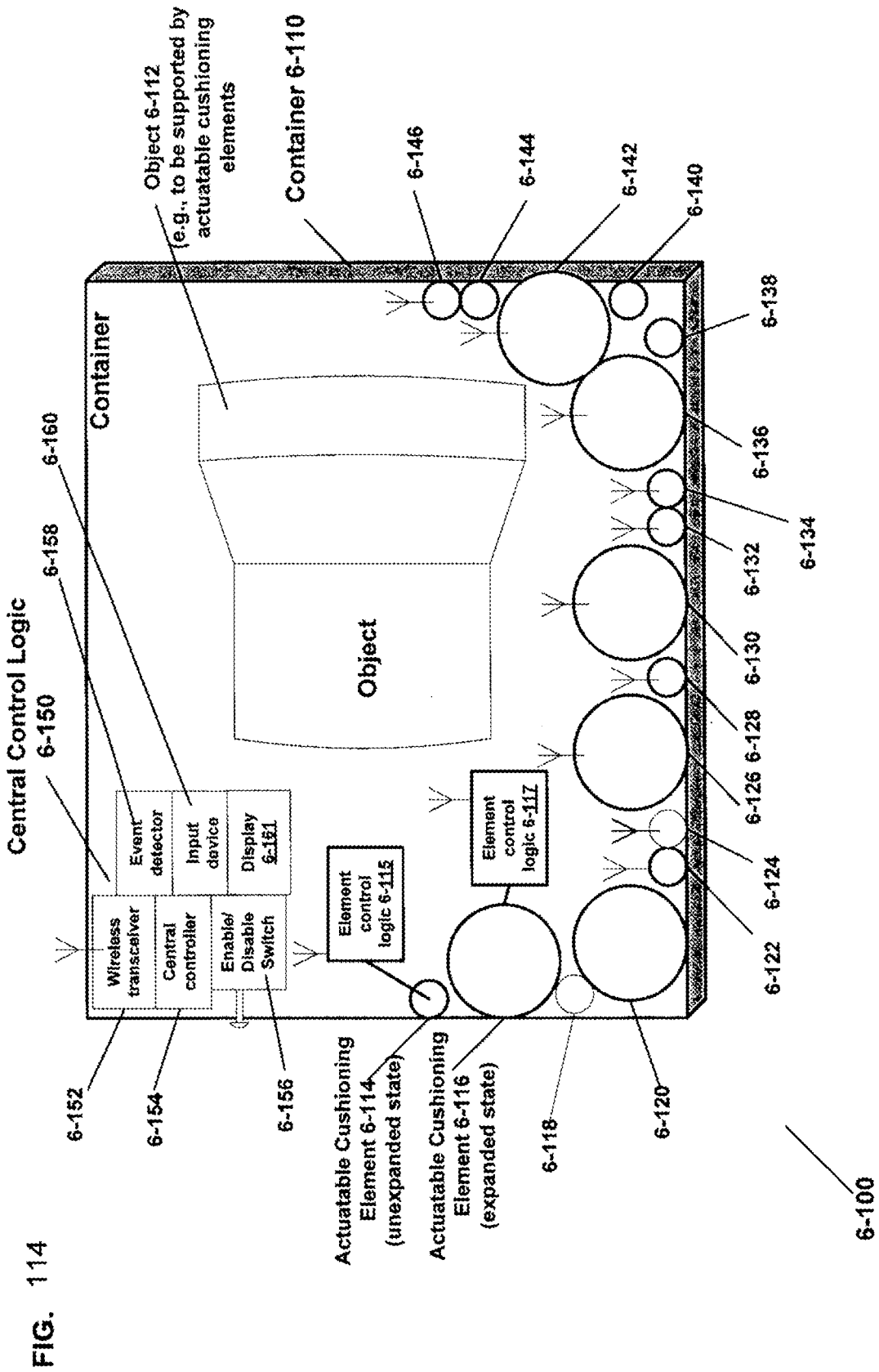

FIG. 114 illustrates an example system in which embodiments may be implemented.

Figure 115:
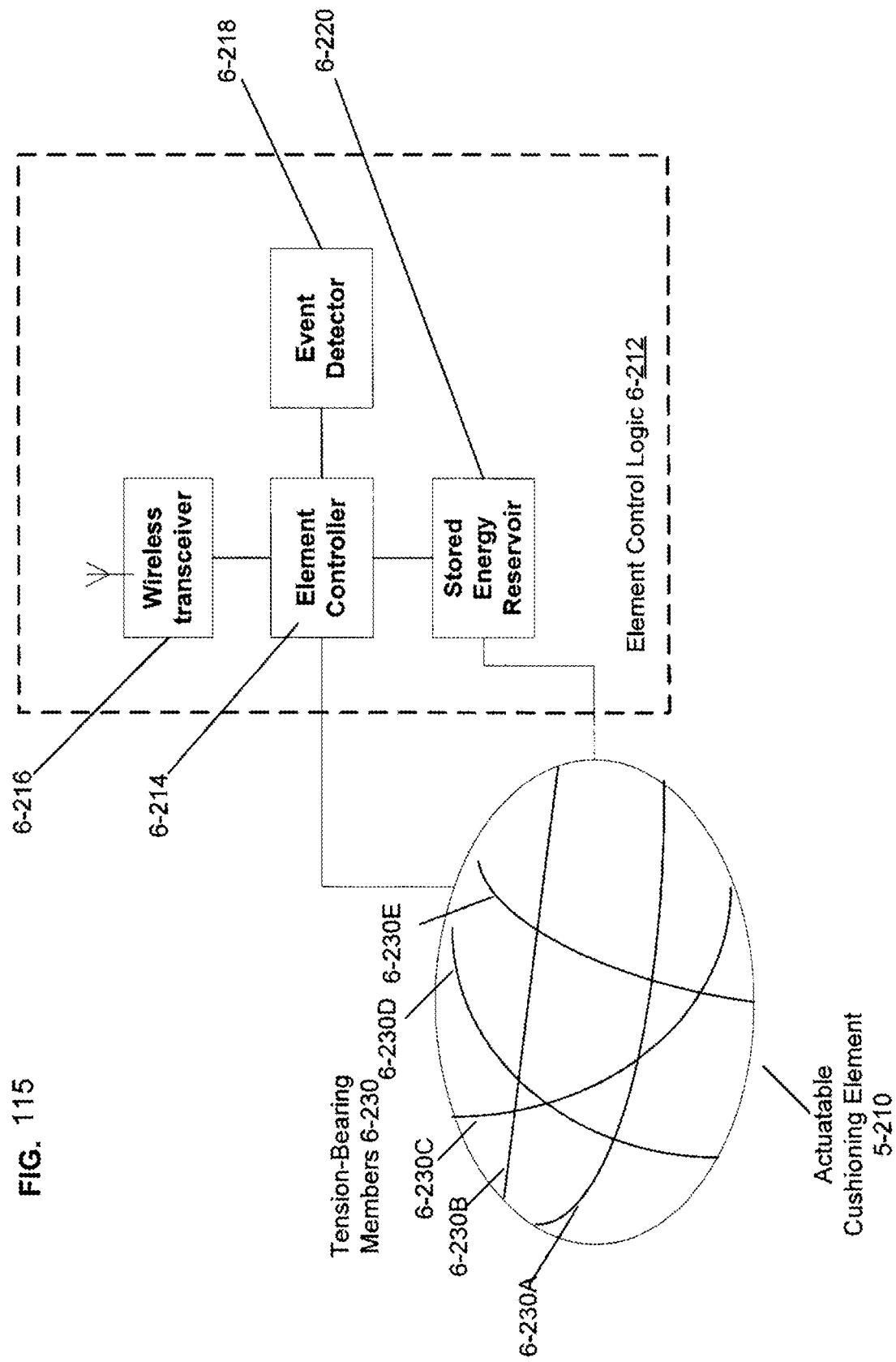

FIG. 115 illustrates an actuatable cushioning element according to an example embodiment.

FIG. 116A illustrates an actuatable cushioning element according to another example embodiment.

FIG. 116B illustrates an actuatable cushioning element of FIG. 116A in a post-collision state according to an example embodiment.

Figure 117:
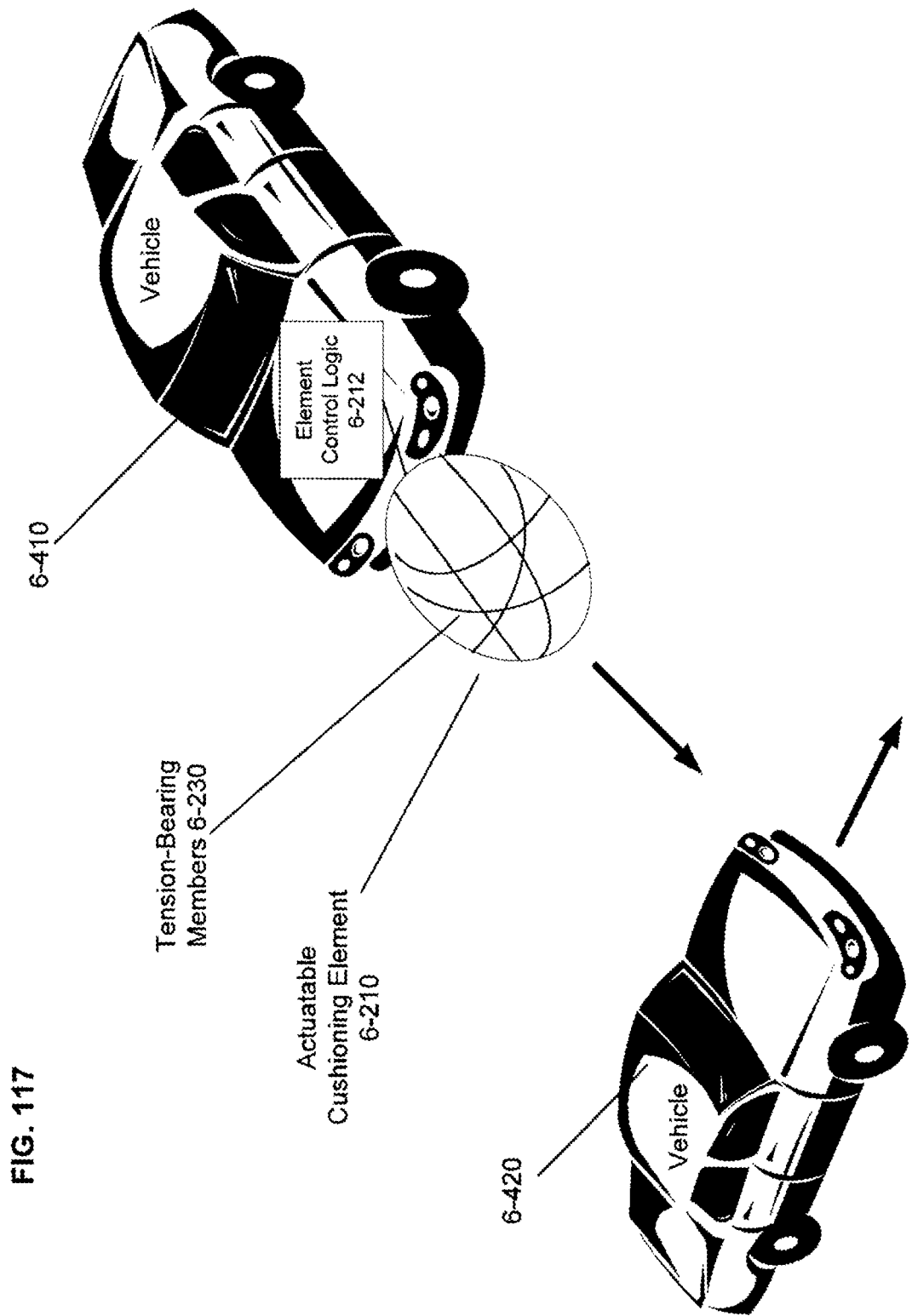

FIG. 117 is a diagram illustrating an operation of an actuatable energy dissipative cushioning element according to an example embodiment.

FIG. 118A is a diagram illustrating a tension-bearing member according to an example embodiment.

FIG. 118B is a diagram illustrating a tension-bearing member according to another example embodiment.

Figure 119:
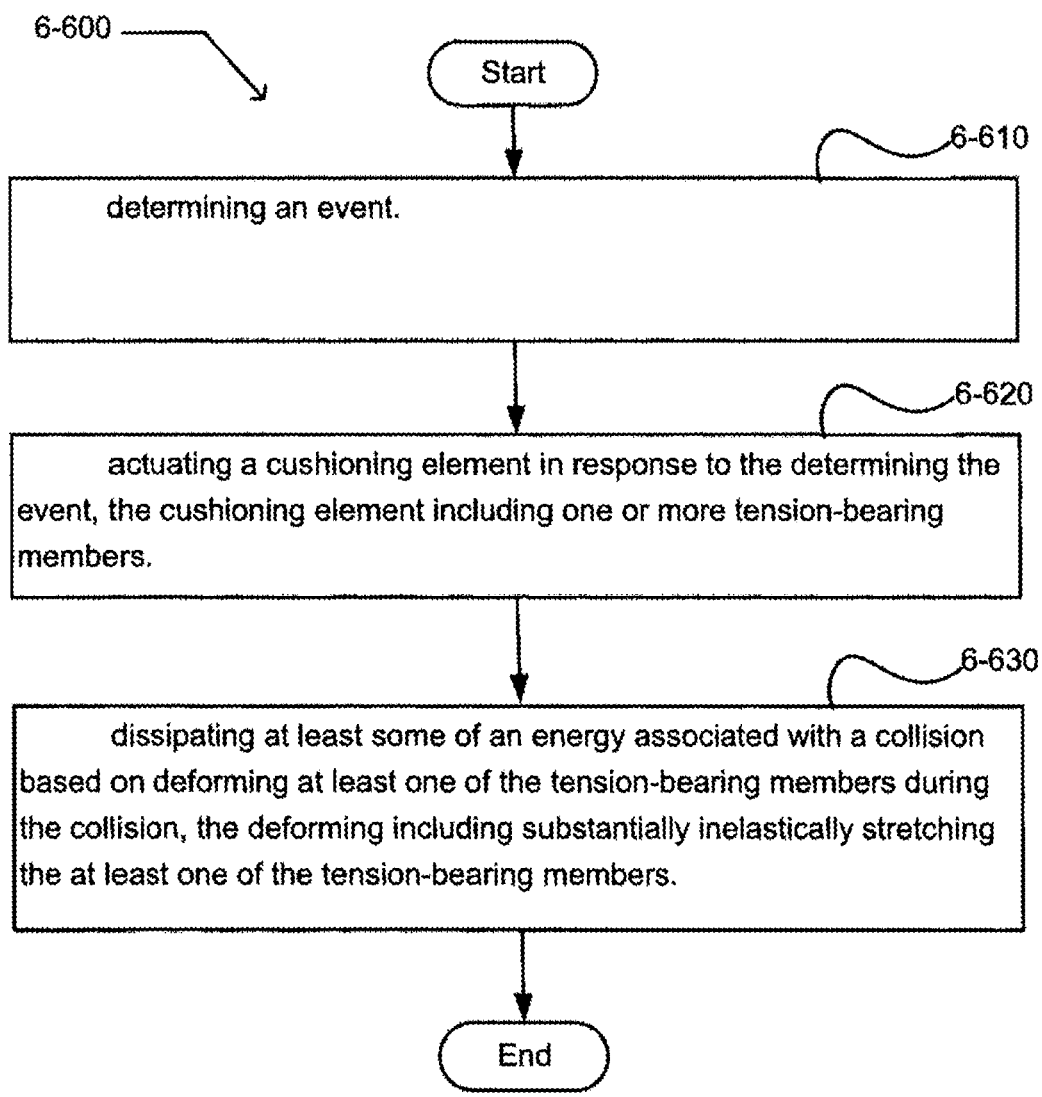

FIG. 119 illustrates an operational flow representing example operations related to actuatable energy dissipative cushioning elements according to an example embodiment.

Figure 120:
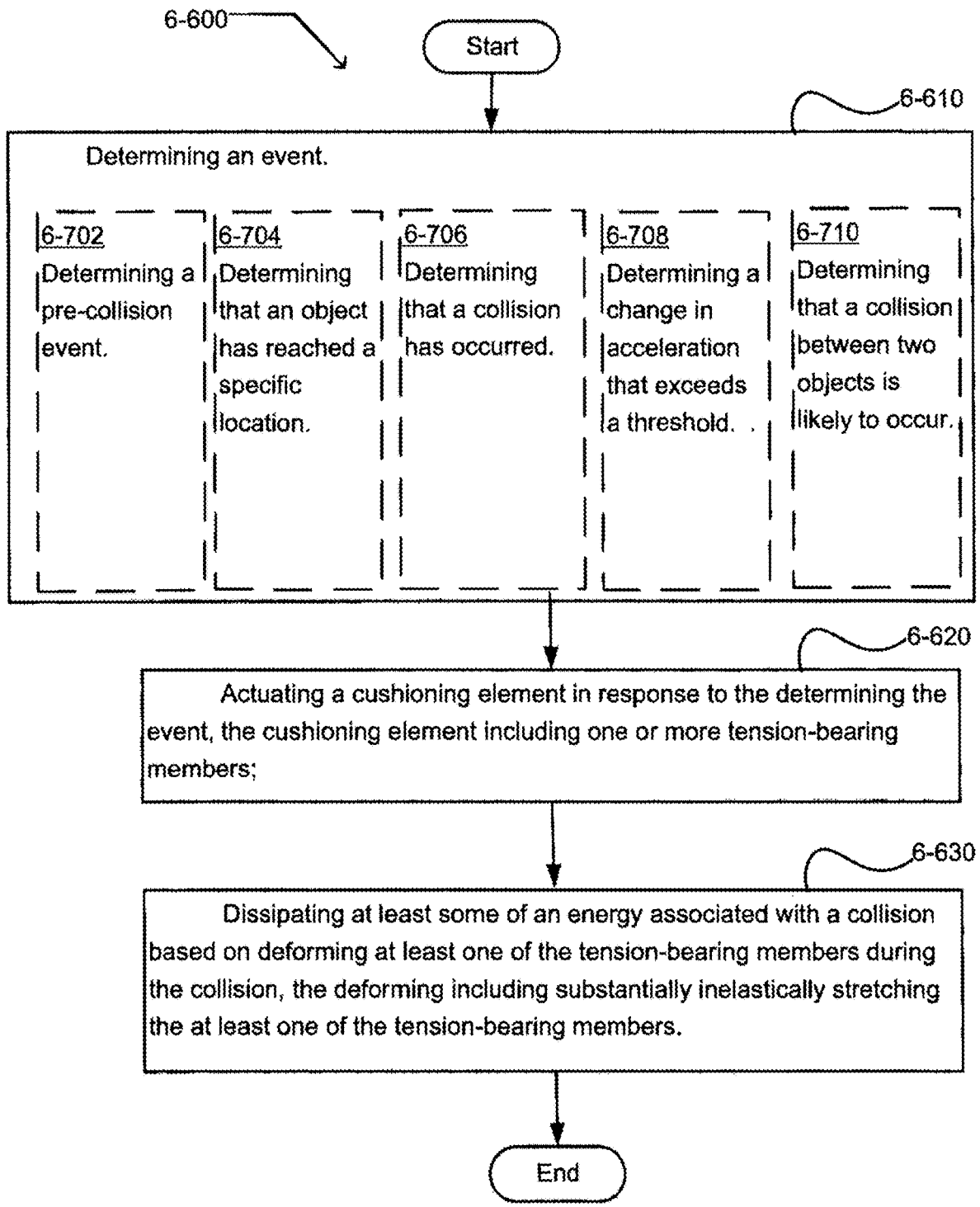

FIG. 120 illustrates an alternative embodiment of the example operational flow of FIG. 119.

Figure 121:
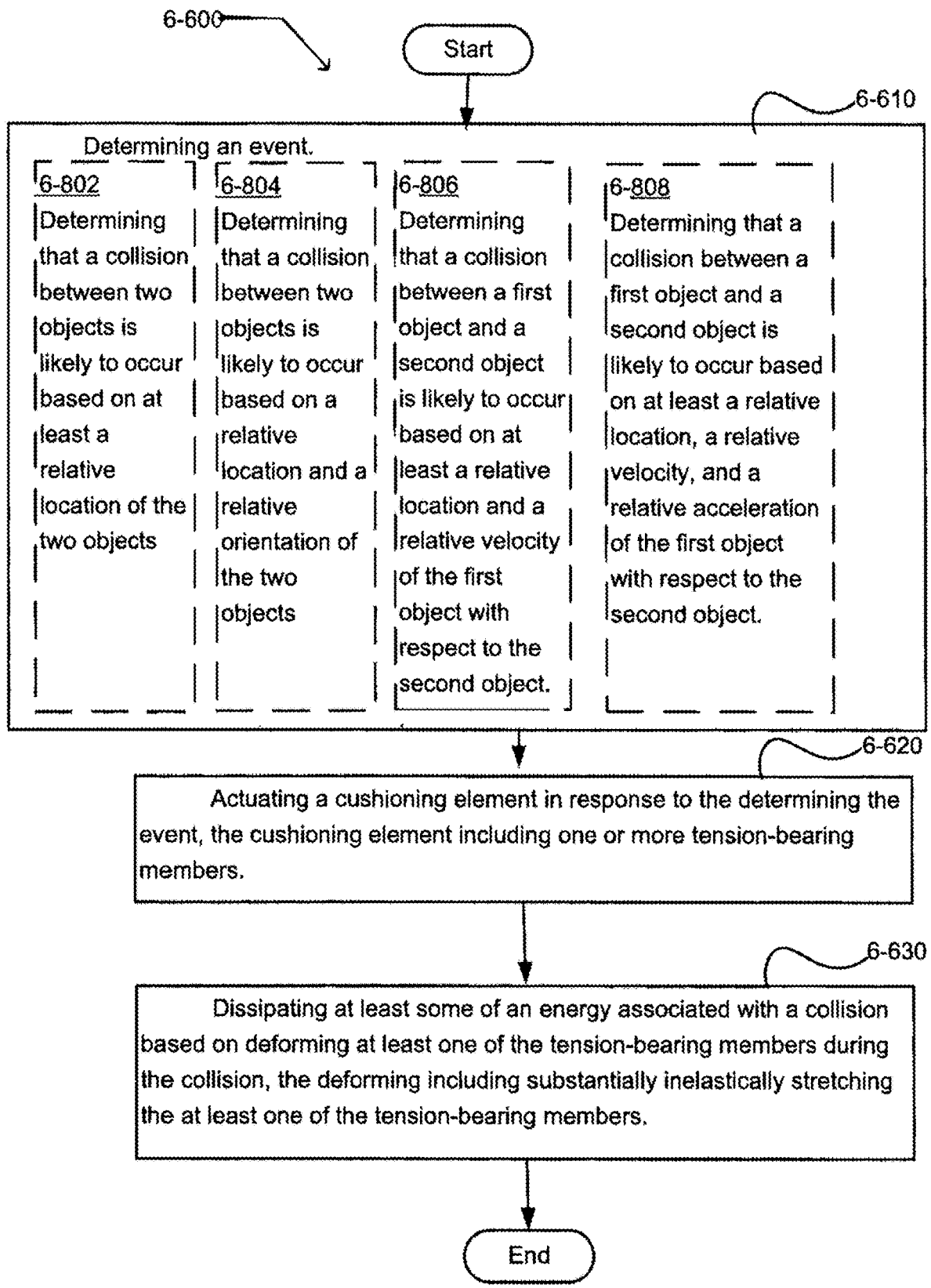

FIG. 121 illustrates an alternative embodiment of the example operational flow of FIG. 119.

Figure 122:
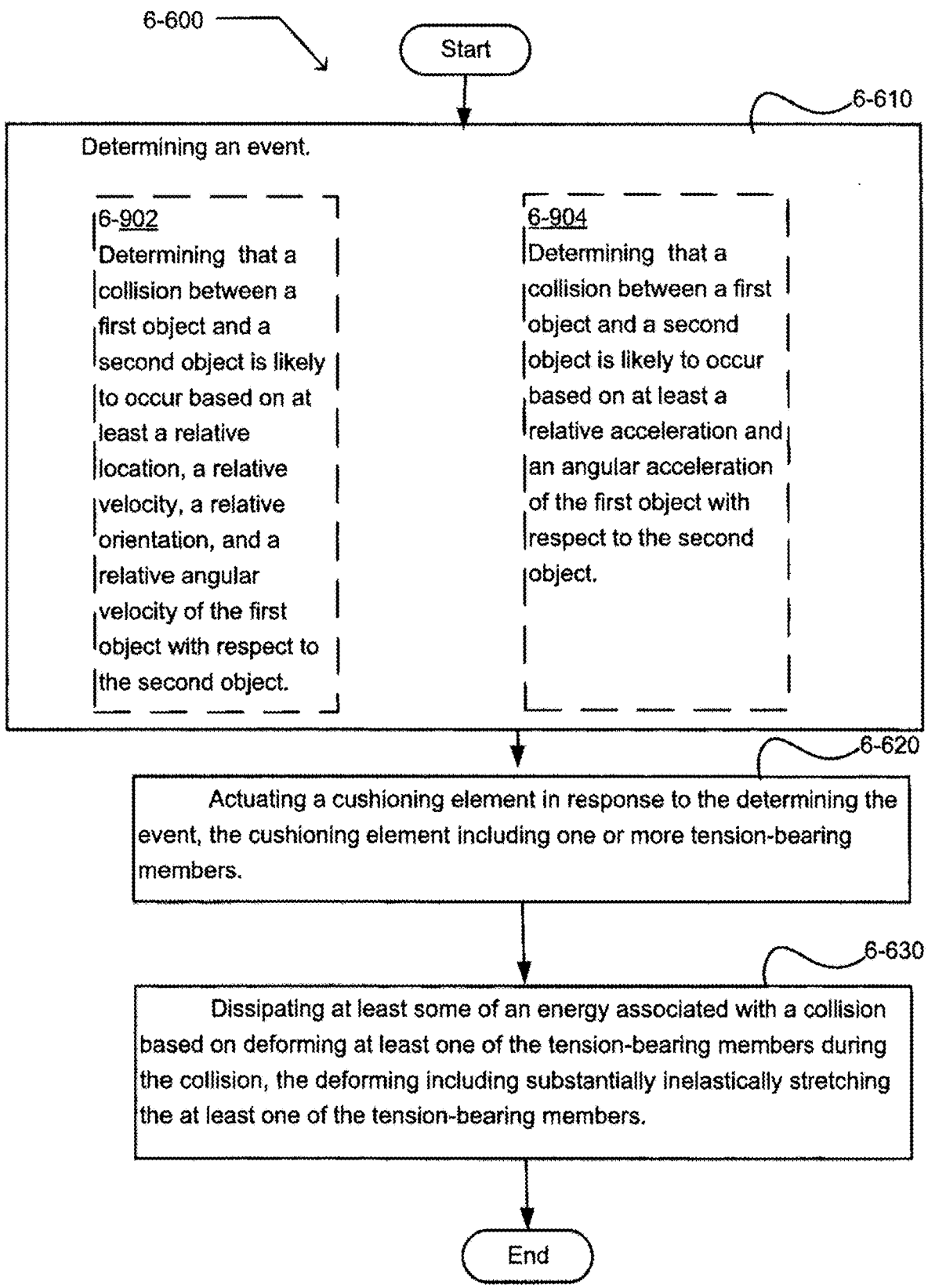

FIG. 122 illustrates an alternative embodiment of the example operational flow of FIG. 119.

Figure 123:
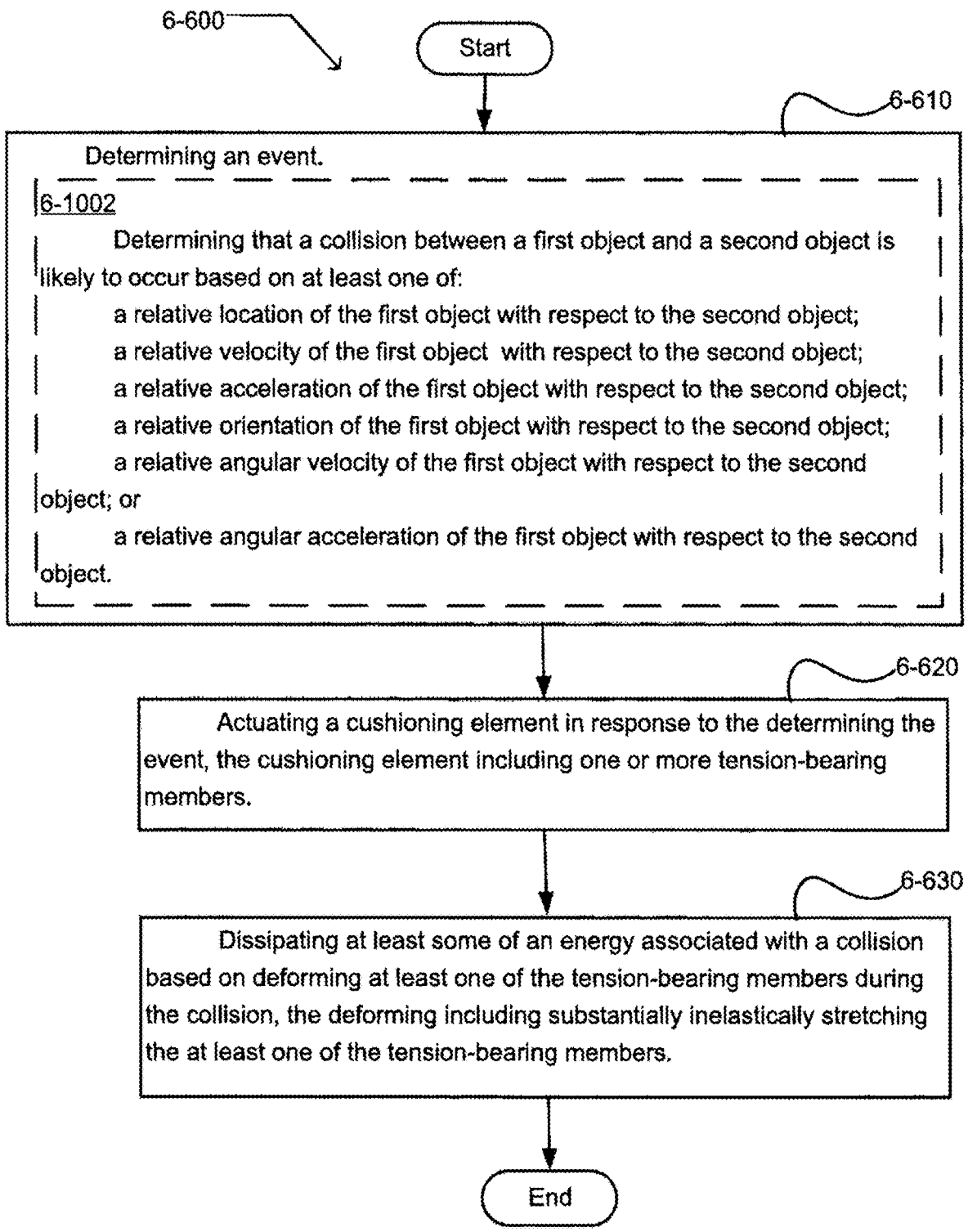

FIG. 123 illustrates an alternative embodiment of the example operational flow of FIG. 119.

Figure 124:
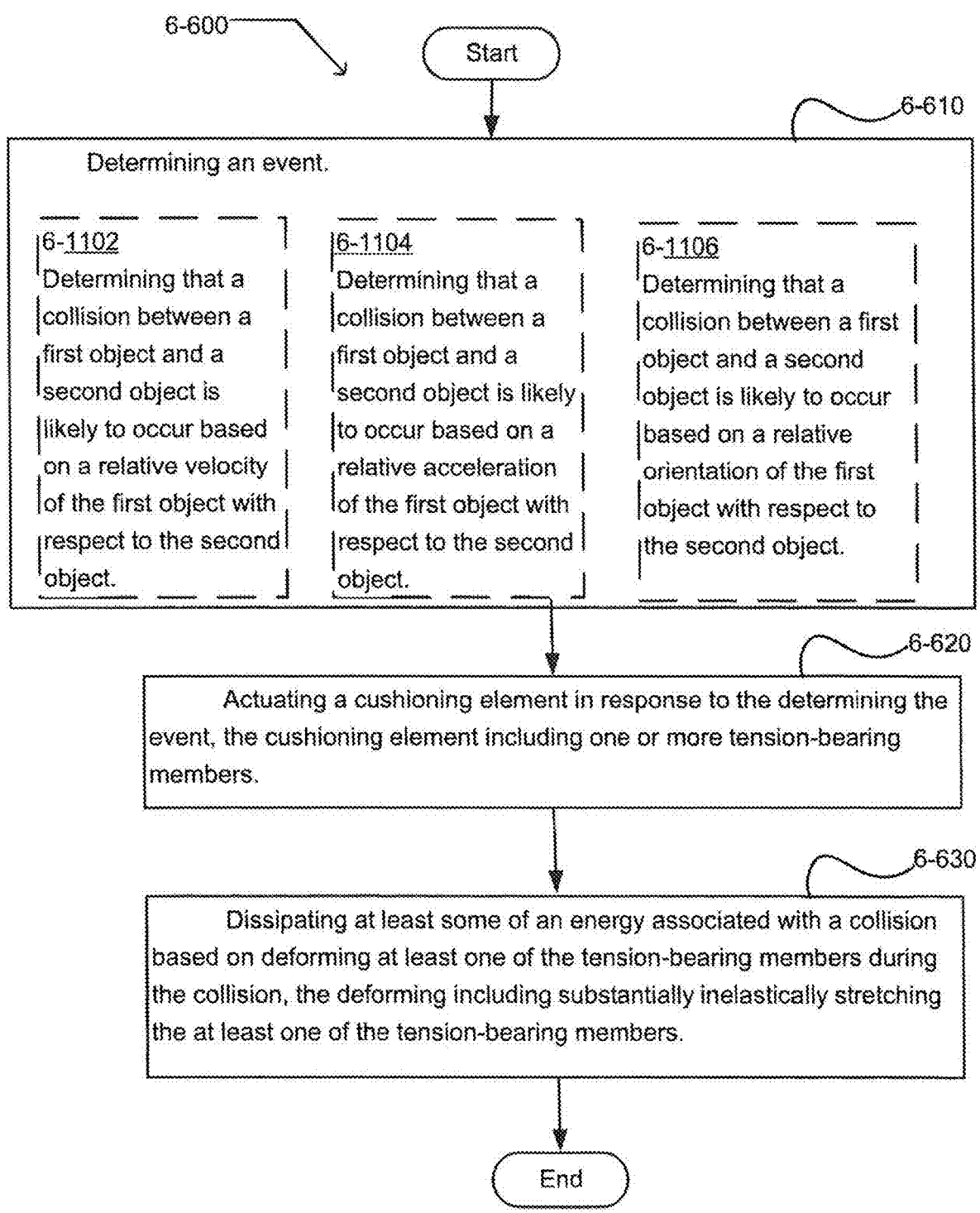

FIG. 124 illustrates an alternative embodiment of the example operational flow of FIG. 119.

Figure 125:
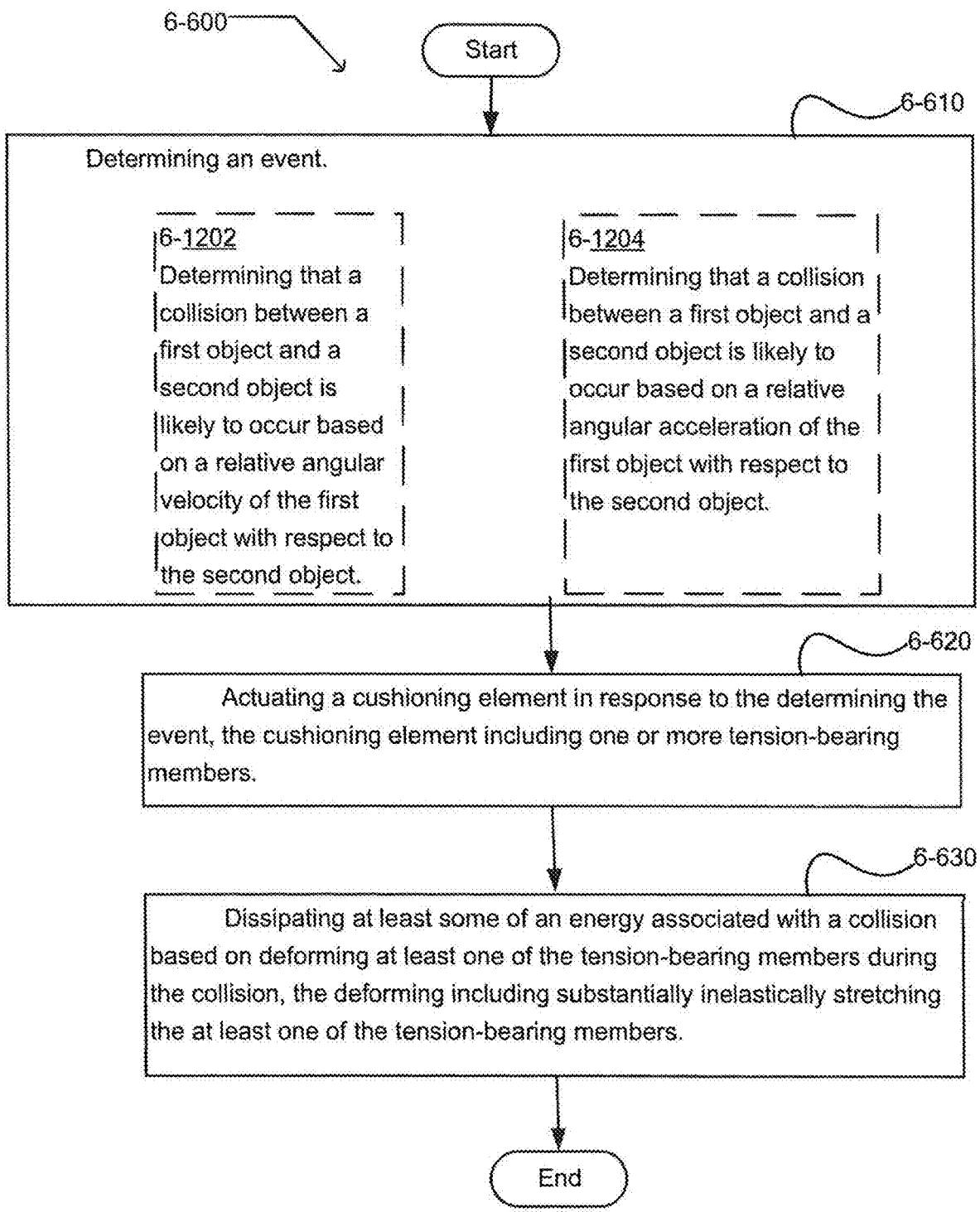

FIG. 125 illustrates an alternative embodiment of the example operational flow of FIG. 119.

Figure 126:
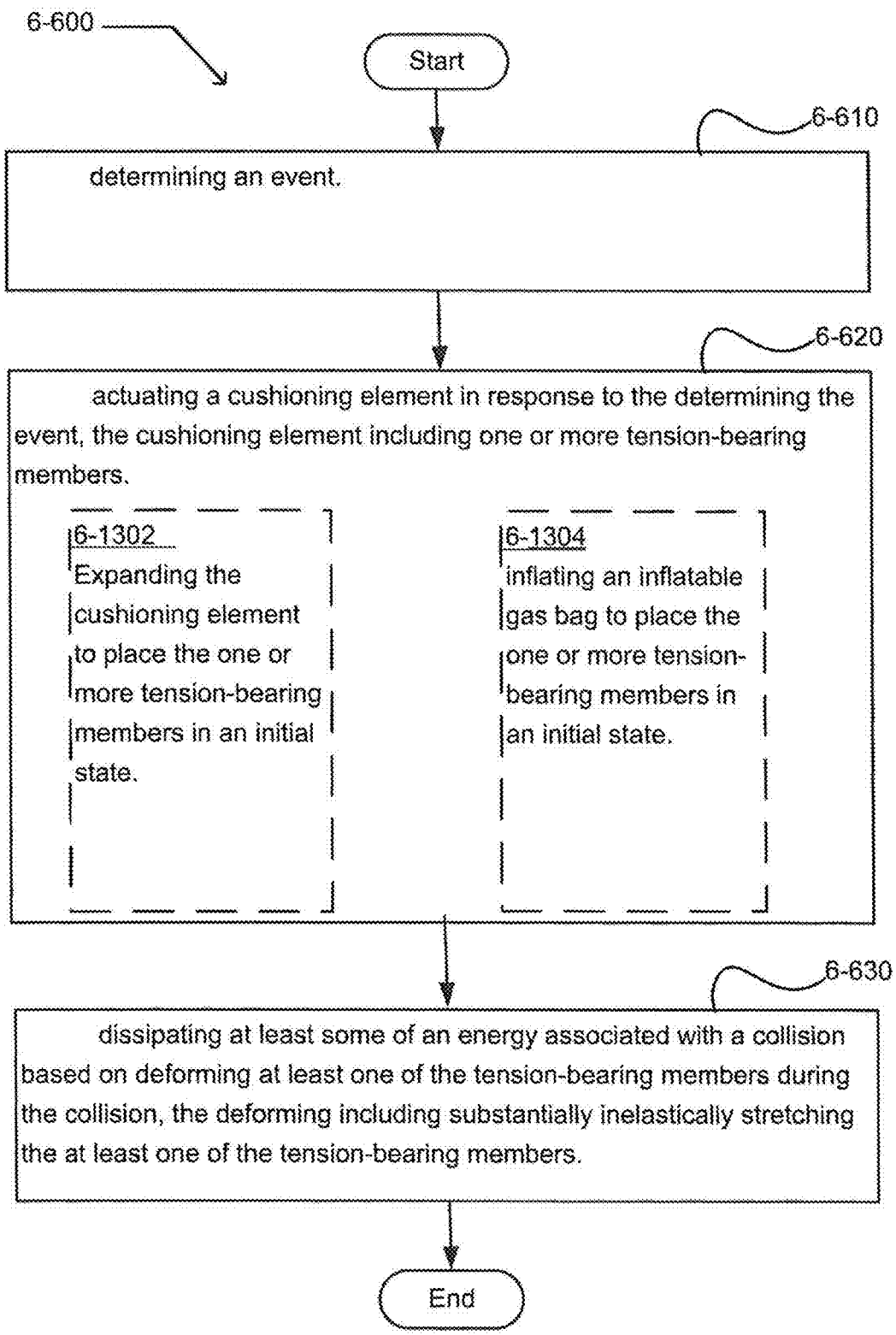

FIG. 126 illustrates an alternative embodiment of the example operational flow of FIG. 119.

Figure 127:
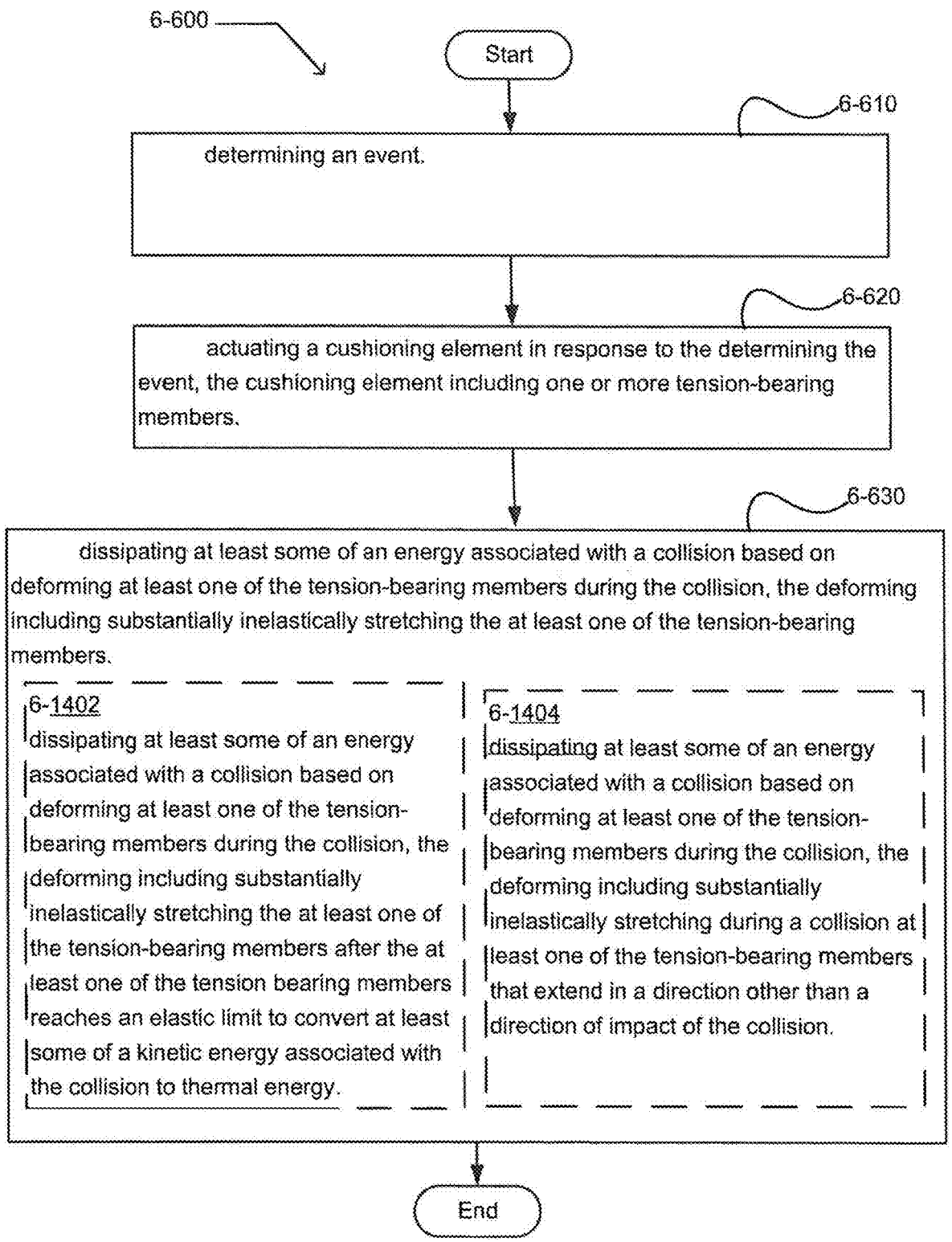

FIG. 127 illustrates an alternative embodiment of the example operational flow of FIG. 119.

Figure 128:
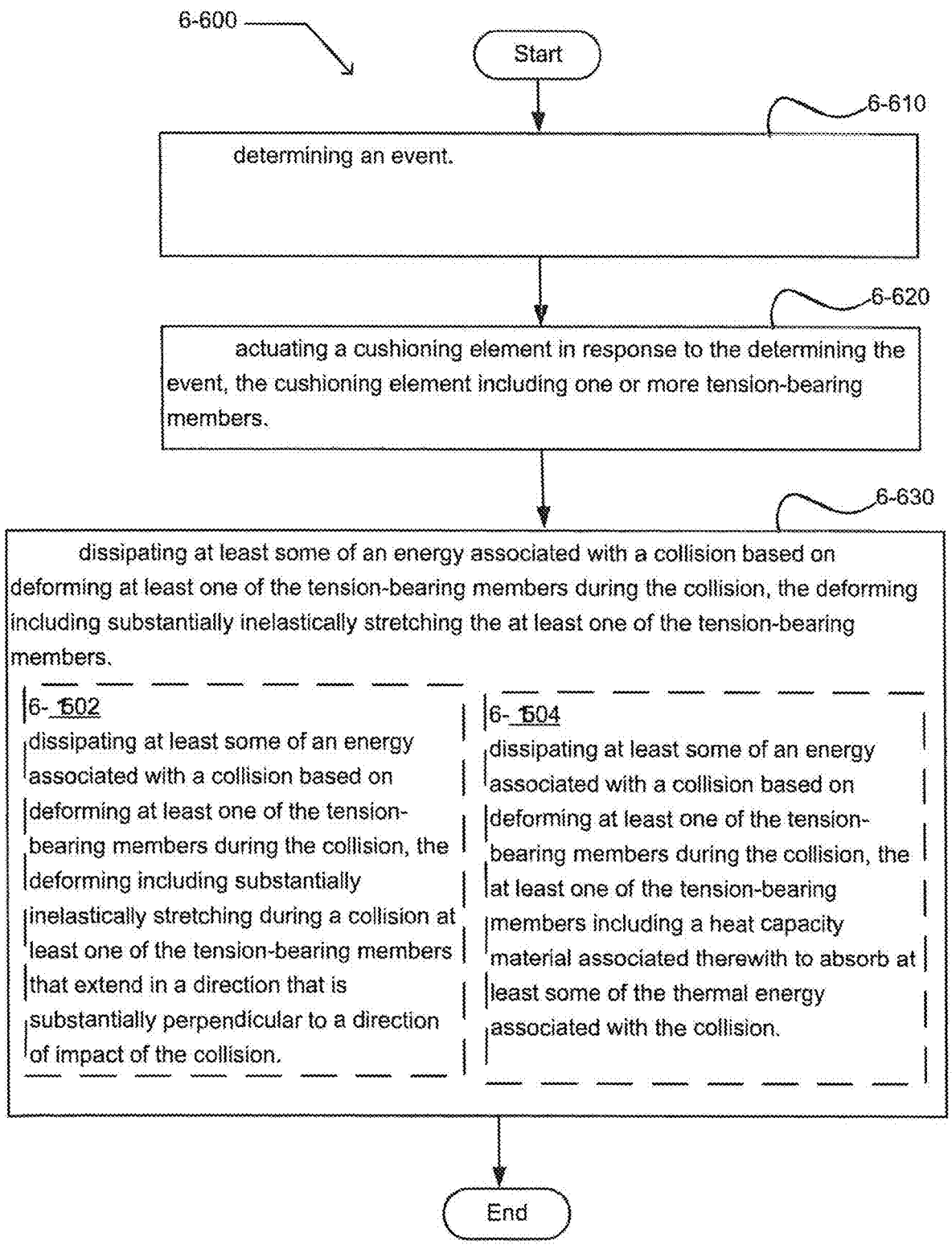

FIG. 128 illustrates an alternative embodiment of the example operational flow of FIG. 119.

Figure 129:
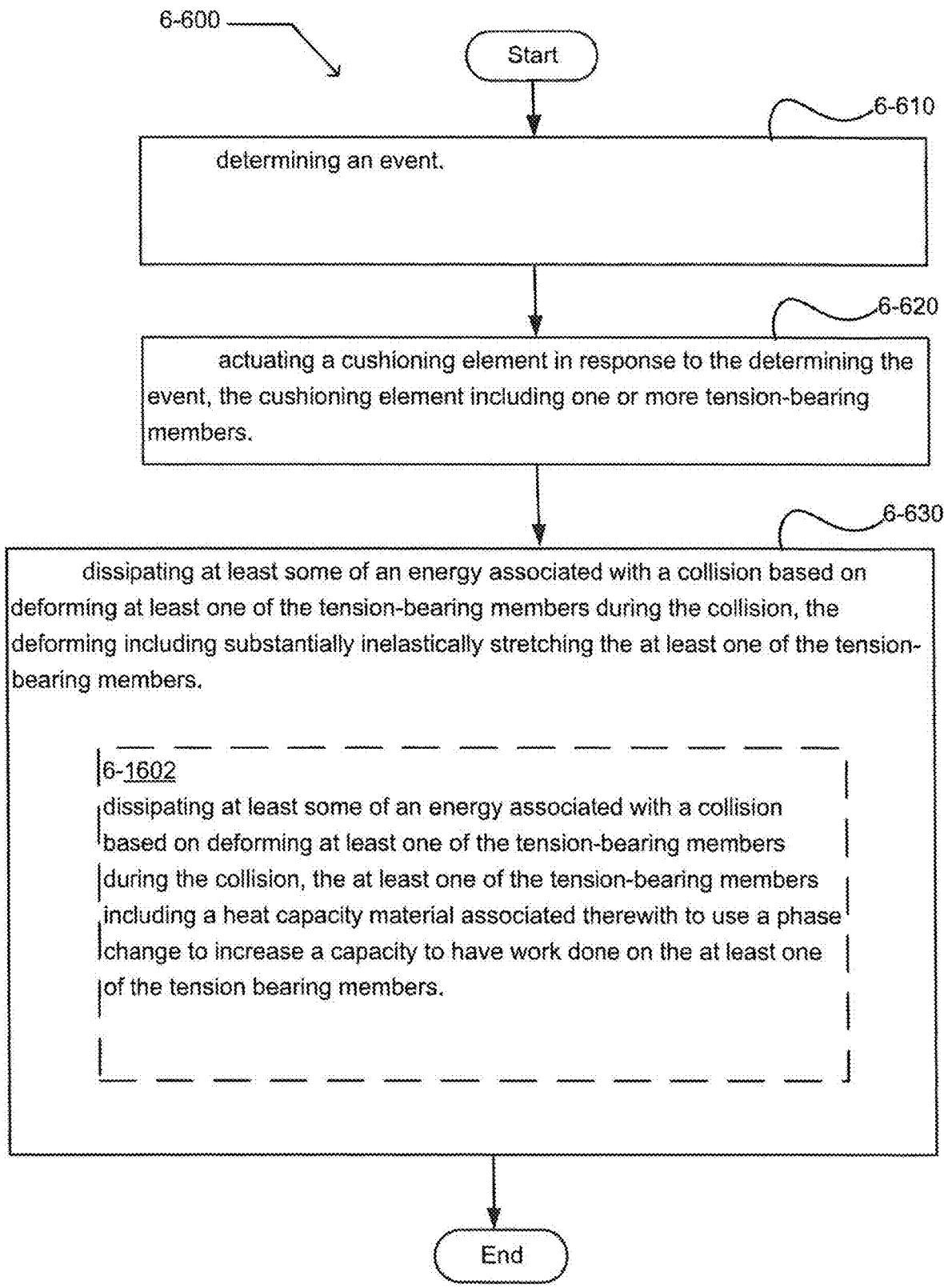

FIG. 129 illustrates an alternative embodiment of the example operational flow of FIG. 119.

FIG. 130 illustrates a partial view of an example computer program product 6-1700.

Figure 131:
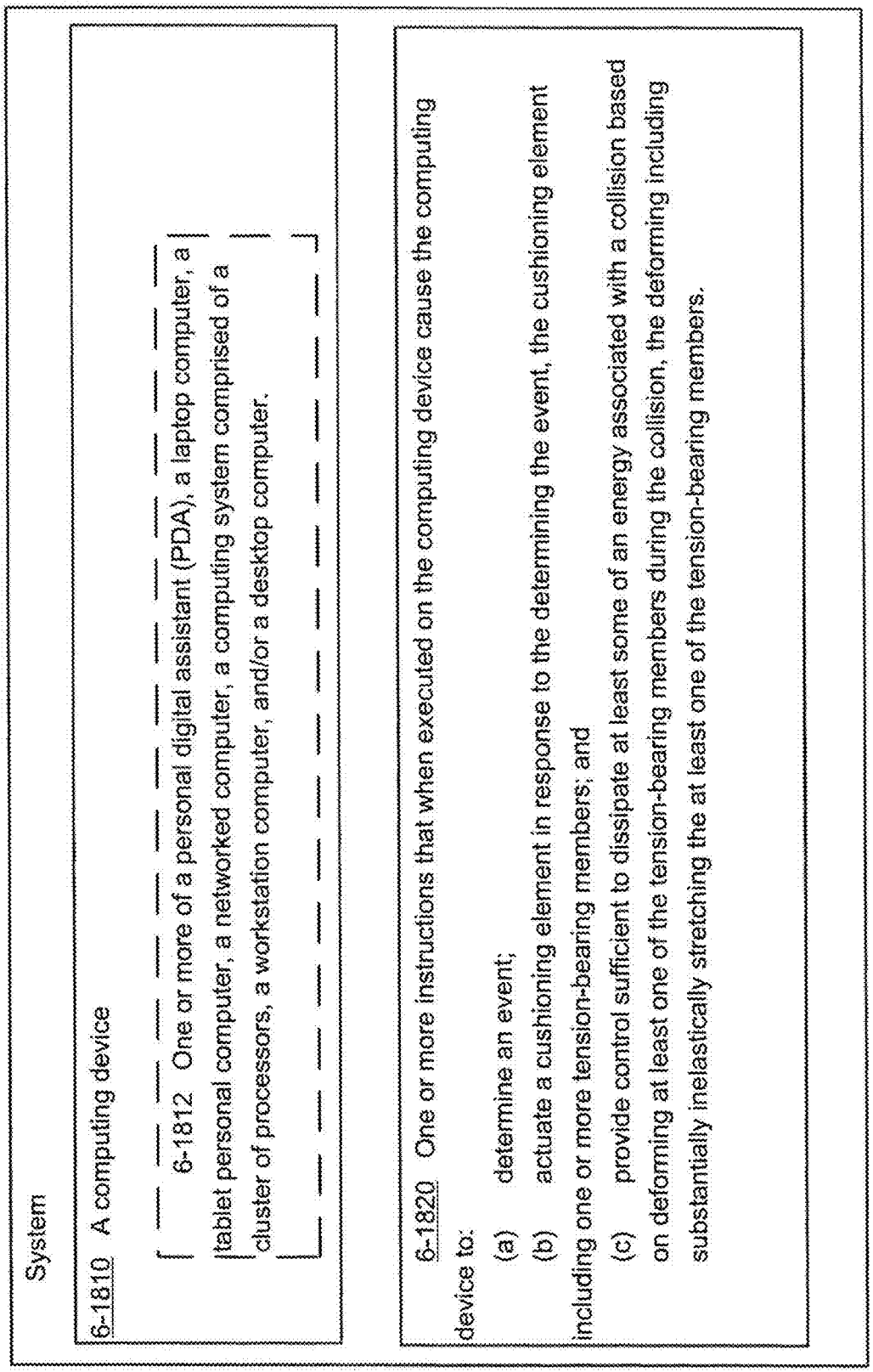

FIG. 131 illustrates an example system 6-1800.

FIG. 132 illustrates an example apparatus 6-1900 in which embodiments may be implemented.

FIG. 133 also illustrates alternative embodiments of the example apparatus 6-1900.

Figure 134:
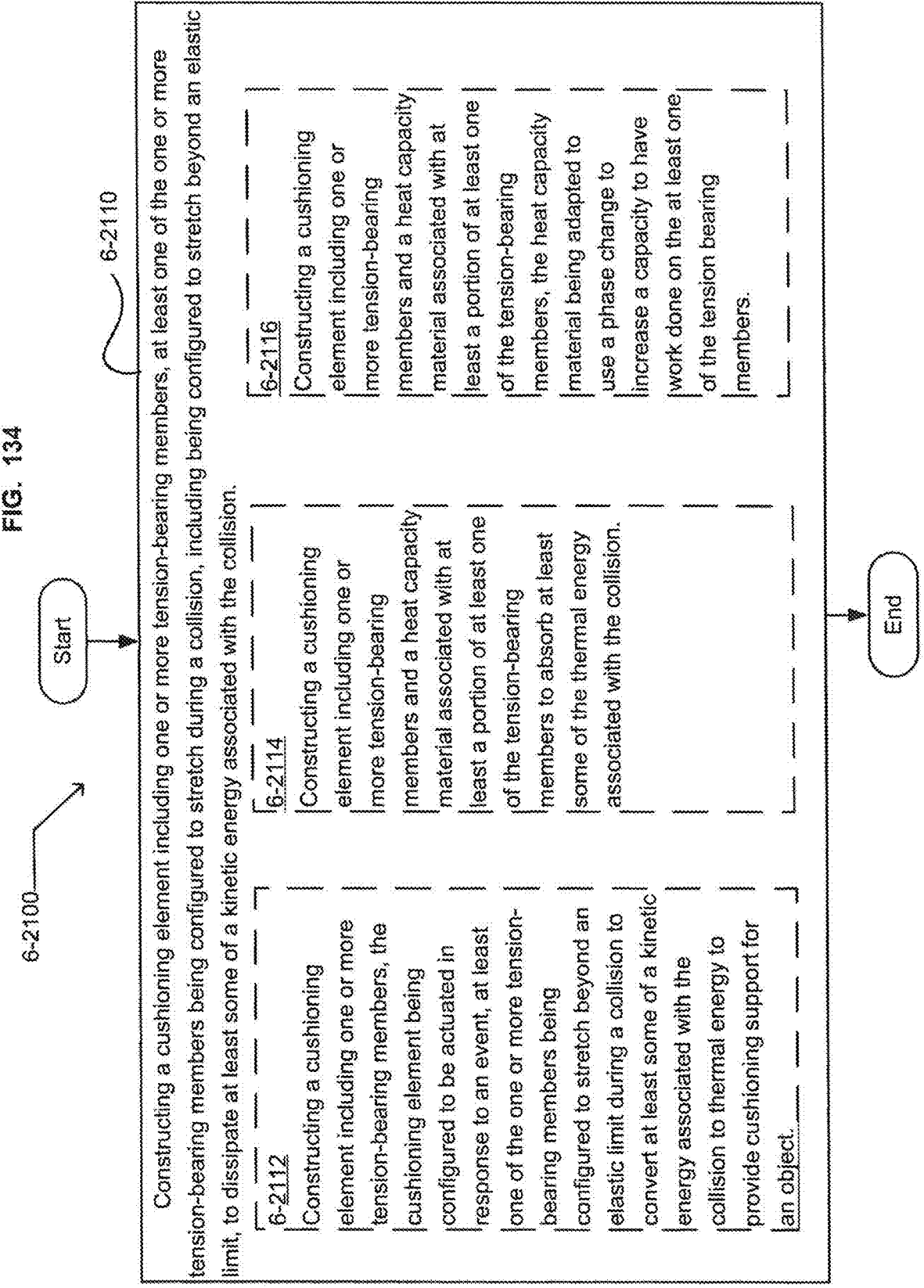

FIG. 134 illustrates an operational flow 6-2100 representing example operations related to cushioning elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for that substantially as shown and described in the detailed description and/or drawings and/or elsewhere herein.

FIG. 1A depicts a block diagram of an embodiment of a system 100 that provides protection to a body from objects (e.g., a threat-object). System 100 includes sensor 102, which may include detector 104 and circuitry 106. System 100 also includes protective instrument 108. In alternative embodiments, system 100 may include other components in addition to and/or instead of those listed above.

System 100 may be used to protect a body from being damaged by adverse interaction with an object.

In an embodiment, system 100 is wearable, deployable body protection, which may be incorporated within, under, or as apparel. In this specification, the word "deploy" and its conjugations may be substituted for the word "activate" and its conjugations and adjectival and adverbial extensions and vice versa to obtain different embodiments as appropriate to context. System 100 may include one or more agents for diffusing momentum or impulse (or both) in space or in time (or both), similar in concept to the functioning of airbags in passenger automobiles. In an embodiment, system 100 may be worn by a locomotion-challenged person to cushion against prospective falls or collisions with environmental objects. In another embodiment, system 100 may be worn by athletes in lieu of traditional body-padding, helmets, and/or guards. In another embodiment, system 100 may be worn by people riding bicycles, skate-boarding, skating, skiing, snow-boarding, sledding and/or while engaged in various other sports or activities.

In an embodiment, system 100 lowers a peak dynamic stress on damage-vulnerable structural features of a body, such as a person, animal, or damage-vulnerable item. In an embodiment, system 100 may be included in a protective gear-set worn under, within, or as an integral feature of a garment. System 100 may control an acceleration and/or deceleration time-history of one or more body elements (e.g., acceleration and/or deceleration in conjunction with time and/or position histories) in the course of modulating what would otherwise be a damaging collision- or fall-event between the body and an object (e.g., a threat-object). In some embodiments, the time-history may be modulated by an inflation-mediated positioning of one or more flexible or inflatable or pressurized fluid-actuated elements. The time-history may modulate a timewise-brief-but-high peak amplitude acceleration 'program' into a time-integral-equivalent acceleration program that includes accelerations which are of a timewise-longer duration, but which have significantly smaller peak amplitudes than if the protective action not taken, so that associated peak mechanical stresses are proportionally reduced in their magnitudes and the likelihood of peak stress-induced damage substantially reduced. Alternatively or additionally, the acceleration may be diffused spatially, so that more of a body is accelerated more-or-less coherently from its exterior, rather than have accelerating forces transmitted throughout the body from a spatially-restricted set of body locations undergoing high peak accelerations and inducing correspondingly high peak mechanical stresses within the body.

Sensor 102 senses that a body, such as a person, animal, or other body, which is wearing or otherwise protected by system 100, is moving in a manner in which it is expected to come into contact with the object with potentially adverse consequences (e.g., at a too-high closing speed). In some embodiments, sensor 102 may be similar to the acceleration sensors included in airbag systems for passenger cars. For example, sensor 102 may have a range and range-rate sensing feature that determines when a potentially-adverse body-object contact is imminent and triggers a protective action (e.g., a cushioning action) to occur at-or-about the position and/or prior to a time at which the contact is expected to occur.

Detector 104 detects the motion of the body, either absolutely (e.g., via an accelerometer function) or relatively (referenced to objects in its vicinity), and sends signals including information about the motion and/or object for analysis to another part of sensor 102. In one embodiment, the detector 104 may detect an acceleration of low magnitude (i.e., significantly less than one gee vector acceleration) during a specified time-interval, which could be indicative of the body being in mid-fall (e.g., in near-free-fall). (In contrast, the sensor associated with a car airbag senses a high acceleration within a relatively short time-interval, corresponding to the abrupt slowing of a car during the initial phase of a crash incident). For example, detector 104 may include a silicon-based triaxial accelerometer for measuring acceleration (e.g., linear acceleration).

Detector 104 may include a MicroElectroMechanical System (MEMS) accelerometer, which may, for instance, sense the displacement of a micro-cantilevered beam under acceleration transverse to its displacement-direction, e.g., by capacitive means. As a non-exclusive alternative, electrodes may be placed on a suitably-shaped and -mounted piezoelectric material for sensing a current and/or voltage generated by the piezoelectric material deforming in response to acceleration-induced stress. Some examples of materials that may be used in the piezoelectric version of detector 104 are lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped-PLZT, and barium zirconate titanate (BZT).

Detector 104 may include a range-detecting feature for detecting the distance between an object and the body, and may also include a range-rate feature for determining the rate at which this range is changing. Detector 104 may include means for estimating the direction and magnitude of one or more forces (e.g., gravity) that are accelerating the body or a portion thereof. Detector 104 may include a radar system and/or a sonar system. Detector 104 may include an angular acceleration or velocity detection feature in order to support estimation-in-advance of the location(s) on the body at which the object is likely to adversely interact. In another embodiment, other methods of detecting the (scalar or vector) acceleration, the fall-motion of a body, and/or of estimating the parameters of an impending adverse interaction may be used.

Circuitry 106 receives the signals from detector 104 and performs the analysis to determine whether there is a potentially harmful interaction in the foreseeable future. Circuitry 106 may analyze the signals from detector 104 to determine whether a particular state or condition-of-motion of the body has been detected. In an embodiment, the particular state or condition-of-motion may be associated with one-or-more objects in the vicinity of the body, a position, a motion, a change of motion, a velocity, an acceleration, and/or a direction of motion or a time-history of any of these, of the body or a portion thereof, either absolutely (referenced to the earth) or relative to one-or-more proximate objects. If an estimation is made by circuitry 106 that the state of condition-of-motion of the body is likely to result in an adverse interaction of above-threshold magnitude with one-or-more such objects, a signal is sent to cause one or more protective instruments 108 to implement a protective action. In an embodiment, the adverse interaction required to activate a protective action may be an expected level of pain or of physiological damage or of psychological damage imposed, or some combination of these. In an embodiment, the user can choose the expected type and/or degree of adverse interaction that suffices to activate a protective action. For example, circuitry 106 may analyze the signals sent from detector 104 to determine whether (1) an adverse interaction with an object is imminent and (2) whether the magnitude of that adverse interaction is above a threshold at which at least one protective action is required. If circuitry 106 estimates that an above-threshold adverse interaction is about to occur, a signal is sent to cause a protective instrument 108 to commence operation.

Similarly, circuitry 106 may determine one or more protective specifics (e.g., specifics related to how to protect the body most effectively). The protective specifics may relate to a manner of activating at least one protective action, to the sequencing of two or more protective actions, etc. The protective specifics may include at least two degrees of protection based on the current state of the body, in which each degree of protection is associated with a different location on the body or other body circumstance (e.g., estimated susceptibility-to-damage of one or another body-portion). In an embodiment, circuitry 106 may determine the degree to which at least one protective action is activated. For example, circuitry 106 may determine the extent to which an interfacing device is positioned, oriented or sized, and/or the amount or other quality of interfacing to be provided. After the protective specifics have been determined, instructions are sent, by circuitry 106, to activate the protective instrument 108 based on at least two extents and/or other protective specifics.

Circuitry 106 may make a selection from a range of different types or degrees of protective actions that can be implemented. For example, the range of protective actions may include adjusting the positions, orientations, natures, or degrees-of-actuation, or sizings of interfacing devices, and/or modifying an outer surface of an interfacing device to protect the body from a particular type of body-threatening object(s), e.g., a pointed, edged or high-temperature one. There may be a multiplicity of interfacing devices whose positions, orientations, shapes, sizes, surface characteristics, internal features, etc. can be adjusted, e.g., relative to each other, to various portions of the body or to the object(s).

The position(s), degree(s) of cushioning provided, and/or the stiffnesses and/or hardness(es) of their outer surface(s) may be adjustable. Thus, circuitry 106 may be capable of selecting from a wide range of protective actions and the timing of and degree to which each of the several possible actions is activated. The selection of the protective action may be made by circuitry 106 estimating which protective action, or combination of protective actions, is most likely to ensure that a peak stress (e.g., a shear stress) imposed by the protectively-modulated adverse interaction with the object on at least one portion of the body is substantially less than some predetermined threshold for imposition of unacceptable damage.

The body positions at which to activate protective actions may be determined by circuitry 106 based on a detected (scalar or vector) direction or speed or acceleration of body motion (or motion of body parts or portions) relative to one-or-more objects that pose a threat of adverse interaction.

Circuitry 106 may include a false positive rejection circuit for determining whether an earlier determination that a condition eventuating in an adverse interaction between body and object is likely to occur is now false; in some implementations, heuristic techniques and/or additional signal processing are used to identify false positives (e.g., more accurately discriminate future adverse interaction from spurious movements and/or other physical, electromagnetic, and/or similar factors that may reduce/degrade detection). Circuitry 106 may include a manually and/or an automatically operated deactivation mechanism (e.g., a hardware/firmware/software switch and/or button) that deactivates the protective instrument 108, or some portion thereof; for example, an off switch/button feature that a patient and/or interested party may use to deactivate the protective system and/or parts of it, in case of an erroneous deployment of the protective instrument. In an embodiment, the deactivation button may be used for resetting the system 100. The deactivation button may be used to deactivate system 100 (of a portion thereof) when system 100 has completed an interval of use. Alternatively, after using system 100, it could be discarded. Circuitry 106 may also include 'learning' features, so that it adapts to the usage patterns of an individual user, thereby providing protection ever more effectively adapted to the motions and object environment of a particular user.

Circuitry 106 may estimate appropriate protective actions to take based substantially on at least a model of a physical law that predicts at least one feature or manner in which the state of the body is expected to change with time, in at least one pertinent circumstance. The protective actions chosen may be expected to modulate a deceleration-vs.-time profile associated substantially with at least one part of the body. Circuitry 106 may include a feedback-aided control of the deceleration-vs.-time profile (which in some frames of reference might also be viewed as an acceleration profile, since both acceleration and deceleration can be viewed as quantities whose sign depends upon the frame of reference chosen), which feedback may be used to determine one or more additional or modulating protective actions to take. The feedback-enhanced control action may involve, after an initial protective action is taken, detector 104 measuring a subsequent state of the body. Based on that subsequent state, circuitry 106 may determine a new protective action and/or update the nature or degree of protective action already being taken.

The particular state may be associated substantially with at least a velocity or an acceleration of at least some portion of the body. The mechanical properties of the body may be estimated from a priori information (e.g., mass, dimensional and inertial moments information inputted to the circuitry 106 by the user or by user-supporting personnel) or may be estimated from at least one time-history of the motion of the body in the one-gee gravitational acceleration at/near the Earth's surface, or both. The determination of state is described herein, for sake of clarity, in relation to an acceleration (among other things). In some configurations, circuitry 106 may implement signal processing techniques including more robust factors in determining a condition likely to eventuate in an adverse body-object interaction. Such factors may include second order effects, and/or parameters defined by at least a portion of a body's position. Use of such factors may employ a variety of digital and/or analog techniques such as digital signal processing, tensor mathematics, and/or other techniques. In addition, those skilled in the art will appreciate that factors and/or techniques may be applied to other calculable components described herein, as appropriate to context.

Circuitry 106 may estimate at substantially any moment in time whether the body's likely trajectory will result in adverse interaction with one or more objects in the body's vicinity, e.g., impact upon a portion of the surface upon which the body is standing or walking. Circuitry 106 may determine whether body trajectory modulation required to avoid adverse interaction is substantially lacking, e.g., whether or not indicated deceleration is occurring. In other words, circuitry 106 may determine that the body's present trajectory is likely to result in an adverse interaction of at least one portion of it with at least one object, and the body or the pertinent portion thereof is not accelerating so as to likely avoid that interaction. As a result of this determination, circuitry 106 may send at least one signal to protective instrument 108 to initiate at least one protective action, and may thereafter monitor the consequences of the at least one action, possibly modulating its time-course as may be indicated to more optimally execute the at least one protective action.

In an embodiment, circuitry 106 may use the detection of an unusual motion-sequence (e.g., a transverse quasi-oscillation, growing in amplitude with time, of the upper body about the pelvis) as one of many indications that an adverse interaction (such as a fall and/or other uncontrolled motion toward a lower-located surface and/or a threat-object) may be commencing. Similarly, circuitry 106 may use detection of such an unusual motion-sequence followed by a time interval of significantly less than one-gee vector acceleration of a body portion as one of many indications that an adverse interaction is underway. In an embodiment, circuitry 106 is an analog circuit, while in another it is a digital circuit, while in yet another it is a hybrid of an analog and a digital circuit. Circuitry 106 is discussed further in conjunction with FIG. 1B.

Protective instrument 108 receives the signals from circuitry 106, causing protective instrument 108 to take a protective action. The protective action may be performed at, or substantially at or about, the body being protected. Protective instrument 108 may include a protective device useful for diffusing physical impulse in space, in time or in both, e.g., a device performing a padding or buffering or cushioning function. Once protective instrument 108 is activated (e.g., deployed), protective instrument 108 may form a protective device or structure that protects the body or at least one portion thereof. Protective instrument 108 may include a multiplicity of different devices or components that can be activated independently. Some non-exclusive examples of body portions where protective instrument 108 may be positioned or activated or deployed to in order to perform at least one protective function are the pelvis, neck, head, shoulders, torso, arms, legs, wrists, ankles, feet, hands, knees and elbows.

In one embodiment, the activated protective instrument 108 modulates the interaction of the body or at least one portion thereof with the at least one object in a significantly less adverse manner by spreading the interaction over a larger body portion or over a longer interval in time, or both, e.g., by means of a pad or cushion deployed so as to be between the at least one object and the at least one body-portion during at least a significant portion of the thereby-modulated interaction. This pad or cushion may be deployed from another location, or may be brought into effective being at the location of use, or its character significantly changed at time-of-use (e.g. its surface stiffened), or any combination of these.

The protective instrument sub-system 108 may be configured for being attached to a vulnerable structural feature associated at least with one portion of the body, and activating the protective instrument sub-system may act to lower a peak stress on a vulnerable structural feature associated with at least one portion of the body. Although only one sensor 102, detector 104, circuitry 106, and protective instrument 108 are shown, sensor 102 could be a multiplicity of the same or different sensors, detector 104 could be a multiplicity of the same or different detectors, instances of circuitry 106 could be a multiplicity of identical or distinct circuits, and protective instrument 108 could be a multiplicity of identical or different protective instruments.

FIG. 1B depicts a block diagram of an embodiment of circuitry 106. Circuitry 106 may include processor 110 and machine-readable medium 112. In alternative embodiments, circuitry 106 may include other components in addition to and/or instead of those listed above.

Processor 110 performs the analysis of the signals from detector 104, and determines whether the signals indicate a state that is estimated to result in an adverse interaction of at least one portion of the body with at least one object. For example, processor 110 may be used for estimating forward in time the trajectory of at least one portion of the body, based on the time history of its measured acceleration, perhaps supplemented by other information, either inferred or provided a priori, and comparing this with the known or estimated position and/or velocity of at least one object in the vicinity of the body or a portion thereof. Processor 110 may perform virtually any of the functions described above in connection with circuitry 106. Processor 110 may be an embedded microprocessor.

Machine-readable medium 112 (e.g., a computer-readable medium or other machine-readable medium) may store instructions that are implemented by processor 110. For example, machine-readable medium 112 may store software associated with a physical model for at least one portion of a body, including means for estimating its trajectory under various accelerations pertinent to adverse interactions with objects and the modulation thereof. As another example, machine-readable medium 112 may store instructions for carrying out virtually any of the other functions that circuitry 106 performs. Machine-readable medium 112 may include software that determines when to activate one or more portions or features of protective instrument 108. There may be multiple versions of the software stored on machine-readable medium 112, each version being specialized for different portions of the body. The different versions may be stored in the same machine-readable medium. In another embodiment, multiple aspects or features of protective instrument 108 are controlled by the same processor, which runs multiple versions or instantiations of the software to determine whether to activate and/or how to activate the protective instrument 108 features or aspects at different locations on or about the body.

Machine-readable medium 112 may also store information related to the specific features of the body and its portions that system 100 is protecting. Machine-readable medium 112 may store a computational model of a body and/or some of its portions that incorporates physical laws and/or engineering principles. Machine-readable medium 112 may include information related to approximations of the body's mass and inertial moments and/or its muscle and skeletal distribution and features. Machine-readable medium 112 may store at least some medical and/or damage- or vulnerability-related information about the body and/or at least one of its portions. In an embodiment, system 100 stores information related to a body's physical features, which may include information that is generic to large classes of bodies and/or may include specific information about the individual user, either provided a priori (such as by a user or a physician) or inferred by the system in the course of its operation. In one implementation, circuitry is utilized sufficient that information of machine-readable medium 112 can be replaced/modified as needed; for example, replaced/modified wirelessly and/or by an electronic device such as a plug-in module when upgrades/changes are available (e.g., model upgrades/changes and/or operating system upgrades/changes).

Figure 2:
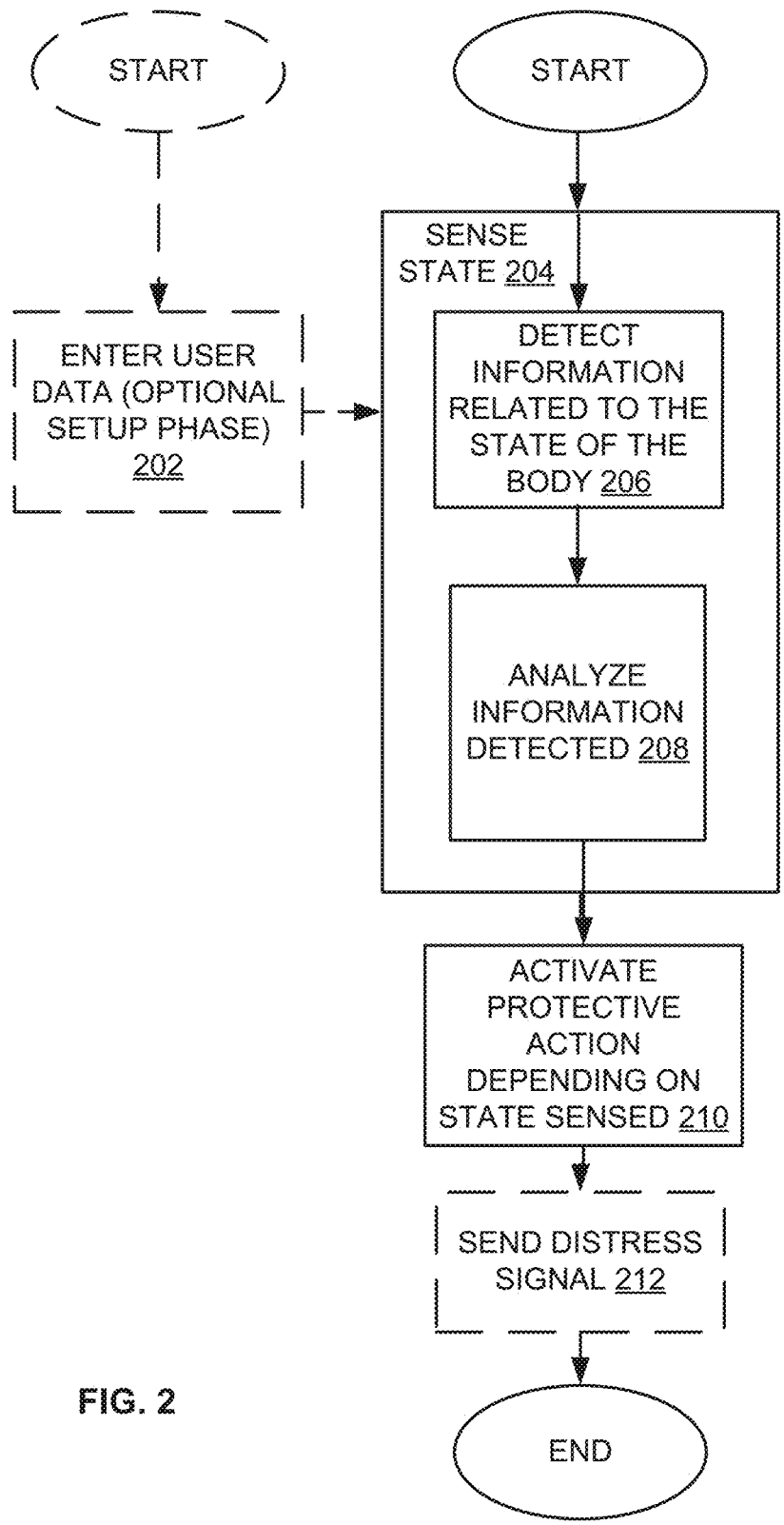
FIG. 2 depicts a flowchart of an example of a method that may be implemented by the system of FIG. 1A.

FIG. 2 depicts an example of a method 200, which may be implemented by system 100. In FIG. 2, dashed lines are used for the borders of boxes that correspond to steps that are optional. FIG. 2 includes an optional setup phase, step 202, during which user data are entered. The user data may include characteristics of the body being protected. For example, the characteristics may include body mass, inertial moments and dimensions, an identifier (such as a name), and/or a type (such as human, dog, cart, vehicle, or robot). During step 202, the user data may be stored within circuitry 106. In the embodiment of FIG. 1B, processor 110 may store the user data on machine-readable medium 112. During step 204, the state of the body, possibly including various portions thereof, is sensed by sensor 102 (FIG. 1A), and also may be recorded in machine-readable medium 112. Step 204 may include two sub-steps 206 and 208. During sub-step 206, detector 104 detects the state of the body, possibly including various portions thereof, and sends signals to circuitry 106 (FIG. 1A). During sub-step 208, circuitry 106 receives the signals from detector 104, and analyzes the signals, using information derived from machine-readable medium 112.

Sub-step 208 may involve circuitry 106 (FIG. 1A) analyzing the signals to estimate the motion of the body and/or various portions thereof and the body's current state, and may also involve estimation of its future trajectory or the future trajectory of at least one portion thereof. Sub-step 208 may involve processor 110 (FIG. 1B) accessing and implementing instructions stored on machine-readable medium 112 (FIG. 1B). Sub-step 208 may also involve processor 110 accessing the user data entered during step 202 for use during the analysis. Depending on the results of the analysis, during Sub-step 208, circuitry 106 sends signals to protective instrument 108. The information in these signals may be based upon the results of the analysis performed during Sub-step 208, and may also be based on signals received from protective instrument 108. In another embodiment, no matter the results of the analysis, a signal is sent to protective instrument 108 (FIG. 1A), but the nature of the signal sent depends upon the state sensed. In yet another embodiment, protective instrument 108 may be activated by the lack of a signal being sent. Sub-step 208 is discussed further in conjunction with FIG. 3.

During step 210, depending on whether a signal was received from circuitry 106 or depending on the information in the signals sent from circuitry 106 (FIG. 1A), protective instrument 108 (FIG. 1A) is activated. During optional step 212, depending on the sensed state of the body and/or object, a distress signal may be sent. In an embodiment, the distress signal may be sent after a signal is received indicating that the body has undergone an adverse interaction with an object.

Figure 3:
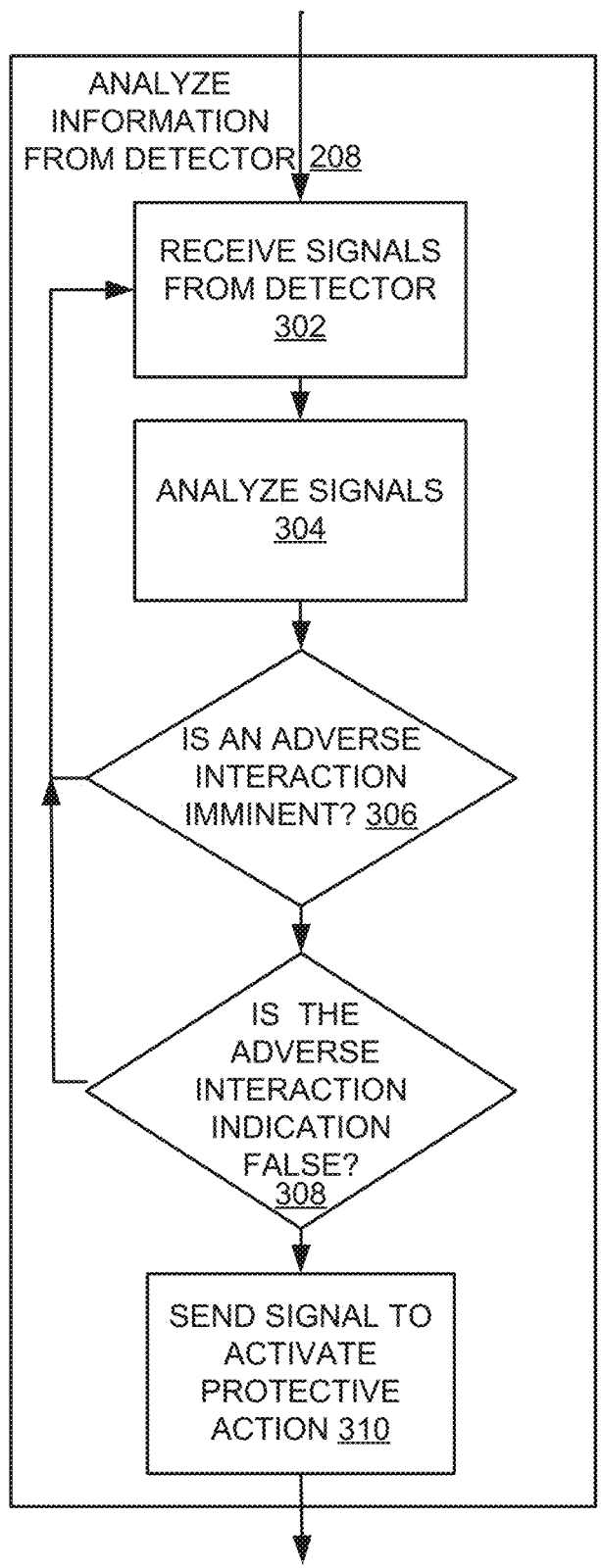
FIG. 3 depicts a flowchart of an example of a method that is an embodiment of a sub-step of the method of FIG. 2.

FIG. 3 depicts a flowchart of a method 300, which is an embodiment of Sub-step 208 of FIG. 2. During sub-step 302, circuitry 106 receives signals from detector 104.
During sub-step 304, the signals received are analyzed by circuitry 106 to estimate the state of the body and/or at least one of its portions, possibly using information stored in machine-readable medium 112. During sub-step 306, a decision is made, based on the estimated state of the body and/or at least one of its portions, as to whether the body and/or one of its portions is likely to undergo an adverse interaction with at least one object. If this adverse interaction is not estimated to occur with above-threshold likelihood, then method 300 returns to sub-step 302. If the adverse interaction is estimated to occur, then method 300 proceeds to sub-step 308.

At sub-step 308, a determination is made whether the expectation of the body undergoing an adverse interaction was a false positive. As discussed in conjunction with circuit 106 (FIG. 1A), a determination that there was a false positive may result from the body recovering from the state that it was in without the body actually commencing to undergo an adverse interaction. Alternatively, a false positive may be determined by performing a second more accurate calculational estimate of the immediate future to double-check the original estimate. One skilled in the art will recognize that signal processing and/or heuristic techniques can be applied to more accurately discriminate commencement of an adverse interaction from spurious movements or other physical, electromagnetic, or similar factors that may reduce/degrade detection. If sub-step 308 determines that the expectation of a future adverse interaction made by sub-step 306 is expected to be false, then method 300 returns to sub-step 302 to wait for the next signal from detector 104. Additionally, if protective instrument 108 (FIG. 1A) has been activated, circuit 106 may send one or more subsequent signals deactivating and/or otherwise inhibiting the protective action.

In an embodiment, step 308 is a machine-implemented step.

If sub-step 308 determines that the expectation of contact made by sub-step 306 is not expected to be false, then method 300 proceeds to step 310. During step 310, circuitry 106 sends signals to protective instrument 108, and may receive signals from 108. In other embodiments, the method 300 may include other sub-steps in addition to, and/or instead of, the steps listed above. Additionally, circuitry 106 (FIG. 1A) may perform the method 300 several times in response to different signals from detector 104 (FIG. 1A).

Figure 4:
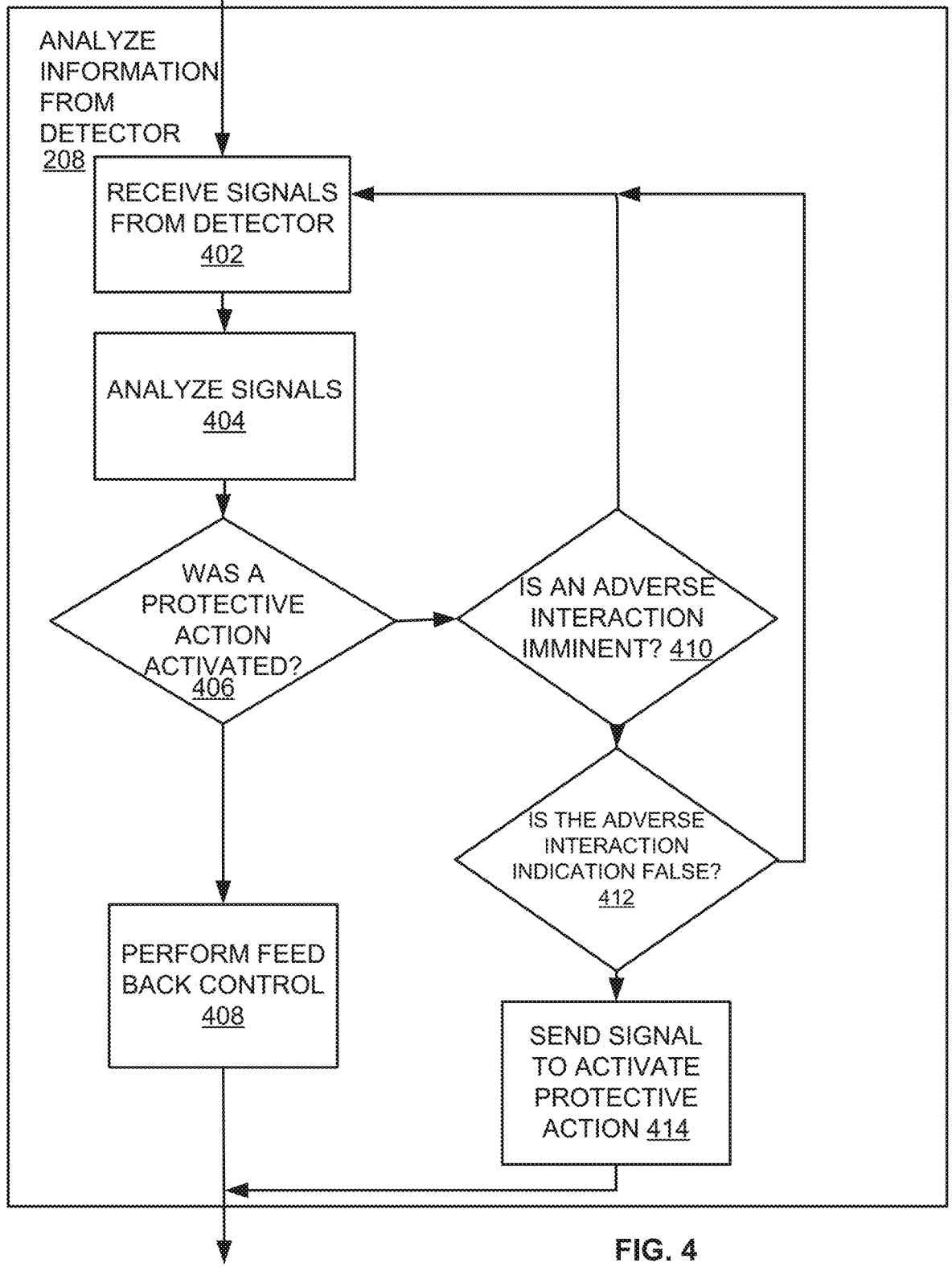
FIG. 4 depicts a flowchart of an example of a method that is another embodiment of the sub-step of the method of FIG. 2.

FIG. 4 depicts a flowchart of a method 400, which is another embodiment of Sub-step 208 of FIG. 2. During sub-step 402, circuitry 106 receives signals from detector 104. During sub-step 404, circuitry 106 analyzes the signals received, including those that may be received from protective instrument(-set) 108. During sub-step 406, a determination is made whether the protective instrument(-set) was already activated. During sub-step 408, the analysis from sub-step 404 is used to adjust the control of the protective instrument. Sub-step 408 is discussed further in conjunction with FIG. 5.

Returning to sub-step 406, if it is determined that the protective instrument has not yet been activated, method 400 proceeds to step 410. During sub-step 410, a determination is made as to whether the body is likely to undergo an adverse interaction. If the body is not expected to undergo such an interaction, then method 400 returns to sub-step 402. If the body is expected to undergo such an interaction, then method 400 proceeds to sub-step 412. At sub-step 412, a determination is made whether the expectation of an adverse interaction is likely to be a false positive (e.g., via techniques described elsewhere herein). If sub-step 412 determines that the expectation of an adverse interaction made by sub-step 410 is expected to be false, then method 400 returns to sub-step 402 to wait for the next signal from detector 104 (FIG. 1A). If sub-step 412 determines that the expectation of an adverse interaction made by sub-step 410 is not expected to be false, then method 400 proceeds to step 414. During step 414, circuitry 106 (FIG. 1A) sends signals to activate protective instrument 108 (FIG. 1A). In other embodiments, method 400 may include other sub-steps in addition to, and/or instead of, the steps listed above. Additionally, circuitry 106 may perform the method 400 several times in response to different signals.

Figure 5:
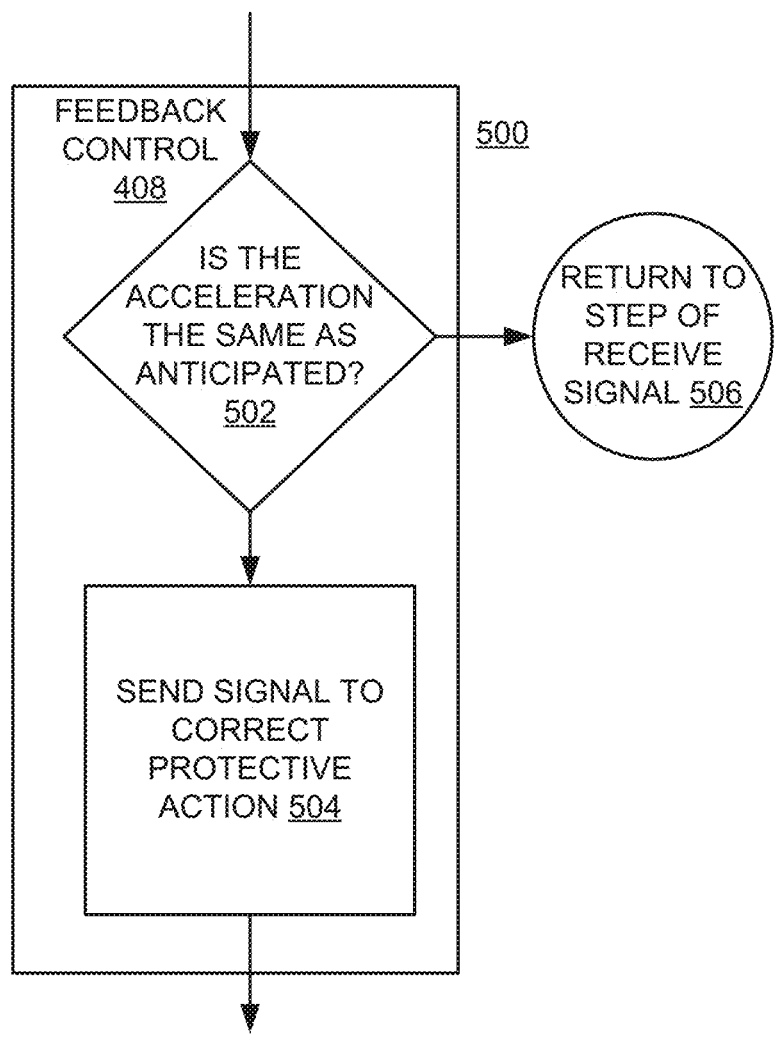
FIG. 5 depicts a flowchart of an example of a method that is an embodiment of a sub-step of the method of FIG. 4.

FIG. 5 depicts a flowchart of a method 500, which is an embodiment of sub-step 408. In sub-step 502, a determination is made whether the state (e.g., the movement or acceleration) of the object is the same as anticipated. If the state is not the same as anticipated, sub-step 502 proceeds to sub-step 504. In sub-step 504, a signal is sent to correct the protective action (that was previously activated) to accommodate for the deviation from the anticipated state. The accommodation for the deviation may be based on an updated expected state and/or upon updated measurements of kinematics of the body or at least one portion thereof and/or upon updated measurements of the object(s) with which an adverse interaction is projected. Returning to sub-step 502, if the state is the same as expected, then method 500 proceeds to sub-step 506.

In sub-step 506, method 500 returns to sub-step 210 (FIG. 2). In an embodiment, during step 506, method 500 continues to send signals to protective instrument 108 (FIG. 1A) that will continue the protective action that was previously activated, and may also receive signals back from 108. In other embodiments, the method 500 may include other sub-steps in addition to, and/or instead of, the steps listed above. Additionally, circuitry 106 (FIG. 1A) may perform the method 500 several times in response to different signals.

Figure 6:
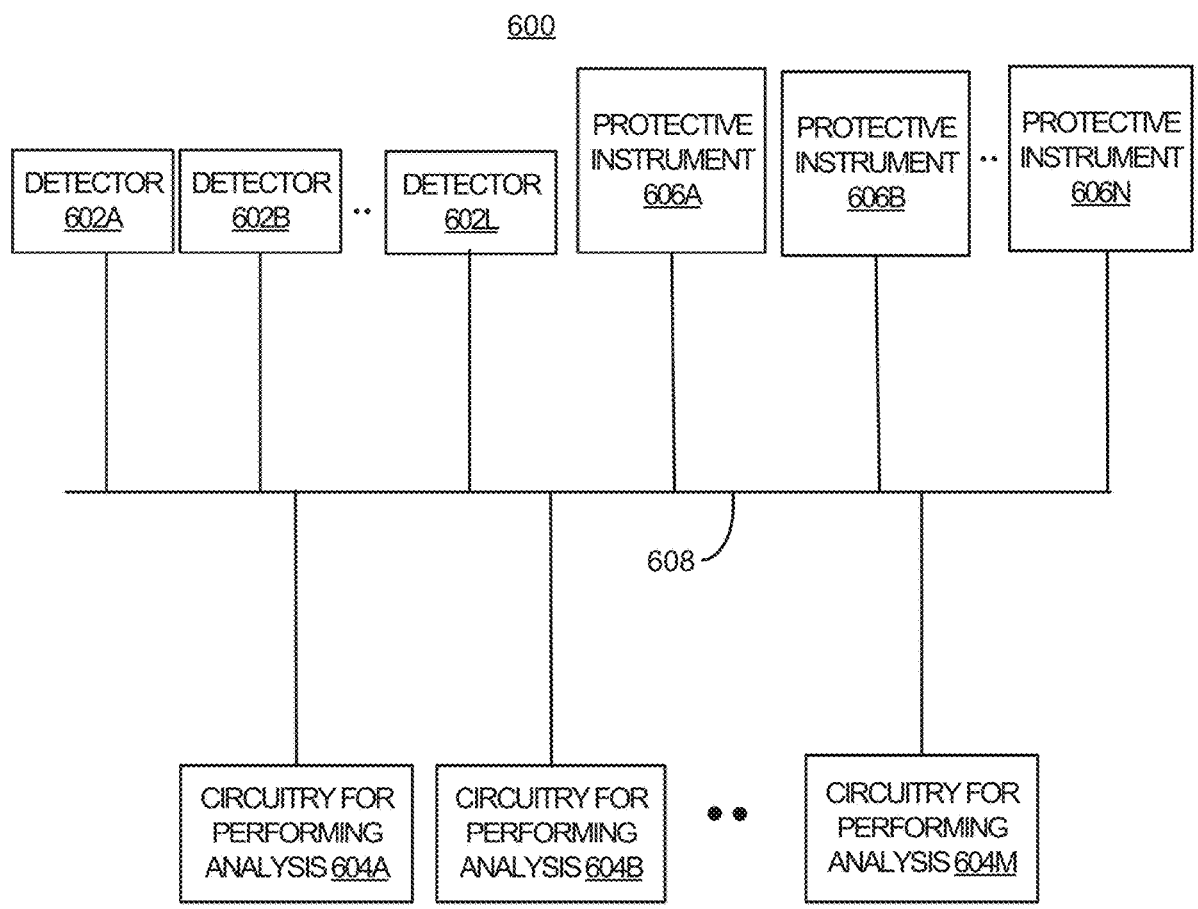
FIG. 6 depicts a block diagram of an embodiment of the system of FIG. 1 having multiple sensors, instances of circuitry, and protective instruments.

FIG. 6 depicts a block diagram of an alternative System 600 having multiple detectors, instances of circuitry, and protective instruments. System 600 includes detectors 602a-1, instances of circuitry 604a-m, protective instruments 606a-n, and communications link 608. In other alternative embodiments, System 600 may include other components in addition to and/or instead of those listed above.

System 600 is an embodiment of system 100 (FIG. 1A) that includes multiple detectors, instances of circuitry, and protective instruments. Detectors 602a-1 may each be the same, or essentially the same, as sensor 102 (FIG. 1A). Similarly, instances of circuitry 604a-m may each be the same, or essentially the same, as circuitry 106 (FIG. 1A). Likewise, protective instruments 606a-n may each be the same, or essentially the same, as protective instrument 108 (FIG. 1A). The letters "1," "m," and "n," each represent any number. The values and relative values of letters "1," "m," and "n," are unrelated to one another. Each of letters "1," "m," and "n," may represent a number that is greater than, less than or equal to either or both of the numbers represented by the other two letters.

Detectors 602a-1 may all be located within the vicinity of a single body or may be distributed amongst the vicinities of multiple bodies and/or objects. The number of detectors 602a-1 that are distributed in the vicinity of each body and/or object may be unrelated to one another. In an embodiment, there may be only one of detectors 602a-1 within the vicinity of each body. The number of detectors placed on a particular body may depend upon the size of the body, the tendency for the body to undergo adverse interactions, the degrees or severity of the adverse interactions anticipated to be possible and/or likely with the body, the characteristics of the body motion or that of one-or-more of its parts, and/or the places or types of environments that the body tends to be located or to traverse under various body-motion circumstances or conditions. The number of sensors placed on a particular body or any portion thereof may also depend on the circumstances-determined fragility of the body or portion thereof, the value or importance of the body and/or the number of available detectors, or other factors. In general and all other considerations being equal, the greater the number of detectors 602a-1 that are located within the vicinity of a particular body or portion thereof, the more reliably, accurately, and precisely the state of the body or portion thereof may be estimated.

In an embodiment, detectors are placed only on the bodies and not on the objects (e.g., potentially-threatening objects). In another embodiment, detectors are also placed on some or all of these objects. Some objects may share one or more of detectors 602a-l. There may be any number of objects that all utilize the same one of detectors 602a-1, and any number of the objects sharing this detector may not be utilizing any other detector.

The number of detectors 602a-1 that are placed within the vicinity of a particular object may depend upon the number of available detectors 602a-l. The number of detectors 602a-1 that are placed within the vicinity of a particular object may depend upon the value or fragility or other factors or considerations pertaining to the bodies expected to pass within the vicinity of the object. The number of detectors 602a-1 that are placed within the vicinity of a particular object may depend on the nature or degree of adverse interaction that the body or portion thereof and/or the object are expected to sustain, should the body or portion thereof adversely interact with the object. The number of detectors placed within a vicinity of an object may depend upon the detailed circumstances of that vicinity. For example, there may be more detectors in the vicinities of objects that are located near corners, vicinities that have one or more changes in elevation, and/or vicinities that have changes in direction of a pathway or hallway than in straight hallways, in the particular case in which the adverse interaction may be inadvertent collisions of one-or-more portions of a (especially, locomotion-challenged) pedestrian's body with stationary objects.

Instances of circuitry 604a-m may operate independently of one another, or may form a distributed computational circuit and/or a distributed processor. Protective instruments 606a-n may be located on the same item deployed on-or-about a body or body-portion, or may be at distinct locations. Detectors 602a-1 may measure at least two expected time-histories including at least one time-history for each of at least two portions of the body corresponding to each of protective instruments 606a-n.

Communications link 608 may be any means by which detectors 602a-1, instances of circuitry 604a-m, and protective instruments 606a-n may communicate with one another. For example, communications link 608 may be any combination of wires, optical fibers or other signal channels, and/or wireless links or other information-communicating means, e.g., acoustic links.

Figure 7:
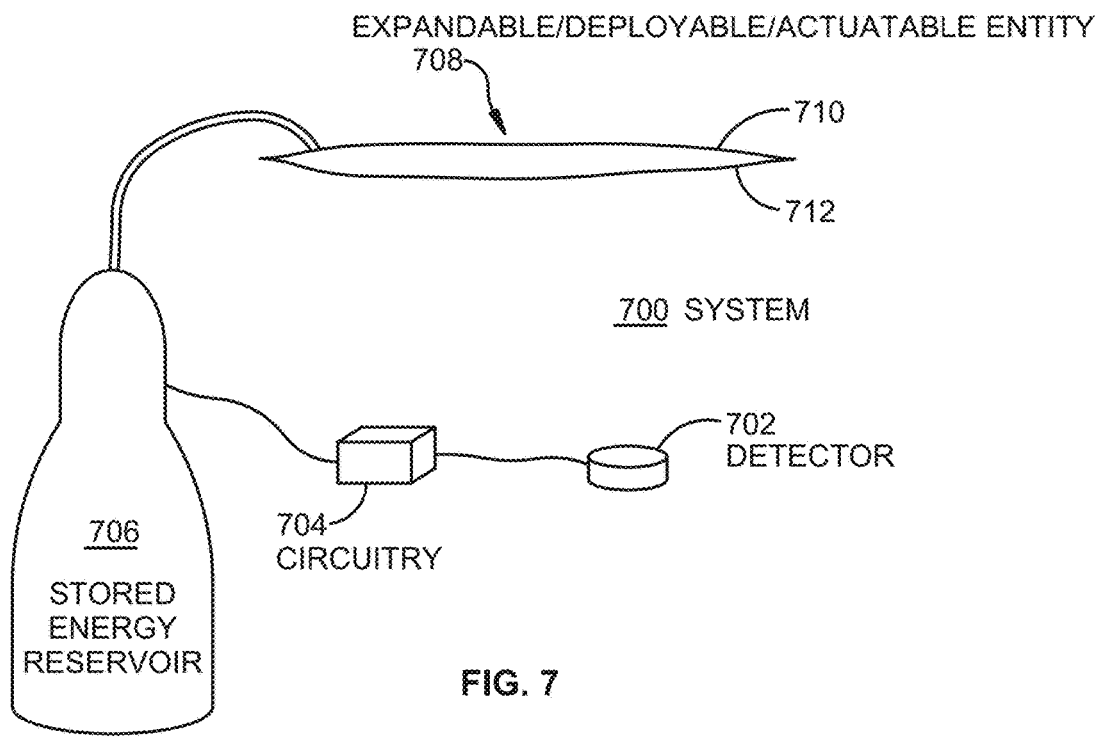
FIG. 7 depicts a system that is an example of one embodiment of the system of FIG. 1.

FIG. 7 depicts a system 700, which is one embodiment of system 100. System 700 includes detector 702, circuitry 704, stored energy reservoir 706, and expandable/deployable/actuatable entity 708 (e.g., a bag such as an air bag and/or a fluid-expandable entity such as might be expanded by one or more fluids such as and/or electrically heated and/or propelled fluids). Expandable/deployable/actuatable entity 708 may include components 710 and 712 (e.g., pieces of material) which may act to determine its size-&-shape and/or other salient feature when partly or fully expanded and/or otherwise actuated, e.g., as a result of introduction of pressurizing fluid from stored energy reservoir 706 and/or by one-time triggering actions (e.g., link-melting or connection-severing) commanded by circuitry 704. In alternative embodiments, system 700 may include other components in addition to and/or instead of those listed above.

Detector 702 is an embodiment of detector 104, and may function in the same manner as described above in conjunction with FIGS. 1-6. Circuitry 704 is an embodiment of circuitry 106, and may function in the same manner as described in FIGS. 1-6. Stored energy reservoir 706 and expandable/deployable/actuatable entity 708 form an embodiment of protective instrument 108 (FIG. 1A). Stored energy reservoir 706 may contain compressed gas or other pressurized fluid or some other source of high-pressure gas or liquid, or other forms of stored energy useful for actuating expandable/deployable/actuatable entity 708. Expandable/deployable/actuatable entity 708 is just one example of a type of structure for diffusing one or more impulses in spacetime that may be included in protective instrument 108. Similarly, expandable/deployable/actuatable entity 708 is just one example of an actuated device or structure that may be included in protective instrument 108. In response to receiving an appropriate signal from circuitry 704, stored energy reservoir 706 may generate and/or release pressurized gas and/or other fluid and/or other stored energy-forms, which begins to operate expandable/deployable/actuatable entity 708 which in turn is designed to modulate favorably an adverse interaction between the body or portion thereof and at least one object. In some implementations, stored energy reservoir 706 may be referred to as a source of an "impulse-diffusing agent," because, in response to being activated, stored energy reservoir 706 is at least partially involved in causing a cushioning effect to occur, in space, in time and/or in both.

Expandable/deployable/actuatable entity 708 may be formed in many possible fashions, e.g., by bonding pieces of material 710 and 712 to one another at their respective edges and/or by interconnecting other components or portions, with some of these interconnections possibly being capable of actuation themselves. The pertinent components of the entity 708 are designed and assembled so as to interact with the stored energy medium from reservoir 706 in such a manner to accomplish the adverse interaction-modulating function of entity 708, e.g., by adequately-swift inflation of a set of possibly-interconnected (and possibly nested and/or reentrant) gas-actuated compartments possibly constrained in their motions by internal connections also possibly controlled by circuitry 704, each perhaps to a particular protective situation-appropriate degree.

Each of detector 702, circuitry 704, energy reservoir 706, and expandable/deployable/actuatable entity 708 may be located on a position of a body so as to favorably modulate the 'baseline' adverse interaction between the body and/or portion thereof and the object. In one embodiment, the expandable/deployable/actuatable entity 708 is a thin gas-filled bladder that inflates so as to provide a protective cushioning layer of a few cm thickness between the object and the portion of the body which the object otherwise would contact, thereby diffusing in both space and time the stress which would otherwise result from the interaction—and thus reducing the peak stress that occurs anywhere at any time. Although only one detector 702, circuitry 704, stored energy reservoir 706 and expandable/deployable/actuatable entity 708 are shown, there may be any number of detectors, instances of circuitry, stored energy reservoirs, and expandable/deployable/actuatable entities. Detector 702, circuitry 704, stored energy reservoir 706 and expandable/deployable/actuatable entity 708 shown may represent one or more detectors, instances of circuitry, stored energy reservoirs, and expandable/deployable/actuatable entities, respectively. Each expandable/deployable/actuatable entity 708 may be individually controlled and individually actuated. In one embodiment, each expandable/deployable/actuatable entity 708 may contain a plurality of individually controlled and individually-actuated compartments, as well as any number of both passive and actuated fixtures, dimensional constraints and shape-determining and position-controlling devices emplaced within and between compartments.

Figure 8:
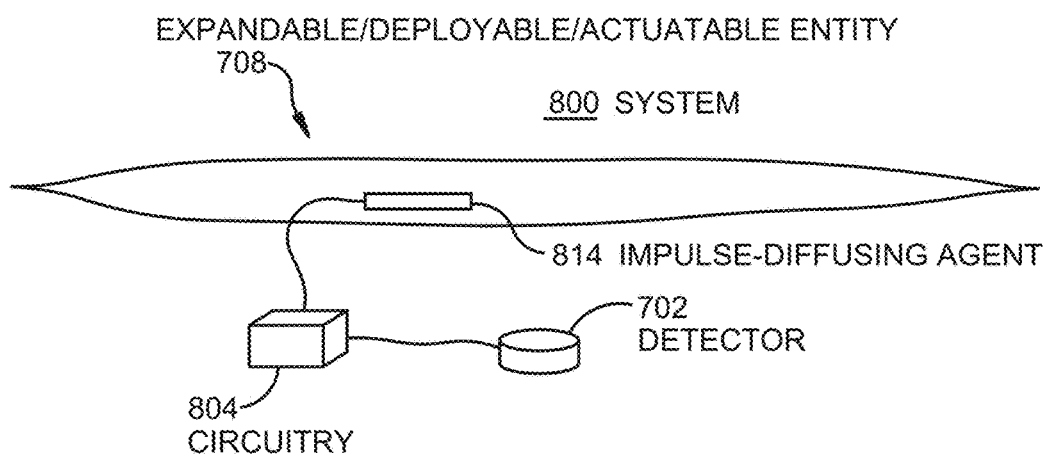
FIG. 8 depicts a system that is an example of another embodiment of the system of FIG. 1.

FIG. 8 depicts a system 800, which is another embodiment of the system 100.

System 800 includes detector 702, expandable/deployable/actuatable entity 708, and circuitry 804. System 800 also includes impulse-diffusing agent 814. In alternative embodiments, system 800 may include other components in addition to and/or instead of those listed above.

Detector 702 and expandable/deployable/actuatable entity 708 are described in conjunction with FIG. 7. Circuitry 804 is an embodiment of circuitry 106 (FIG. 1A), and may function in a similar manner as described in FIGS. 1-6. Circuitry 804 may differ from circuitry 704 in that circuitry 704 may send signals that are appropriate for releasing pressurizing agent from stored energy reservoir 706, while circuitry 804 sends signals appropriate for activating an impulse-diffusing agent 814, which is not necessarily a stored energy reservoir but which may instead entail an energy conversion device and/or system.

Impulse-diffusing agent 814 is sometimes a device or material that, in response to receiving an appropriate signal from circuitry 804, causes expandable/deployable/actuatable entity 708 to be actuated. Impulse-diffusing agent 814 may release a gas or other elastic medium, device, or structure as a result of a chemical reaction caused by an electric current or voltage being applied by, or as a result of, signals from circuitry 804. In one embodiment, the impulse-diffusing agent 814 may be an azide material, such as sodium azide. In another embodiment, impulse-diffusing agent 814 causes a chemical reaction to occur that releases gas in a time-interval small compared to that upon which the adverse interaction would occur if it were not to be favorably modulated. Although only one detector 702, circuitry 804, expandable/deployable/actuatable entity 708, and impulse-diffusing agent 814 are shown, there may be any number of detectors, instances of circuitry, impulse-diffusing agents, and expandable/deployable/actuatable entities. Detector 702, circuitry 804, expandable/deployable/actuatable entity 708, and impulse-diffusing agent 814 may represent one or more detectors, instances of circuitry, impulse-diffusing agents, and expandable/deployable/actuatable entities, respectively.

Figure 9:
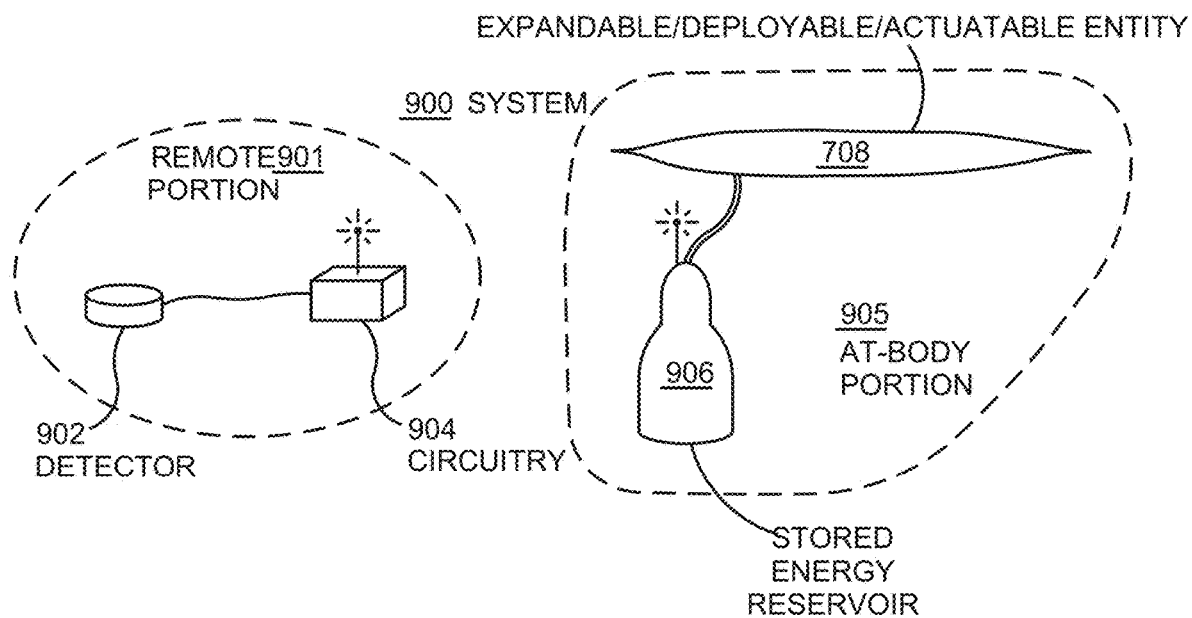
FIG. 9 depicts a system that is an example of another embodiment of the system of FIG. 1.

FIG. 9 depicts a system 900, which is another embodiment of the system 100 (FIG. 1A). System 900 includes remote portion 901, which has detector 902 and circuitry 904. System 900 also includes at-body portion 905, which has stored energy reservoir 906 and expandable/deployable/actuatable entity 708. In alternative embodiments, system 900 may include other components in addition to and/or instead of those listed above.

Expandable/deployable/actuatable entity 708 is described in conjunction with FIG. 7. Remote portion 901 is located remote from the body. For example, remote portion 901 may be located in a nexus that the body often traverses and/or near an object that would be damaging to the body were the body to interact adversely with the object. There may be several remote portions 901 located throughout a locality, such as a building or a vehicle. Alternatively, remote portion 901 may be located on-or-about the body, but remote from protective instrument 708. In an embodiment including multiple remote portions, there may be one or more remote portions located remote from the body and one or more remote portions 901 located on the body.

Detector 902 is an embodiment of detector 104 (FIG. 1A) and corresponds to detector 702 (FIG. 7). Detector 902 may function in a manner similar to that described above in conjunction with FIGS. 1-7. However, since detector 902 may be located at a remote location from the body, the manner in which detector 902 is configured may be somewhat different than the manner in which detector 702 is configured. Circuitry 904 is an embodiment of circuitry 106 (FIG. 1A) and corresponds to circuitry 704 (FIG. 7). Circuitry 904 may function in a manner similar to circuitry 106, instances of circuitry 604*a-m*, and/or circuitry 704 described in FIGS. 1-7. However, the analysis performed by circuitry 904 may be somewhat different from that of circuitry 704, because the signals received from detector 902 may represent a different perspective than the signal received from detector 702. Additionally, circuitry 904 is depicted as sending its signals (e.g., radio waves, light signals, and/or acoustic signals) via a wireless link to at-body portion 905, whereas circuitry 704 sends its signals via wire or optical fiber connection to the protective instrument. At-body portion 905 is an embodiment of protective instrument 108 (FIG. 1A), which is located on-or-about a body that is being protected to a degree from an object. Stored energy reservoir 906 corresponds to, and functions in a similar manner as, pressurized fluid reservoir 706 (FIG. 7), e.g., releasing gas causing expandable/deployable/actuatable entity 708 to actuate. However, stored energy reservoir 906 receives signals from circuitry 904, via a wireless link, whereas pressurized fluid reservoir 706 receives signals via a wire or optical fiber from circuitry 704.

Although only one remote portion 901, detector 902, circuitry 904, at-body portion 905, stored energy reservoir 906, and expandable/deployable/actuatable entity 708 are shown, there may be any number of remote portions, at-body portions, detectors, instances of circuitry, impulse-diffusing agents, and expandable/deployable/actuatable entities in system 900. Remote portion 901, detector 902, circuitry 904, at-body portion 905, stored energy reservoir 906, and expandable/deployable/actuatable entity 708 may represent one or more remote portions, detectors, instances of circuitry, at-body portions, stored energy reservoirs, and expandable/deployable/actuatable entities, respectively.

Figure 10:
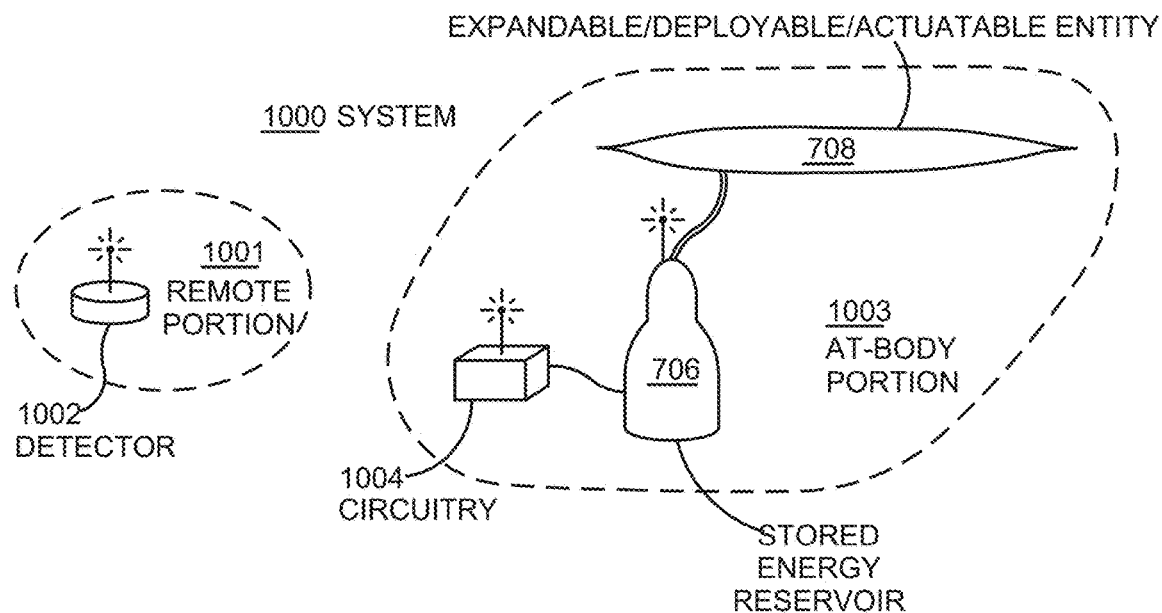
FIG. 10 depicts a system that is an example of another embodiment of the system of FIG. 1.

FIG. 10 depicts a system 1000, which is another embodiment of the system 100 (FIG. 1A). System 1000 includes remote portion 1001, which has detector 1002. System 1000 also includes at-body portion 1003, which has circuitry 1004, stored energy reservoir 706, and expandable/deployable/actuatable entity 708. In alternative embodiments, system 1000 may include other components in addition to and/or instead of those listed above.

Expandable/deployable/actuatable entity 708 is described in conjunction with FIG. 7. At-body portion 905 and stored energy reservoir 906 are described in conjunction with FIG. 9. Remote portion 1103 is located remote from at-body portion 905 and remote portion 1001. Remote portion 1103 may be located on the body or remote from the body. Circuitry 1004 is an embodiment of circuitry 106 (FIG. 1A), and functions in a manner similar to circuitry 904 (FIG. 9). Remote portion 1001 may be located on the body, but remote from at-body portion 1003. In an embodiment including multiple remote portions, there may be one or more remote portions located remote from the body and one or more remote portions 1001 located on-or-about the body.

Detector 1002 is an embodiment of detector 104 (FIG. 1A). Detector 1002 corresponds to detector 902, and may function in a manner similar to that described above in conjunction with FIG. 9. However, detector 1002 sends its signals (e.g., radio waves, light signals, and/or acoustic signals) via a wireless link to at-body portion 1003, whereas detector 902 sends its signals via a wire or an optical fiber connection to circuitry 904. Circuitry 1004 corresponds to circuitry 106 or 704, and may function in a manner similar to that described in FIGS. 1-7. However, the analysis performed by circuitry 1004 may be similar to that performed by circuitry 904, because detectors 902 and 1002 are in remote portions 901 and 1001, respectively, and therefore sense the motion of the body with respect to the object from comparable perspectives.

Although only one remote portion 1001, detector 1002, at-body portion 1003, circuitry 1004, stored energy reservoir 706, and expandable/deployable/actuatable entity 708 are shown, there may be any number of remote portions, detectors at-body portions, instances of circuitry, stored energy reservoirs, and expandable/deployable/actuatable entities in system 1000. Remote portion 1001, detector 1002, at-body portion 1003, circuitry 1004, stored energy reservoir 706, and expandable/deployable/actuatable entity 708 may represent one or more remote portions, detectors at-body portions, instances of circuitry, stored energy reservoirs, and expandable/deployable/actuatable entities, respectively.

Figure 11:
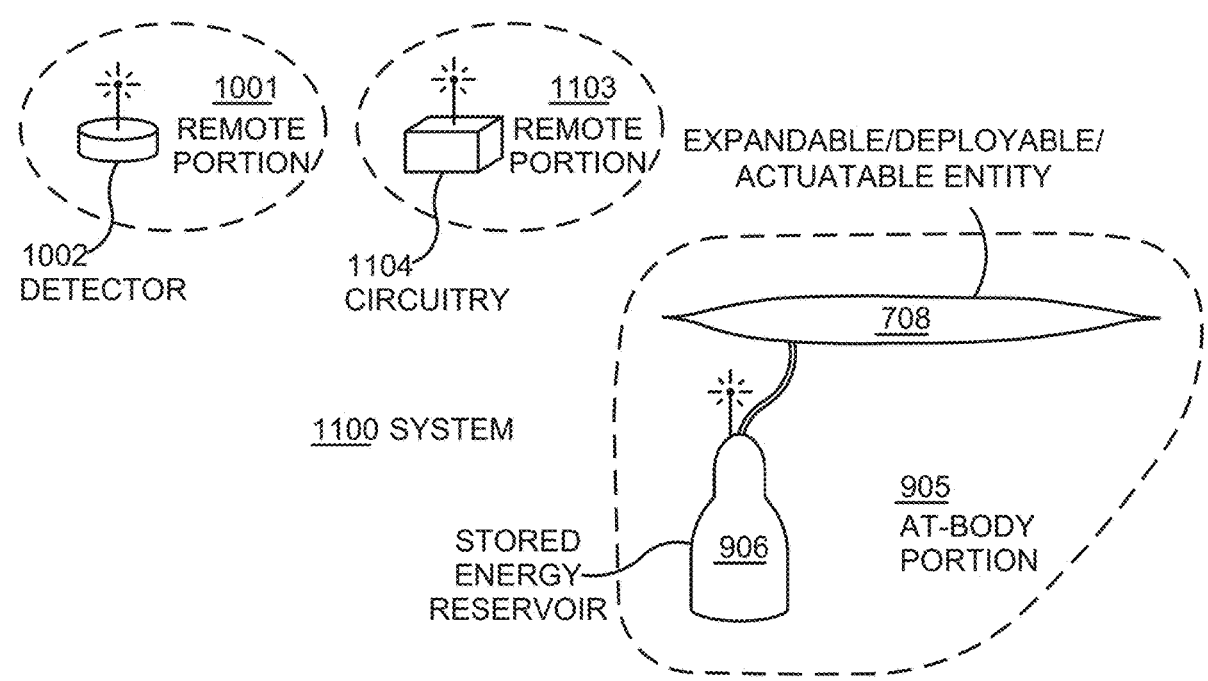
FIG. 11 depicts a system that is an example of another embodiment of the system of FIG. 1.

FIG. 11 depicts a system 1100, which is another embodiment of the system 100 (FIG. 1A). System 1100 includes remote portion 1001, which has detector 1002. System 1100 also includes remote portion 1103, which includes circuitry 1104. Further system 1100 includes at-body portion 905, which has stored energy reservoir 906 and expandable/deployable/actuatable entity 708. In alternative embodiments, system 1100 may include other components in addition to and/or instead of those listed above.

Expandable/deployable/actuatable entity 708 is described in conjunction with FIG. 7. At-body portion 905 and stored energy reservoir 906 are explained in conjunction with FIG. 9. Remote portion 1001 and detector 1002 are described in conjunction with FIG. 10. Remote portion 1001 may be located on-or-about the body, but remote from at-body portion 1003.

Remote portion 1103 is located remote from remote portion 1001 and at-body portion 905. In an embodiment including multiple remote portions, there may be one or more remote portions 1103 located remote from the body and one or more remote portions 1103 located on-or-about the body. There may be one or more remote portions 1103 located remote from the body and one or more remote portions 1103 located on-or-about the body. Circuitry 1104 is an embodiment of circuitry 106, and may function in a manner similar to that described in conjunction with FIGS. 1-6. The analysis performed by circuitry 1104 is similar to that performed by circuitry 1004 (FIG. 10) or 904 (FIG. 9), because detector 902 and 1002 are in remote portions 901 and 1001, respectively, and therefore detect the motion of the body with respect to the object from comparable perspectives. However, in contrast to instances of circuitry 1004 (FIG. 10) and 904 (FIG. 9), circuitry 1104 communicates wirelessly with both detector 1002 and stored energy reservoir 906.

Although only one remote portion 1001, detector 1002, remote portion 1103, circuitry 1104, at-body portion 905, stored energy reservoir 906, and expandable/deployable/actuatable entity 708 are shown, there may be any number of remote portions, detectors, instances of circuitry, at-body portions, stored energy reservoirs, and expandable/deployable/actuatable entities in system 1100. Remote portion 1001, detector 1002, remote portion 1103, circuitry 1104, at-body portion 905, stored energy reservoir 906, and expandable/deployable/actuatable entity 708 may represent one or more remote portions (for the detectors), detectors, remote portions (for the instances of circuitry), instances of circuitry, at-body portions, stored energy reservoirs, and expandable/deployable/actuatable entities, respectively.

Figure 12A:
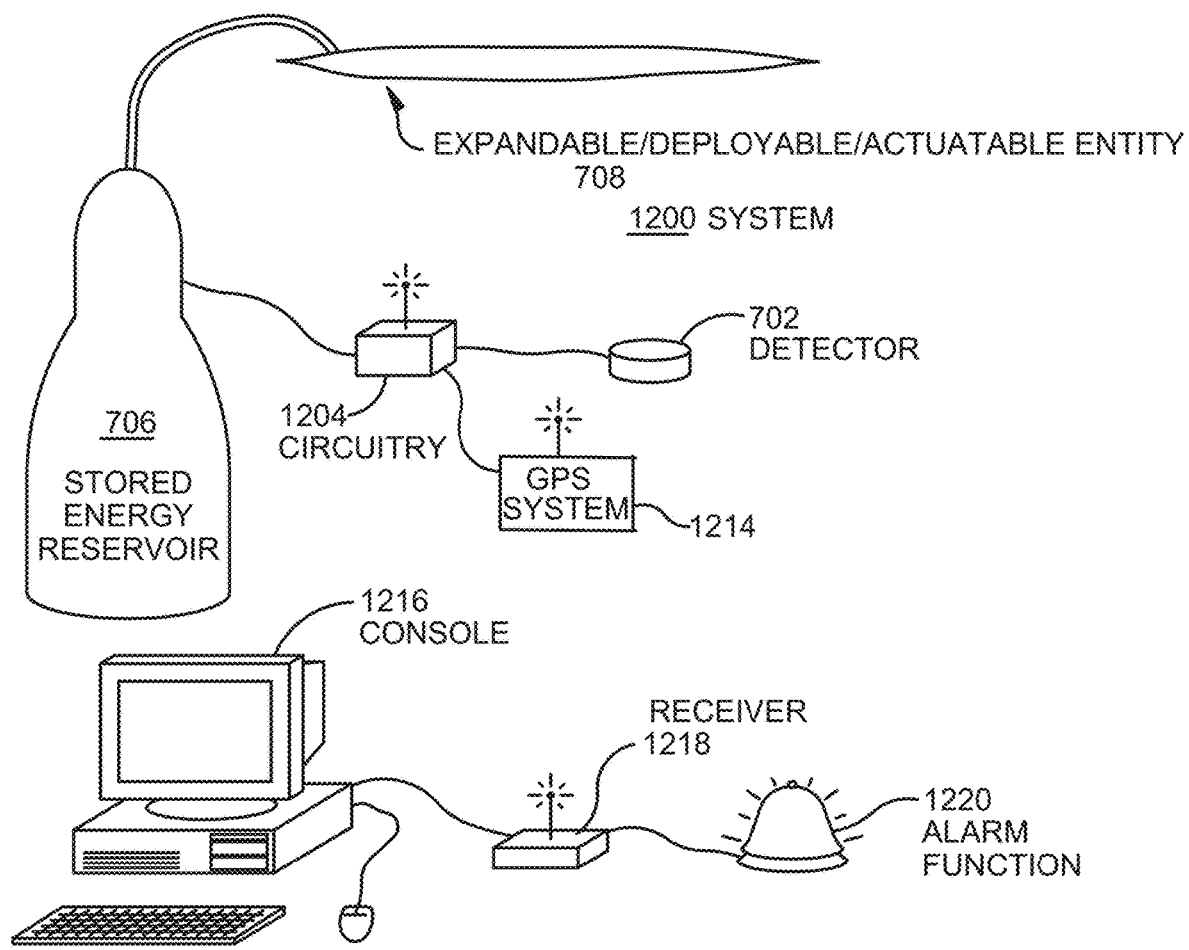
FIG. 12A depicts a system that is an example of another embodiment of the system of FIG. 1.

FIG. 12A depicts a system 1200, which is another embodiment of the system 100 (FIG. 1A). System 1200 includes detector 702, stored energy reservoir 706, and expandable/deployable/actuatable entity 708. System 1200 also includes circuitry 1204, Global Positioning System (GPS) 1214, console 1216, receiver 1218, and alarm function 1220. In alternative embodiments, system 1200 may include other components in addition to and/or instead of those listed above. (Throughout the present application, the term 'GPS' is typically used as a generic label to characterize any geolocation system of any type and employing any technology, whether conveying 'absolute' geodetic coordinates-&-time or analogous triangulation- or quadrangulation-enabling data (possibly not including any type of time-signal per se) referenced to some more local coordinate system.)

Detector 702, stored energy reservoir 706, and expandable/deployable/actuatable entity 708 are described in conjunction with FIG. 7. Circuitry 1204 is an embodiment of circuitry 106, and may function in a manner similar to that described in conjunction with FIGS. 1-6. Circuitry 1204 is also similar to circuitry 704 (FIG. 7). However, circuitry 1204 differs from circuitry 704 in that circuitry 1204 performs analysis of signals received from detector 702 to determine the state of the body after the adverse interaction with the object. The state of the body is analyzed to determine if the body has been adversely impacted beyond a particular degree that warrants sending a distress signal. Some examples of the body being adversely impacted to a degree that warrants sending a distress signal are if the body is immobilized, seriously injured, functionally broken, and/or cognitively disabled; for example, a likely broken hip or head injury resulting in dementia and/or loss of consciousness. For example, if the adversely-impacted body is a robot or a person, circuitry 1204 may use signals from detector 702 to determine whether or not the body is able to continue an adequate semblance of normal functioning. The degrees of adverse interaction required for activating the protective instrument and that required for sending a distress signal may be different.

Circuitry 1204 also differs from that of circuitry 704 (FIG. 7) in that circuitry 1204 may receive input from a GPS receiver, and may send a distress signal. GPS receiver 1214 is optional. GPS receiver 1214 may receive signals from satellites orbiting the earth that may be used to determine the location of the body having GPS receiver 1214, and/or its vector velocity and/or the absolute ('universal') time. Calculations may be performed by GPS 1214 receiver and/or circuitry 1204 that determine the position and/or vector velocity of the body based upon the signals received by GPS receiver 1214. Upon determining that the body has undergone an adverse interaction, circuitry 1204 may transmit information regarding the location of the body, the time of the adverse interaction, and/or other pertinent data. The information sent by circuitry 1204 may be based upon signals received from GPS receiver 1214. Circuitry 1204 may send a distress signal in addition to, or instead of, the location or time data. For example, in an embodiment not having GPS receiver 1214, circuitry 1204 may send a distress signal with little or no location information or with other location information derived from means different from that available from the GPS functionality.

Console 1216 is optional. Console 1216 may be a feature of a handheld computer, a laptop computer, a personal computer, a personal digital assistant, a computer-enabled personal communications device, a workstation, a mainframe computer, or a terminal, for example. Console 1216 may include one or more output devices, such as a monitor and/or a printer, which may be used to display or document information sent by, or derived from, the signals sent by circuitry 1204. Based on the information displayed or documented, an interested party may determine an appropriate action to take with respect to the body which has undergone the adverse interaction. The interested party may be a healthcare professional, a user, and/or a relative and/or an owner of the body, for example. Console 1216 may be associated with one-or-more databases that include information about multiple bodies, multiple locations, or other pertinent data. Console 1216 may perform diagnostic functions based on diagnostic and/or other information sent by circuit 1204. In an embodiment, circuitry 1204 may send status information about the body to console 1216 even when the body does not appear to have undergone an adverse interaction. The status information may include a descriptive assessment, location or position information, or information related to the direction of movement and/or information related to the speed of movement. The transmitted assessment may include estimates pertaining to the inferred state of the body and its recent history, particularly aspects of locomotion and environmental interactions. Console 1216 may also include a user interface for entering information, which information may be stored on machine-readable medium 112 (FIG. 1B).

Receiver 1218 receives signals from circuitry 1204 and transmits the signals to console 1216 and/or an alarm function 1220, which is optional. System 1200 may include none of, one of, or both of, console 1216 and alarm function 1220. Since both console 1216 and alarm function 1220 are optional, receiver 1218 is also optional. Specifically, receiver 1218 need not be included in system 1200 if console 1216 and alarm function 1220 are not present.

Alarm function 1220 receives signals from transmitter 1218 and alerts an interested party that there may be a problem with the body. Alarm function 1220 may include a bell, a beeper, a light source, a flashing light, a vibrator or any other device whose output can be sensed by a party bearing a component of alarm function 1220. In an embodiment, circuitry 1204 may include an alarm that sounds when circuitry 1204 determines that the body has undergone an adverse interaction with at least one object. A camera (not shown) may be associated with alarm function 1220, which turns on and shows the state of (e.g., images some fraction of) the body when it is detected that an adverse interaction has occurred. Upon detecting that an adverse interaction has occurred, an optical or acoustic (or other useful type of) signal at a station may be activated. The station may be monitoring the body and may be located at a hospital, home, school, and/or public-safety station, for example.

Although only one detector 702, stored energy reservoir 706, expandable/deployable/actuatable entity 708, circuitry 1204, GPS receiver 1214, console 1216, receiver 1218, and alarm function 1220 are shown, there may be any number of detectors, stored energy reservoirs, expandable/deployable/ actuatable entities, instances of circuitry, GPS receivers, consoles, receivers, and alarm functions. Detector 702, stored energy reservoir 706, expandable/deployable/actuatable entity 708, circuitry 1204, GPS receiver 1214, console 1216, receiver 1218, and alarm function 1220 may represent one or more detectors, stored energy reservoirs, expandable/deployable/actuatable entities, instances of circuitry, GPS receivers, consoles, receivers, and alarm functions, respectively.

Figure 12B:
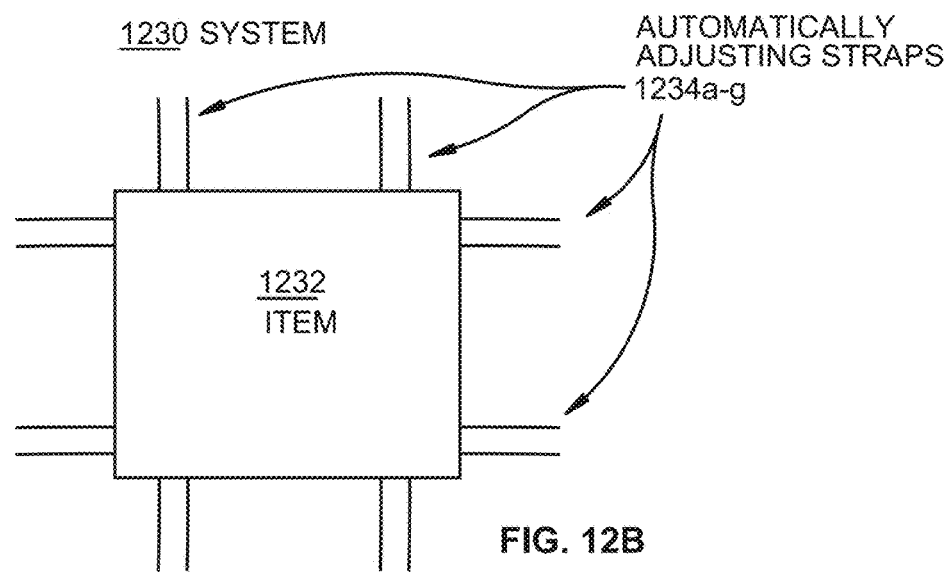
FIG. 12B depicts a system that is an example of an embodiment of the protective instrument of FIG. 1.

FIG. 12B depicts a system 1230, which is another embodiment of protective instrument 108 of FIG. 1. System 1230 includes item 1232 and straps 1234a-g (e.g., automatically adjusting straps). In alternative embodiments, system 1230 may include other components in addition to and/or instead of those listed above.

System 1230 depicts some possible mechanical means for affixing and/or adjusting the protective system on a body. Item 1232 may be a cushion or an expandable/deployable/actuatable entity such as expandable/deployable/actuatable entity 708 (FIGS. 7-12A), for example. In an embodiment, item 1232 may be positioned or oriented by straps or other means. Straps 1234a-g may be adjusted in response to signals from circuitry 106 (FIG. 1A) to position or orient or otherwise condition item 1232 so as to best protect a body or portion thereof against an projected adverse interaction and/or to allow item 1232 to actuate in a manner so as to favorably modulate an adverse interaction with one-or-more objects. Although in this embodiment there are 8 straps depicted in 1234a-g, in other embodiments there may be any number of straps or other different means of adjusting the position, orientation or actuation features or interaction-modulating capabilities of item 1232.

Although only one item 1232 and its set of straps are shown, there may be any number of items, each having a set of straps or other means for adjusting position, orientation, actuation features or interaction-modulation capabilities. Item 1232 and its set of straps may represent one or more functionally-similar items and their sets of adjustment means, respectively.

Regarding FIGS. 12C-25, any of the systems in FIGS. 1-12B may be included within many different types of items, such as garments or items-of-apparel or other devices or systems carried by or usually-&-reasonably closely associated with the particular type of body. FIGS. 12C-25 depict some non-exclusive examples of garments and other items within which the systems of FIGS. 1-12B may be included. More remarks applicable to FIGS. 12C-25 appear after FIG. 25.

Figure 12C:
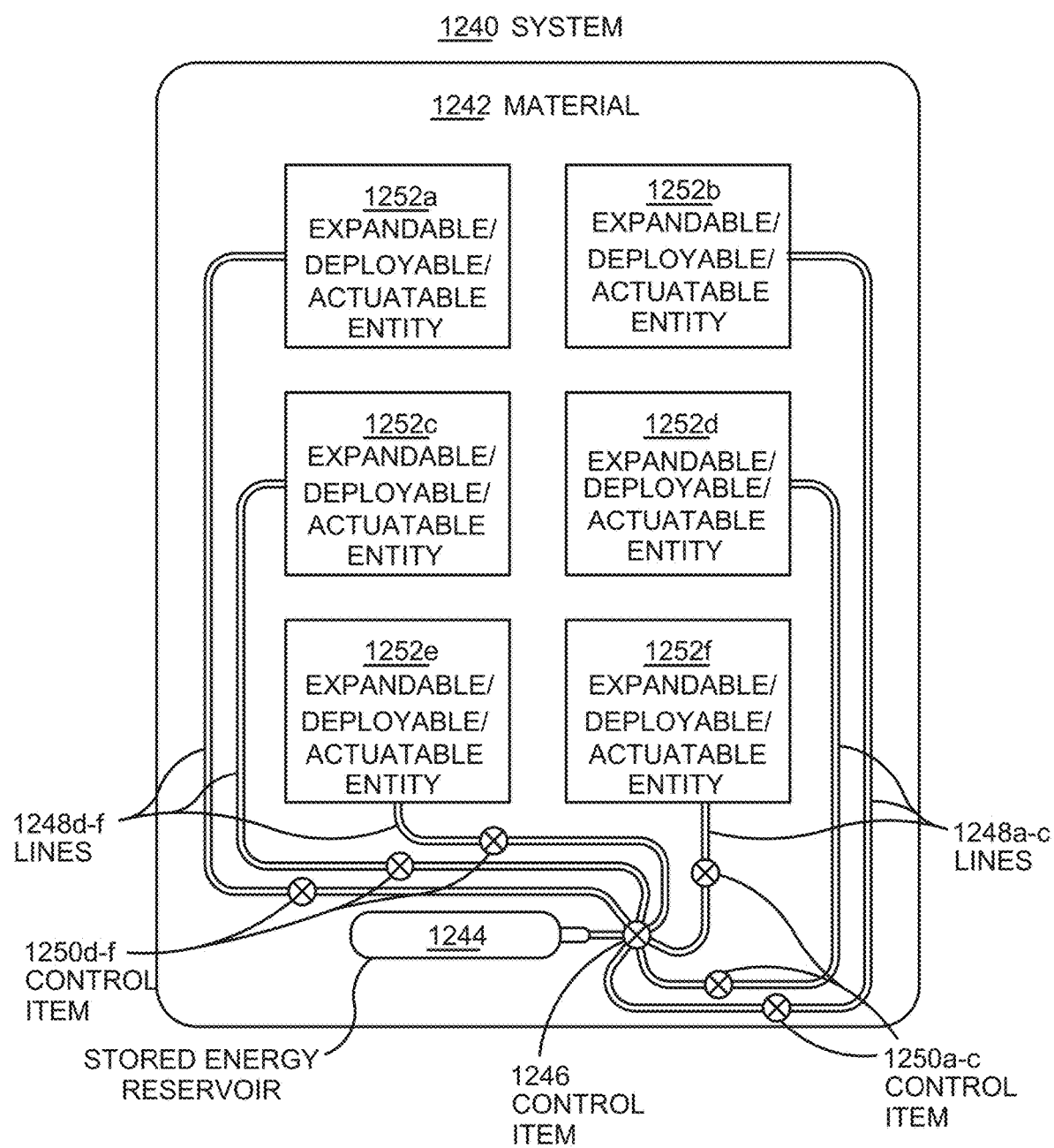
FIG. 12C depicts a system that is an example of an embodiment of the protective instrument of FIGS. 1, 6 and 7.

FIG. 12C depicts system 1240, which is an embodiment of the protective instruments of systems 100, 600, and 700 of FIGS. 1, 6, and 7, respectively. System 1240 includes material 1242, stored energy reservoir 1244, control item 1246 (an example of a more general control item), lines 1248a-f, valves 1250a-f, and expandable/deployable/actuatable entities 1252a-f. In alternative embodiments system 1240 may include other components in addition to and/or instead of those listed above.

Material 1242 is a material that is being worn by, or is a part of, the body being protected. For example, material 1242 may be part of a garment. Stored energy reservoir 1244 is an embodiment of stored energy reservoir 706. Control item 1246 controls the total flow of the pressurizing fluid out of stored energy reservoir 1244. Lines 1248a-f bring a stored-energy form from stored energy reservoir 1244 to corresponding expandable/deployable/actuatable entities 1250a-f. Control items 1250a-f control the flow of a stored-energy form, e.g., a pressurizing fluid, to each the corresponding expandable/deployable/actuatable entities. Control item 1246 is optional, because by controlling the individual flows using valves 1250a-f the aggregate flow may be controlled. Expandable/deployable/actuatable entities 1252a-f are more specific embodiments of expandable/deployable/actuatable entity 708. Each of expandable/deployable/actuatable entities 1252a-f may be constructed in the manner depicted for constructing expandable/deployable/actuatable entity 708 in FIG. 7. The amount or degree of expansion/deployment/actuation of each of expandable/deployable/actuatable entities 1252a-f is individually controlled. Each expandable/deployable/actuatable entity may be expanded or actuated to potentially a different degree according to a specification for modulating the adverse interaction. The modulation may take into account the various features of the body or major portion(s) thereof and of the one-or-more object with which the body may be adversely interacting, as well as the particular circumstances of the interaction.

Figure 12D:
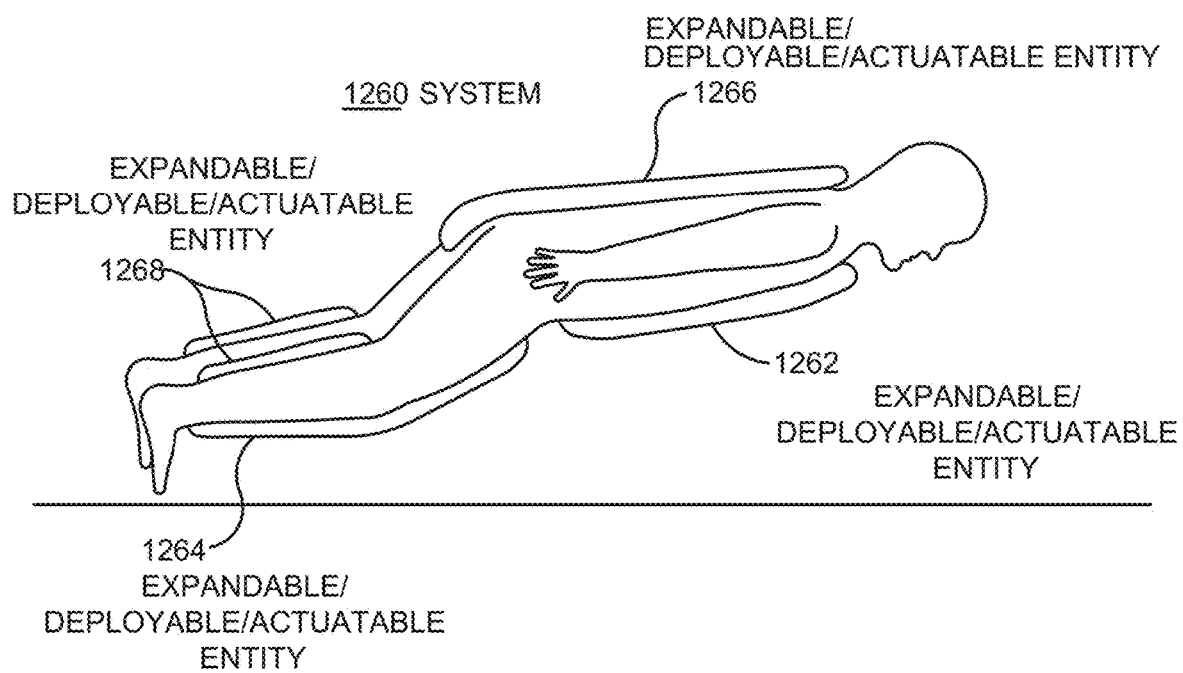
FIGS. 12D and 12E show a system, within which any combination of systems of FIGS. 1-12A may be used, in which different protective elements are activated, depending on how the body is accelerated and the nature of the potential adverse interaction with an object.
Figure 12E:
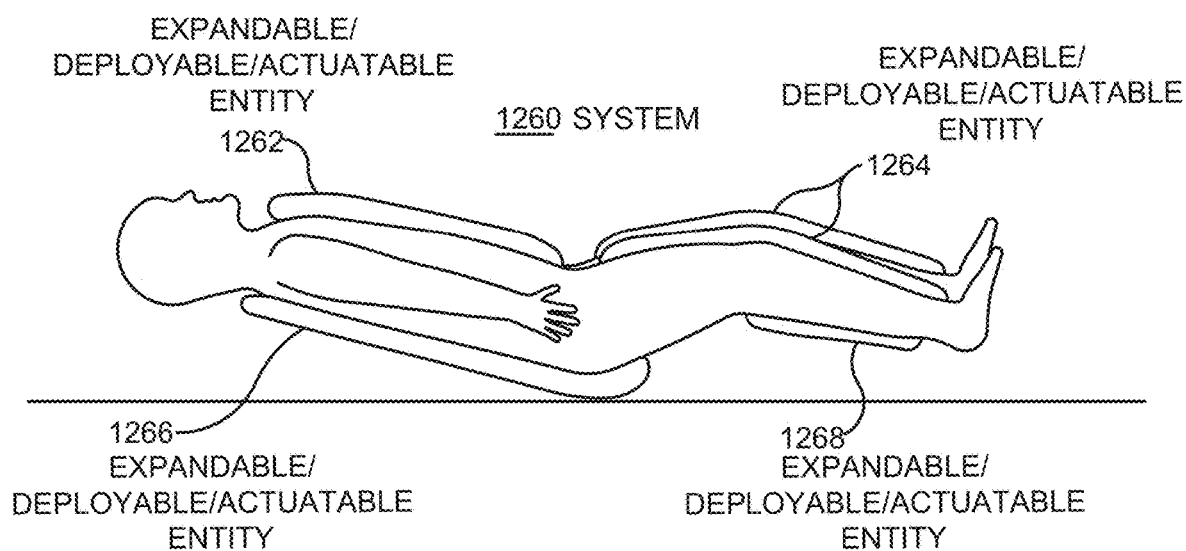

FIGS. 12D and 12E depict a system 1260 in which different expandable/deployable/actuatable entities are activated depending on how the body may be adversely interacting or projected to be adversely interacting with the one-or-more objects. System 1260 includes entities 1262, 1264, 1266, and 1268. In other embodiments, system 1260 may include other components in addition to or instead of those shown.

Each of expandable/deployable/actuatable entities 1262, 1264, 1266, and 1268 may include any of the systems described in conjunction with FIGS. 1-12A. Each of entities 1262, 1264, 1266, and 1268 may be a single entity with a single portion, or a single entity with multiple portions, each portion being capable of being separately activated to varying degrees. In FIG. 12D, the body fell forward, and consequently entities 1262 and 1264 were activated. In FIG. 12E, the body fell backwards and consequently entities 1266 and 1268 were activated. Which entities are activated and to what degrees is determined by the projected interaction with the one-or-more objects and an estimation of how to favorably modulate such interaction(s). In an embodiment, the responses of the two-or-more activated entities are coordinated to favorably modulate the net actions resulting from the responses. For example, if the head of a body is about to collide with an object, positioning an impulse-diffusing entity about the head may favorably modulate its interaction with the object, although so doing may also increase the likelihood of a neck injury as a result of the head being displaced a greater amount from the rest of the body than if the head-protecting action weren't taken. Consequently, in this embodiment, other entities may also be activated (e.g., about the neck and upper torso) in order to favorably modulate secondary consequences of the primary favorable modulation action(s). Those skilled in the art will appreciate that the expandable/deployable/actuatable entities of the figures herein are intended to be illustrative of many different types of entities; for example, the entities of FIG. 12D AND FIG. 12E may be considered representative of head and/or neck protective entities by straightforward logical extension.

Figure 13A:
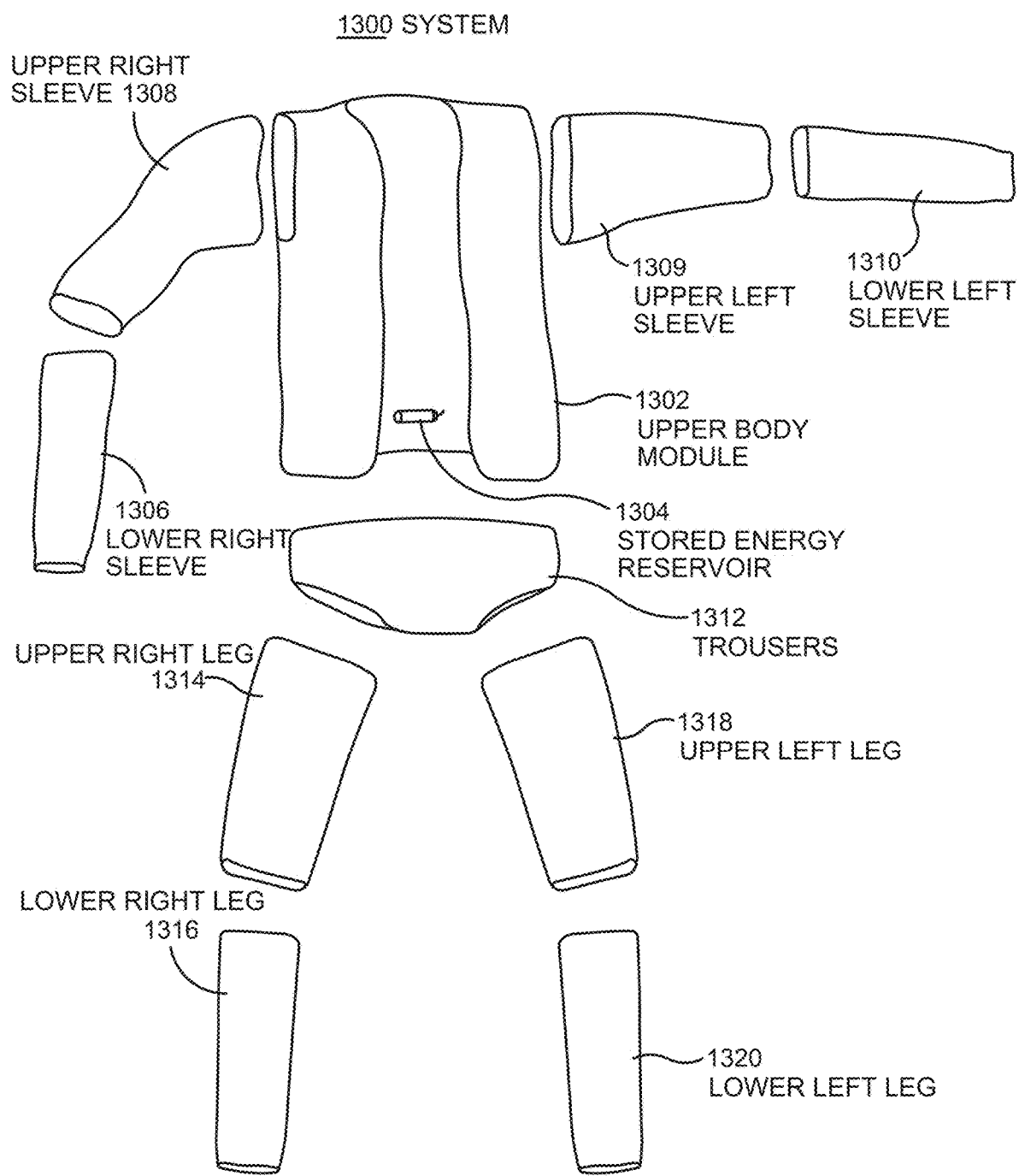
FIG. 13A depicts a system for protecting parts of a body, within which any combination of systems of FIGS. 1-12A may be used.

FIG. 13A depicts a system 1300 within which any combination of systems 100 and 600 (described in conjunction with FIGS. 1-12A). System 1300 includes upper body module 1302 having stored energy reservoir 1304, lower right sleeve 1306, upper right sleeve 1308, upper left sleeve 1309, lower left sleeve 1310, trousers 1312, upper right leg 1314, lower right leg 1316, upper left leg 1318, and lower left leg 1320. In alternative embodiments system 1300 may include other components in addition to and/or instead of those listed above. As used herein, the term "module" is to be treated as more or less coextensive with the term "entity," unless context dictates otherwise.

System 1300 depicts a series of garments that may be worn as protective items without being visibly conspicuous.

Upper body module 1302 is worn on-or-about, and protects, the chest of the body. Stored energy reservoir 1304 supplies a stored-energy form, e.g., a pressurized fluid to one or more expandable/deployable/actuatable modules within the upper body module 1302. Stored energy reservoir 1304 may be located in any convenient location, e.g., in-or-about a portion of upper body module 1302 that corresponds to the lumbar region of the body. Although stored energy reservoir 1304 is depicted as being oriented parallel to the bottom edge of upper body module 1302, reservoir 1304 may be positioned and/or oriented in any other fashion that may be convenient; it may consist of two or more physically distinct entities.

Each of the components of system 1300 protects the corresponding portion of the body. Lower right sleeve 1306 protects the lower right arm and may include the wrist. Upper right sleeve 1308 protects the upper part of the right arm and may include the elbow. Upper left sleeve 1309 protects the upper part of the left arm and may include the elbow. Lower left sleeve 1310 protects the left forearm and may include the wrist.

Trousers 1312 protect the lower part of the trunk of the body. Upper right leg 1314 protects the upper part of the right leg and may include the knee. Lower right leg 1316 protects the lower part of the right leg and may include the ankle. Upper left leg 1318 protects the upper part of the left leg and may include the knee. Lower left leg 1320 protects the lower part of the left leg and may include the ankle. In some implementations, the various system components described herein are sized/shaped/arranged to give protective priority to the joints of the limbs and/or to the torso (e.g., ribs, spinal vertebrae) since such body components are viewed as mechanically weak points and likely to suffer damage.

Each of the components of system 1300 (upper body pad 1302 having stored energy reservoir 1304, lower right sleeve 1306, upper right sleeve 1308, upper left sleeve 1309, lower left sleeve 1310, pants 1312, upper right leg 1314, lower right leg 1316, upper left leg 1318, and lower left leg 1320) may have any number of stored energy reservoirs, expandable/deployable/actuatable entities, detectors, and/or instances of circuitry. For example, each of the components of system 1300 may include one or more of system 1250 (FIG. 12C). Alternatively, each of the components of system 1300 includes one expandable/deployable/actuatable module, for example. Each of the components of system 1300 may be worn as an undergarment, may be worn on top of normal clothing, and/or may be incorporated within or under or over other garments or other items-of-apparel, such as shirts and trousers, for example. Any of the components of system 1300 may be used to immobilize, restrain, stiffen, protectively cushion, and/or strengthen a body-limb and/or appendage. In an embodiment, any of the components of system 1300 may be used to protect, reduce or otherwise favorably modulate a break, such as skeletal bone-break, muscle, or other soft-tissue damage or other somatic structural failure or incapacity until more definitive or standardized treatment becomes available.

Figure 13B:
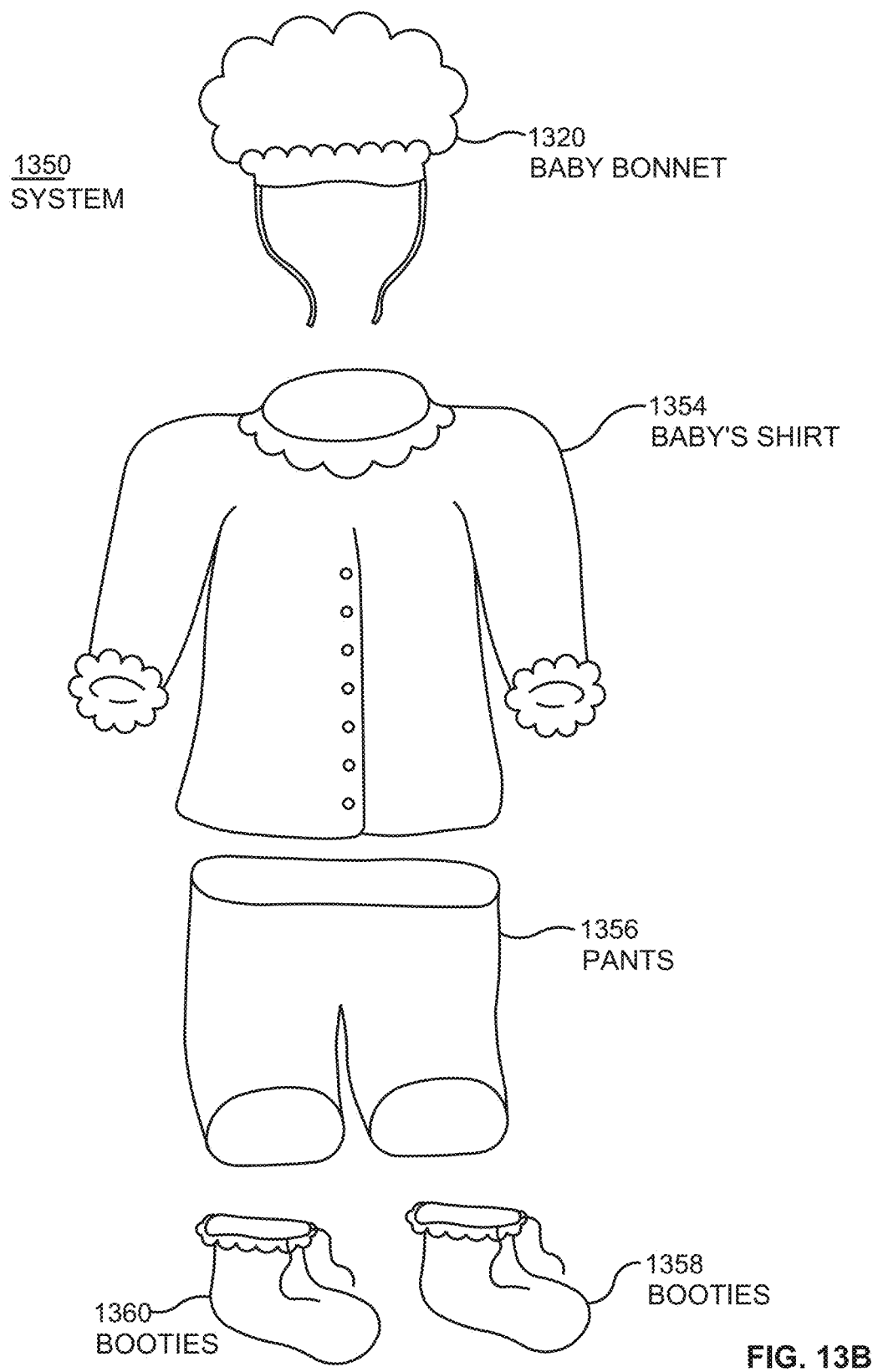
FIG. 13B shows a system for protecting the body of a baby within which any combination of systems of FIGS. 1-12A may be used.

FIG. 13B shows a system 1350 within which any combination of systems 100 and 600-1250 (described in conjunction with FIGS. 1-12A) may be deployed and/or utilized. System 1350, baby bonnet 1352, baby shirt 1354, baby pants 1356, and baby booties 1358 and 1360 are merely exemplary. In alternative embodiments, system 1350 may include other components in addition to and/or instead of those listed above.

Each of the components of system 1350 protects the corresponding portion of the body. Baby bonnet 1352 may include one or more protective instruments for protecting the baby's head and/or neck. The baby's shirt 1354 may include one or more protective instruments for protecting the baby's upper body and arms, as well as its neck- and/or head. Pants 1356 may include one or more protective instruments for protecting the lower body and the legs of the baby. Booties 1358 and 1360 may include one or more protective instruments for protecting the baby's feet; furthermore, those skilled in the art will recognize that the clothing items depicted are representative of other types of protective clothing, such as protective hand devices (e.g., gloves) and or protective footwear (e.g., boots) such as shown/described elsewhere herein. System 1350 differs from that of an adult, because babies tend to be less mobile and less concerned about their appearance.

FIG. 14 depicts a system 1400, which includes a shirt 1402 having an activatable collar 1404, which when actuated may protect a body or portion(s) thereof, e.g., portions of the head and/or neck. In other embodiments, system 1400 may include other components in addition to or instead of those listed. Incorporated within shirt 1402 or elsewhere on-or-about the body of the shirt-wearer may be one or more embodiments of system 100. One or more expandable/deployable/actuatable entities may cover selected regions of shirt 1402. Shirt 1402 includes collar 1404, which when actuated extends over the neck and portions of the head of the human body wearing system 1400. Actuatable collar 1404 also includes one or more protective instruments for protecting the neck and/or head of the body, and may deploy when activated up from the shoulders from a garment collar in a girdle-like mode. In an embodiment, collar 1404 may surround and cover the entire head, and may have internal surfaces that conform to the neck and/or the head so as to provide particular types of mechanical support and/or cushioning conducive to minimization of injury from pertinent types of adverse interactions.

FIG. 15A depicts a system 1500, which includes shirt 1502 and trousers 1504 for protecting a body from an adverse interaction with one-or-more objects. In other embodiments, system 1500 may include other components in addition to or instead of those listed. In some embodiments, shirt 1502 and trousers 1504 appear to be ordinary clothing and/or items-of-apparel, but include modules that are part of the protective instrument 108 embedded therein. An advantage of inconspicuously placing system 100 (FIG. 1A) (e.g., System 600, FIG. 6) within shirt 1502 and/or trousers 1504 (or within any other item that appears to be ordinary clothing) is that people may be more willing to wear garments including system 100 if system 100's presence is inconspicuous. For example, the system 100 may be sufficient thin and/or otherwise devoid of externally-distinguishing features as to be minimally-observable. However, in an embodiment, system 100 is conspicuous or noticeable, as more protective capabilities may be embedded within or about a garment, if the requirement of inconspicuousness is removed. In one embodiment, shirt 1502 and/or trousers 1504 may be water-washable and/or suitable for various modes of 'dry cleaning'.

Figure 18:
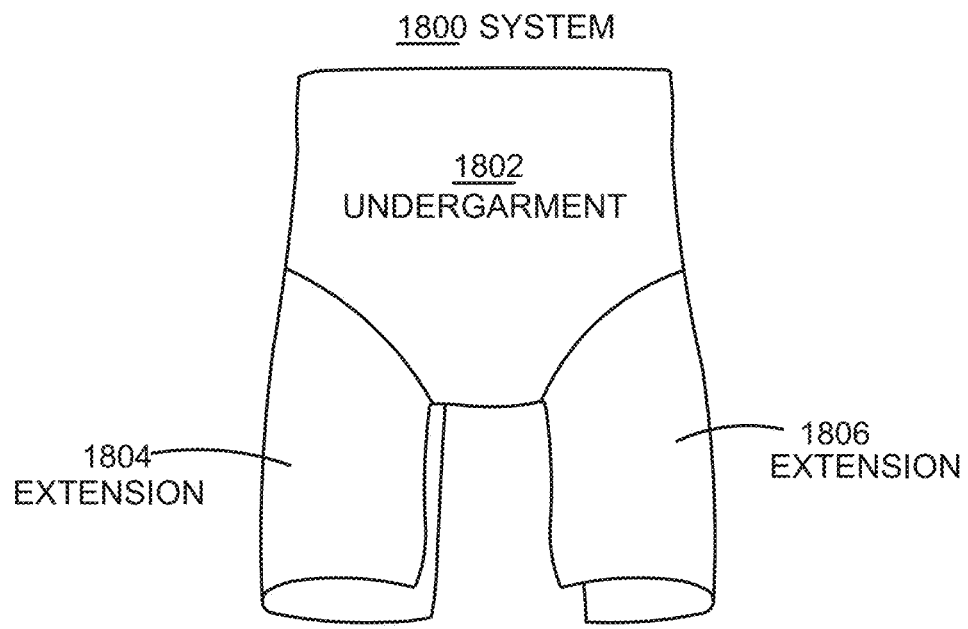
FIG. 18 depicts an undergarment having extensions for protecting a body, within which any combination of systems of FIGS. 1-12A may be used.
Figure 19A:
FIG. 19A depicts an example of a face mask, which may protect the nose and/or other parts of the head of a body, within which any combination of systems of FIGS. 1-12A may be used.
Figure 19B:
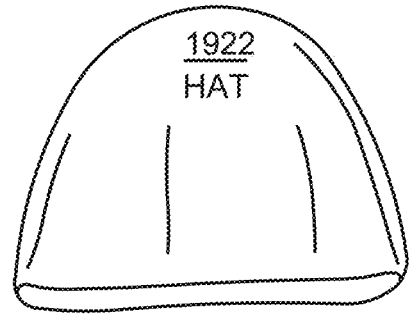
FIG. 19B depicts an example of a hat for protecting the head of a body, within which any combination of systems of FIGS. 1-12A may be used.

FIG. 15B depicts a jacket 1550 for protecting a body. In an embodiment, jacket 1550 is a ski jacket including modules that may protect a skier when the skier undergoes an adverse interaction with the immediate environment. FIG. 16A depicts a protective instrument 1602 for protecting from certain types of excessive transverse or rotational accelerations or excessive movements (e.g., such as might be associated with a neck, a wrist, an elbow, a knee, or an ankle). FIG. 16B depicts a module 1612 for protecting the elbow of a body from out-of-range motion or excessive transverse accelerations. FIG. 17A depicts a knee module 1702 for protecting a knee of a body from out-of-range motion or excessive transverse accelerations. FIG. 17B depicts protective instrument 1722 for protecting a shin of a body from excessive transverse accelerations or motions; quite similar devices would protect ankles and wrists from similar threats, and extensions thereof would perform likewise for hands and feet. FIG. 18 depicts a system 1800 having undergarment 1802 with extensions 1804 and 1806. The dotted lines separate the extensions from the rest of undergarment 1802. Extensions 1804 and 1806 partly cover, and are for protecting, the unusually-vulnerable upper thighs of a human body from excessive accelerations, e.g., ones resulting in femur-fracture proximate to the pelvic interface. Undergarment 1802 may likewise protect portions of the pelvis from excessive peak accelerations. FIG. 19A depicts a face mask 1902, which may protect the face and/or other parts of the head and/or neck from excessive peak accelerating forces. FIG. 19B depicts a hat or similar item of cranial apparel 1922 for protecting the skull of a human body from locally-excessive accelerations. In other embodiments, the systems of FIGS. 15B-19B may include other components in addition to or instead of those listed.

Figure 20:
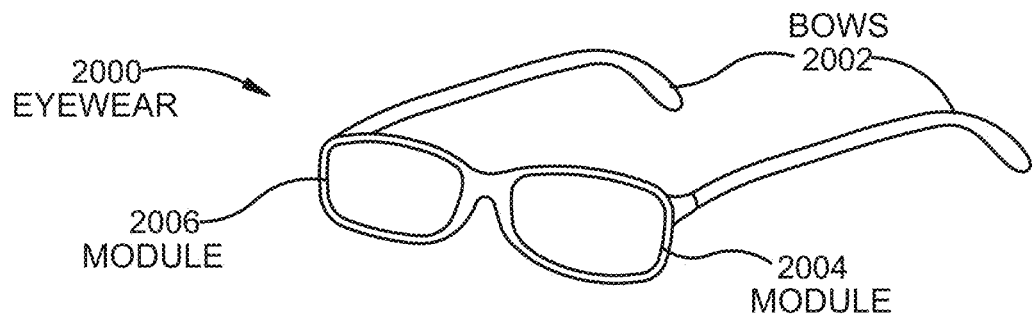
FIG. 20 depicts an example of eyewear having frames with pads, for protecting the eyes of a body, within which any combination of systems of FIGS. 1-12A may be used.

FIG. 20 depicts an example of eyewear 2000 having bows 2002 and modules 2004 and 2006. In other embodiments, system 2000 may include other components in addition to or instead of those listed. Eyewear 2000 could be any kind of glasses or goggles. For example, eyewear 2000 may be safety glasses, ski goggles, swimming goggles or goggles, e.g., ones that are intended to be worn while operating a vehicle that does not have a windshield. Bows 2002 support-&-position modules 2004 and 2006, and may be of any type. Modules 2004 and 2006 protect the eyes of a body. Each of modules 2004 and 2006 may include one or more expandable/deployable/actuatable entities that actuate to protect either or both of the eyes of the body from an adverse interaction. Modules 2004 and 2006 may actuate to enable cushioning action around the eyes, which modules may be incorporated into goggles 2000. Other modules may be placed elsewhere on frames or bows 2002 in addition to or instead of modules 2004 and 2006, e.g., to assist in maintaining the positioning of protective features during an adverse interaction.

Figure 21:
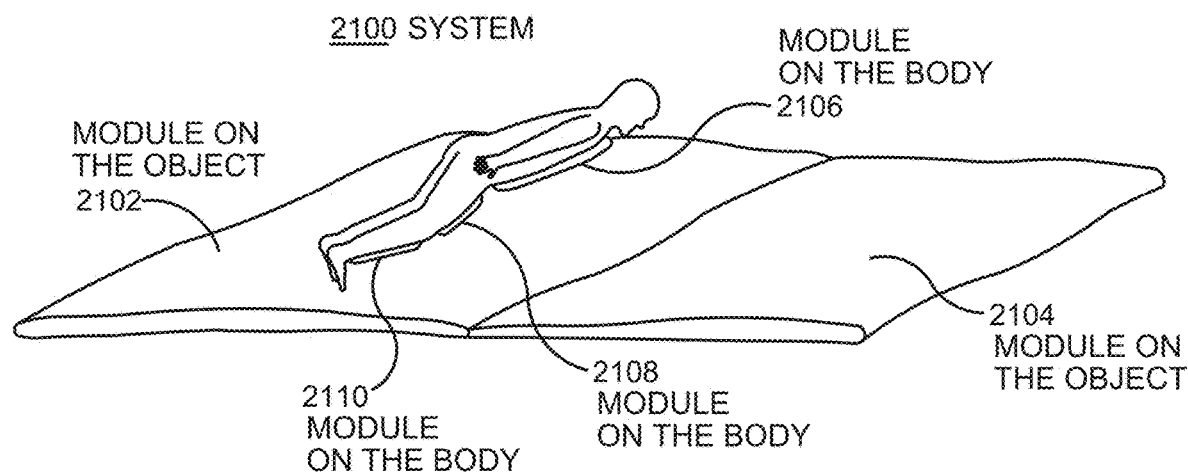
FIG. 21 depicts an example of a system that includes protective devices on both the body and the object, within which any combination of systems of FIGS. 1-12A may be used.

FIG. 21 depicts a system 2100, which includes actuatable modules on both the body and the potentially-threatening object. In other embodiments, system 2100 may include other components in addition to or instead of those listed. System 2100 includes modules 2102 and 2104 on the object and modules 2106, 2108, and 2110 on the body.

The object on which the modules 2102 and 2104 are placed may be any object that may adversely interact with the body, e.g., objects and surfaces thereof in the body's immediate environment. Although only two large modules 2102 and 2104 are depicted, the modules may be any size and there may be any number of them. By placing modules on both the object and the body, there is brought into play a significantly richer set of options for modulating adverse interactions between body and object(s).

Those skilled in the art will appreciate that the modules described herein are depicted as appropriately general so as to be structureable as appropriate to context. For example, in implementations where a certain body system(s) are to be protected, the modules shown are to be adapted to protect such systems. For instance, since it is contemplated that the hands and/or wrists might need protection, the modules herein, such as modules 2106, 2108, and/or 2110 are representative of hand-protective devices, such as gloves, as well as other body-system/component/member protective devices.

Figure 22:
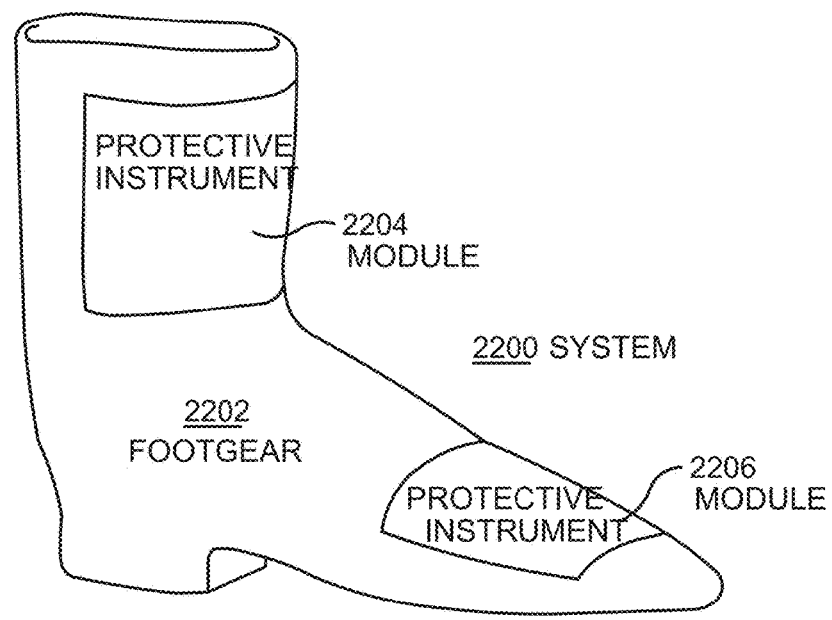
FIG. 22 depicts an example of system that includes footgear having protective devices within which any combination of systems of FIGS. 1-12A may be used.

FIG. 22 depicts system 2200, which includes footgear 2202 having modules 2204 and 2206. In other embodiments, system 2200 may include other components in addition to or instead of those listed. Footgear 2202 may afford protection against a variety of possible adverse interactions of the body or major portions with the body's environment and/or objects therein. In other embodiments, other modules may be included at other positions of footgear 2202 in addition to or instead of modules 2204 and 2206. Any of the embodiments of system 100 (FIG. 1A) (e.g., System 600, FIG. 6) may be used for modulating adverse interactions. System 2200 may also include at least one module for protecting the toes, e.g., from impacting objects.

Figure 23:
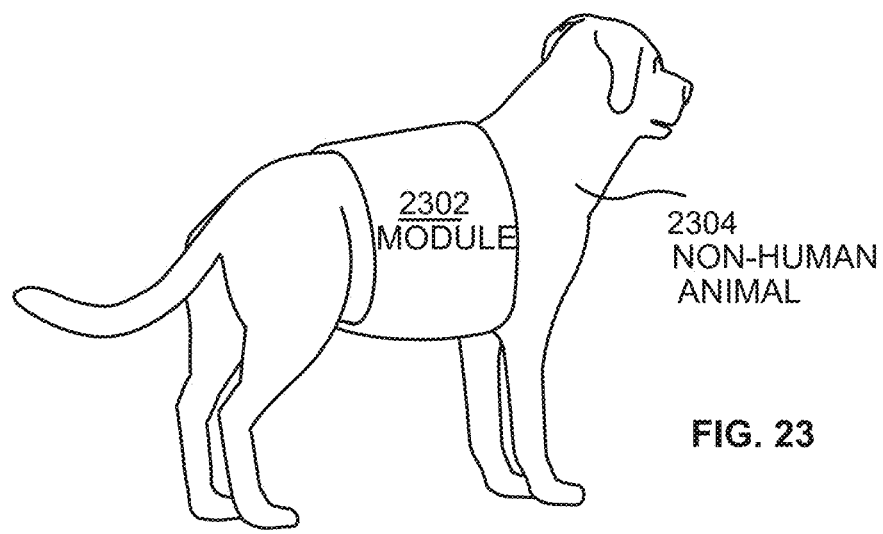
FIG. 23 depicts an example of a protective device for a body that is a non-human animal, within which any combination of systems of FIGS. 1-12A may be used.

FIG. 23 depicts a module 2302 for a body, which is a non-human animal 2304. Module 2302 may be located upon and used to protect other parts of the animal than that depicted, such as the head, the neck, the legs, ankles, and/or pelvis, etc.

Figure 24:
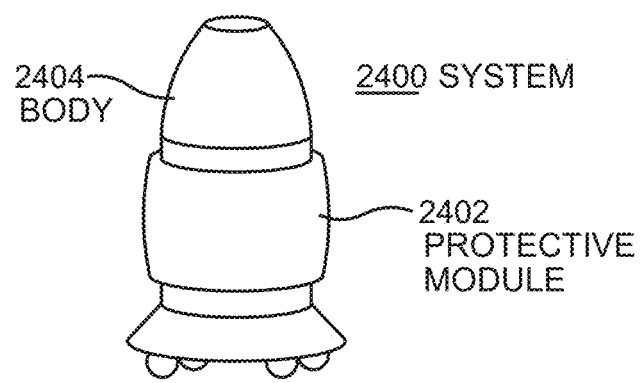
FIG. 24 depicts an example of a system having a protective device for a body, which is not living, within which any combination of systems of FIGS. 1-12A may be used.

FIG. 24 depicts a system 2400 having a protective module 2402 for a body 2404 that is not a living being. Body 2404 may be a robot, either stationary or mobile.

Figure 25:
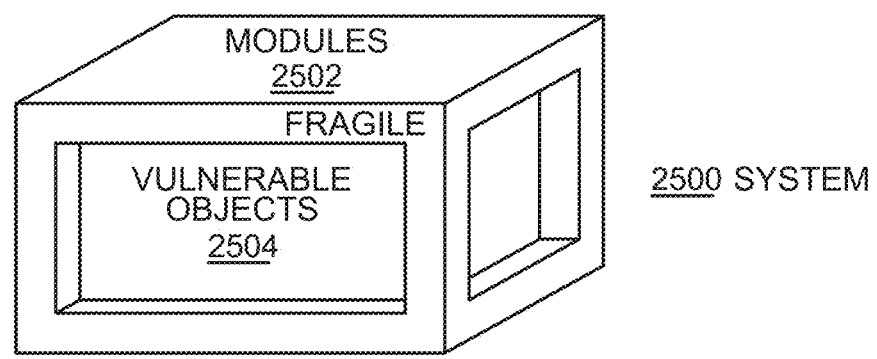
FIG. 25 depicts an example of a system having protective devices for a fragile object, within which any combination of systems of FIGS. 1-12A may be used.

FIG. 25 depicts a system 2500 having modules 2502 for a vulnerable object 2504. Modules 2502 protect vulnerable object 2504. In other embodiments, each of the systems associated with FIGS. 23-25 may include other components in addition to or instead of those listed.

Regarding FIGS. 15A-25, each of the garments or modules may include one or more modules that are capable of being activated, moreover each to various degrees and in various manners. Each of the modules may be capable of being individually activated, and each of its component parts likewise, moreover potentially to various degrees. Any of the modules may have multiple compartments or portions that are capable of being individually activated, moreover to various degrees or in various manners. The detectors and instances of circuitry used to activate the module(s) may be located on or about the body being protected and/or elsewhere. The protective devices of any of FIGS. 7-25 may include a deactivation function for deactivating which may be exercised to deactivate any the devices of FIGS. 15A-25, once their functioning is no longer desired. Alternatively, the protective devices of FIGS. 15A-25 could be removed or discarded after their functioning is no longer desired.

Although specific embodiments have been described, those skilled in the art will understand that various changes may be made and equivalents may be substituted for elements thereof without departing from the true spirit and scope of these embodiments. In addition, modifications may be made to the embodiments disclosed, without departing from the essential teachings herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Figure 26:
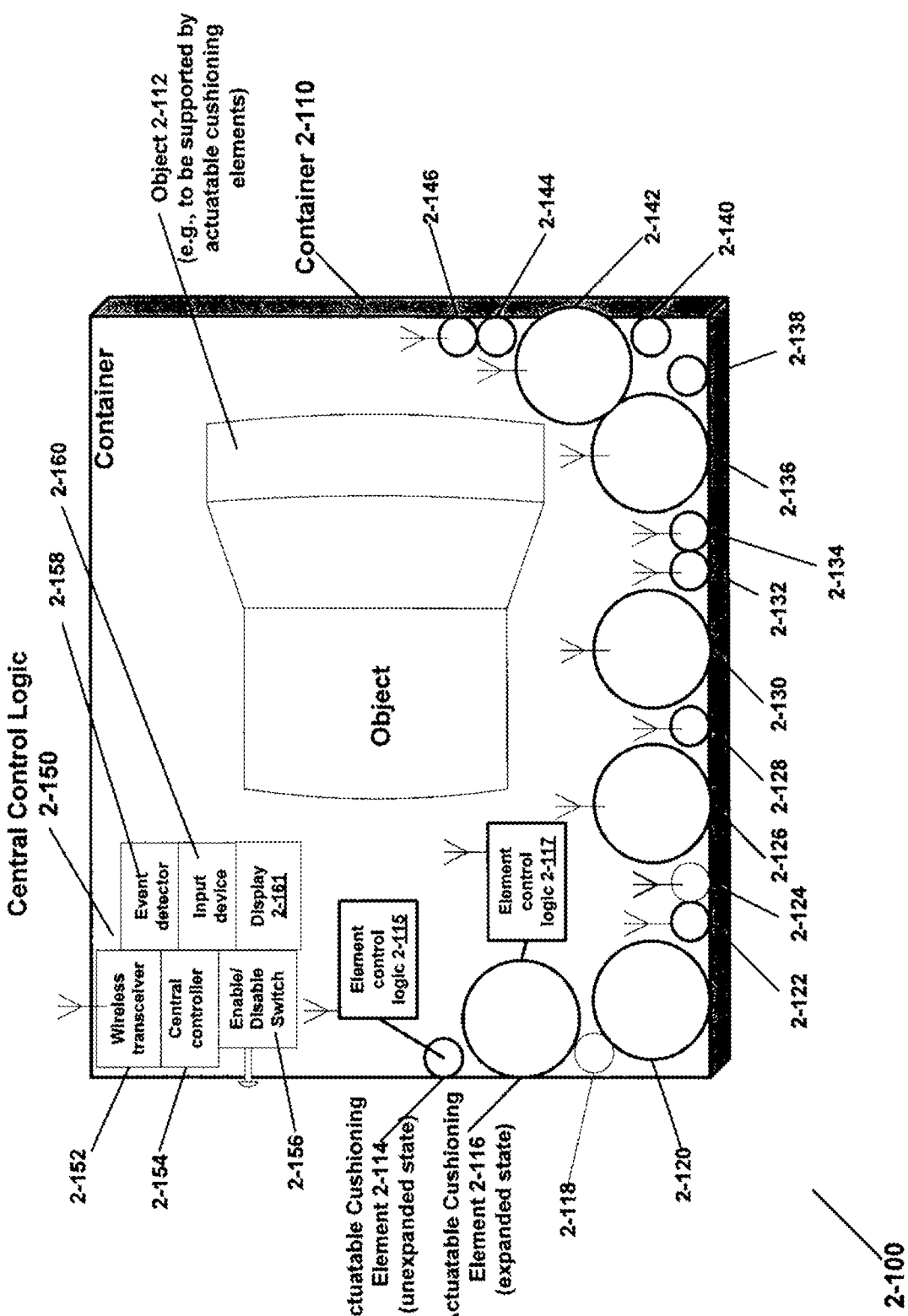
FIG. 26 illustrates an example system in which embodiments may be implemented.

FIG. 26 illustrates an example system 2-100 in which embodiments may be implemented. System 2-100 may include, for example, a container 2-110, which may be any type of container, such as a box, a container for shipping cargo on a vehicle, boat, plane, train or other vehicle, a container for shipping or storing small or large items, a container for shipping fragile items, or any other container. Container 2-110 may be made from any suitable material, such as cardboard, plastic, steel, etc., as a few example materials, but any type of material may be used.

System 2-100 may also include one or more actuatable cushioning elements provided within container 2-110, such as actuatable cushioning elements 2-114, 2-116, 2-118, 2-120, 2-122, 2-124, 2-126, 2-128, 2-130, 2-132, 2-134, 2-136, 2-138, 2-140, 2-142, 2-144, 2-146, etc. The actuatable cushioning elements may provide cushioning support for an item or object, such as object 2-112, for example. Object 2-112 may be any type of object, such as electronics, books, food items, cargo, fragile or delicate or breakable items which may be in need of cushioning support, people, animals, other organisms, or any other type of object. These are just a few examples of an object which may be supported by actuatable cushioning elements, and the various embodiments are not limited thereto. Actuatable cushioning elements 2-114, 2-116, etc. may spread a force or interaction of an object over a period of time or over an area within container 2-110, which may, at least in some cases, decrease potential impact and/or damage to the object, for example.

For example, one or more actuatable cushioning elements may be actuated (e.g., expanded) in response to an event to protect an object or passenger from damage or harm or collision effects. Also, for example, one or more actuatable cushioning elements may be actuated based upon one or more sensed values in accordance with a model of one or more objects to be protected, the actuatable cushioning elements, and the environment.

Also, for example, one or more actuatable cushioning elements may be actuated over a series of events or in response to a series of events to provide a coordinated protection of one or more objects or passengers in a vehicle from harm, damage or other effects from a collision, acceleration or other event. The protection of one or more objects may be based upon a harm function of the actual or predicted damage to subsets or portions of such objects, such as a maximum value, a weighted value, a cumulative value, or other such functions. The harm function may include damage to the environment (e.g., pedestrians or other vehicles in a vehicular collision, higher valued objects in the vicinity of a container collision, etc.) as well as to the one or more nominally protected objects. These are merely a few illustrative examples and the disclosure is not limited thereto. Additional details and example embodiments are described herein.

Actuatable cushioning elements 2-114, 2-116, etc. may be in either an expanded state, such as shown for actuatable cushioning element 2-116, or an unexpanded state such as for actuatable cushioning element 2-114, for example. Or an actuatable cushioning element may also be partially expanded or partially unexpanded, for example.

In an example embodiment, some types of actuatable cushioning elements may be provided in an expanded state (e.g., inflated) for a limited period of time. For example, one or more actuatable cushioning elements may be actuated (e.g., expanded or unexpanded) in response to an event. In an example embodiment, a subset of actuatable cushioning elements may be actuated in response to an event. In another example embodiment, one or more actuatable cushioning elements may be expanded just prior to shipment and may remain in an expanded state for an extended period of time, or for a duration of transport, for example. In an example embodiment, an actuatable cushioning element may provide greater cushioning support for an object while in an expanded state, as compared to an unexpanded state (e.g., due to a greater volume of flexible or cushioning material or matter to absorb an impact). This is merely an example embodiment, and the disclosure is not limited thereto.

One or more of the actuatable cushioning elements may be actuated, which may include putting an actuatable cushioning element into motion or action. Actuation may include, for example, expanding an actuatable cushioning element from an unexpanded state to an expanded state (e.g., causing an element to expand or increase in size), or unexpanding an actuatable cushioning element from an expanded state to an unexpanded state (e.g., causing an element to shrink or reduce in size or contract), as examples. Actuation may include, for example, causing an airbag or other entity to inflate or deflate. Actuation may include, for example, changing or controlling the shape of an actuatable cushioning element. Actuation may also include partial motions or partial actions, such as partially expanding or partially unexpanding an actuatable cushioning element, for example.

Actuatable cushioning elements 2-114, 2-116, etc. may include any type of expandable element. For example, Actuatable cushioning elements 2-114, 2-116, etc., may include expandable gas bags which may expand based on the application of pressurized gas to the bag similar to the airbags used in automobiles and other vehicles. Actuatable cushioning elements 2-114, 2-116, etc. may alternatively include a fluid-expandable bag or entity that may be expanded by fluid. For example, Actuatable cushioning elements 2-114, 2-116, etc., may include fluid-actuatable elements, where fluid may be sourced from one or more fluid reservoirs, e.g., via a valving actuation. The fluid reservoirs may, for example, cause the fluid actuatable elements to actuate (e.g., expand and/or unexpand/contract) by causing fluid to flow into or out of the fluid-actuatable elements. For example, Actuatable cushioning elements 2-114, 2-116, etc., may include magnetic field-actuatable elements, where magnetic field may be sourced from one or more electric energy sources, e.g., via a capacitor, an inductor, a flux generator, or other means. The electric energy sources may, for example, cause the magnetic field actuatable elements to actuate (e.g., expand and/or unexpand/contract) by causing magnetic fields to apply force to the fluid-actuatable elements. Actuatable cushioning elements 2-114, 2-116, etc. alternatively may include an expandable cushioning material which may expand (or unexpand), for example, through the application of a chemical, gas, liquid, electrical energy, reaction force or other energy or material. Electrical energy may, for example be used to expand (or unexpand) or shape an expandable cushioning material by means of an electric motor, a linear electromagnetic motor, a piezoelectric actuator, or other means. Reaction force may, for example be used to expand (or unexpand) or shape an expandable cushioning material by means of a rocket engine, a pulsed microimpulse reaction engine, a magnetic repulsion coil, or other means. Expandable cushioning material may apply cushioning force by means of pressure, electric/magnetic fields, inertia, compressive stress, tensile force, or shear force, or a combination thereof. Expandable cushioning material may apply cushioning force and/or dissipate interaction energy by means of crushing (e.g., foam or shells), breaking (e.g., fibers or wires), buckling (e.g., struts or plates) or other mechanisms.

In an example embodiment, the actuatable cushioning elements may be re-usable, where the cushioning elements may be expanded to absorb an impact, later fully or partially unexpanded, and then subsequently expanded again to provide cushioning support or protect the object for a second event or impact, or to provide cushioning support in another container, for example. While in another example embodiment, the actuatable cushioning elements may be disposable, wherein the elements, for example, may be expanded or used only once or only a few times.

Any number of actuatable cushioning elements may be used to provide cushioning support for object 2-112. For example, in one embodiment, at least 12 actuatable cushioning elements may be used to provide cushioning support for an object. This may include providing at least 12, 20, 50, 100 or even 500 actuatable cushioning elements (or more) to provide cushioning support, according to different example embodiments.

The actuatable cushioning elements may be any shape (e.g., round, oblong, rectangular, irregular shape) and any size. In an example embodiment, one or more of Actuatable cushioning elements 2-114, 2-116, etc. may be 2.5 cm in width or less in an unexpanded state, or may be 2.5 cm in width or more in an unexpanded state, or may be 5 cm or less in an unexpanded state, or may be 8 cm or less in an unexpanded state, as examples. For example, different numbers and/or sizes of cushioning elements may be used, e.g., depending on the application, the type of object to be protected, the type or size of container to be used, or other factors. These are some example numbers and sizes and the disclosure is not limited thereto. In an example embodiment, smaller-sized actuatable cushioning elements may be more applicable for smaller containers, whereas larger actuatable cushioning elements may be more applicable for larger containers, for example.

In another example embodiment, a group of actuatable cushioning elements may be provided within a container, or outside of the container, to provide cushioning support for an object, such as a vase or other object within the container. A first subset of actuatable cushioning elements may be pre-inflated or pre-expanded in response to a first event, e.g., at packing time or just prior to shipment. At some later point, a second subset of actuatable cushioning elements may be actuated (e.g., expanded), in response to a second event (such as an acceleration that exceeds a threshold, or an impact or likely impact), for example. At some point later, a third subset of actuatable cushioning elements may be actuated (e.g., inflated or expanded), in response to a third event, for example. Also, in an example embodiment, upon arrival (which may be considered a fourth event), one or more (or even all) of the actuatable cushioning elements in the container may be actuated (e.g., unexpanded or deflated), to allow the object to be unpacked from the container. The actuatable cushioning elements may also be-reused in another container, for example. In this manner, the group of actuatable cushioning elements may provide cushioning support for an object, e.g., for one or more events.

Actuatable cushioning elements may be actuated outside of a container or outside of the preactivation envelope of a system. For example, such actuation may provide additional cushioning to that provided with interior actuatable cushioning elements alone. For example, such exterior actuation may also act by modification of the dynamics of the interaction with the environment, such as by introducing sliding contacts, aerodynamic lift, sideways steering forces, or by other means. For example, such exterior actuatable cushioning elements may have spherical shapes, cylindrical shapes, high aspect ratio shapes, lifting-body shapes, or other shapes. For example, exterior actuatable cushioning elements may include expandable gas bags, fluid actuatable elements, expandable cushioning materials, skids, reaction engines, drag-inducing devices, anchors, or other such elements. For example, such exterior actuatable cushioning elements may act in a time dependent (e.g., via a specified actuation profile, by stretching, deforming, breaking) and/or time sequenced manner (e.g., by timed activation of one or more exterior actuatable cushioning elements).

According to an example embodiment, one or more actuatable cushioning elements may be actuated (e.g., expanded or unexpanded) for or in response to an event. The event may be any of a variety of different events. For example, the event may include determining an impact or likely impact, determining an acceleration or change in acceleration that exceeds a threshold (such as when a container has been dropped), determining a temperature (e.g., inside or outside the container) that reaches a selected temperature, determining a time that reaches a specific time, determining that a location has been reached or that a selected distance within the location has been reached (e.g., either approaching or leaving the location), determining that a selected subset of actuatable cushioning elements (e.g., some or all of the elements) have not yet been expanded (thus more elements should be expanded to provide support), or other event.

These are merely a few examples of events, e.g., events which may cause or result in one or more actuatable cushioning elements to be actuated.

According to an example embodiment, acceleration may include a scalar quantity, or may include a vector quantity. Acceleration may include linear acceleration, angular acceleration, or other type of acceleration. A detected or determined acceleration may include an acceleration having components with varying degrees of interest or relevance (e.g., one or more linear components may be used, or one or more angular components to indicate an event or events to trigger actuation of an actuatable cushioning element). For example, an event may include an acceleration or change in acceleration that may include an acceleration (e.g., one or more acceleration components) or a change in acceleration that may exceed a threshold. Alternatively, the acceleration may be determined in more complex manners, such as ad hoc, time and situation-dependent manners, or other manners. For example, a model may be provided or used to model the operation of a system (e.g., system 2-100), or model the operation of actuatable cushioning elements, or model the free-fall or acceleration or movement of one or more objects or passengers, or the like. For example, one or more actuatable cushioning elements may be actuated (e.g., expanded or unexpanded/contracted) based on the model and/or based on determination of one or more events. For example, the selected actuation of one or more actuatable cushioning elements may be based upon the predicted shift of the time profile of one or more accelerations from a value associated with one actuation state to another value corresponding to the selected actuation state, the value of which is predicted to reduce damage to one or more protected objects. For example, measured and model-forecasted time-integrals of acceleration that may exceed case dependent thresholds may be used, e.g., to identify criteria or likely situations where objects may be damaged or broken. In another example embodiment, a time-history of acceleration may, in some cases, may inform the system 2-100 as to the level of protection that may or should be used to protect the object. For example, an extended time-interval of free-fall may result in decelerations of significant magnitudes being purposefully applied to protect objects when, e.g., an event is detected. For example, measured or model-forecasted stresses within the object may be used, e.g., to identify criteria or likely situations where objects may be damaged or broken. Such stress thresholds may include peak values or time-dependent value profiles of a function of one or more elements of the stress tensor, or may include initiation or propagation of fracture. For example, measured or model-forecasted temperatures within the object may be used, e.g., to identify criteria or likely situations where objects may be damaged or broken. Such temperature thresholds may include peak temperature values, or energy deposition values (e.g., a substance that will undergo a phase change—e.g., liquid to gas—after accumulation of a certain energy, which those skilled in the art will appreciate is an example of a more general determination that an energy exceeds a threshold), or time dependent temperature profiles. These are merely a few additional example embodiments relating to acceleration, and the disclosure is not limited thereto.

Referring to FIG. 26 again, in an example embodiment, system 2-100 may include central control logic 2-150, including a central controller 2-154 which may provide overall control for system 2-100. Central control logic 2-150 may include a number of additional blocks coupled to central controller 2-154, which will be briefly described.

A wireless receiver 2-152 may transmit and receive wireless signals such as RF (radio frequency) signals. Wireless signals such as RF signals may include any wireless or other electromagnetic signals, and are not limited to any particular frequency range.

An event detector 2-158 may detect or determine an event (or condition), or a series of events, such as an acceleration or change in acceleration that exceeds a threshold, a temperature that reaches a specific temperature, a location that is within a specific distance of a selected location, or any other event. Event detector 2-158 may include any type of detector or sensor. Event detector 2-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold. In another example embodiment, event detector 2-158 may include a Micro Electro Mechanical System (MEMS) accelerometer, which may, for instance, sense a displacement of a micro-cantilevered beam under acceleration transverse to its displacement-direction, e.g., by capacitive means. An angular accelerometer may determine that an angular acceleration or change in angular acceleration has exceeded a threshold. In another example embodiment, event detector 2-158 may include a Ring Laser Gyro, a Fiber Optic Gyro, a Vibrating Structure Gyro, a MEMS Gyro, or a mechanical gyroscope.

Or, alternatively for event detector 2-158, electrodes may be placed on a suitably shaped and mounted piezoelectric material for sensing a current and/or voltage generated by the piezoelectric material deforming in response to acceleration induced stress. Some examples of materials that may be used in the piezoelectric version of the event detector 2-158 may include lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped PLZT, and Barium zirconate titanate (BZT). These are just a few examples of event detectors.

An enable/disable switch 2-156 may be used to enable or disable system 2-100. For example, enable/disable switch 2-156 may be used to enable the one or more actuatable cushioning elements to be actuated, or may disable the one or more actuatable cushioning elements from being actuated, for example. System 2-100 may also include an input device, such as a mouse, keypad or other input device, which may allow a user to configure operation of system 2-100, for example. For example, enable/disable switch 2-156 and/or input device 2-160 may enable a first subset of actuatable cushioning elements to be actuatable during a first time period (or first time interval), and may enable a second subset of actuatable cushioning elements to be actuatable during a second time period (or second time interval), e.g., to provide cushioning support for an object over (or for) a series of events. The phrase "time period" may, for example, include any time interval, and is not necessarily cyclical or periodic, and may include random, non-periodic and/or non-cyclical time periods or time intervals, as examples.

An output device or display 2-161 may also be provided to display information. Input device 2-160 and display 2-161 may be provided in a position which may be reached or accessed by a user, such as on the outside of the container 2-110, for example.

One or more of the actuatable cushioning elements may include an element control logic to control overall operation and/or actuation of the element(s) to which the control logic is connected. For example, element control logic 2-115 may provide control to actuatable cushioning element 2-114, while element control logic 2-117 may control operation of actuatable cushioning element 2-116.

An element control logic may control a single actuatable cushioning element, or may control multiple cushioning elements, for example. The element control logic for one or more actuatable cushioning elements may communicate with other element control logic to provide a cushioning support for object 2-112 in a coordinated manner, for example. According to an example embodiment, this may include an element control logic transmitting a wireless signal(s) when the associated actuatable cushioning element has been actuated (or otherwise an element control logic for an element transmitting a signal notifying other elements of the cushioning element's state) which may allow the element control logic associated with other actuatable cushioning elements to determine how many or what percentage of cushioning elements are in an expanded state. For example, if an insufficient number of cushioning elements are currently in an expanded state, then one or more actuatable cushioning elements (via their element control logic) may then actuate or move to an expanded state to improve cushioning support for the object. Thus, distributed control may be provided via communication between the element control logic for different actuatable cushioning elements.

In another example embodiment, central controller 2-154 (FIG. 26) of central control logic 2-150 may provide central control for operation of the one or more actuatable cushioning elements within container 2-110. For example, event detector 2-158 may detect an event, and then wireless transceiver 2-152 (e.g., under control of central controller 2-154) may transmit wireless signals to one or more element control logic (e.g., 115, 117.) to cause one or more actuatable cushioning elements to actuate in response to the event.

Figure 27:
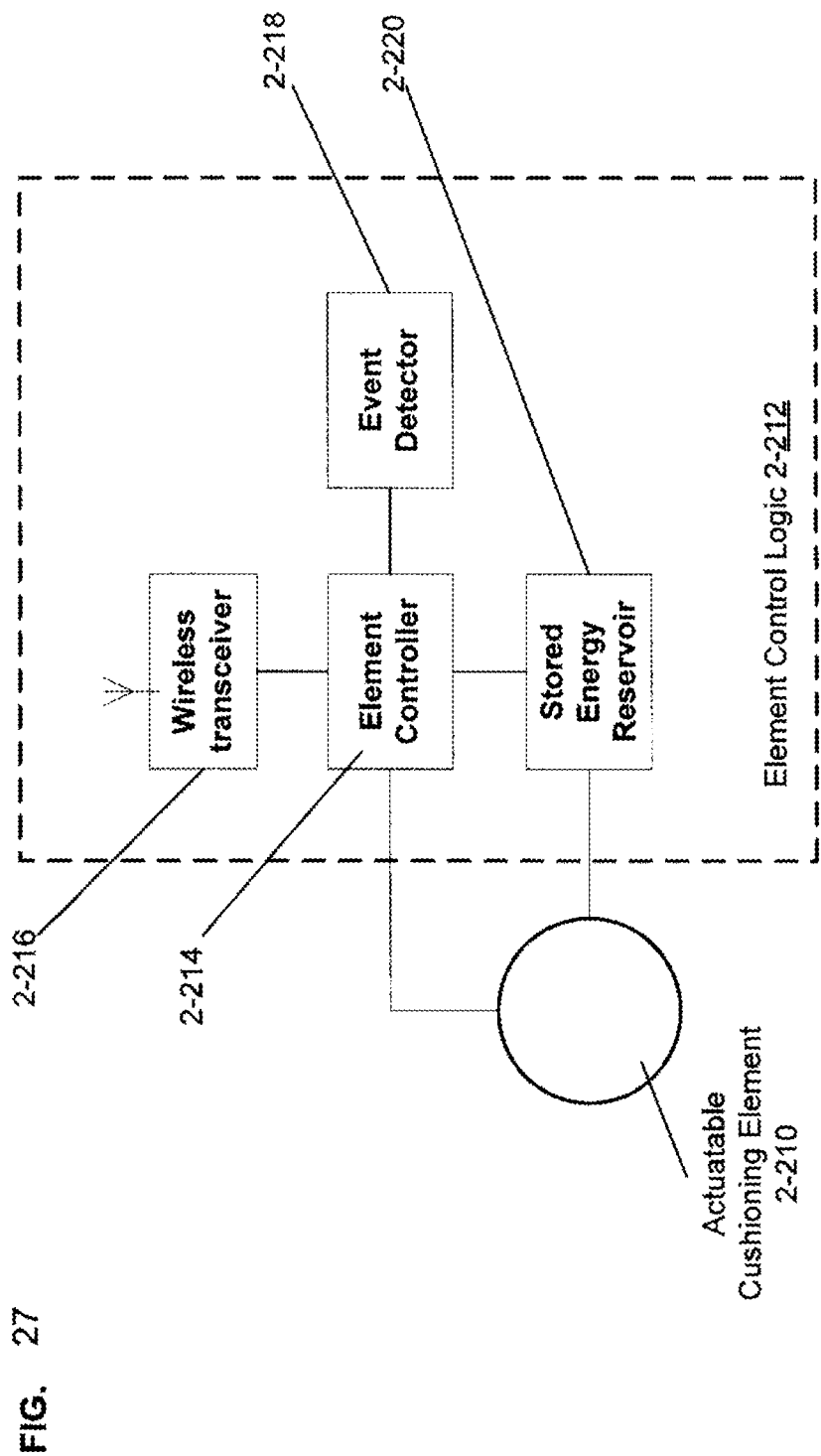
FIG. 27 illustrates an actuatable cushioning element according to an example embodiment.

FIG. 27 illustrates an actuatable cushioning element according to an example embodiment. An actuatable cushioning element 2-210 may be coupled to (or may include) an associated element control logic 2-212. Although not shown, one or more of the actuatable cushioning elements (e.g., Actuatable cushioning elements 2-114, 2-116, 2-118, 2-120, 2-122, 2-124, . . . ) may each include a similar element control logic. For example, element control logic 2-115 and 2-117 may be the same as or similar to element control logic 2-212, for example. In an alternative embodiment, element control logic 2-212 may be omitted.

Element control logic 2-212 may include an element controller 2-214 to provide overall control for an actuatable cushioning element 2-210. An event detector 2-218 may detect or determine an event. A wireless transceiver 2-216 may transmit and receive wireless signals. Alternatively, actuatable cushioning elements may be coupled together (and/or to central control logic 2-150) via any communications media, such as a wireless media (e.g., via RF or other electromagnetic signals, acoustic signals), a wired communication media, such as cable, wire, fiber optic line, etc., or other media.

A stored energy reservoir 2-220 may store gas, liquid, energy (chemical or electrical energy or the like) or other energy or substance, which may be used to actuate actuatable cushioning element 2-210. For example, stored energy reservoir 2-220 may receive signals from element controller 2-214, causing stored energy reservoir 2-220 to release pressurized liquid or gas to actuatable cushioning element 2-210 to cause element 2-210 to expand or inflate, or may release a chemical or other substance causing an expandable cushioning material to expand, for example. In an example embodiment, actuatable cushioning element 2-210 may include one or more fluid-actuatable elements, where fluid may be sourced from one or more fluid reservoirs (such as from stored energy reservoir 2-220), e.g., via a valving actuation. The fluid reservoirs may, for example, cause the fluid actuatable element(s) to actuate (e.g., expand and/or unexpand/contract) by causing fluid to flow into or out of the fluid-actuatable elements.

One or more actuatable cushioning elements, such as actuatable cushioning element 2-210, may be coupled to an element controller (e.g., element controller 2-214) via any communications media, such as a wireless media (e.g., via RF or other electromagnetic signals, acoustic signals), a wired communication media, such as cable, wire, fiber optic line, etc., or other communications media.

According to an example embodiment, one or more actuatable cushioning elements may include fluid-actuated cushioning elements or structures, or may include gas-actuated or gas-powered cushioning elements, or other types of elements. For example, one or more of the actuatable cushioning elements, when actuated, may have at least one of a size, shape, position, orientation, stress-strain tensor components (or other component) of the cushioning elements changed or modified as a result of one or more actuating actions applied to the cushioning element. For example, an actuating action or sequence of actuating actions which may be applied to an actuatable cushioning element, may, e.g., first change its position (or center of mass), then its orientation, then its size, and/or its rigidity or other characteristic. These changes to the actuatable cushioning element may occur, e.g., in a pre-programmed manner, and may occur, e.g., in response to or based upon an event, such as based on a measurement, signals received from cooperating cushioning elements or a controller(s) in the system 2-100, or other signals or criteria or event. The signals that may be received from other cooperating structures (e.g., elements or controllers) may, for example, describe or indicate their own characteristics, such as size, pressure, orientation, shape, etc. A model (e.g., of the system or operation of the system or objects) may be used to determine one or more actions that may be performed (such as actuation of an element), e.g., to protect one or more objects or passengers from harm or damage.

Also, in another example embodiment, one or more objects or passengers may include one or more associated actuatable cushioning elements on or near each object or passenger, where the group of associated actuatable cushioning elements may be independently controlled so as to provide cushioning support and/or protection for the associated object or passenger. Also, in another example embodiment, two or more separate objects, each protected by their own sets of actuatable cushioning elements may interact (for instance, by an actual or predicted collision). The actuation of one or more object's actuatable cushioning elements may occur with or without cooperation from that of the actuatable cushioning elements of one or more of the other objects. For example, one or more of the objects may sense the actions or state of the actuatable cushioning elements associated with one or more of the other objects. For example, two or more of the objects may share information on the actual and/or planned actuation histories of their actuatable cushioning elements. For example, one or more of the objects may sense the actions or state of the actuatable cushioning elements associated with one or more of the other objects. For example, one or more objects may base the actuation of one or more of its actuatable cushioning elements upon the sensed or predicted actions of one or more actuatable cushioning elements associated with one or more of the other objects. For example, one or more objects may command the actuation or nonactuation of one or more actuatable cushioning elements associated with one or more of the other objects.

This commanded actuation process may be performed by a joint decision process, by a hierarchical process, by a master-slave process, or by other means.

Figure 28:
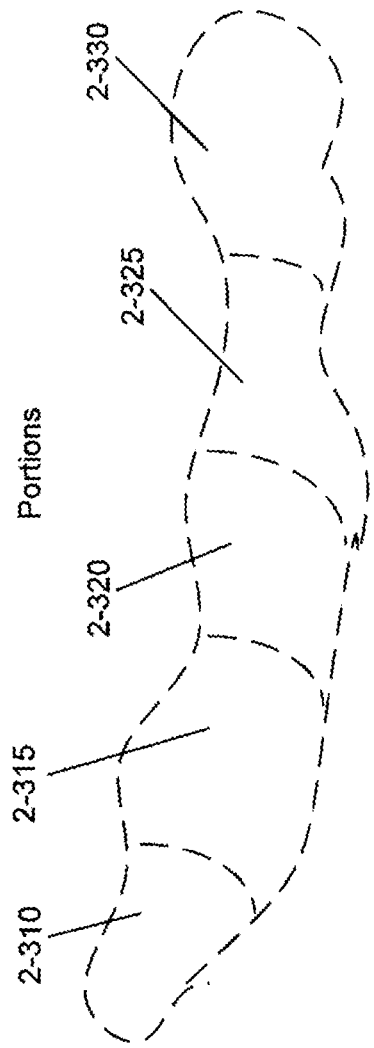
FIG. 28 illustrates actuatable cushioning elements according to another example embodiment.

FIG. 28 illustrates actuatable cushioning elements according to another example embodiment. An expandable cushioning material 2-305 is shown in FIG. 28. A separate portion of the expandable cushioning material 2-305, such as portions 2-310, 2-315, 2-320, 2-325, and 2-330, may be actuated (expanded or unexpanded). Thus, actuatable cushioning elements may be provided as portions of the expandable cushioning material 2-305, for example. In an example embodiment, the portions may be actuated by application of a gas, liquid or other substance or energy applied to the portion, for example.

Figure 29:
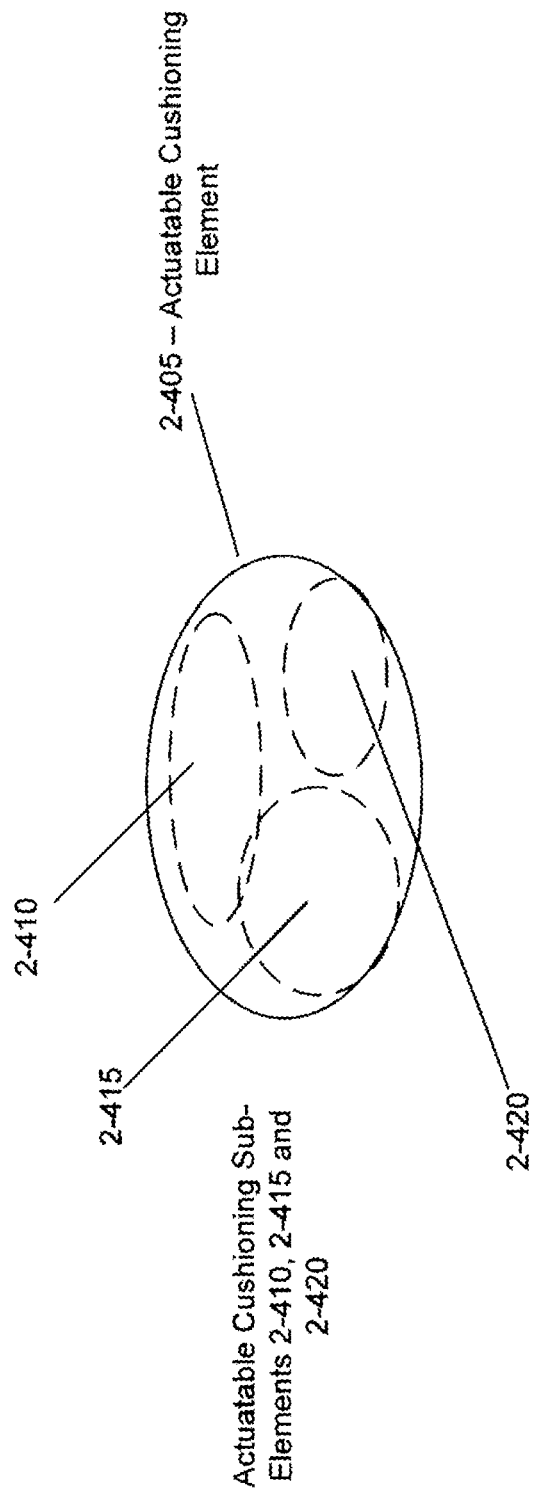
FIG. 29 illustrates actuatable cushioning elements according to yet another example embodiment.

FIG. 29 illustrates actuatable cushioning elements according to yet another example embodiment. According to an example embodiment, an actuatable cushioning element 2-405 may include one or more sub-elements, such as sub-elements 2-410, 2-415 and 2-420. For example, each of these sub-elements may be separately controlled, or may be separately actuated, e.g., under control of an element control logic, for example.

Figure 30:
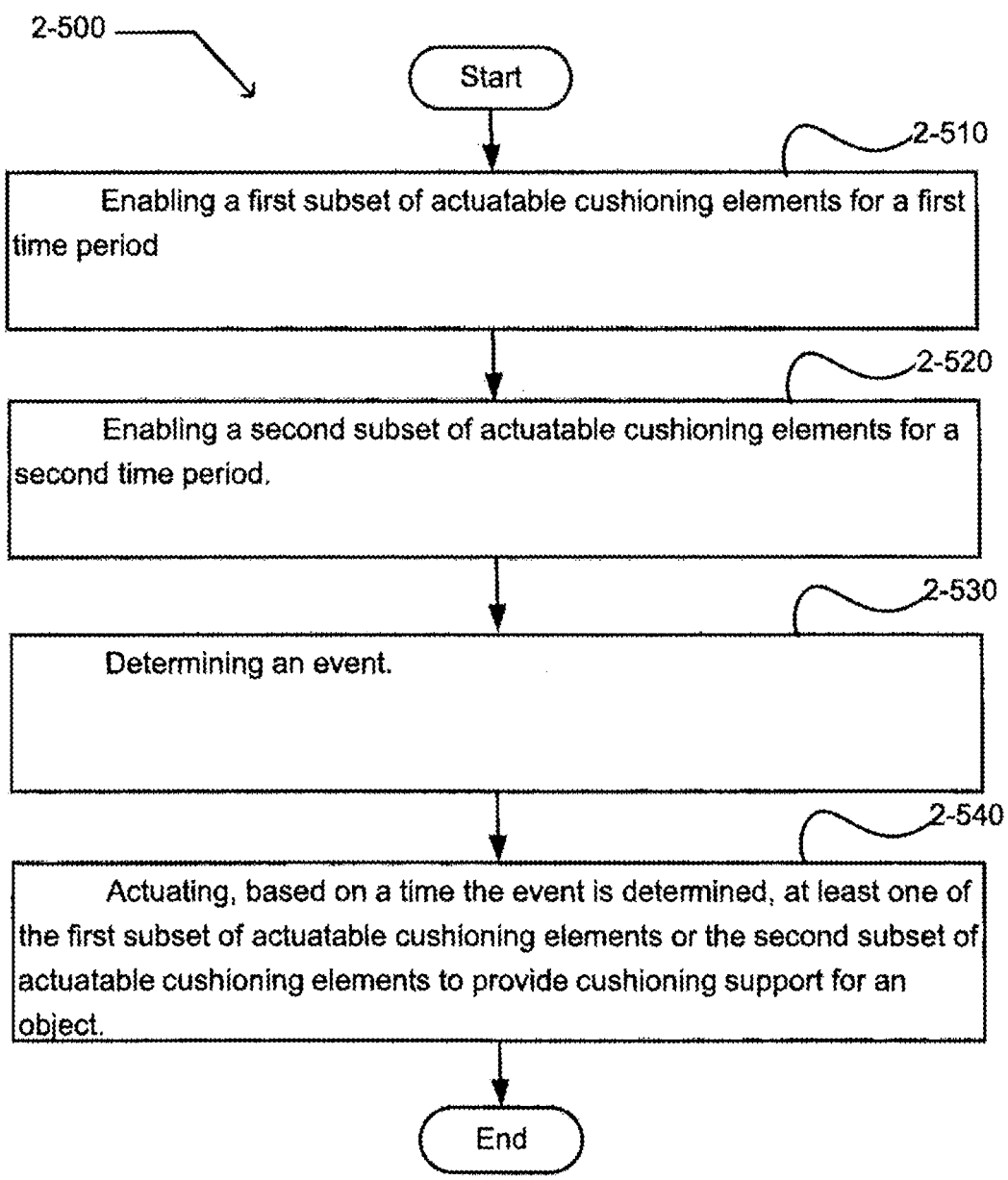
FIG. 30 illustrates an operational flow representing example operations related to actuatable cushioning elements according to an example embodiment.

FIG. 30 illustrates an operational flow 2-500 representing example operations related to actuatable cushioning elements. In FIG. 30 and in following figures that include various examples of operational flows, discussion and explanation may be provided with respect to the above-described examples of FIG. 29, and/or with respect to other examples and contexts. However, it should be understood that the operational flows may be executed in a number of other environments and contexts, and/or in modified versions of FIG. 29. Also, although the various operational flows are presented in the sequence(s) illustrated, it should be understood that the various operations may be performed in other orders than those which are illustrated, or may be performed concurrently.

After a start operation, the operational flow 2-500 moves to an enabling operation 2-510 where a first subset of actuatable cushioning elements are enabled for a first time period. For example, as shown in FIG. 26, enable/disable switch 2-156 and/or input device 2-160 may enable a first subset of actuatable cushioning elements to actuate during a first five minutes after container 2-110 has departed.

Then, in an enabling operation 2-520, a second subset of actuatable cushioning elements is enabled during a second time period. For example, as shown in FIG. 26, enable/disable switch 2-156 and/or input device 2-160 may enable a second subset of actuatable cushioning elements to actuate during a second five minutes after container 2-110 has departed. In this manner, for example, different subsets of cushioning elements may be enabled to actuate in response to an event. This may allow, for example, the system 2-100 to provide cushioning support for an object over one or more or a series of events.

Then in determining operation 2-530, an event is determined. For example, event detector 2-218 in FIG. 27 for an actuatable cushioning element may (e.g., as an accelerometer) determine that an acceleration or change in acceleration has exceeded a threshold, or may determine (e.g., as a GPS receiver) that a location has been reached or that a specific distance within a location has been reached.

Then in actuating operation 2-540, at least one of the first subset of actuatable cushioning elements or the second subset of actuatable cushioning elements are actuated based on a time the event is determined to provide cushioning support for an object. For example, a first subset of elements may include elements 2-114, 2-118 and 2-122, for example, which may be enabled during a first five minutes. In response to detecting an event during a first five minutes, for example, the element control logic 2-212 (FIG. 27) associated with one or more of actuatable cushioning elements 2-114, 2-118 and 2-122, may cause these actuatable cushioning elements to expand (e.g., based on pressurized gas or liquid or other material or energy released from stored energy reservoir 2-220 for each element). Alternatively, central controller 2-154 may actuate one of the subsets of actuatable cushioning elements.

Figure 31:
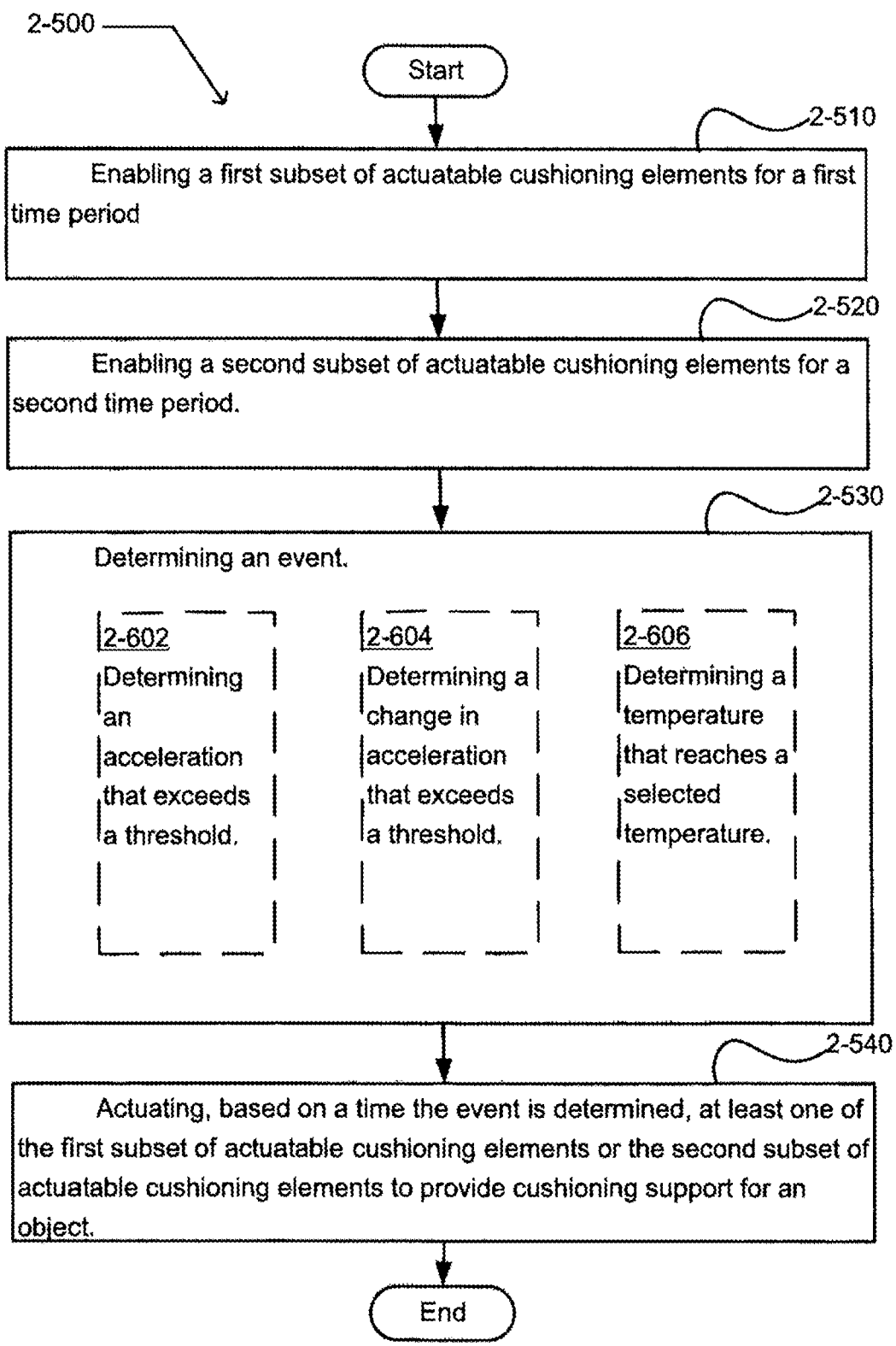
FIG. 31 illustrates an alternative embodiment of the example operational flow of FIG. 30.

FIG. 31 illustrates alternative embodiments of the example operational flow 2-500 of FIG. 30. FIG. 31 illustrates example embodiments where the determining operation 2-530 may include at least one additional operation. Additional operations may include operations 2-602, 2-604 and/or 2-606.

At the operation 2-602 an acceleration that exceeds a threshold is determined. For example, event detector 2-218 (e.g., as an accelerometer) in FIG. 27, may determine that an acceleration has exceeded a threshold, such as 0.2 G ("point two" G), where G indicates a force of gravity. When acceleration exceeds a threshold, this may indicate or suggest that a collision for the container 2-110 is likely, or that the container is in free fall or has been dropped, or other condition which may be damaging to the object inside the container 2-110. Thus, in such case, it may be desirable to increase cushioning support for the object, e.g., by actuating or expanding additional cushioning elements.

At the operation 2-604, a change in acceleration that exceeds a threshold is determined. For example, event detector 2-218 in FIG. 27 may determine that acceleration has increased from 0 G to 0.1 G ("point one" G) within a specific period of time, e.g., which may indicate a likely collision for the container.

At the operation 2-606 a temperature that reaches a selected temperature is determined. For example, event detector 2-218 (FIG. 27), e.g., as a thermometer, may determine that a temperature within the container has reached a temperature above freezing, and therefore, additional cushioning support should be provided for the perishable or frozen food items or a fragile object in the container.

Figure 32:
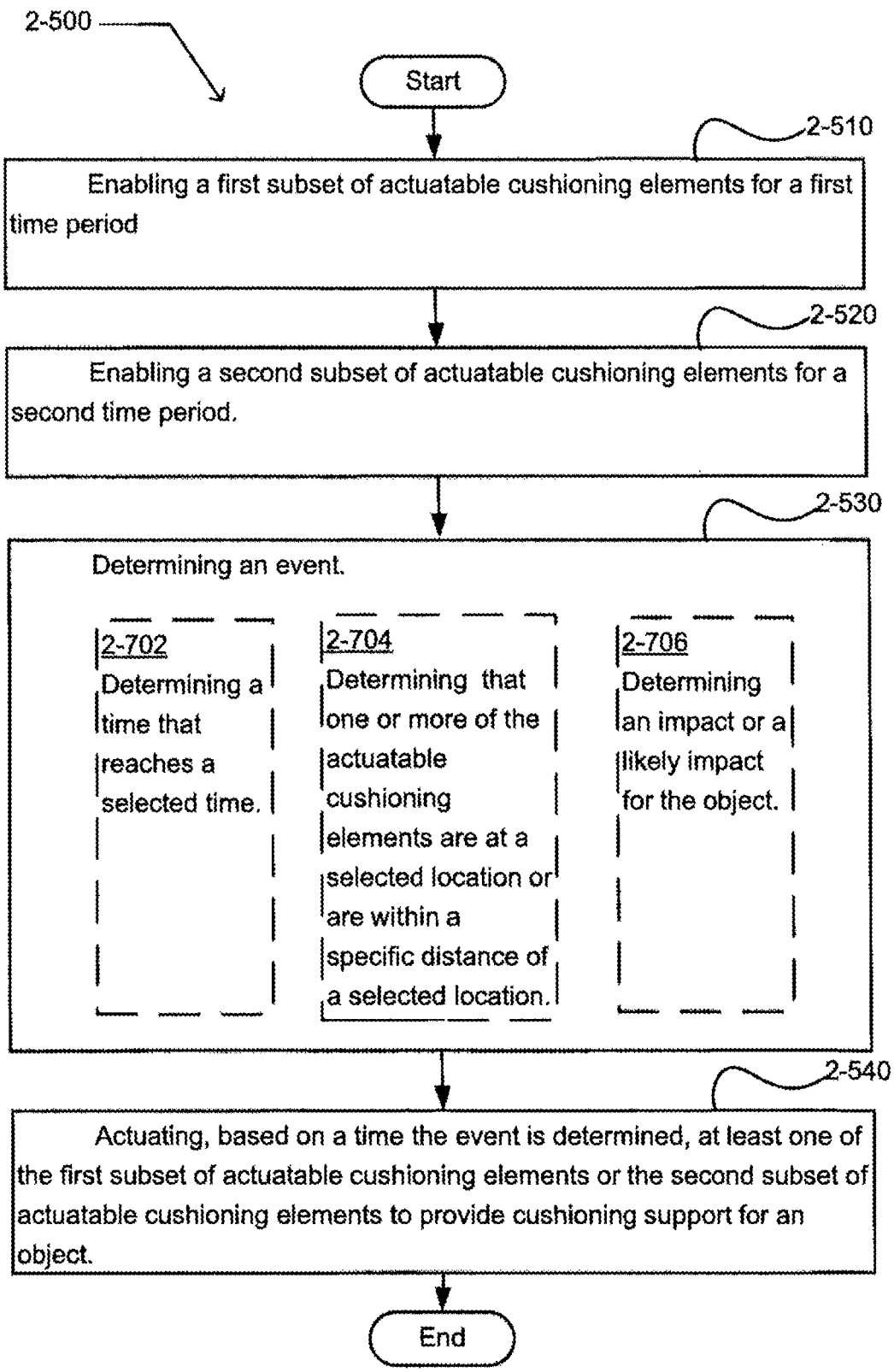
FIG. 32 illustrates an alternative embodiment of the example operational flow of FIG. 30.

FIG. 32 illustrates alternative embodiments of the example operational flow 2-500 of FIG. 30. FIG. 32 illustrates example embodiments where the determining operation 2-530 may include at least one additional operation. Additional operations may include operations 2-702, 2-704 or 2-706.

At the operation 2-702, a time that reaches a selected time is determined. For example, event detector 2-218 (FIG. 27) may determine that the time is now 12 noon. This time may indicate that additional cushioning support should be provided for the object, for example.

At the operation 2-704, it is determined that one or more of the actuatable cushioning elements are at a selected location or are within a specific distance of a selected location. For example, event detector 2-218, e.g., as a GPS receiver, may determine that packages of food have been placed on a ship, or may determine that cargo on a plane has taken off and/or departed, therefore, requiring additional cushioning support. The event detector 2-218 may determine that a specific location has been reached within 200 feet, for example. For example, when a destination is reached, one or more, or even all, of the cushioning elements may be unexpanded or deflated to allow the objects to be unpacked.

At the operation 2-706, an impact or likely impact for the object is determined. For example, event detector 2-218 (FIG. 27), e.g., as an accelerometer or other instrument, may measure a sharp increase in force or acceleration due to free fall (e.g., indicating a likely impact) or a sharp force due to an impact on the container, for example.

Figure 33:
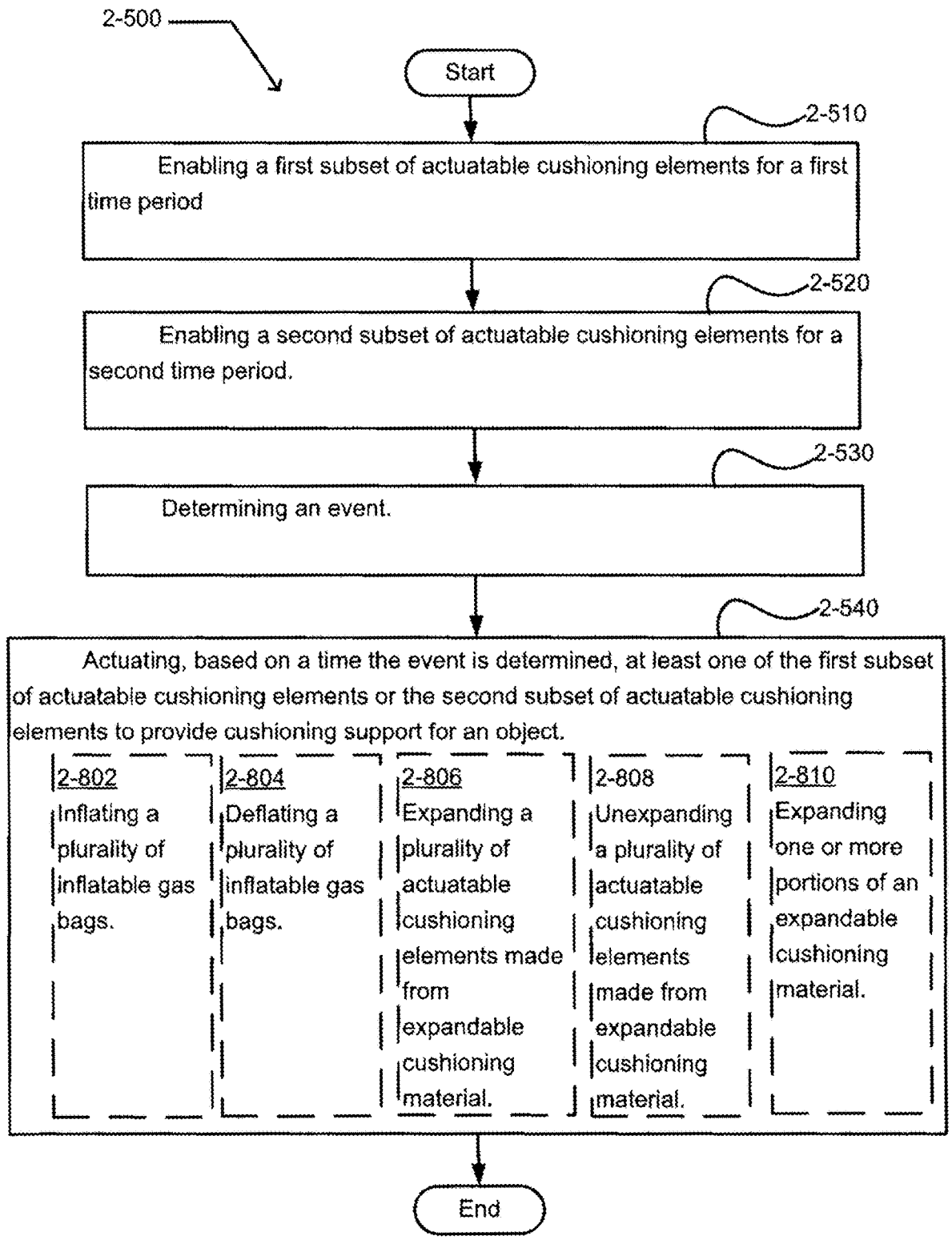
FIG. 33 illustrates an alternative embodiment of the example operational flow of FIG. 30.

FIG. 33 illustrates alternative embodiments of the example operational flow 2-500 of FIG. 30. FIG. 33 illustrates example embodiments where the actuating operation 2-540 may include at least one additional operation. Additional operations may include operations 2-802, 2-804, 2-806, 2-808 or 2-810.

At the operation 2-802, a plurality of inflatable gas bags are inflated. For example, in response to signals from element controller 2-214 (FIG. 27), stored energy reservoir 2-220 may release pressurized air or other gas to inflate a gas bag (e.g., element 2-210).

At the operation 2-804, a plurality of inflatable gas bags may be deflated. For example, previously inflated gas bags may be deflated based on control signals from element controller 2-214. For example, stored energy reservoir 2-220 in FIG. 27 may provide an exit or leakage point to allow gas to escape from the inflatable gas bag, thereby deflating the gas bag.

At the operation 2-806, a plurality of actuatable cushioning elements made from expandable cushioning material are expanded. For example, stored energy reservoir 2-220 in FIG. 27 may release electrical current, a chemical or other substance or energy to cause an expandable cushioning material to expand or increase in size.

At the operation 2-808, a plurality of actuatable cushioning elements made from expandable cushioning material are unexpanded. For example, stored energy reservoir 2-220 may release electrical current, a chemical or other substance or energy to cause an expandable cushioning material to unexpand or decrease in size.

At the operation 2-810, one or more portions of an expandable cushioning material are expanded. For example, stored energy reservoir 2-220 in FIG. 27 may release electrical current, a chemical or other substance or energy to cause one or more portions of expandable cushioning material 2-305 (FIG. 28) to expand.

Figure 34:
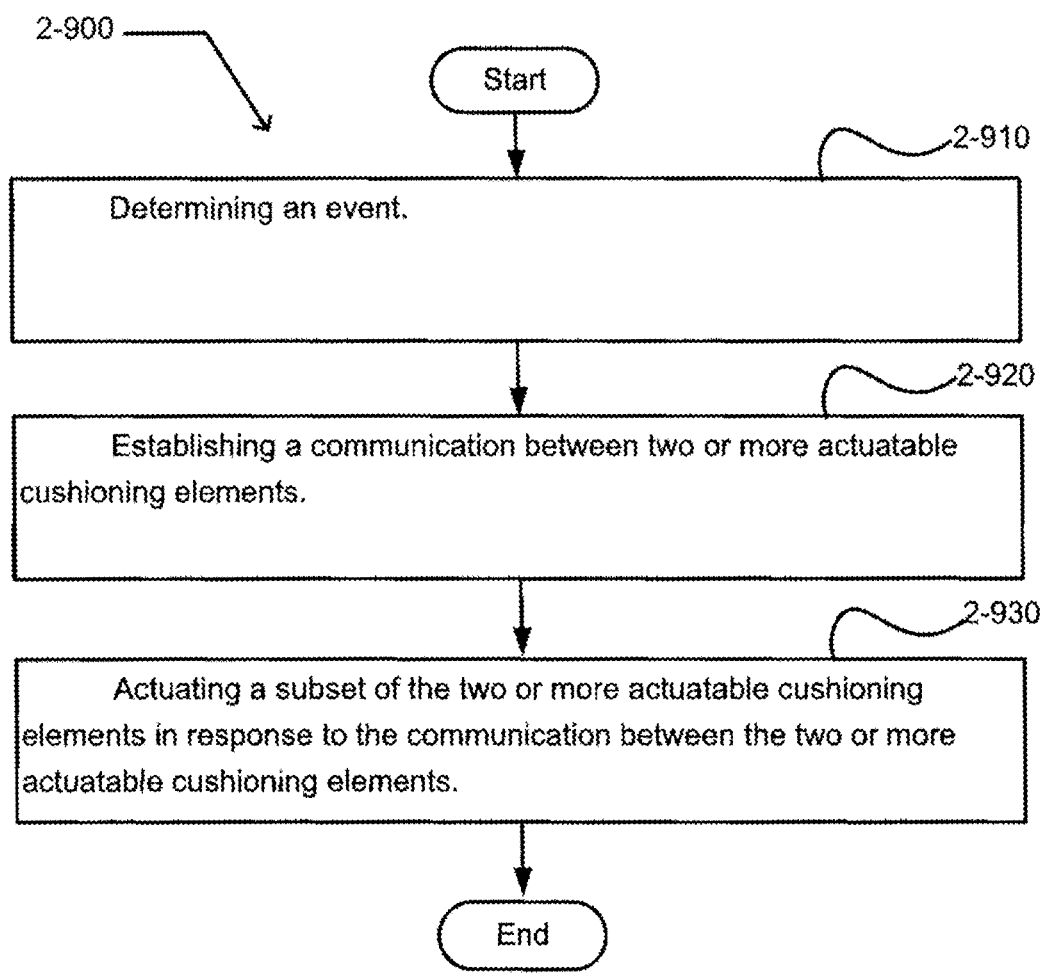
FIG. 34 illustrates an operational flow representing example operations related to actuatable cushioning elements.

FIG. 34 illustrates an operational flow 2-900 representing example operations related to actuatable cushioning elements. After a start operation, the operational flow 2-900 moves to a determining operation 2-910 where an event is determined. For example, an event detector 2-218, FIG. 27 (e.g., as an accelerometer) for actuatable cushioning element 2-118 may determine that an event has occurred, such as determining that an acceleration has exceeded a threshold, for example.

Then in establishing operation 2-920, a communication is established between two or more actuatable cushioning elements. For example, element controller 2-214 for actuatable cushioning element 2-118 may establish communication with element control logic 2-212 of another cushioning element (such as for element 2-122), via wireless transceivers 2-216 for each cushioning element. This may allow, for example, for the two or more actuatable cushioning elements (e.g., elements 2-118, 2-122) to notify each other when an event is detected, or to coordinate the actuation of one or more actuatable cushioning elements.

Then in actuating operation 2-930 a subset of the two or more actuatable cushioning elements is actuated in response to the communication between the two or more actuatable cushioning elements. For example, in response to communication via wireless transceivers 2-216 of elements 2-118 and 2-122, the stored energy reservoirs 2-220 for elements 2-118 and 2-122 may release gas or liquid to expand the actuatable cushioning elements 2-118, 2-122.

Figure 35:
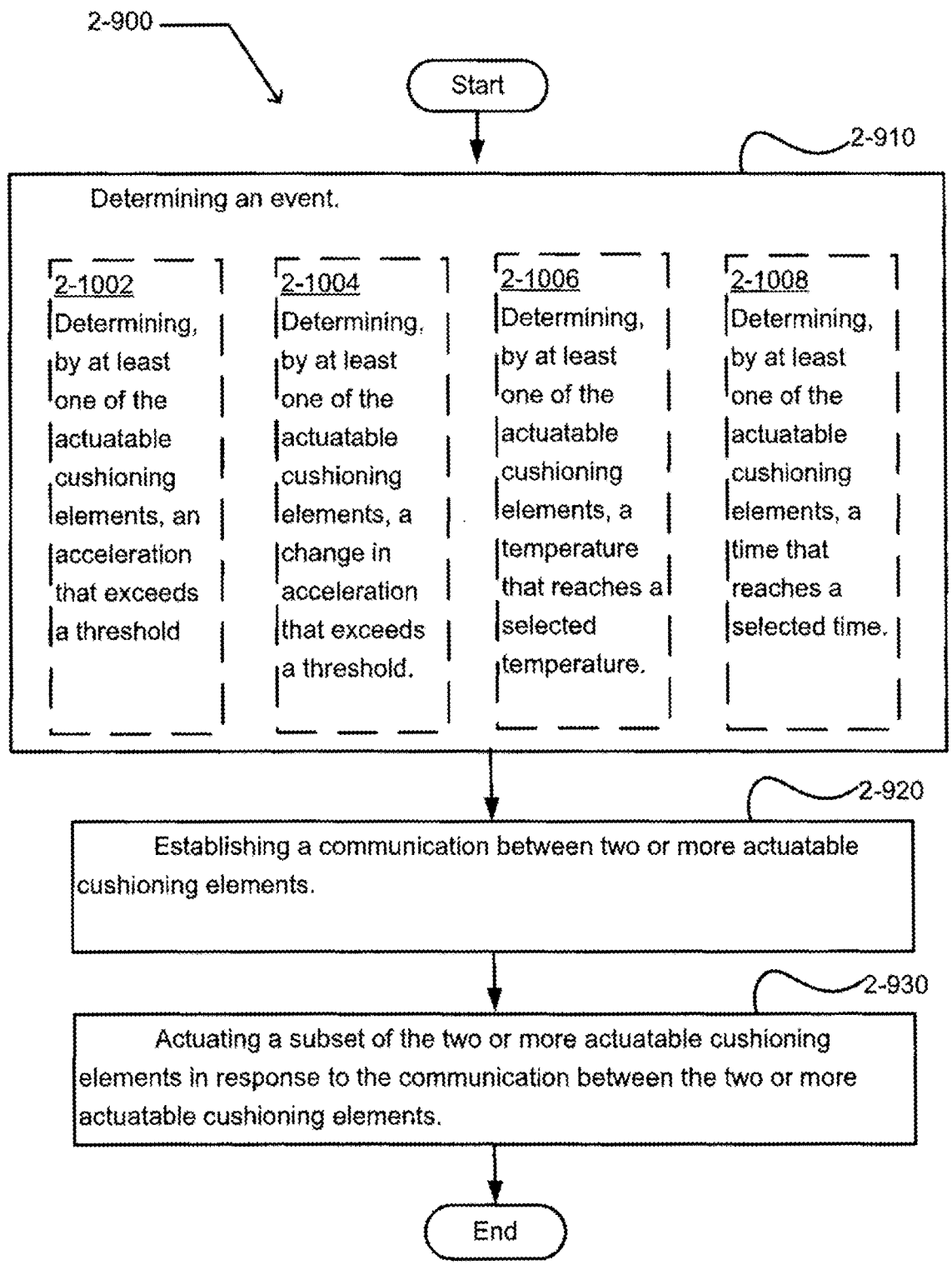
FIG. 35 illustrates an alternative embodiment of the example operational flow of FIG. 34.

FIG. 35 illustrates alternative embodiments of the example operational flow 2-900 of FIG. 34. FIG. 35 illustrates example embodiments where the determining operation 2-910 may include at least one additional operation. Additional operations may include operations 2-1002, 2-1004, 2-1006, or 2-1008.

At operation 2-1002, at least one of the actuatable cushioning elements determines an acceleration that exceeds a threshold. For example, event detector 2-218 (e.g., as an accelerometer) in FIG. 27 of an actuatable cushioning element may determine that an acceleration has exceeded a threshold, such as 0.2 G, where G indicates a force of gravity. When acceleration exceeds a threshold, this may indicate that a collision for the container 2-110 is likely, or that the container is in free fall or has been dropped, or other condition which may be damaging to the object inside the container 2-110.

At the operation 2-1004, at least one of the actuatable cushioning elements determines a change in acceleration that exceeds a threshold. For example, event detector 2-218 (e.g., as an accelerometer) in FIG. 27 of an actuatable cushioning element may determine that a change in acceleration has exceeded a threshold, such as 20%, or an increase in acceleration by X meters/S2.

At the operation 2-1006, at least one of the actuatable cushioning elements determines a temperature that reaches a selected temperature. For example, event detector 2-218 (e.g., as a thermometer) in FIG. 27 of an actuatable cushioning element may determine that the current temperature (e.g., either inside or outside the container 2-110, FIG. 26) is 32 degrees Fahrenheit.

At the operation 2-1008, at least one of the actuatable cushioning elements determines a time that reaches a selected time. For example, event detector 2-218 (e.g., as a clock or other time measuring device) in FIG. 27 of an actuatable cushioning element may determine that the current time is now 12 noon.

Figure 36:
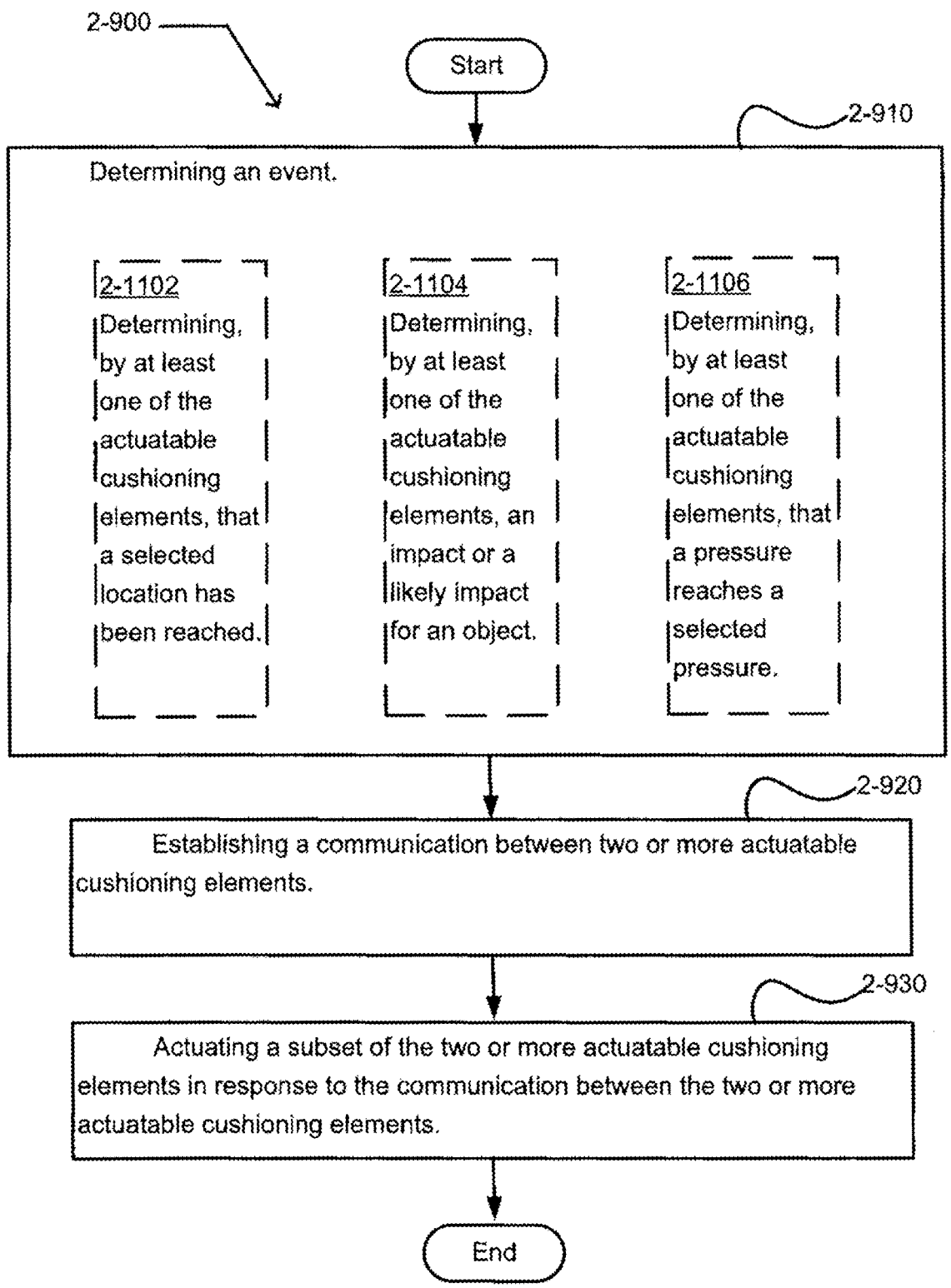
FIG. 36 illustrates an alternative embodiment of the example operational flow of FIG. 34.

FIG. 36 illustrates alternative embodiments of the example operational flow 2-900 of FIG. 34. FIG. 36 illustrates example embodiments where the determining operation 2-910 may include at least one additional operation. Additional operations may include operations 2-1102, 2-1104, or 2-1106.

At operation 2-1102, at least one of the actuatable cushioning elements determines that a selected location has been reached. For example, event detector 2-218 (e.g., as a GPS receiver) in FIG. 27 of an actuatable cushioning element may determine that a specific location has been reached, or that a specific location has been reached within a specific range (e.g., 50 feet). This may include, for example, determining that the object is approaching a specific location and is now within a specific range (e.g., 50 feet) of the specific location, or is moving away from a selected location and is within a specific range (e.g., 0.4 miles) of the selected location. These are merely some examples.

At the operation 2-1104, at least one of the actuatable cushioning elements determines an impact or a likely impact for the object. For example, event detector 2-218 (e.g., as an accelerometer) in FIG. 27 of an actuatable cushioning element may determine that a rapid acceleration or rapid change in acceleration indicates an impact or likely impact for the object.

At the operation 2-1106, at least one of the actuatable cushioning elements determines that a pressure reaches a selected pressure. For example, event detector 2-218 (e.g., as a barometer, pressure sensor, or other instrument) in FIG. 27 of an actuatable cushioning element may determine that a pressure between one or more cushioning elements has reached a selected pressure. The selected pressure may refer to pressure between actuatable cushioning elements, mechanical pressure, atmospheric pressure (e.g., such as when an object is on a plane at a certain altitude), pressure between an actuatable cushioning element and the object, or other pressure. For example, if a low pressure is detected between the object and a cushioning element, this may indicate that insufficient cushioning support is being provided to the object.

Figure 37:
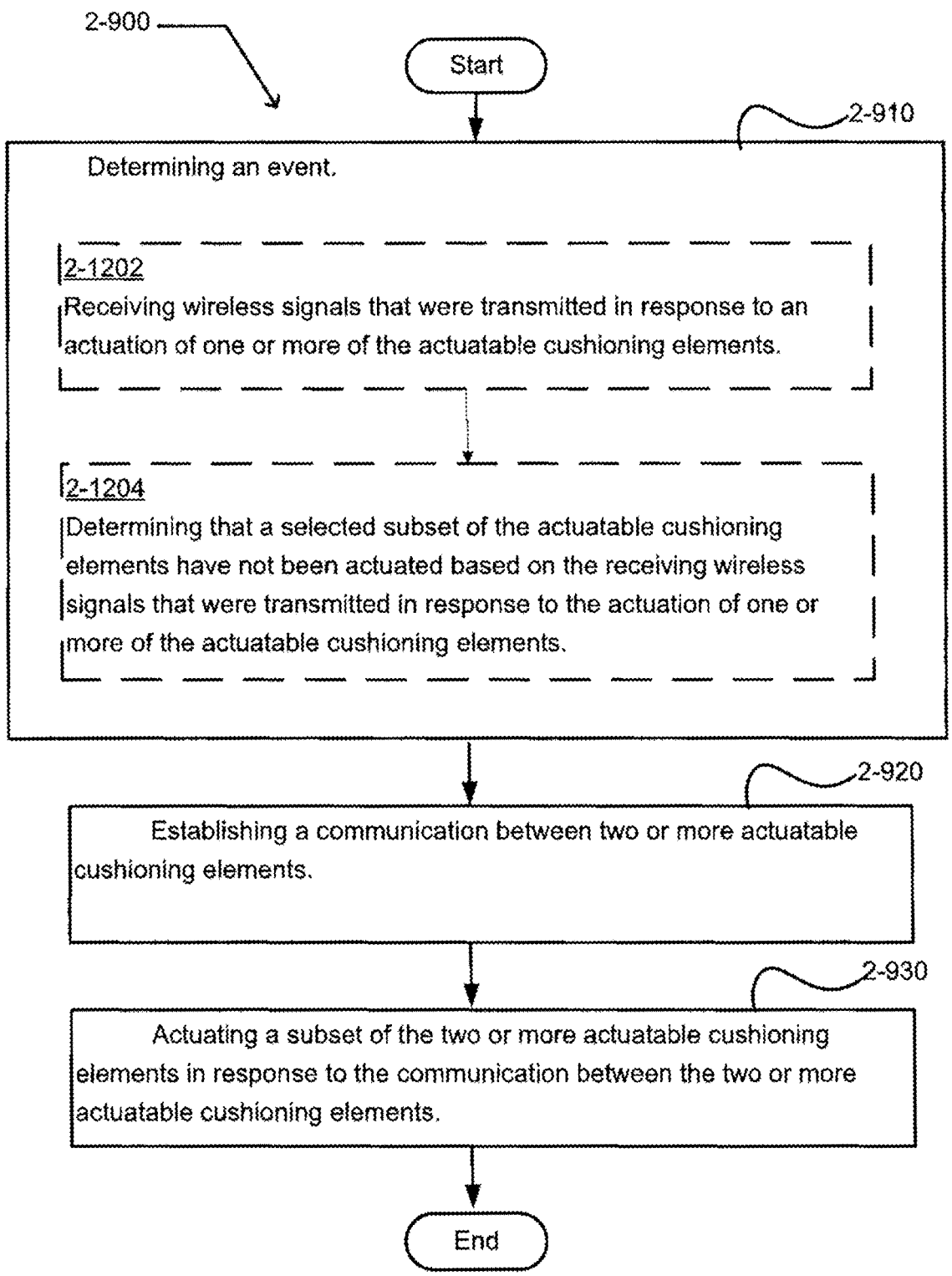
FIG. 37 illustrates an alternative embodiment of the example operational flow of FIG. 34.

FIG. 37 illustrates alternative embodiments of the example operational flow 2-900 of FIG. 34. FIG. 37 illustrates example embodiments where the determining operation 2-910 may include at least one additional operation. Additional operations may include operations 2-1202 and/or 2-1204.

At operation 2-1202, wireless signals are received that were transmitted in response to an actuation of one or more of the actuatable cushioning elements. For example, wireless transceiver 2-216 (FIG. 27) of actuatable cushioning element 2-118 (FIG. 26) may receive wireless signals transmitted by actuatable cushioning elements 126 and 130 based on the actuation of such elements. In an example embodiment, these received wireless signals may notify or provide information to actuatable cushioning element 2-118 indicating which elements are expanded or not expanded. Alternatively, wireless transceiver 2-152 of central control logic 2-150 (FIG. 26) may receive wireless signals that were transmitted in response to actuation of one or more cushioning elements.

At operation 2-1204, a selected subset of the actuatable cushioning elements are determined to have not been actuated based on the receiving wireless signals that were transmitted in response to the actuation of one or more of the actuatable cushioning elements. For example, element controller 2-214 (FIG. 27) of actuatable cushioning element 2-118 (FIG. 26) may determine, based on the received wireless signals, that 20% of the actuatable cushioning elements have not been actuated, which may indicate that cushioning support for the object is presently inadequate. Alternatively, central controller 2-154 of central control logic 2-150 (FIG. 26) may determine that a threshold number of actuatable cushioning elements have not been actuated based on received wireless signals.

Figure 38:
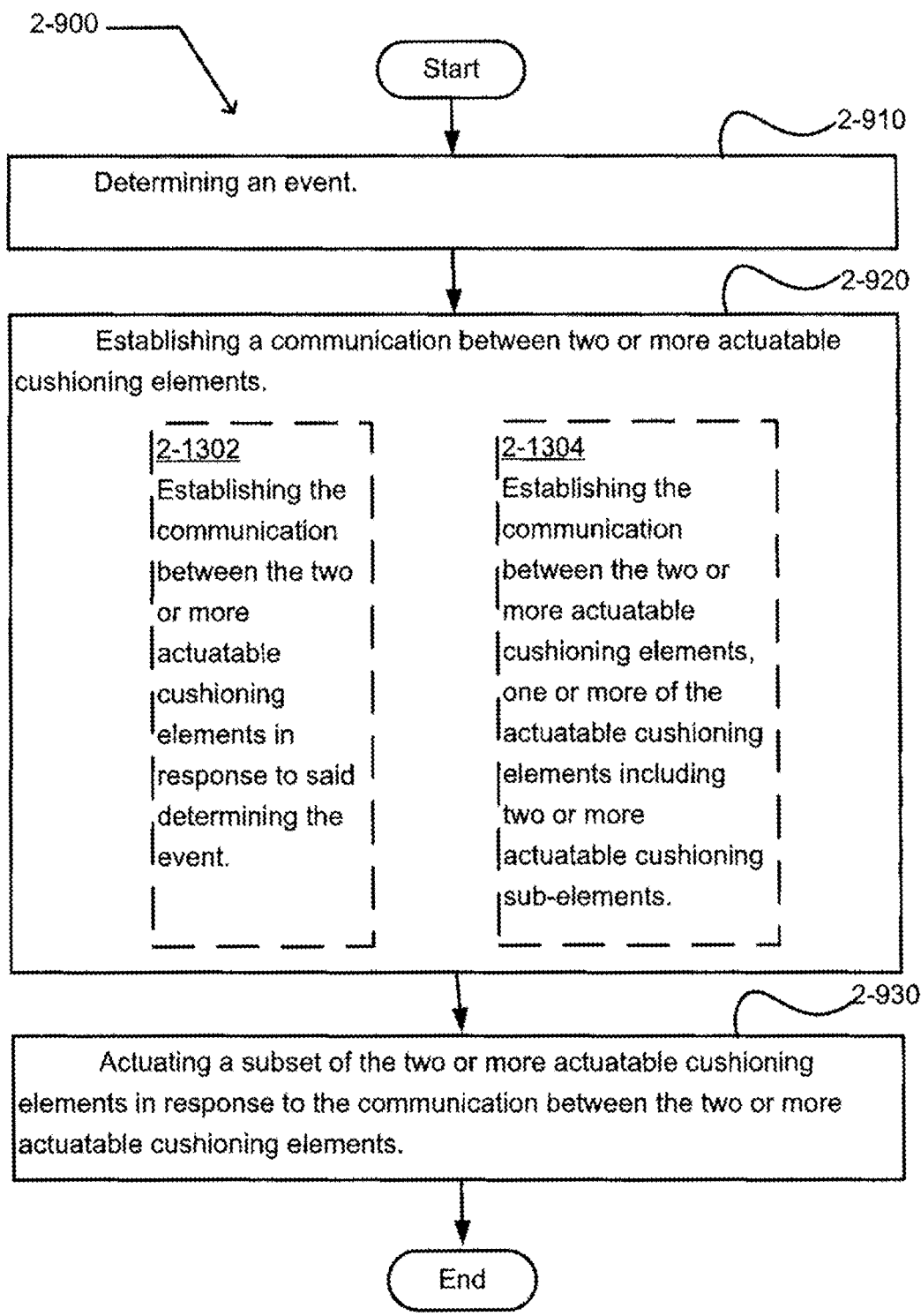
FIG. 38 illustrates an alternative embodiment of the example operational flow of FIG. 34.

FIG. 38 illustrates alternative embodiments of the example operational flow 2-900 of FIG. 34. FIG. 38 illustrates example embodiments where the establishing operation 2-920 may include at least one additional operation. Additional operations may include operations 2-1302 or 2-1304.

At operation 2-1302, the communication is established between the two or more actuatable cushioning elements in response to said determining the event. For example, a wireless transceiver 2-216 (FIG. 27) of actuatable cushioning element 2-118 (FIG. 26) may establish a wireless communication with a wireless transceiver 2-216 of actuatable cushioning element 120 (FIG. 26).

At operation 2-1304, the communication is established between the two or more actuatable cushioning elements, one or more of the actuatable cushioning elements including two or more actuatable cushioning sub-elements. For example, a wireless transceiver 2-216 (FIG. 27) of actuatable cushioning element 2-118 (FIG. 26) may establish a wireless communication with a wireless transceiver 2-216 of actuatable cushioning element 120 (FIG. 26). In this example embodiment, actuatable cushioning element 2-118 (FIG. 26), for example, may include three actuatable sub-elements, such as actuatable sub-elements 2-410, 2-415 and 2-420 (FIG. 29).

Figure 39:
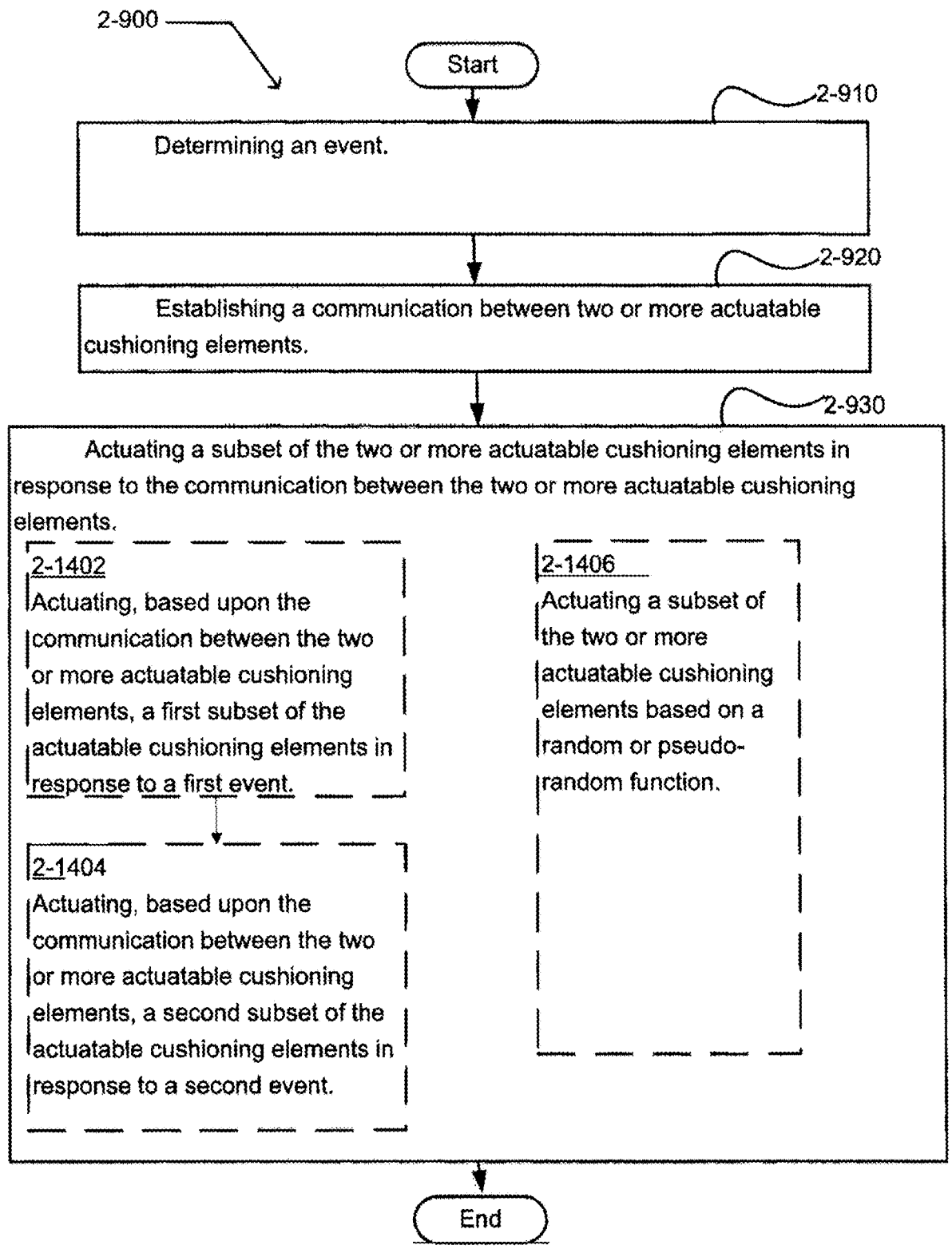
FIG. 39 illustrates an alternative embodiment of the example operational flow of FIG. 34.

FIG. 39 illustrates alternative embodiments of the example operational flow 2-900 of FIG. 34. FIG. 39 illustrates example embodiments where the actuating operation 2-930 may include at least one additional operation. Additional operations may include operations 2-1402, 2-1404 and/or 2-1406.

At operation 2-1402, a first subset of the actuatable cushioning elements is actuated based upon the communication between the two or more actuatable cushioning elements in response to a first event. For example, actuatable cushioning elements 2-114, 2-118 and 2-128 may be expanded to provide cushioning support based on the communication in response to detecting that the container 2-110 has been dropped (e.g., an event where acceleration may exceed a threshold). The actuatable cushioning elements 2-114, 2-118 and 2-128 may be expanded based on control signals from element controller 2-214 (FIG. 27) for each element, causing a stored energy reservoir 2-220 (FIG. 27) for each of the elements 2-114, 2-118 and 2-128 to release gas or other material to expand or inflate the actuatable element, for example.

At operation 2-1404, a second subset of the actuatable cushioning elements is actuated based upon the communication between the two or more actuatable cushioning elements in response to a second event. For example, in response to one (or more) of the actuatable cushioning elements detecting that a specific location (e.g., destination location) has been reached, all of the currently expanded cushioning elements may be unexpanded, e.g., to allow the object to be unpacked more easily from the container 2-110. For example, an element controller 2-214 (FIG. 27) for each expanded actuatable cushioning element may release gas from the element to allow the element to unexpand or deflate.

At operation 2-1406, a subset of the two or more actuatable cushioning elements is actuated based on a random or pseudo-random function. For example, one or more of the actuatable cushioning elements may actuate in a random or pseudo-random fashion. For example, each actuatable cushioning element may have a 10% probability of actuating, such as for a given time period or in response to an event. Thus, statistically, for example, 10% of the actuatable cushioning elements may be actuatable or enabled for a specific period of time, or 10% may actuate in response to each event. This may allow, for example, a group or subset of actuatable cushioning elements to be actuated or to be actuatable for each of up to 10 time periods or for each of up to 10 events. This is merely an example, and other random or pseudo-random functions may be used.

Figure 40:
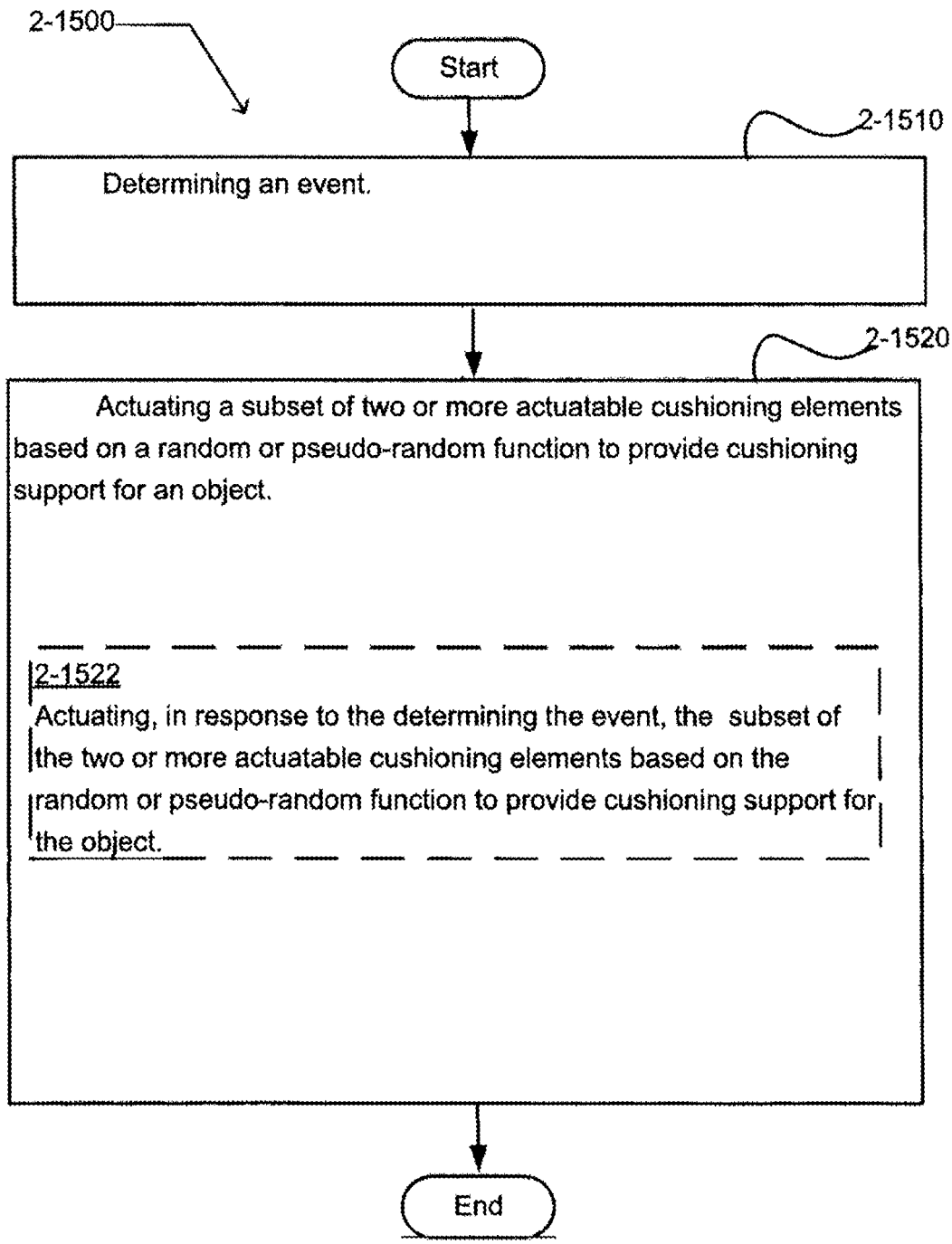
FIG. 40 illustrates an operational flow representing example operations related to actuatable cushioning elements.

FIG. 40 illustrates an operational flow 2-1500 representing example operations related to actuatable cushioning elements. After a start operation, the operational flow 2-1500 moves to a determining operation 2-1510 where an event is determined. For example, event detector 2-218 (FIG. 27) of an actuatable cushioning element or event detector 2-158 (FIG. 26) may determine that a specific location has been reached, or detect an acceleration that exceeds a threshold, or other event.

Then, at actuating operation 2-1520, a subset of two or more actuatable cushioning elements is actuated based on a random or a pseudo-random function to provide cushioning support for an object. For example, one or more of the actuatable cushioning elements may actuate in a random fashion in response to signals provided by an element controller 2-214. For example, each actuatable cushioning element may have a 10% probability of actuating, such as for a given time period or in response to an event. Thus, statistically, for example, 10% of the actuatable cushioning elements may be actuatable or enabled for a specific period of time, or 10% may actuate in response to each event. This may allow, for example, a group or subset of actuatable cushioning elements to be actuated or to be actuatable for each of up to 10 time periods or for each of up to 10 events. This is merely an example, and other random or pseudo-random functions may be used.

FIG. 40 also illustrates alternative embodiments of the example operational flow 2-1500, where the actuating operation 2-1520 may include at least one additional operation. Additional operations may include at least operation 2-1522.

At operation 2-1522, the subset of the two or more actuatable cushioning elements is actuated, in response to the determining the event, based on the random or the pseudo-random function to provide cushioning support for the object. An element controller 2-214 for each actuatable cushioning element may actuate the element based on a random or pseudo-random function. Thus, for example, approximately 10% of the actuatable cushioning elements may actuate in response to each event. This may allow a group of actuatable cushioning elements to respond for or in response to a series of events.

Figure 41:
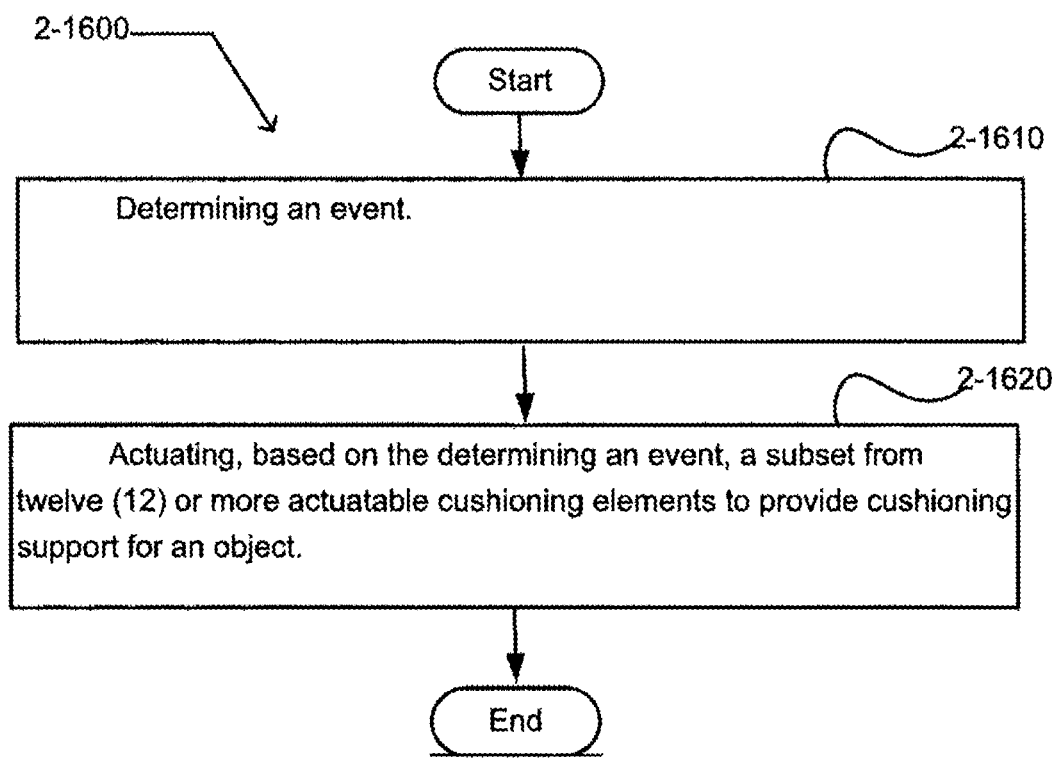
FIG. 41 illustrates an operational flow representing example operations related to actuatable cushioning elements.

FIG. 41 illustrates an operational flow 2-1600 representing example operations related to actuatable cushioning elements. After a start operation, the operational flow 2-1600 moves to a determining operation 2-1610 where an event is determined. For example, event detector 2-158 of central control logic 2-150 (FIG. 26) may determine that a specific location has been reached, or detect an acceleration that exceeds a threshold, or other event.

At actuating operation 2-1620, a subset from 12 or more actuatable cushioning elements is actuated, based on the determining an event, to provide cushioning support for an object. For example, central controller 2-154 (FIG. 26), e.g., in response to event detector 2-158 determining or detecting an event, may transmit signals via transceiver 2-152 to 12 or more actuatable cushioning elements, which may cause a stored energy reservoir 2-220 at each of the elements to actuate the associated element.

Figure 42:
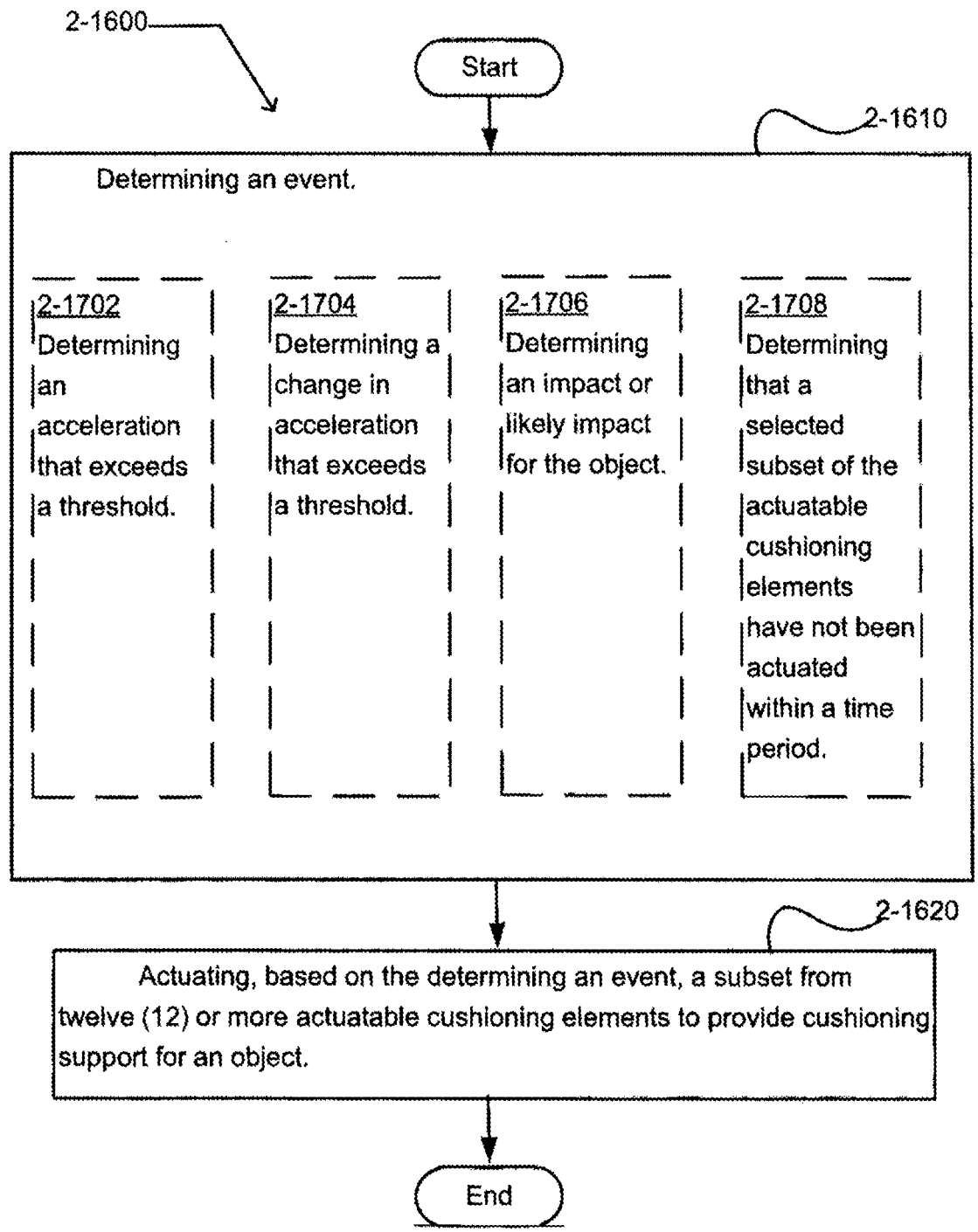
FIG. 42 illustrates an alternative embodiment of the example operational flow of FIG. 41.

FIG. 42 illustrates alternative embodiments of the example operational flow 2-1600 of FIG. 41. FIG. 42 illustrates example embodiments where the determining operation 2-1610 may include at least one additional operation. Additional operations may include operations 2-1702, 2-1704, 2-1706 or 2-1708.

At operation 2-1702, an acceleration that exceeds a threshold is determined. For example, event detector 2-158 (e.g., as an accelerometer) in FIG. 26 may determine that an acceleration has exceeded a threshold, such as 0.4 G, where G indicates a force of gravity. When acceleration exceeds a threshold, this may indicate or suggest that a collision for the container 2-110 is likely, or that the container is in free fall or has been dropped, or other condition which may be damaging to the object inside the container 2-110. Thus, in such case, it may be desirable to increase cushioning support for the object, e.g., by actuating or expanding additional cushioning elements.

At the operation 2-1704, a change in acceleration that exceeds a threshold is determined. For example, event detector 2-158 (FIG. 26) may determine that acceleration has increased from 0 G to 0.3 G within a specific period of time, e.g., which may indicate a likely collision for the container 2-110.

At the operation 2-1706, an impact or likely impact for the object is determined. For example, event detector 2-158 (FIG. 26), e.g., as an accelerometer or other instrument, may measure a sharp increase in force or acceleration due to free fall (e.g., indicating a likely impact) or a sharp force due to an impact on the container, for example.

At the operation 2-1708, it is determined that a selected subset of the actuatable cushioning elements have not been actuated within a time period. For example, central controller 2-154 of central control logic 2-150 (FIG. 26) may determine that less than 20% of the actuatable cushioning elements in container 2-110 have been actuated over the last 2 hours, e.g., based on signals received from the actuatable cushioning elements. This may indicate, for example, that cushioning support for the object is inadequate.

Figure 43:
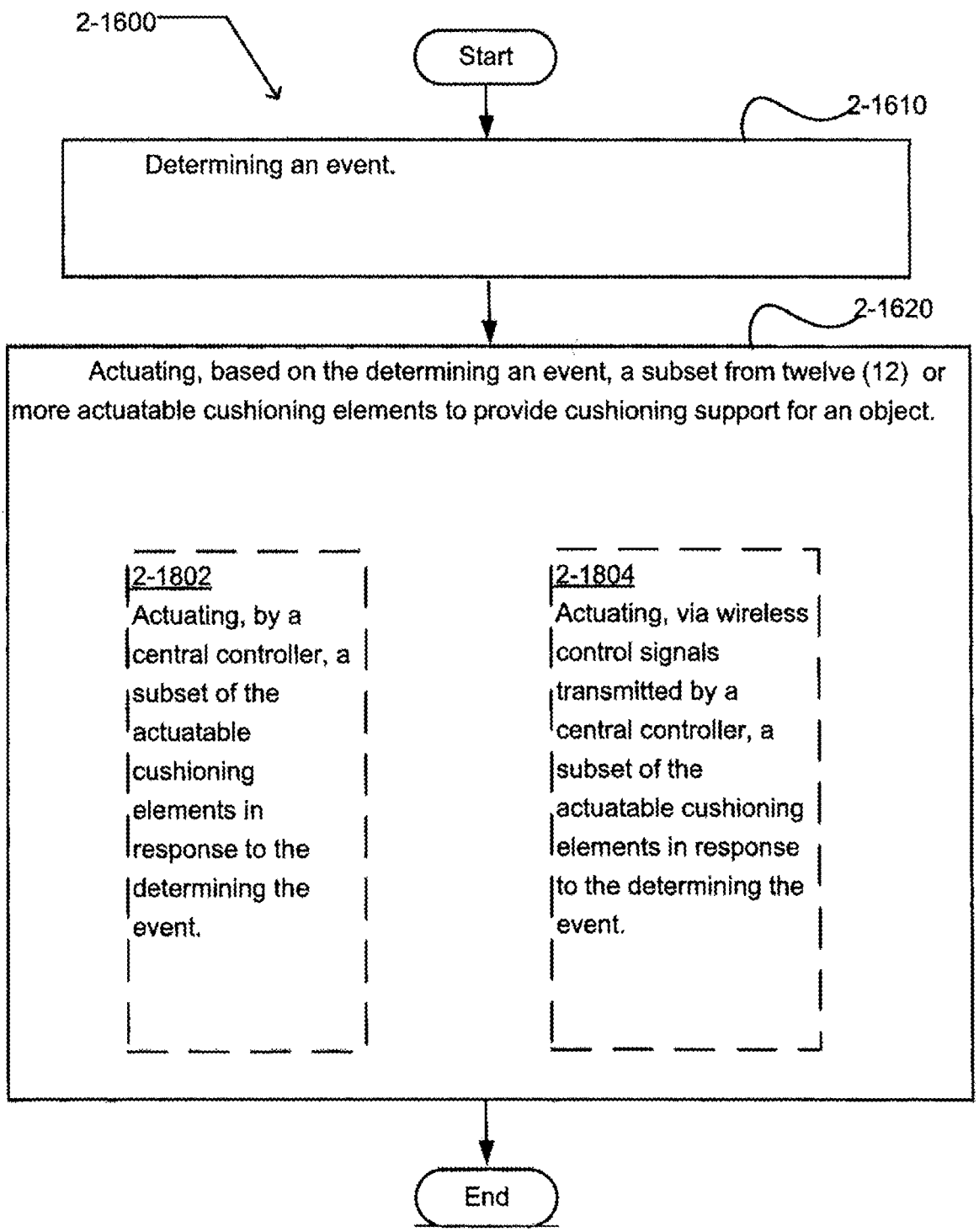
FIG. 43 illustrates an alternative embodiment of the example operational flow of FIG. 41.

FIG. 43 illustrates alternative embodiments of the example operational flow 2-1600 of FIG. 41. FIG. 43 illustrates example embodiments where the actuating operation 2-1620 may include at least one additional operation. Additional operations may include operations 2-1802 or 2-1804.

At operation 2-1802, a central controller actuates a subset of the actuatable cushioning elements in response to the determining the event. For example, central controller 2-154 (FIG. 26), e.g., in response to event detector 2-158 determining or detecting an event, may transmit signals via transceiver 2-152 to a group of actuatable cushioning elements, which may cause a stored energy reservoir 2-220 at each of the elements to actuate the associated element.

At operation 2-1804, a central controller actuates, via transmission of wireless control signals, a subset of the actuatable cushioning elements in response to the determining the event. For example, central controller 2-154 (FIG. 26), e.g., in response to event detector 2-158 determining or detecting an event, may transmit wireless control signals via wireless transceiver 2-152 to one or more actuatable cushioning elements, which may cause a stored energy reservoir 2-220 at the one or more cushioning elements to actuate the associated element.

Figure 44:
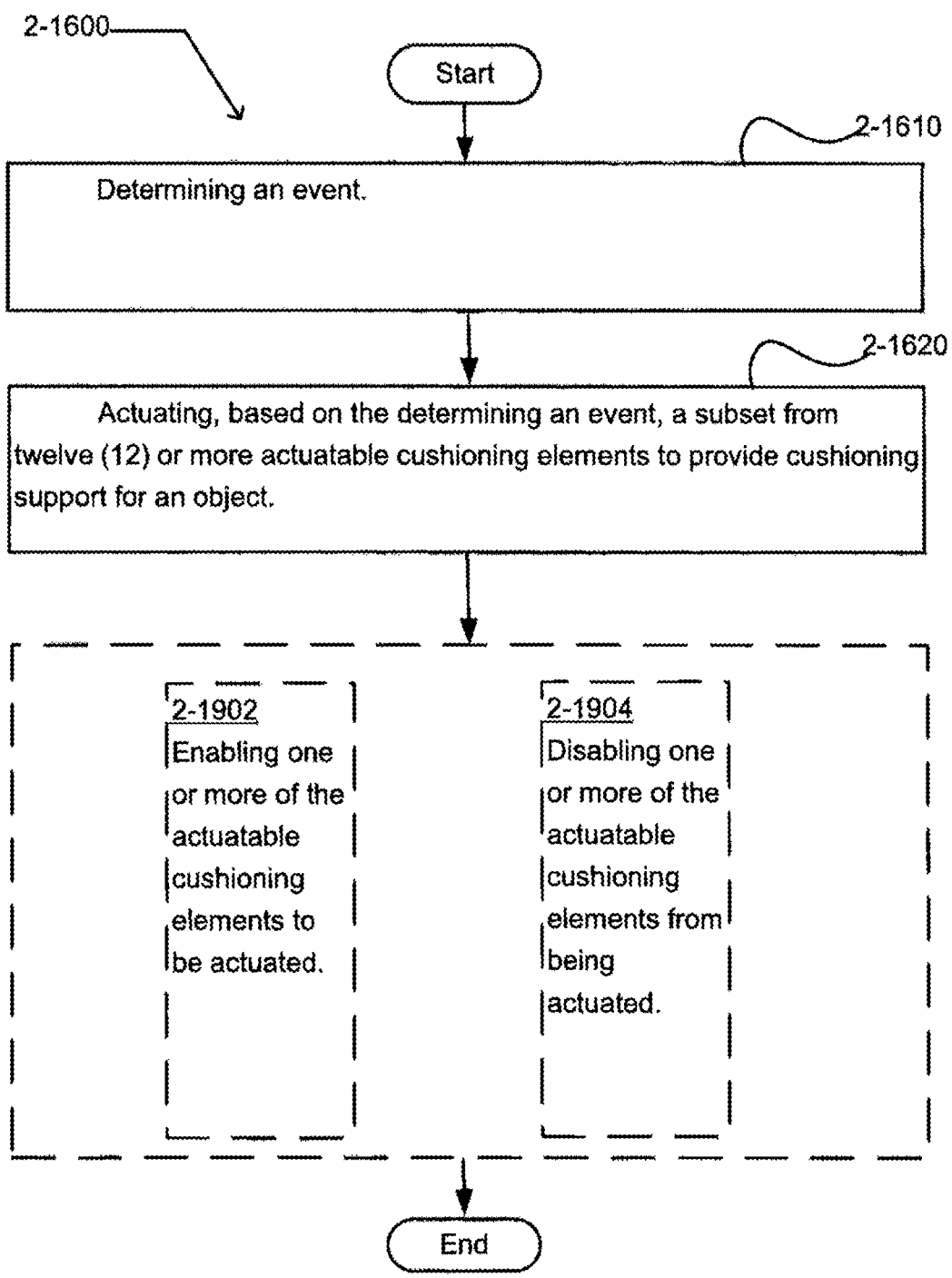
FIG. 44 illustrates an alternative embodiment of the example operational flow of FIG. 41.

FIG. 44 illustrates alternative embodiments of the example operational flow 2-1600 of FIG. 41. FIG. 44 illustrates example embodiments that may include at least one additional operation. Additional operations may include operations 2-1902 or 2-1904.

At operation 2-1902, one or more of the actuatable cushioning elements are enabled to be actuated. For example, central controller 2-154 may transmit signals via wireless transceiver 2-152 to enable actuatable cushioning elements 116 and 118 to be actuated. This may allow, for example, for cushioning elements 116 and 118 to be actuated, e.g., in response to an event.

At operation 2-1904, one or more of the actuatable cushioning elements are disabled from being actuated. For example, central controller 2-154 may transmit signals via wireless transceiver 2-152 to disable actuatable cushioning elements 2-116 and 2-118 from being actuated. This may prevent, for example, for cushioning elements 2-116 and 2-118 from being actuated, e.g., in response to an event.

FIG. 45 illustrates an example apparatus 2-2000 in which embodiments may be implemented. The apparatus 2-2000 may include at least two actuatable cushioning elements 2-2010 configured to provide cushioning support for an object. For example, a system 2-100 (FIG. 26) may include actuatable cushioning elements 2-116 and 2-118.

The at least two actuatable cushioning elements 2-2010 may include a first subset of actuatable cushioning elements 2-2012 enabled to actuate in response to an event during a first time period. For example, actuatable cushioning element 2-116 may be enabled to actuate during a first hour that container 2-110 is in-transit to a destination location.

The at least two actuatable cushioning elements 2-2010 may include a second subset of actuatable cushioning elements 2-2014 enabled to actuate in response to an event during a second time period. For example, actuatable cushioning element 2-118 may be enabled to actuate during a second hour that container 2-110 is in-transit to a destination location.

FIG. 46 illustrates alternative embodiments of the example apparatus 2-2000 of FIG. 45. FIG. 46 illustrates example embodiments that may include at least one additional implementation. Additional implementations may include implementations 2-2102, 2-2104, or 2-2106.

At implementation 2-2102, the actuatable cushioning elements are 2.5 cm in width or less in an unexpanded state. For example, actuatable cushioning elements 2-116 and 2-118 may be 2.0 cm in width in an unexpanded state.

At implementation 2-2104, the actuatable cushioning elements are 2.5 cm in width or more in an unexpanded state. For example, actuatable cushioning elements 2-16 and 2-118 may be 3.7 cm in width in an unexpanded state.

At implementation 2-2106, the actuatable cushioning elements are 8 cm in width or less in an unexpanded state. For example, actuatable cushioning elements 2-116 and 2-118 may be 4.6 cm in width in an unexpanded state.

Figure 47A:
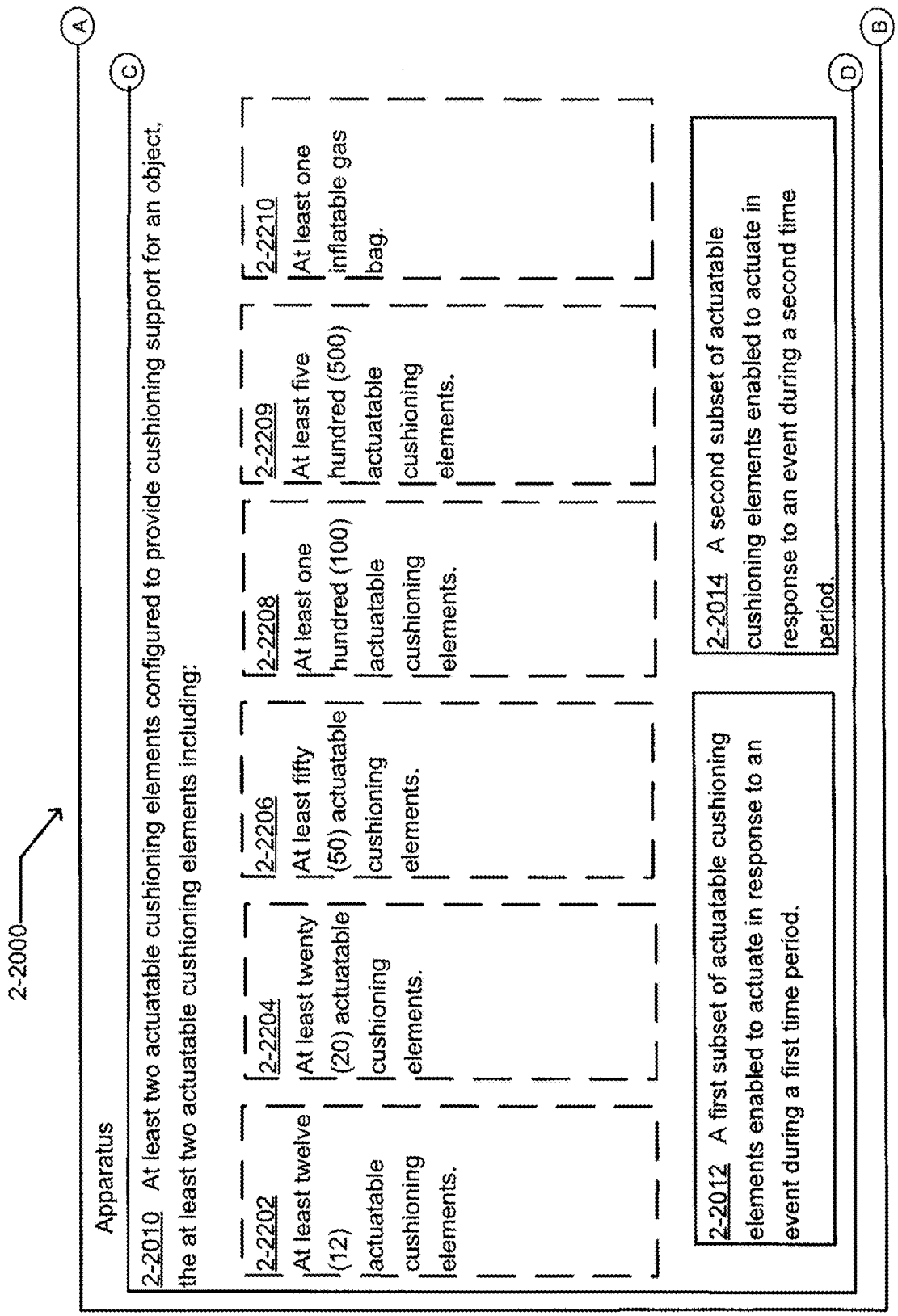
FIGS. 47A and 47B together illustrate an alternative embodiment of the example apparatus of FIG. 45.
Figure 47B:
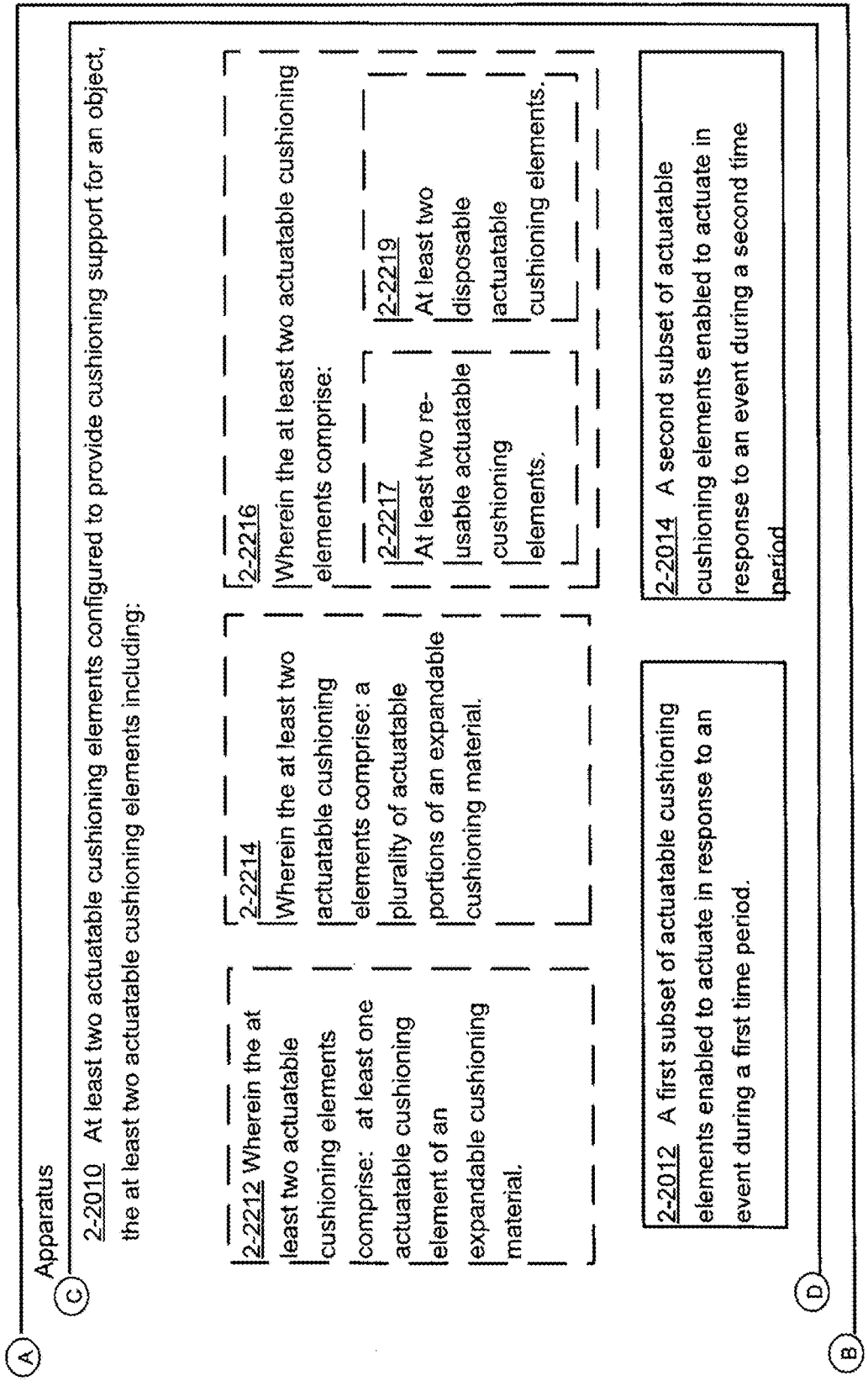

FIGS. 47A and 47B together illustrate alternative embodiments of the example apparatus 2-2000 of FIG. 45. FIGS. 47A and 47B together illustrate example embodiments that may include at least one additional implementation. Additional implementations may include implementations 2-2202, 2-2204, 2-2206, 2-2208, 2-2209, 2-2210, 2-2212, 2-2214, 2-2216, 2-2217 and/or 2-2219.

At implementation 2-2202, the at least two actuatable cushioning elements include at least 12 actuatable cushioning elements, such as 14 actuatable cushioning elements, for example.

At implementation 2-2204, the at least two actuatable cushioning elements include at least 20 actuatable cushioning elements, such as 25 actuatable cushioning elements, for example.

At implementation 2-2206, the at least two actuatable cushioning elements include at least 50 actuatable cushioning elements, such as 60 actuatable cushioning elements, for example.

At implementation 2-2208, the at least two actuatable cushioning elements include at least 100 actuatable cushioning elements, such as 125 actuatable cushioning elements, for example.

At implementation 2-2209, the at least two actuatable cushioning elements include at least 500 actuatable cushioning elements, such as 525 actuatable cushioning elements, for example.

At implementation 2-2210, the at least two actuatable cushioning elements include at least one inflatable gas bag, such as an inflatable air bag, for example.

At implementation 2-2212, the at least two actuatable cushioning elements include at least one actuatable cushioning element of an expandable cushioning material, such as an expandable cushioning material 2-305 (FIG. 28), for example.

At implementation 2-2214, the at least two actuatable cushioning elements include a plurality actuatable portions of an expandable cushioning material, such as portions 2-310, 2-315, 2-320, 2-325, and/or 2-330 of expandable cushioning material 2-305 (FIG. 28), for example.

At implementation 2-2216, the at least two actuatable cushioning elements include at least two re-usable actuatable cushioning elements 2-2217, and/or at least two disposable actuatable cushioning elements 2-2219. For example, the disposable actuatable cushioning elements may be one-time use elements, whereas the re-usable actuatable cushioning elements may be repeatedly expanded, unexpanded, and re-expanded.

FIG. 48 illustrates a partial view of an example computer program product 2-2300 that includes a computer program 2-2304 for executing a computer process on a computing device. An embodiment of the example computer program product 2-2300 is provided using a signal bearing medium 2-2302, and may include one or more instructions for enabling a first subset of actuatable cushioning elements for a first time period, the signal bearing medium also bearing one or more instructions for enabling a second subset of actuatable cushioning elements for a second time period, the signal bearing medium also bearing one or more instructions for determining an event, and the signal bearing medium also bearing one or more instructions for actuating, based on a time the event is determined, at least one of the first subset actuatable cushioning elements and the second subset of actuatable cushioning elements to provide cushioning support for an object. The one or more instructions may be, for example, computer executable and/or logic-implemented instructions. In one implementation, the signal-bearing medium 2-2302 may include a computer-readable medium 2-2306. In one implementation, the signal bearing medium 2-2302 may include a recordable medium 2-2308. In one implementation, the signal bearing medium 2-2302 may include a communications medium 2-2310.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality.

Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Figure 49:
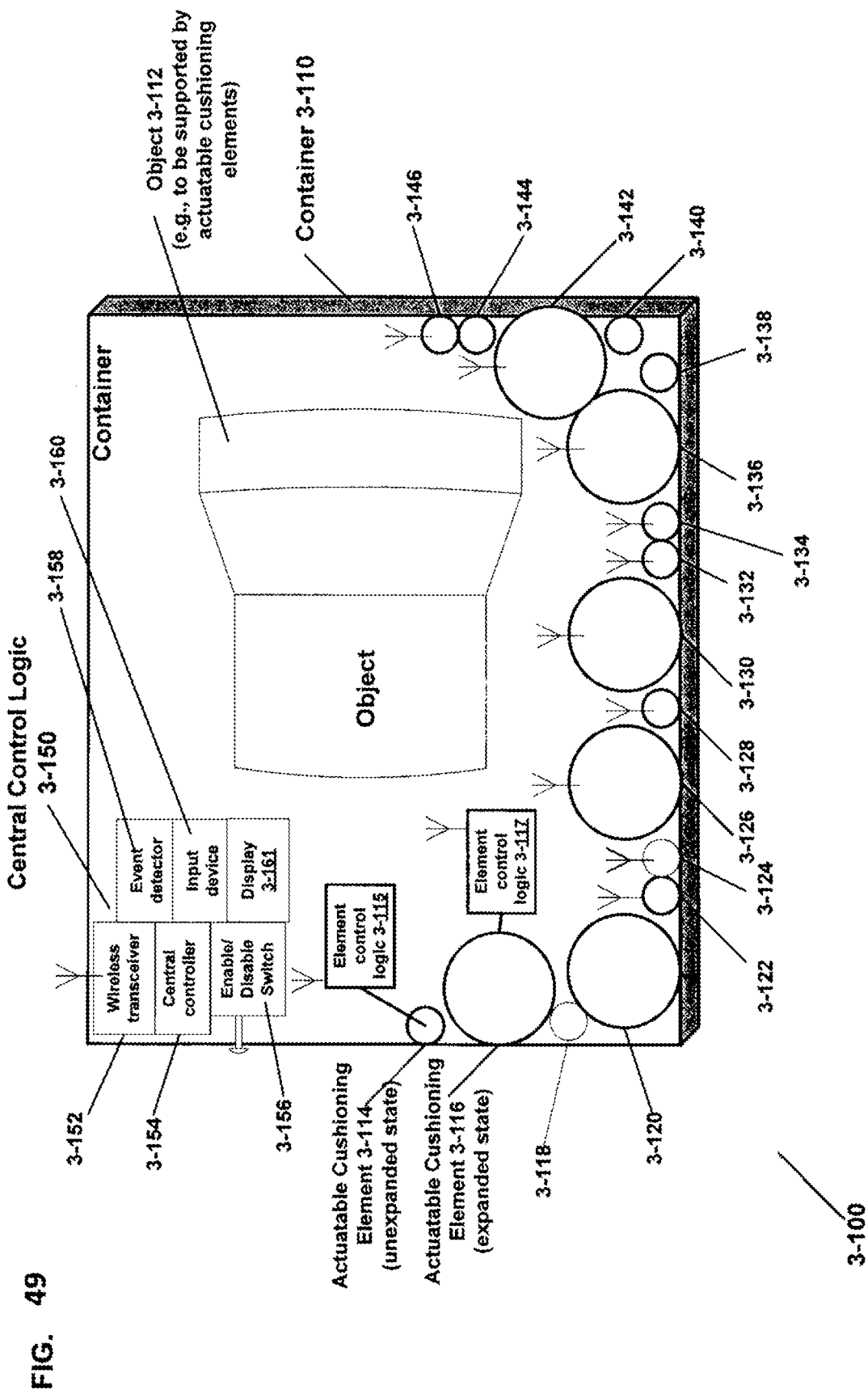
FIG. 49 illustrates an example system in which embodiments may be implemented.

FIG. 49 illustrates an example system 3-100 in which embodiments may be implemented. System 3-100 may include, for example, a container 3-110, which may be any type of container, such as a box, a container for shipping cargo on a vehicle, boat, plane, train or other vehicle, a container for shipping or storing small or large items, a container for shipping fragile items, or any other container. Container 3-110 may be made from any suitable material, such as cardboard, plastic, steel, etc., as a few example materials, but any type of material may be used.

System 3-100 may also include one or more actuatable cushioning elements provided within container 3-110, such as actuatable cushioning elements 3-114, 3-116, 3-118, 3-120, 3-122, 3-124, 3-126, 3-128, 3-130, 3-132, 3-134, 3-136, 3-138, 3-140, 3-142, 3-144, 3-146, etc. The actuatable cushioning elements may provide cushioning support for an item or object, such as object 3-112, for example. Object 3-112 may be any type of object, such as electronics, books, food items, cargo, fragile or delicate or breakable items which may be in need of cushioning support, people, animals, other organisms, or any other type of object. These are just a few examples of an object which may be supported by actuatable cushioning elements, and the various embodiments are not limited thereto. Actuatable cushioning elements 3-114, 3-116, etc. may spread a force or interaction of an object over a period of time or over an area within container 3-110, which may, at least in some cases, decrease potential impact and/or damage to the object, for example.

For example, one or more actuatable cushioning elements may be actuated (e.g., expanded) in response to an event to protect an object or passenger from damage or harm or collision effects. Also, for example, one or more actuatable cushioning elements may be actuated based upon one or more sensed values in accordance with a model of one or more objects to be protected, the actuatable cushioning elements, and the environment.

Also, for example, one or more actuatable cushioning elements may be actuated over a series of events or in response to a series of events to provide a coordinated protection of one or more objects or passengers in a vehicle from harm, damage or other effects from a collision, acceleration or other event. The protection of one or more objects may be based upon a harm function of the actual or predicted damage to subsets or portions of such objects, such as a maximum value, a weighted value, a cumulative value, or other such functions. The harm function may include damage to the environment (e.g., pedestrians or other vehicles in a vehicular collision, higher valued objects in the vicinity of a container collision, etc.) as well as to the one or more nominally protected objects. These are merely a few illustrative examples and the disclosure is not limited thereto.

Additional details and example embodiments are described herein.

Actuatable cushioning elements 3-114, 3-116, etc. may be in either an expanded state, such as shown for actuatable cushioning element 3-116, or an unexpanded state such as for actuatable cushioning element 3-114, for example. Or an actuatable cushioning element may also be partially expanded or partially unexpanded, for example.

In an example embodiment, some types of actuatable cushioning elements may be provided in an expanded state (e.g., inflated) for a limited period of time. For example, one or more actuatable cushioning elements may be actuated (e.g., expanded or unexpanded) in response to an event. In an example embodiment, a subset of actuatable cushioning elements may be actuated in response to an event. In another example embodiment, one or more actuatable cushioning elements may be expanded just prior to shipment and may remain in an expanded state for an extended period of time, or for a duration of transport, for example. In an example embodiment, an actuatable cushioning element may provide greater cushioning support for an object while in an expanded state, as compared to an unexpanded state (e.g., due to a greater volume of flexible or cushioning material or matter to absorb an impact). This is merely an example embodiment, and the disclosure is not limited thereto.

One or more of the actuatable cushioning elements may be actuated, which may include putting an actuatable cushioning element into motion or action. Actuation may include, for example, expanding an actuatable cushioning element from an unexpanded state to an expanded state (e.g., causing an element to expand or increase in size), or unexpanding an actuatable cushioning element from an expanded state to an unexpanded state (e.g., causing an element to shrink or reduce in size or contract), as examples. Actuation may include, for example, causing an airbag or other entity to inflate or deflate. Actuation may include, for example, changing or controlling the shape of an actuatable cushioning element. Actuation may also include partial motions or partial actions, such as partially expanding or partially unexpanding an actuatable cushioning element, for example.

Actuatable cushioning elements 3-114, 3-116, etc. may include any type of expandable element. For example, Actuatable cushioning elements 3-114, 3-116, etc., may include expandable gas bags which may expand based on the application of pressurized gas to the bag similar to the airbags used in automobiles and other vehicles. Actuatable cushioning elements 3-114, 3-116, etc. may alternatively include a fluid-expandable bag or entity that may be expanded by fluid. For example, Actuatable cushioning elements 3-114, 3-116, etc., may include fluid-actuatable elements, where fluid may be sourced from one or more fluid reservoirs, e.g., via a valving actuation. The fluid reservoirs may, for example, cause the fluid actuatable elements to actuate (e.g., expand and/or unexpand/contract) by causing fluid to flow into or out of the fluid-actuatable elements. For example, Actuatable cushioning elements 3-114, 3-116, etc., may include magnetic field-actuatable elements, where magnetic field may be sourced from one or more electric energy sources, e.g., via a capacitor, an inductor, a flux generator, or other means. The electric energy sources may, for example, cause the magnetic field actuatable elements to actuate (e.g., expand and/or unexpand/contract) by causing magnetic fields to apply force to the fluid-actuatable elements. Actuatable cushioning elements 3-114, 3-116, etc. alternatively may include an expandable cushioning material which may expand (or unexpand), for example, through the application of a chemical, gas, liquid, electrical energy, reaction force or other energy or material. Electrical energy may, for example be used to expand (or unexpand) or shape an expandable cushioning material by means of an electric motor, a linear electromagnetic motor, a piezoelectric actuator, or other means. Reaction force may, for example be used to expand (or unexpand) or shape an expandable cushioning material by means of a rocket engine, a pulsed microimpulse reaction engine, a magnetic repulsion coil, or other means. Expandable cushioning material may apply cushioning force by means of pressure, electric/magnetic fields, inertia, compressive stress, tensile force, or shear force, or a combination thereof. Expandable cushioning material may apply cushioning force and/or dissipate interaction energy by means of crushing (e.g., foam or shells), breaking (e.g., fibers or wires), buckling (e.g., struts or plates) or other mechanisms.

In an example embodiment, the actuatable cushioning elements may be re-usable, where the cushioning elements may be expanded to absorb an impact, later fully or partially unexpanded, and then subsequently expanded again to provide cushioning support or protect the object for a second event or impact, or to provide cushioning support in another container, for example. While in another example embodiment, the actuatable cushioning elements may be disposable, wherein the elements, for example, may be expanded or used only once or only a few times.

Any number of actuatable cushioning elements may be used to provide cushioning support for object 3-112. For example, in one embodiment, at least 12 actuatable cushioning elements may be used to provide cushioning support for an object. This may include providing at least 12, 20, 50, 100 or even 500 actuatable cushioning elements (or more) to provide cushioning support, according to different example embodiments.

The actuatable cushioning elements may be any shape (e.g., round, oblong, rectangular, irregular shape) and any size. In an example embodiment, one or more of Actuatable cushioning elements 3-114, 3-116, etc. may be 2.5 cm in width or less in an unexpanded state, or may be 2.5 cm in width or more in an unexpanded state, or may be 5 cm or less in an unexpanded state, or may be 8 cm or less in an unexpanded state, as examples. For example, different numbers and/or sizes of cushioning elements may be used, e.g., depending on the application, the type of object to be protected, the type or size of container to be used, or other factors. These are some example numbers and sizes and the disclosure is not limited thereto. In an example embodiment, smaller-sized actuatable cushioning elements may be more applicable for smaller containers, whereas larger actuatable cushioning elements may be more applicable for larger containers, for example.

In another example embodiment, a group of actuatable cushioning elements may be provided within a container, or outside of the container, to provide cushioning support for an object, such as a vase or other object within the container. A first subset of actuatable cushioning elements may be pre-inflated or pre-expanded in response to a first event, e.g., at packing time or just prior to shipment. At some later point, a second subset of actuatable cushioning elements may be actuated (e.g., expanded), in response to a second event (such as an acceleration that exceeds a threshold, or an impact or likely impact), for example. At some point later, a third subset of actuatable cushioning elements may be actuated (e.g., inflated or expanded), in response to a third event, for example. Also, in an example embodiment, upon arrival (which may be considered a fourth event), one or more (or even all) of the actuatable cushioning elements in the container may be actuated (e.g., unexpanded or deflated), to allow the object to be unpacked from the container. The actuatable cushioning elements may also be-reused in another container, for example. In this manner, the group of actuatable cushioning elements may provide cushioning support for an object, e.g., for one or more events.

Actuatable cushioning elements may be actuated outside of a container or outside of the preactivation envelope of a system. For example, such actuation may provide additional cushioning to that provided with interior actuatable cushioning elements alone. For example, such exterior actuation may also act by modification of the dynamics of the interaction with the environment, such as by introducing sliding contacts, aerodynamic lift, sideways steering forces, or by other means. For example, such exterior actuatable cushioning elements may have spherical shapes, cylindrical shapes, high aspect ratio shapes, lifting-body shapes, or other shapes. For example, exterior actuatable cushioning elements may include expandable gas bags, fluid actuatable elements, expandable cushioning materials, skids, reaction engines, drag-inducing devices, anchors, or other such elements. For example, such exterior actuatable cushioning elements may act in a time dependent (e.g., via a specified actuation profile, by stretching, deforming, breaking) and/or time sequenced manner (e.g., by timed activation of one or more exterior actuatable cushioning elements).

According to an example embodiment, one or more actuatable cushioning elements may be actuated (e.g., expanded or unexpanded) for or in response to an event. The event may be any of a variety of different events. For example, the event may include determining an impact or likely impact, determining an acceleration or change in acceleration that exceeds a threshold (such as when a container has been dropped), determining a temperature (e.g., inside or outside the container) that reaches a selected temperature, determining a time that reaches a specific time, determining that a location has been reached or that a selected distance within the location has been reached (e.g., either approaching or leaving the location), determining that a selected subset of actuatable cushioning elements (e.g., some or all of the elements) have not yet been expanded (thus more elements should be expanded to provide support), or other event. These are merely a few examples of events, e.g., events which may cause or result in one or more actuatable cushioning elements to be actuated.

According to an example embodiment, acceleration may include a scalar quantity, or may include a vector quantity. Acceleration may include linear acceleration, angular acceleration, or other type of acceleration. A detected or determined acceleration may include an acceleration having components with varying degrees of interest or relevance (e.g., one or more linear components may be used, or one or more angular components to indicate an event or events to trigger actuation of an actuatable cushioning element). For example, an event may include an acceleration or change in acceleration that may include an acceleration (e.g., one or more acceleration components) or a change in acceleration that may exceed a threshold. Alternatively, the acceleration may be determined in more complex manners, such as ad hoc, time and situation-dependent manners, or other manners. For example, a model may be provided or used to model the operation of a system (e.g., system 3-100), or model the operation of actuatable cushioning elements, or model the free-fall or acceleration or movement of one or more objects or passengers, or the like. For example, one or more actuatable cushioning elements may be actuated (e.g., expanded or unexpanded/contracted) based on the model and/or based on determination of one or more events. For example, the selected actuation of one or more actuatable cushioning elements may be based upon the predicted shift of the time profile of one or more accelerations from a value associated with one actuation state to another value corresponding to the selected actuation state, the value of which is predicted to reduce damage to one or more protected objects. For example, measured and model-forecasted time-integrals of acceleration that may exceed case dependent thresholds may be used, e.g., to identify criteria or likely situations where objects may be damaged or broken. In another example embodiment, a time-history of acceleration may, in some cases, may inform the system 3-100 as to the level of protection that may or should be used to protect the object. For example, an extended time-interval of free-fall may result in decelerations of significant magnitudes being purposefully applied to protect objects when, e.g., an event is detected. For example, measured or model-forecasted stresses within the object may be used, e.g., to identify criteria or likely situations where objects may be damaged or broken. Such stress thresholds may include peak values or time-dependent value profiles of a function of one or more elements of the stress tensor, or may include initiation or propagation of fracture. For example, measured or model-forecasted temperatures within the object may be used, e.g., to identify criteria or likely situations where objects may be damaged or broken. Such temperature thresholds may include peak temperature values, or energy deposition values (e.g., a substance that will undergo a phase change—e.g., liquid to gas—after accumulation of a certain energy, which those skilled in the art will appreciate is an example of a more general determination that an energy exceeds a threshold), or time dependent temperature profiles. These are merely a few additional example embodiments relating to acceleration, and the disclosure is not limited thereto.

Referring to FIG. 49 again, in an example embodiment, system 3-100 may include central control logic 3-150, including a central controller 3-154 which may provide overall control for system 3-100. Central control logic 3-150 may include a number of additional blocks coupled to central controller 3-154, which will be briefly described.

A wireless receiver 3-152 may transmit and receive wireless signals such as RF (radio frequency) signals. Wireless signals such as RF signals may include any wireless or other electromagnetic signals, and are not limited to any particular frequency range.

An event detector 3-158 may detect or determine an event (or condition), or a series of events, such as an acceleration or change in acceleration that exceeds a threshold, a temperature that reaches a specific temperature, a location that is within a specific distance of a selected location, or any other event. Event detector 3-158 may include any type of detector or sensor. Event detector 3-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold. In another example embodiment, event detector 3-158 may include a Micro Electro Mechanical System (MEMS) accelerometer, which may, for instance, sense a displacement of a micro-cantilevered beam under acceleration transverse to its displacement-direction, e.g., by capacitive means. An angular accelerometer may determine that an angular acceleration or change in angular acceleration has exceeded a threshold. In another example embodiment, event detector 3-158 may include a Ring Laser Gyro, a Fiber Optic Gyro, a Vibrating Structure Gyro, a MEMS Gyro, or a mechanical gyroscope.

Or, alternatively for event detector 3-158, electrodes may be placed on a suitably shaped and mounted piezoelectric material for sensing a current and/or voltage generated by the piezoelectric material deforming in response to acceleration induced stress. Some examples of materials that may be used in the piezoelectric version of the event detector 3-158 may include lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped PLZT, and Barium zirconate titanate (BZT). These are just a few examples of event detectors.

An enable/disable switch 3-156 may be used to enable or disable system 3-100. For example, enable/disable switch 3-156 may be used to enable the one or more actuatable cushioning elements to be actuated, or may disable the one or more actuatable cushioning elements from being actuated, for example. System 3-100 may also include an input device, such as a mouse, keypad or other input device, which may allow a user to configure operation of system 3-100, for example. For example, enable/disable switch 3-156 and/or input device 3-160 may enable a first subset of actuatable cushioning elements to be actuatable during a first time period (or first time interval), and may enable a second subset of actuatable cushioning elements to be actuatable during a second time period (or second time interval), e.g., to provide cushioning support for an object over (or for) a series of events. The phrase "time period" may, for example, include any time interval, and is not necessarily cyclical or periodic, and may include random, non-periodic and/or non-cyclical time periods or time intervals, as examples.

An output device or display 3-161 may also be provided to display information. Input device 3-160 and display 3-161 may be provided in a position which may be reached or accessed by a user, such as on the outside of the container 3-110, for example.

One or more of the actuatable cushioning elements may include an element control logic to control overall operation and/or actuation of the element(s) to which the control logic is connected. For example, element control logic 3-115 may provide control to actuatable cushioning element 3-114, while element control logic 3-117 may control operation of actuatable cushioning element 3-116.

An element control logic may control a single actuatable cushioning element, or may control multiple cushioning elements, for example. The element control logic for one or more actuatable cushioning elements may communicate with other element control logic to provide a cushioning support for object 3-112 in a coordinated manner, for example. According to an example embodiment, this may include an element control logic transmitting a wireless signal(s) when the associated actuatable cushioning element has been actuated (or otherwise an element control logic for an element transmitting a signal notifying other elements of the cushioning element's state) which may allow the element control logic associated with other actuatable cushioning elements to determine how many or what percentage of cushioning elements are in an expanded state. For example, if an insufficient number of cushioning elements are currently in an expanded state, then one or more actuatable cushioning elements (via their element control logic) may then actuate or move to an expanded state to improve cushioning support for the object. Thus, distributed control may be provided via communication between the element control logic for different actuatable cushioning elements.

In another example embodiment, central controller 3-154 (FIG. 49) of central control logic 3-150 may provide central control for operation of the one or more actuatable cushioning elements within container 3-110. For example, event detector 3-158 may detect an event, and then wireless transceiver 3-152 (e.g., under control of central controller 3-154) may transmit wireless signals to one or more element control logic (e.g., 115, 117.) to cause one or more actuatable cushioning elements to actuate in response to the event.

Figure 50:
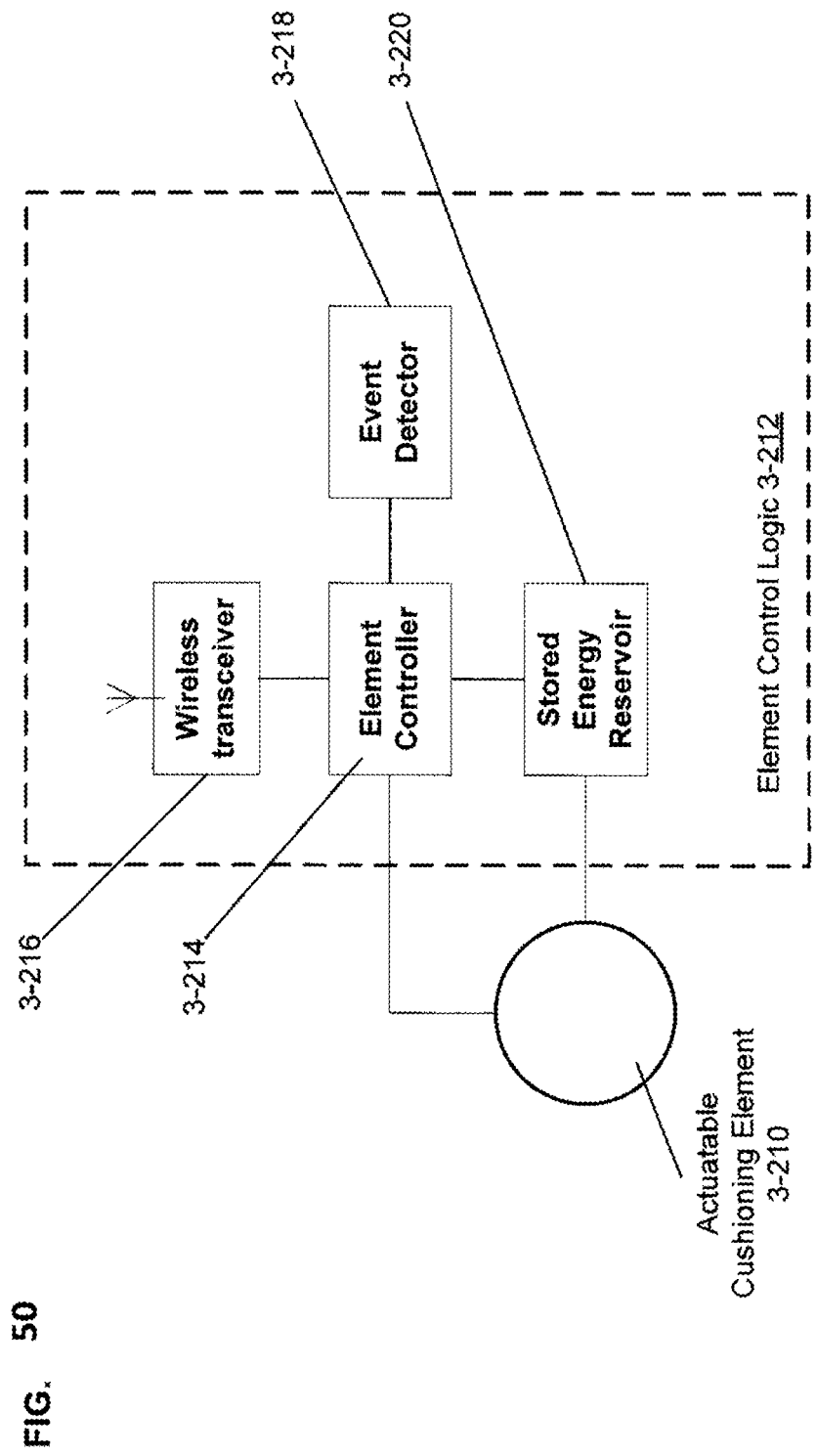
FIG. 50 illustrates an actuatable cushioning element according to an example embodiment.

FIG. 50 illustrates an actuatable cushioning element according to an example embodiment. An actuatable cushioning element 3-210 may be coupled to (or may include) an associated element control logic 3-212. Although not shown, one or more of the actuatable cushioning elements (e.g., Actuatable cushioning elements 3-114, 3-116, 3-118, 3-120, 3-122, 3-124 . . . ) may each include a similar element control logic. For example, element control logic 3-115 and 3-117 may be the same as or similar to element control logic 3-212, for example. In an alternative embodiment, element control logic 3-212 may be omitted.

Element control logic 3-212 may include an element controller 3-214 to provide overall control for an actuatable cushioning element 3-210. An event detector 3-218 may detect or determine an event. A wireless transceiver 3-216 may transmit and receive wireless signals. Alternatively, actuatable cushioning elements may be coupled together (and/or to central control logic 3-150) via any communications media, such as a wireless media (e.g., via RF or other electromagnetic signals, acoustic signals), a wired communication media, such as cable, wire, fiber optic line, etc., or other media.

A stored energy reservoir 3-220 may store gas, liquid, energy (chemical or electrical energy or the like) or other energy or substance, which may be used to actuate actuatable cushioning element 3-210. For example, stored energy reservoir 3-220 may receive signals from element controller 3-214, causing stored energy reservoir 3-220 to release pressurized liquid or gas to actuatable cushioning element 3-210 to cause element 3-210 to expand or inflate, or may release a chemical or other substance causing an expandable cushioning material to expand, for example. In an example embodiment, actuatable cushioning element 3-210 may include one or more fluid-actuatable elements, where fluid may be sourced from one or more fluid reservoirs (such as from stored energy reservoir 3-220), e.g., via a valving actuation. The fluid reservoirs may, for example, cause the fluid actuatable element(s) to actuate (e.g., expand and/or unexpand/contract) by causing fluid to flow into or out of the fluid-actuatable elements.

One or more actuatable cushioning elements, such as actuatable cushioning element 3-210, may be coupled to an element controller (e.g., element controller 3-214) via any communications media, such as a wireless media (e.g., via RF or other electromagnetic signals, acoustic signals), a wired communication media, such as cable, wire, fiber optic line, etc., or other communications media.

According to an example embodiment, one or more actuatable cushioning elements may include fluid-actuated cushioning elements or structures, or may include gas-actuated or gas-powered cushioning elements, or other types of elements. For example, one or more of the actuatable cushioning elements, when actuated, may have at least one of a size, shape, position, orientation, stress-strain tensor components (or other component) of the cushioning elements changed or modified as a result of one or more actuating actions applied to the cushioning element. For example, an actuating action or sequence of actuating actions which may be applied to an actuatable cushioning element, may, e.g., first change its position (or center of mass), then its orientation, then its size, and/or its rigidity or other characteristic. These changes to the actuatable cushioning element may occur, e.g., in a pre-programmed manner, and may occur, e.g., in response to or based upon an event, such as based on a measurement, signals received from cooperating cushioning elements or a controller(s) in the system 3-100, or other signals or criteria or event. The signals that may be received from other cooperating structures (e.g., elements or controllers) may, for example, describe or indicate their own characteristics, such as size, pressure, orientation, shape, etc. A model (e.g., of the system or operation of the system or objects) may be used to determine one or more actions that may be performed (such as actuation of an element), e.g., to protect one or more objects or passengers from harm or damage.

Also, in another example embodiment, one or more objects or passengers may include one or more associated actuatable cushioning elements on or near each object or passenger, where the group of associated actuatable cushioning elements may be independently controlled so as to provide cushioning support and/or protection for the associated object or passenger. Also, in another example embodiment, two or more separate objects, each protected by their own sets of actuatable cushioning elements may interact (for instance, by an actual or predicted collision). The actuation of one or more object's actuatable cushioning elements may occur with or without cooperation from that of the actuatable cushioning elements of one or more of the other objects. For example, one or more of the objects may sense the actions or state of the actuatable cushioning elements associated with one or more of the other objects. For example, two or more of the objects may share information on the actual and/or planned actuation histories of their actuatable cushioning elements. For example, one or more of the objects may sense the actions or state of the actuatable cushioning elements associated with one or more of the other objects. For example, one or more objects may base the actuation of one or more of its actuatable cushioning elements upon the sensed or predicted actions of one or more actuatable cushioning elements associated with one or more of the other objects. For example, one or more objects may command the actuation or nonactuation of one or more actuatable cushioning elements associated with one or more of the other objects.

This commanded actuation process may be performed by a joint decision process, by a hierarchical process, by a master-slave process, or by other means.

Figure 51:
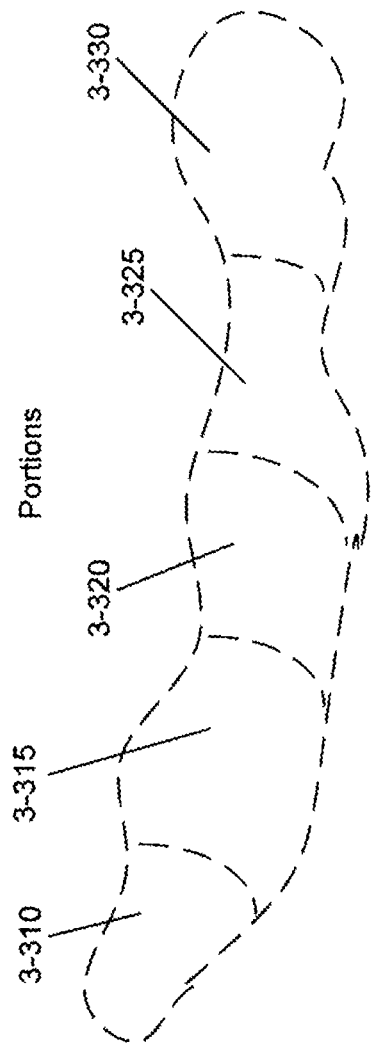
FIG. 51 illustrates actuatable cushioning elements according to another example embodiment.

FIG. 51 illustrates actuatable cushioning elements according to another example embodiment. An expandable cushioning material 3-305 is shown in FIG. 51. A separate portion of the expandable cushioning material 3-305, such as portions 3-310, 3-315, 3-320, 3-325, and 3-330, may be actuated (expanded or unexpanded). Thus, actuatable cushioning elements may be provided as portions of the expandable cushioning material 3-305, for example. In an example embodiment, the portions may be actuated by application of a gas, liquid or other substance or energy applied to the portion, for example.

Figure 52:
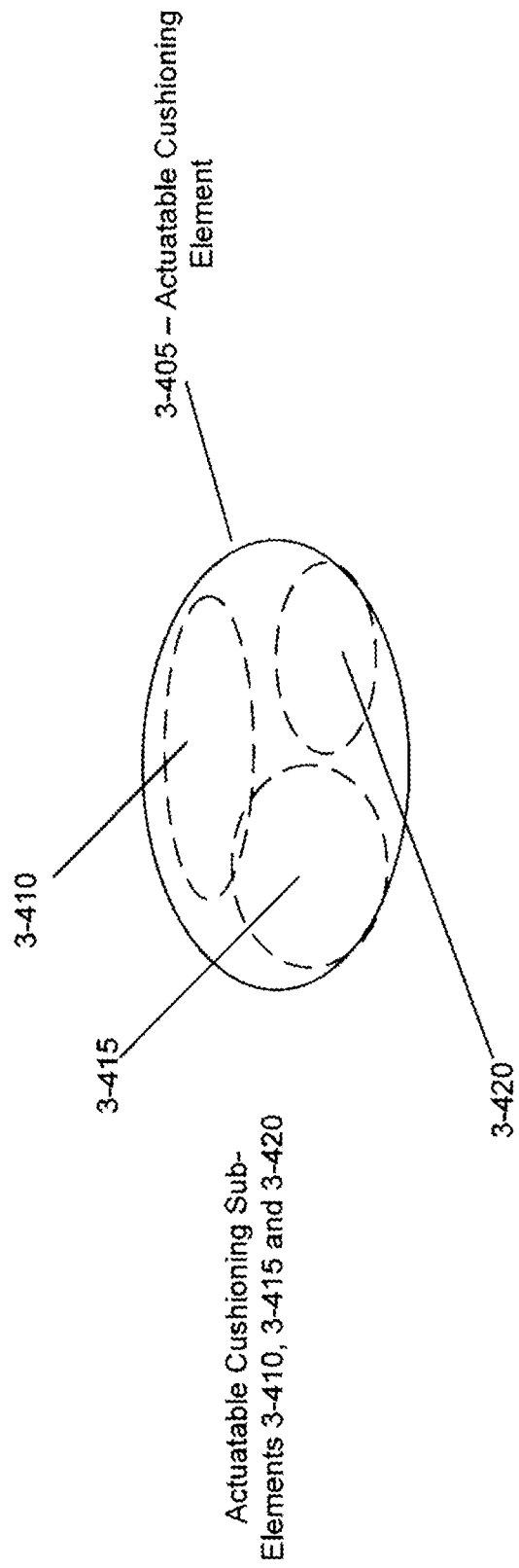
FIG. 52 illustrates actuatable cushioning elements according to yet another example embodiment.

FIG. 52 illustrates actuatable cushioning elements according to yet another example embodiment. According to an example embodiment, an actuatable cushioning element 3-405 may include one or more sub-elements, such as sub-elements 3-410, 3-415 and 3-420. For example, each of these sub-elements may be separately controlled, or may be separately actuated, e.g., under control of an element control logic, for example.

Figure 53:
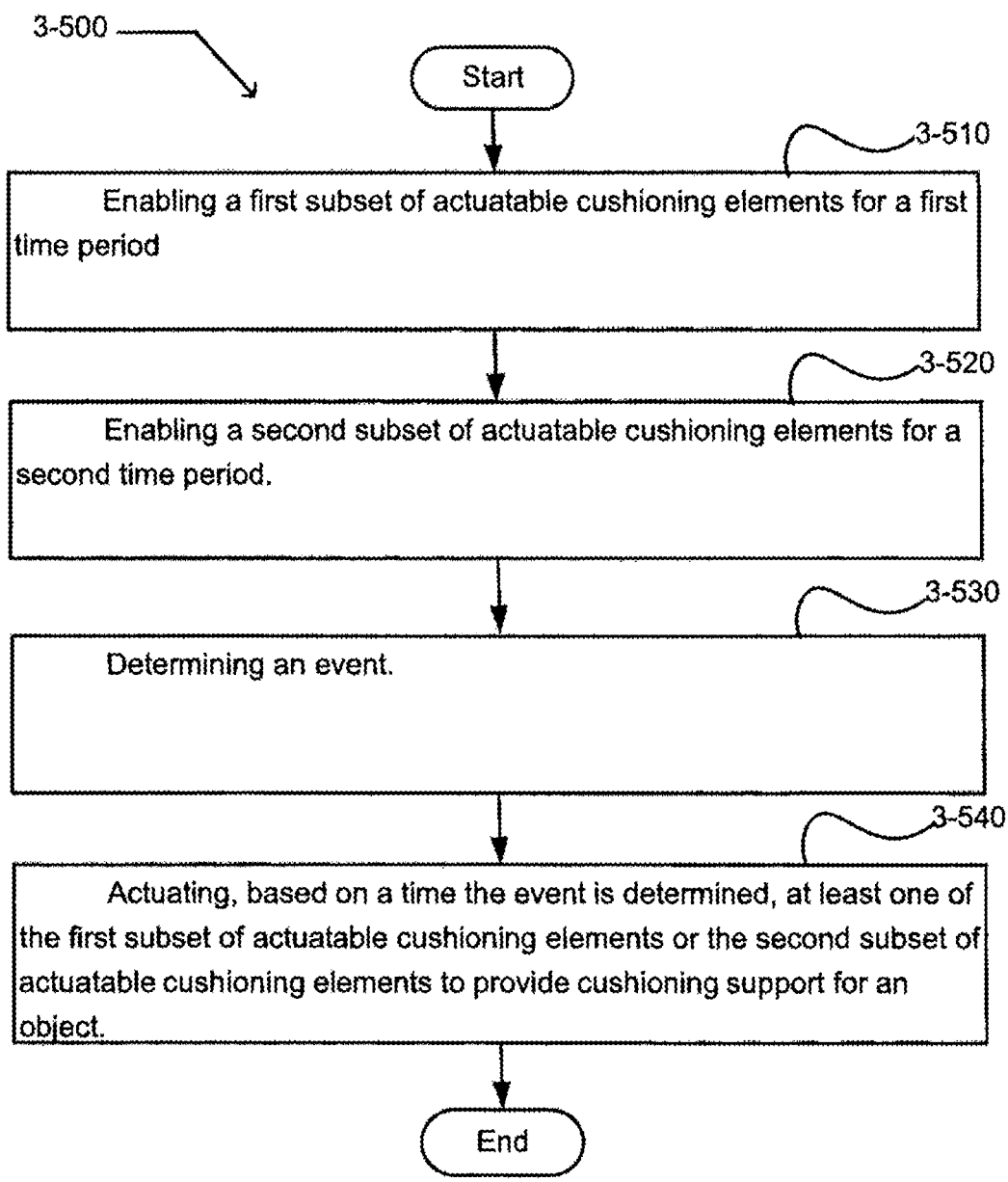
FIG. 53 illustrates an operational flow representing example operations related to actuatable cushioning elements according to an example embodiment.

FIG. 53 illustrates an operational flow 3-500 representing example operations related to actuatable cushioning elements. In FIG. 53 and in following figures that include various examples of operational flows, discussion and explanation may be provided with respect to the above-described examples of FIG. 52, and/or with respect to other examples and contexts. However, it should be understood that the operational flows may be executed in a number of other environments and contexts, and/or in modified versions of FIG. 52. Also, although the various operational flows are presented in the sequence(s) illustrated, it should be understood that the various operations may be performed in other orders than those which are illustrated, or may be performed concurrently.

After a start operation, the operational flow 3-500 moves to an enabling operation 3-510 where a first subset of actuatable cushioning elements are enabled for a first time period. For example, as shown in FIG. 49, enable/disable switch 3-156 and/or input device 3-160 may enable a first subset of actuatable cushioning elements to actuate during a first five minutes after container 3-110 has departed.

Then, in an enabling operation 3-520, a second subset of actuatable cushioning elements is enabled during a second time period. For example, as shown in FIG. 49, enable/disable switch 3-156 and/or input device 3-160 may enable a second subset of actuatable cushioning elements to actuate during a second five minutes after container 3-110 has departed. In this manner, for example, different subsets of cushioning elements may be enabled to actuate in response to an event. This may allow, for example, the system 3-100 to provide cushioning support for an object over one or more or a series of events.

Then in determining operation 3-530, an event is determined. For example, event detector 3-218 in FIG. 50 for an actuatable cushioning element may (e.g., as an accelerometer) determine that an acceleration or change in acceleration has exceeded a threshold, or may determine (e.g., as a GPS receiver) that a location has been reached or that a specific distance within a location has been reached.

Then in actuating operation 3-540, at least one of the first subset of actuatable cushioning elements or the second subset of actuatable cushioning elements are actuated based on a time the event is determined to provide cushioning support for an object. For example, a first subset of elements may include elements 3-114, 3-118 and 3-122, for example, which may be enabled during a first five minutes. In response to detecting an event during a first five minutes, for example, the element control logic 3-212 (FIG. 50) associated with one or more of actuatable cushioning elements 3-114, 3-118 and 3-122, may cause these actuatable cushioning elements to expand (e.g., based on pressurized gas or liquid or other material or energy released from stored energy reservoir 3-220 for each element). Alternatively, central controller 3-154 may actuate one of the subsets of actuatable cushioning elements.

Figure 54:
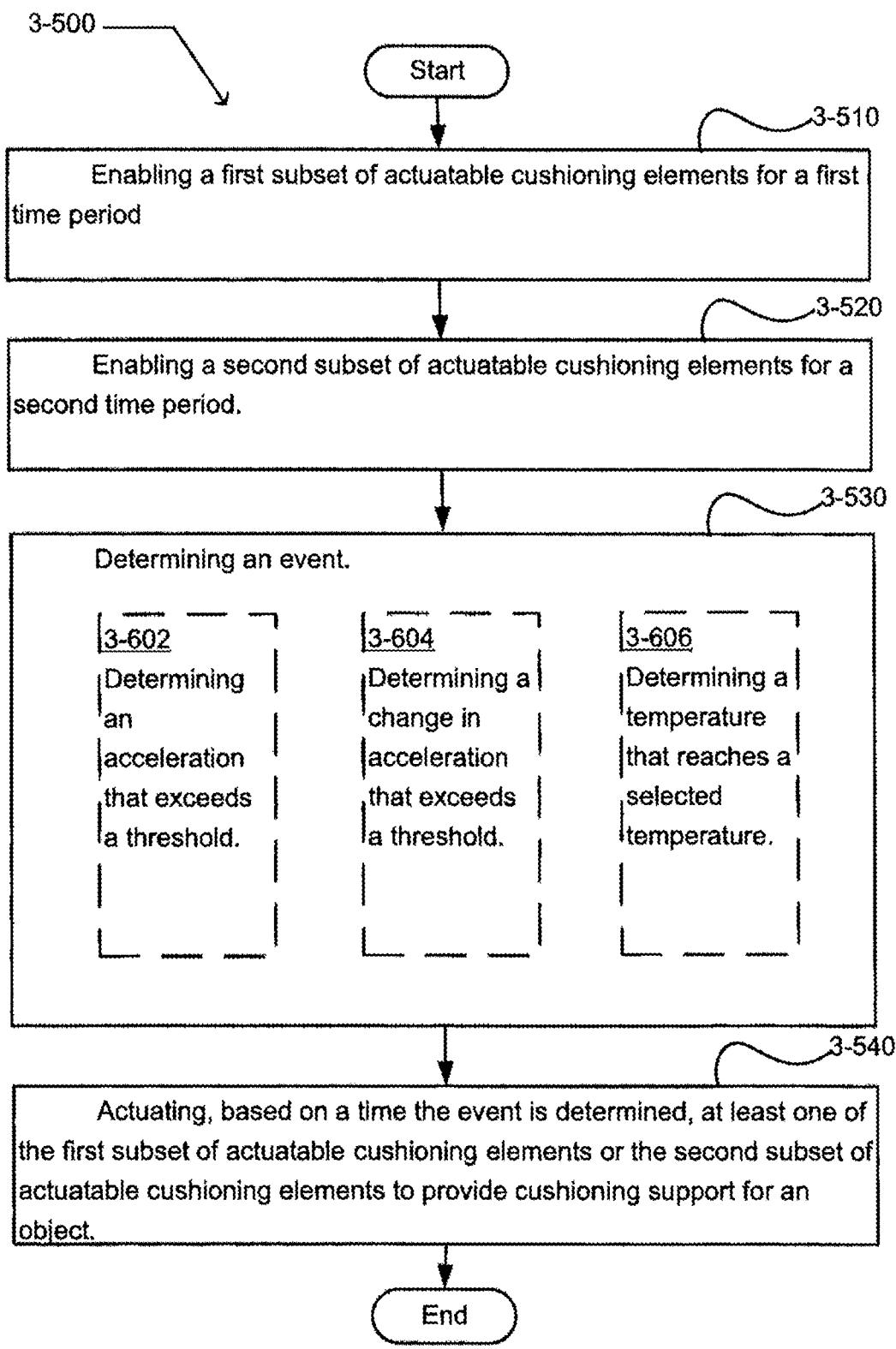
FIG. 54 illustrates an alternative embodiment of the example operational flow of FIG. 53.

FIG. 54 illustrates alternative embodiments of the example operational flow 3-500 of FIG. 53. FIG. 54 illustrates example embodiments where the determining operation 3-530 may include at least one additional operation. Additional operations may include operations 3-602, 3-604 and/or 3-606.

At the operation 3-602 an acceleration that exceeds a threshold is determined. For example, event detector 3-218 (e.g., as an accelerometer) in FIG. 50, may determine that an acceleration has exceeded a threshold, such as 0.2 G ("point two" G), where G indicates a force of gravity. When acceleration exceeds a threshold, this may indicate or suggest that a collision for the container 3-110 is likely, or that the container is in free fall or has been dropped, or other condition which may be damaging to the object inside the container 3-110. Thus, in such case, it may be desirable to increase cushioning support for the object, e.g., by actuating or expanding additional cushioning elements.

At the operation 3-604, a change in acceleration that exceeds a threshold is determined. For example, event detector 3-218 in FIG. 50 may determine that acceleration has increased from 0 G to 0.1 G ("point one" G) within a specific period of time, e.g., which may indicate a likely collision for the container.

At the operation 3-606 a temperature that reaches a selected temperature is determined. For example, event detector 3-218 (FIG. 50), e.g., as a thermometer, may determine that a temperature within the container has reached a temperature above freezing, and therefore, additional cushioning support should be provided for the perishable or frozen food items or a fragile object in the container.

Figure 55:
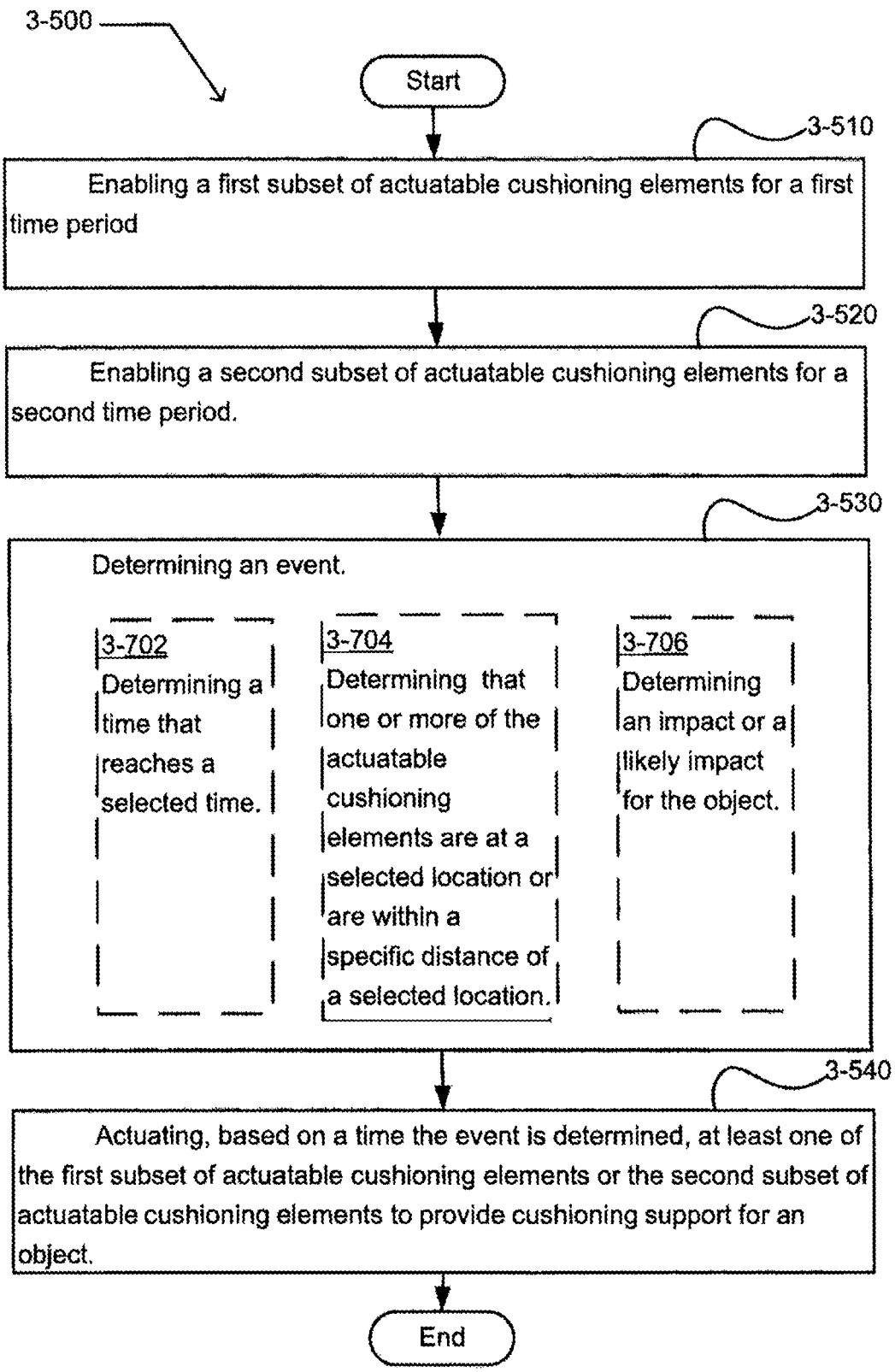
FIG. 55 illustrates an alternative embodiment of the example operational flow of FIG. 53.

FIG. 55 illustrates alternative embodiments of the example operational flow 3-500 of FIG. 53. FIG. 55 illustrates example embodiments where the determining operation 3-530 may include at least one additional operation. Additional operations may include operations 3-702, 3-704 or 3-706.

At the operation 3-702, a time that reaches a selected time is determined. For example, event detector 3-218 (FIG. 50) may determine that the time is now 12 noon. This time may indicate that additional cushioning support should be provided for the object, for example.

At the operation 3-704, it is determined that one or more of the actuatable cushioning elements are at a selected location or are within a specific distance of a selected location. For example, event detector 3-218, e.g., as a GPS receiver, may determine that packages of food have been placed on a ship, or may determine that cargo on a plane has taken off and/or departed, therefore, requiring additional cushioning support. The event detector 3-218 may determine that a specific location has been reached within 200 feet, for example. For example, when a destination is reached, one or more, or even all, of the cushioning elements may be unexpanded or deflated to allow the objects to be unpacked.

At the operation 3-706, an impact or likely impact for the object is determined. For example, event detector 3-218 (FIG. 50), e.g., as an accelerometer or other instrument, may measure a sharp increase in force or acceleration due to free fall (e.g., indicating a likely impact) or a sharp force due to an impact on the container, for example.

Figure 56:
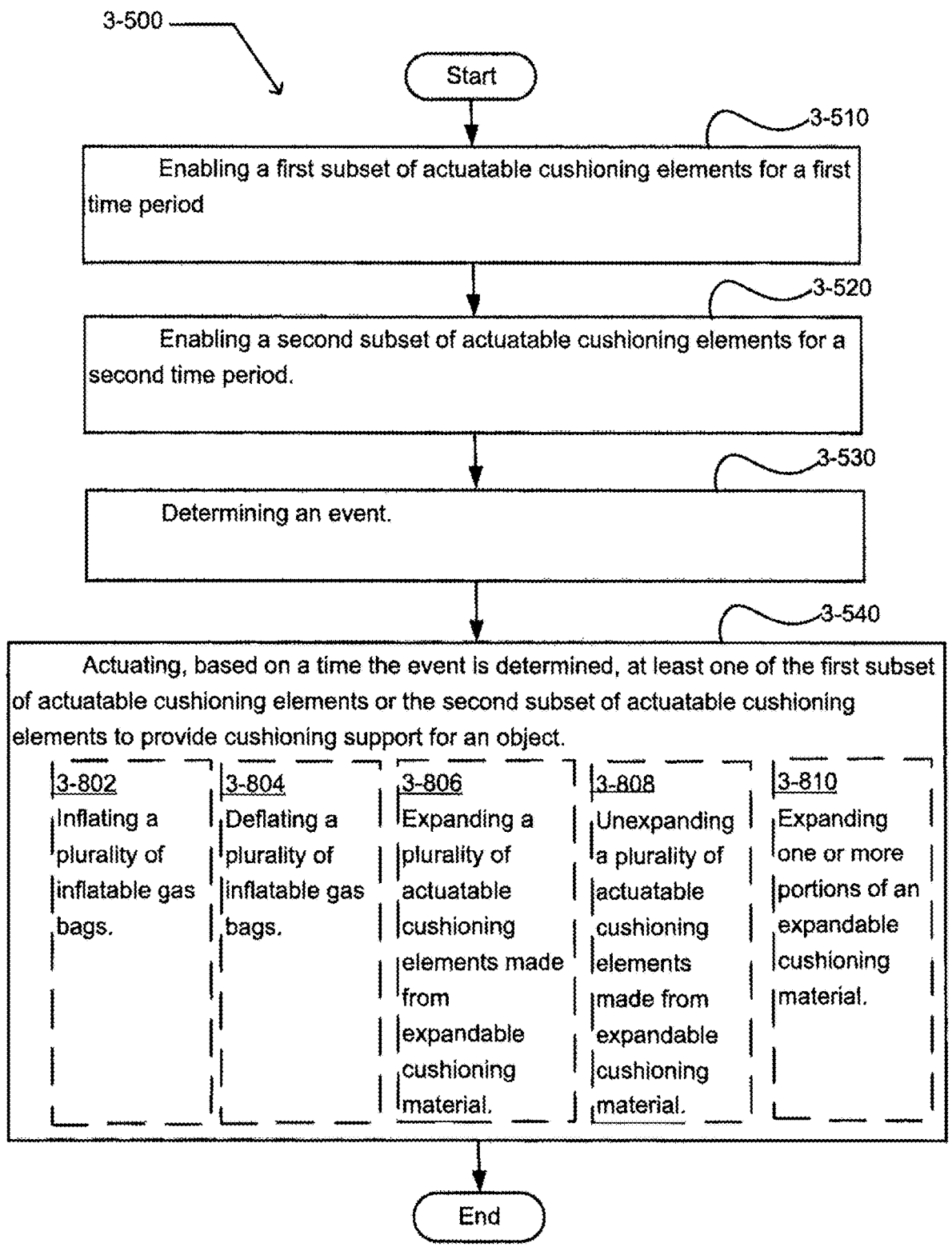
FIG. 56 illustrates an alternative embodiment of the example operational flow of FIG. 53.

FIG. 56 illustrates alternative embodiments of the example operational flow 3-500 of FIG. 53. FIG. 56 illustrates example embodiments where the actuating operation 3-540 may include at least one additional operation. Additional operations may include operations 3-802, 3-804, 3-806, 3-808 or 3-810.

At the operation 3-802, a plurality of inflatable gas bags are inflated. For example, in response to signals from element controller 3-214 (FIG. 50), stored energy reservoir 3-220 may release pressurized air or other gas to inflate a gas bag (e.g., element 3-210).

At the operation 3-804, a plurality of inflatable gas bags may be deflated. For example, previously inflated gas bags may be deflated based on control signals from element controller 3-214. For example, stored energy reservoir 3-220 in FIG. 50 may provide an exit or leakage point to allow gas to escape from the inflatable gas bag, thereby deflating the gas bag.

At the operation 3-806, a plurality of actuatable cushioning elements made from expandable cushioning material are expanded. For example, stored energy reservoir 3-220 in FIG. 50 may release electrical current, a chemical or other substance or energy to cause an expandable cushioning material to expand or increase in size.

At the operation 3-808, a plurality of actuatable cushioning elements made from expandable cushioning material are unexpanded. For example, stored energy reservoir 3-220 may release electrical current, a chemical or other substance or energy to cause an expandable cushioning material to unexpand or decrease in size.

At the operation 3-810, one or more portions of an expandable cushioning material are expanded. For example, stored energy reservoir 3-220 in FIG. 50 may release electrical current, a chemical or other substance or energy to cause one or more portions of expandable cushioning material 3-305 (FIG. 51) to expand.

Figure 57:
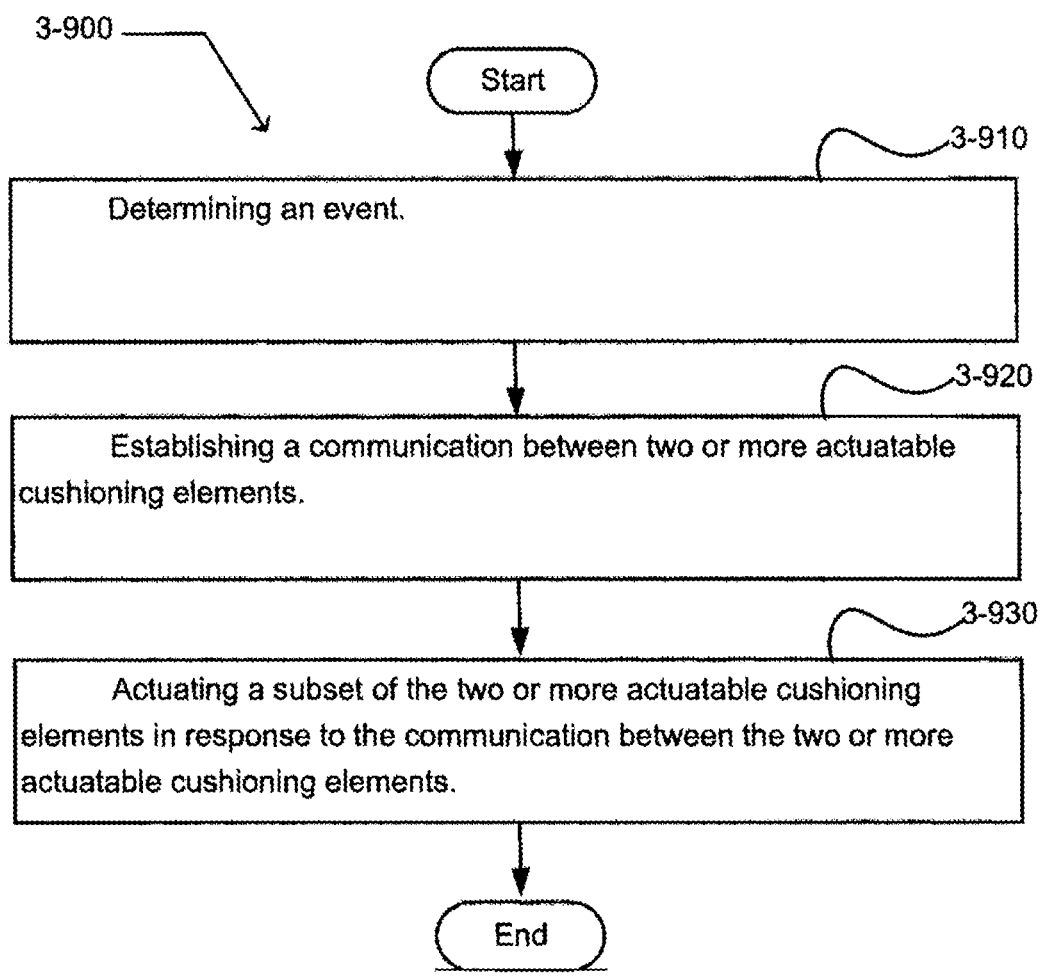
FIG. 57 illustrates an operational flow representing example operations related to actuatable cushioning elements.

FIG. 57 illustrates an operational flow 3-900 representing example operations related to actuatable cushioning elements. After a start operation, the operational flow 3-900 moves to a determining operation 3-910 where an event is determined. For example, an event detector 3-218, FIG. 50 (e.g., as an accelerometer) for actuatable cushioning element 3-118 may determine that an event has occurred, such as determining that an acceleration has exceeded a threshold, for example.

Then in establishing operation 3-920, a communication is established between two or more actuatable cushioning elements. For example, element controller 3-214 for actuatable cushioning element 3-118 may establish communication with element control logic 3-212 of another cushioning element (such as for element 3-122), via wireless transceivers 3-216 for each cushioning element. This may allow, for example, for the two or more actuatable cushioning elements (e.g., elements 3-118, 3-122) to notify each other when an event is detected, or to coordinate the actuation of one or more actuatable cushioning elements.

Then in actuating operation 3-930 a subset of the two or more actuatable cushioning elements is actuated in response to the communication between the two or more actuatable cushioning elements. For example, in response to communication via wireless transceivers 3-216 of elements 3-118 and 3-122, the stored energy reservoirs 3-220 for elements 3-118 and 3-122 may release gas or liquid to expand the actuatable cushioning elements 3-118, 3-122.

Figure 58:
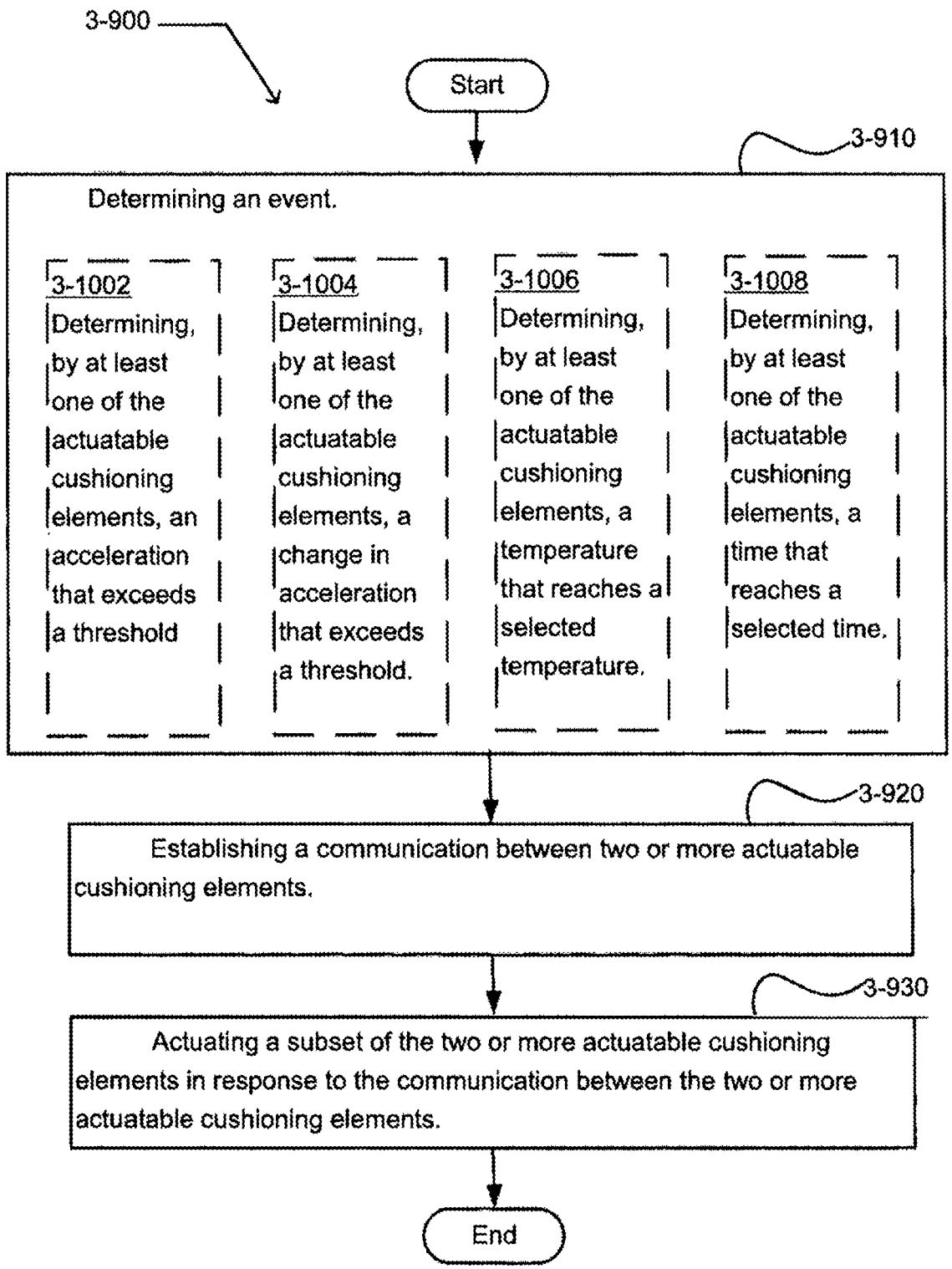
FIG. 58 illustrates an alternative embodiment of the example operational flow of FIG. 57.

FIG. 58 illustrates alternative embodiments of the example operational flow 3-900 of FIG. 57. FIG. 58 illustrates example embodiments where the determining operation 3-910 may include at least one additional operation. Additional operations may include operations 3-1002, 3-1004, 3-1006, or 3-1008.

At operation 3-1002, at least one of the actuatable cushioning elements determines an acceleration that exceeds a threshold. For example, event detector 3-218 (e.g., as an accelerometer) in FIG. 50 of an actuatable cushioning element may determine that an acceleration has exceeded a threshold, such as 0.2 G, where G indicates a force of gravity. When acceleration exceeds a threshold, this may indicate that a collision for the container 3-110 is likely, or that the container is in free fall or has been dropped, or other condition which may be damaging to the object inside the container 3-110.

At the operation 3-1004, at least one of the actuatable cushioning elements determines a change in acceleration that exceeds a threshold. For example, event detector 3-218 (e.g., as an accelerometer) in FIG. 50 of an actuatable cushioning element may determine that a change in acceleration has exceeded a threshold, such as 20%, or an increase in acceleration by X meters/S2.

At the operation 3-1006, at least one of the actuatable cushioning elements determines a temperature that reaches a selected temperature. For example, event detector 3-218 (e.g., as a thermometer) in FIG. 50 of an actuatable cushioning element may determine that the current temperature (e.g., either inside or outside the container 3-110, FIG. 49) is 32 degrees Fahrenheit.

At the operation 3-1008, at least one of the actuatable cushioning elements determines a time that reaches a selected time. For example, event detector 3-218 (e.g., as a clock or other time measuring device) in FIG. 50 of an actuatable cushioning element may determine that the current time is now 12 noon.

Figure 59:
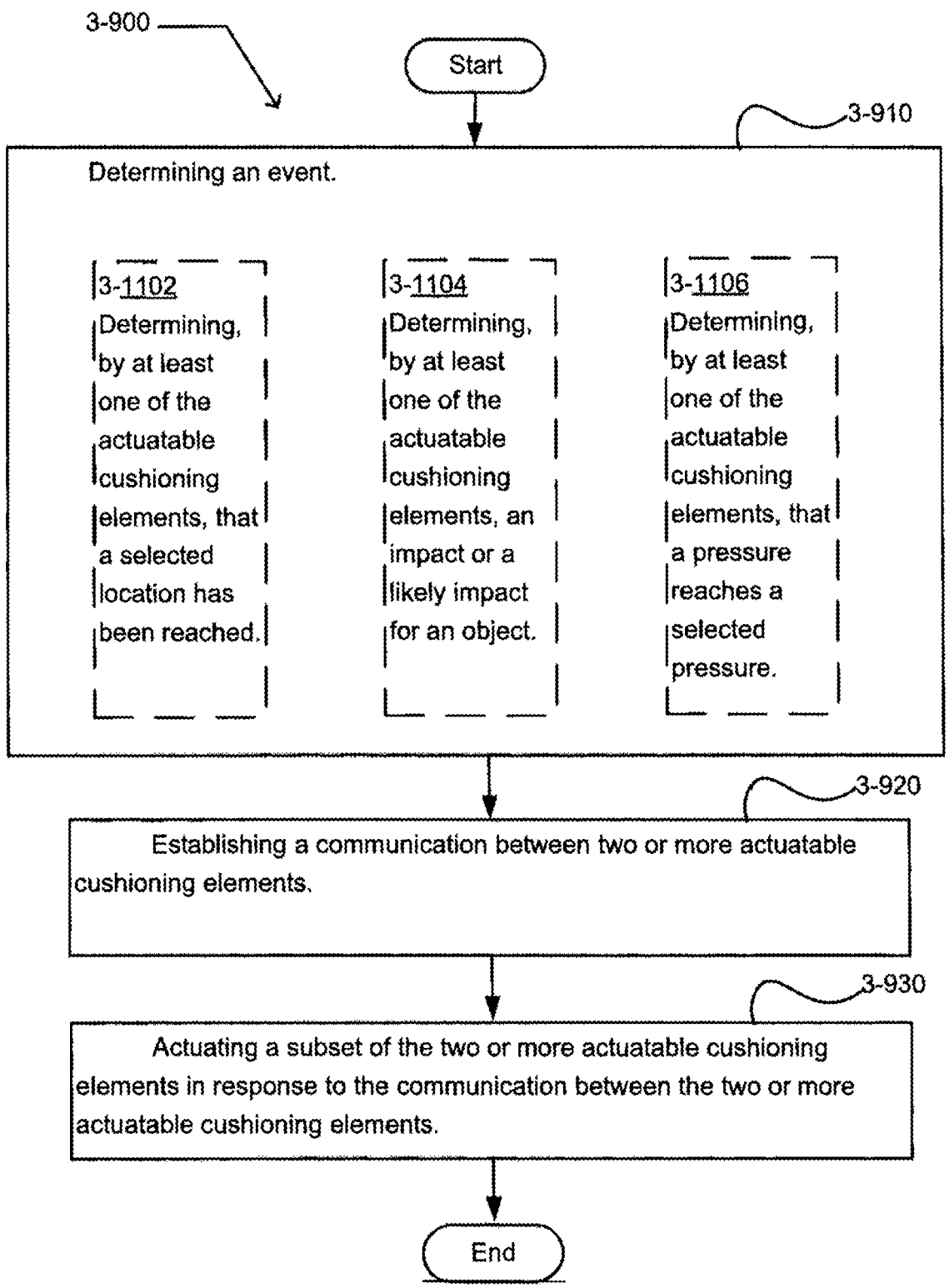
FIG. 59 illustrates an alternative embodiment of the example operational flow of FIG. 57.

FIG. 59 illustrates alternative embodiments of the example operational flow 3-900 of FIG. 57. FIG. 59 illustrates example embodiments where the determining operation 3-910 may include at least one additional operation. Additional operations may include operations 3-1102, 3-1104, or 3-1106.

At operation 3-1102, at least one of the actuatable cushioning elements determines that a selected location has been reached. For example, event detector 3-218 (e.g., as a GPS receiver) in FIG. 50 of an actuatable cushioning element may determine that a specific location has been reached, or that a specific location has been reached within a specific range (e.g., 50 feet). This may include, for example, determining that the object is approaching a specific location and is now within a specific range (e.g., 50 feet) of the specific location, or is moving away from a selected location and is within a specific range (e.g., 0.4 miles) of the selected location. These are merely some examples.

At the operation 3-1104, at least one of the actuatable cushioning elements determines an impact or a likely impact for the object. For example, event detector 3-218 (e.g., as an accelerometer) in FIG. 50 of an actuatable cushioning element may determine that a rapid acceleration or rapid change in acceleration indicates an impact or likely impact for the object.

At the operation 3-1106, at least one of the actuatable cushioning elements determines that a pressure reaches a selected pressure. For example, event detector 3-218 (e.g., as a barometer, pressure sensor, or other instrument) in FIG. 50 of an actuatable cushioning element may determine that a pressure between one or more cushioning elements has reached a selected pressure. The selected pressure may refer to pressure between actuatable cushioning elements, mechanical pressure, atmospheric pressure (e.g., such as when an object is on a plane at a certain altitude), pressure between an actuatable cushioning element and the object, or other pressure. For example, if a low pressure is detected between the object and a cushioning element, this may indicate that insufficient cushioning support is being provided to the object.

Figure 60:
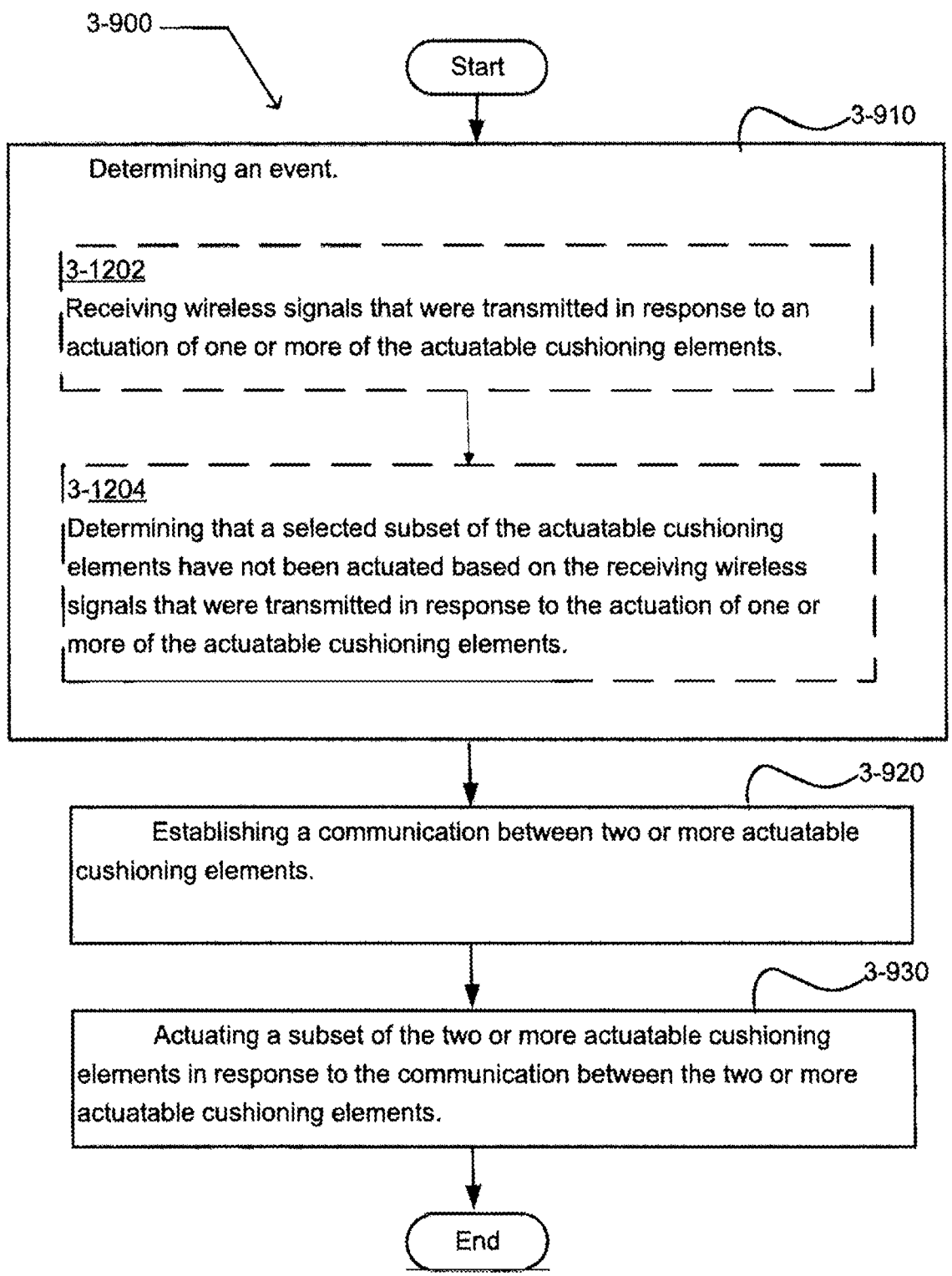
FIG. 60 illustrates an alternative embodiment of the example operational flow of FIG. 57.

FIG. 60 illustrates alternative embodiments of the example operational flow 3-900 of FIG. 57. FIG. 60 illustrates example embodiments where the determining operation 3-910 may include at least one additional operation. Additional operations may include operations 3-1202 and/or 3-1204.

At operation 3-1202, wireless signals are received that were transmitted in response to an actuation of one or more of the actuatable cushioning elements. For example, wireless transceiver 3-216 (FIG. 50) of actuatable cushioning element 3-118 (FIG. 49) may receive wireless signals transmitted by actuatable cushioning elements 126 and 130 based on the actuation of such elements. In an example embodiment, these received wireless signals may notify or provide information to actuatable cushioning element 3-118 indicating which elements are expanded or not expanded. Alternatively, wireless transceiver 3-152 of central control logic 3-150 (FIG. 49) may receive wireless signals that were transmitted in response to actuation of one or more cushioning elements.

At operation 3-1204, a selected subset of the actuatable cushioning elements are determined to have not been actuated based on the receiving wireless signals that were transmitted in response to the actuation of one or more of the actuatable cushioning elements. For example, element controller 3-214 (FIG. 50) of actuatable cushioning element 3-118 (FIG. 49) may determine, based on the received wireless signals, that 20% of the actuatable cushioning elements have not been actuated, which may indicate that cushioning support for the object is presently inadequate. Alternatively, central controller 3-154 of central control logic 3-150 (FIG. 49) may determine that a threshold number of actuatable cushioning elements have not been actuated based on received wireless signals.

Figure 61:
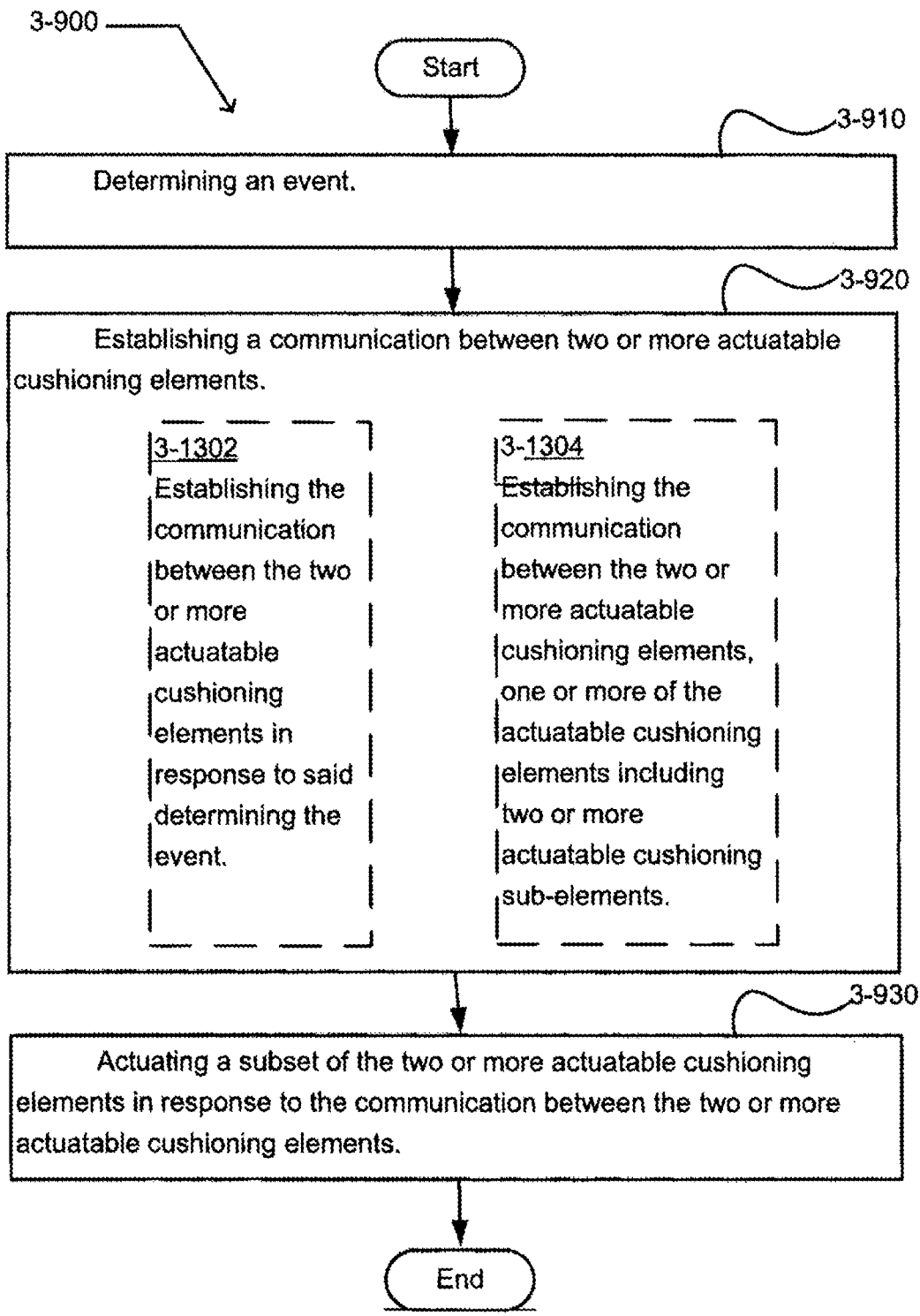
FIG. 61 illustrates an alternative embodiment of the example operational flow of FIG. 57.

FIG. 61 illustrates alternative embodiments of the example operational flow 3-900 of FIG. 57. FIG. 61 illustrates example embodiments where the establishing operation 3-920 may include at least one additional operation. Additional operations may include operations 3-1302 or 3-1304.

At operation 3-1302, the communication is established between the two or more actuatable cushioning elements in response to said determining the event. For example, a wireless transceiver 3-216 (FIG. 50) of actuatable cushioning element 3-118 (FIG. 49) may establish a wireless communication with a wireless transceiver 3-216 of actuatable cushioning element 120 (FIG. 49).

At operation 3-1304, the communication is established between the two or more actuatable cushioning elements, one or more of the actuatable cushioning elements including two or more actuatable cushioning sub-elements. For example, a wireless transceiver 3-216 (FIG. 50) of actuatable cushioning element 3-118 (FIG. 49) may establish a wireless communication with a wireless transceiver 3-216 of actuatable cushioning element 120 (FIG. 49). In this example embodiment, actuatable cushioning element 3-118 (FIG. 49), for example, may include three actuatable sub-elements, such as actuatable sub-elements 3-410, 3-415 and 3-420 (FIG. 52).

Figure 62:
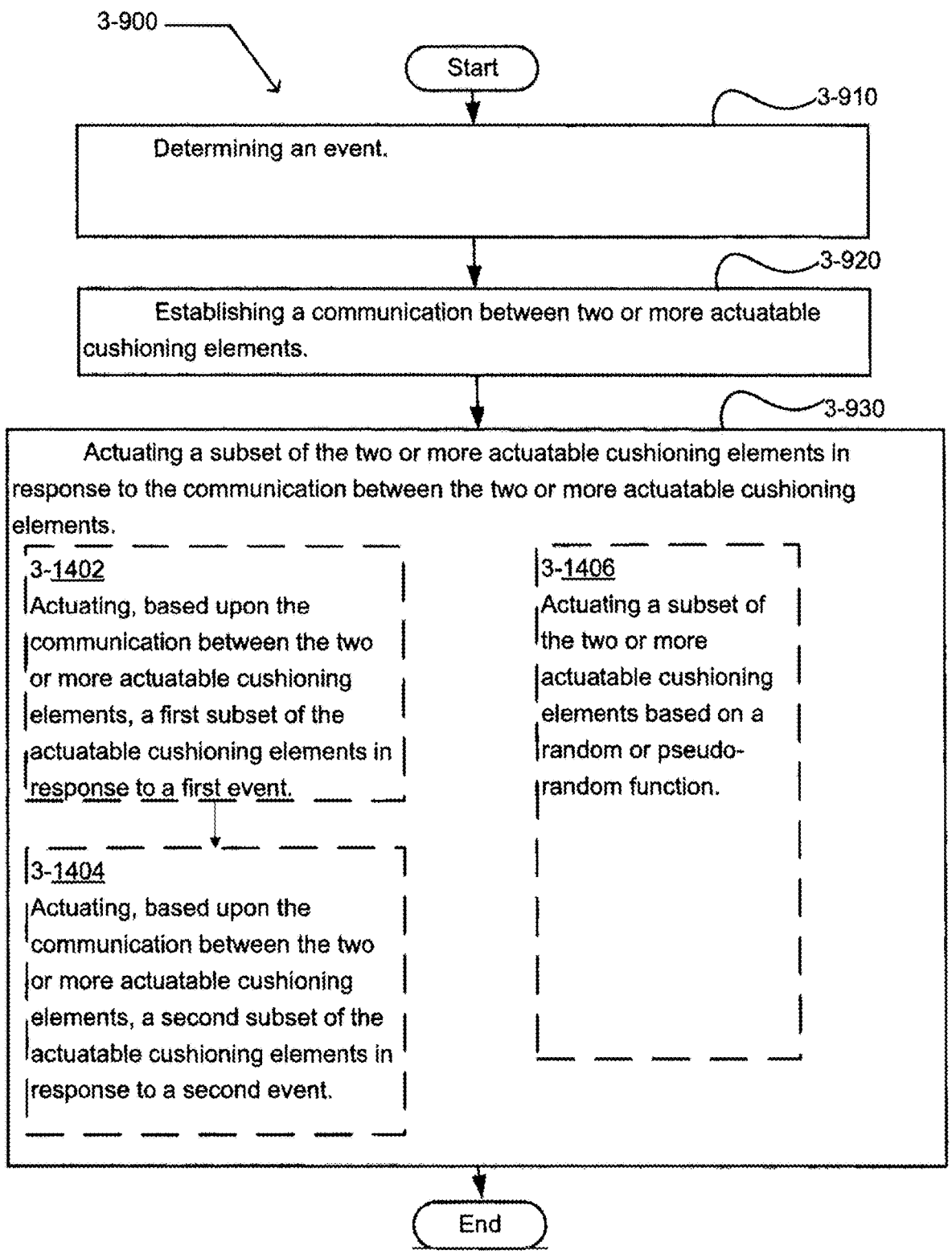
FIG. 62 illustrates an alternative embodiment of the example operational flow of FIG. 57.

FIG. 62 illustrates alternative embodiments of the example operational flow 3-900 of FIG. 57. FIG. 62 illustrates example embodiments where the actuating operation 3-930 may include at least one additional operation. Additional operations may include operations 3-1402, 3-1404 and/or 3-1406.

At operation 3-1402, a first subset of the actuatable cushioning elements is actuated based upon the communication between the two or more actuatable cushioning elements in response to a first event. For example, actuatable cushioning elements 3-114, 3-118 and 3-128 may be expanded to provide cushioning support based on the communication in response to detecting that the container 3-110 has been dropped (e.g., an event where acceleration may exceed a threshold). The actuatable cushioning elements 3-114, 3-118 and 3-128 may be expanded based on control signals from element controller 3-214 (FIG. 50) for each element, causing a stored energy reservoir 3-220 (FIG. 50) for each of the elements 3-114, 3-118 and 3-128 to release gas or other material to expand or inflate the actuatable element, for example.

At operation 3-1404, a second subset of the actuatable cushioning elements is actuated based upon the communication between the two or more actuatable cushioning elements in response to a second event. For example, in response to one (or more) of the actuatable cushioning elements detecting that a specific location (e.g., destination location) has been reached, all of the currently expanded cushioning elements may be unexpanded, e.g., to allow the object to be unpacked more easily from the container 3-110. For example, an element controller 3-214 (FIG. 50) for each expanded actuatable cushioning element may release gas from the element to allow the element to unexpand or deflate.

At operation 3-1406, a subset of the two or more actuatable cushioning elements is actuated based on a random or pseudo-random function. For example, one or more of the actuatable cushioning elements may actuate in a random or pseudo-random fashion. For example, each actuatable cushioning element may have a 10% probability of actuating, such as for a given time period or in response to an event. Thus, statistically, for example, 10% of the actuatable cushioning elements may be actuatable or enabled for a specific period of time, or 10% may actuate in response to each event. This may allow, for example, a group or subset of actuatable cushioning elements to be actuated or to be actuatable for each of up to 10 time periods or for each of up to 10 events. This is merely an example, and other random or pseudo-random functions may be used.

Figure 63:
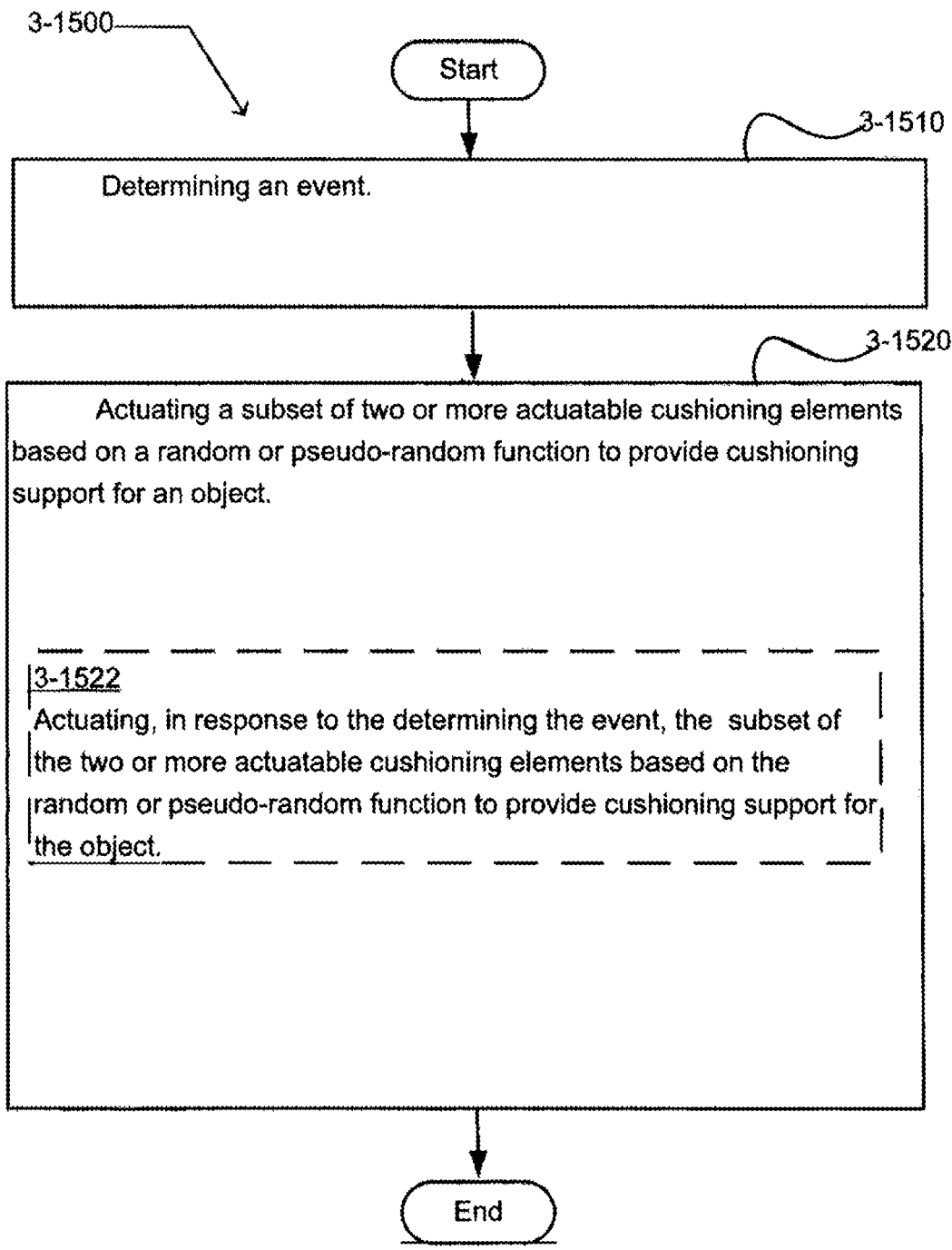
FIG. 63 illustrates an operational flow representing example operations related to actuatable cushioning elements.

FIG. 63 illustrates an operational flow 3-1500 representing example operations related to actuatable cushioning elements. After a start operation, the operational flow 3-1500 moves to a determining operation 3-1510 where an event is determined. For example, event detector 3-218 (FIG. 50) of an actuatable cushioning element or event detector 3-158 (FIG. 49) may determine that a specific location has been reached, or detect an acceleration that exceeds a threshold, or other event.

Then, at actuating operation 3-1520, a subset of two or more actuatable cushioning elements is actuated based on a random or a pseudo-random function to provide cushioning support for an object. For example, one or more of the actuatable cushioning elements may actuate in a random fashion in response to signals provided by an element controller 3-214. For example, each actuatable cushioning element may have a 10% probability of actuating, such as for a given time period or in response to an event. Thus, statistically, for example, 10% of the actuatable cushioning elements may be actuatable or enabled for a specific period of time, or 10% may actuate in response to each event. This may allow, for example, a group or subset of actuatable cushioning elements to be actuated or to be actuatable for each of up to 10 time periods or for each of up to 10 events. This is merely an example, and other random or pseudo-random functions may be used.

FIG. 63 also illustrates alternative embodiments of the example operational flow 3-1500, where the actuating operation 3-1520 may include at least one additional operation. Additional operations may include at least operation 3-1522.

At operation 3-1522, the subset of the two or more actuatable cushioning elements is actuated, in response to the determining the event, based on the random or the pseudo-random function to provide cushioning support for the object. An element controller 3-214 for each actuatable cushioning element may actuate the element based on a random or pseudo-random function. Thus, for example, approximately 10% of the actuatable cushioning elements may actuate in response to each event. This may allow a group of actuatable cushioning elements to respond for or in response to a series of events.

Figure 64:
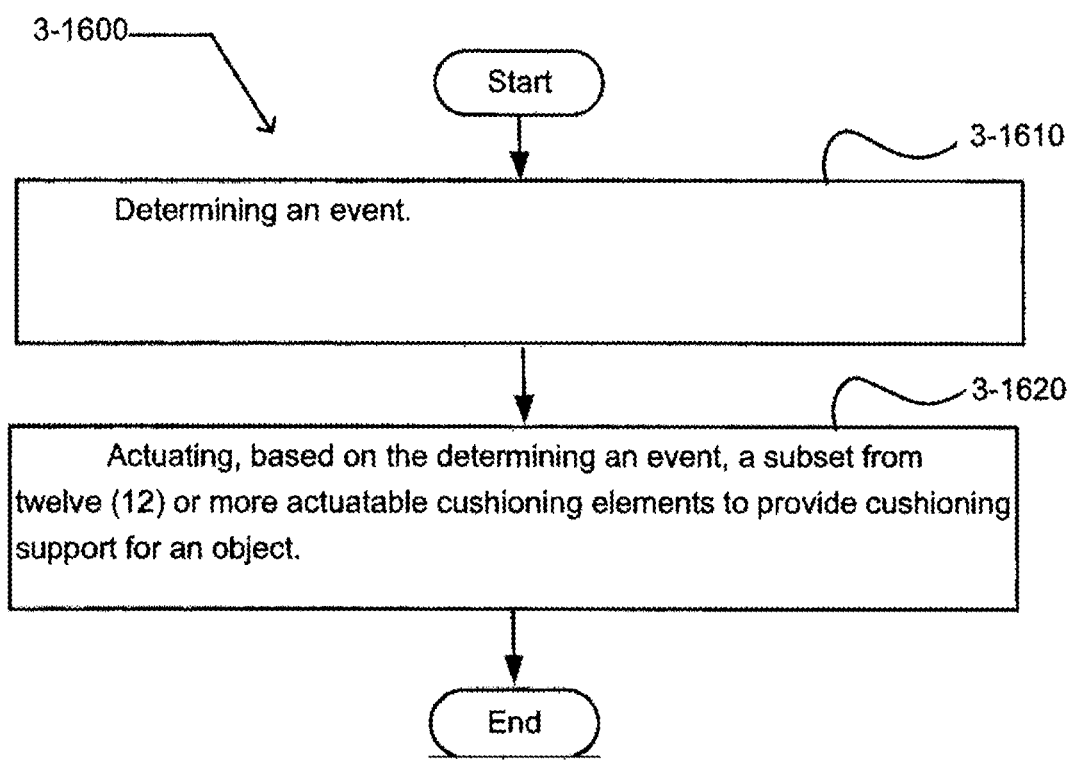
FIG. 64 illustrates an operational flow representing example operations related to actuatable cushioning elements.

FIG. 64 illustrates an operational flow 3-1600 representing example operations related to actuatable cushioning elements. After a start operation, the operational flow 3-1600 moves to a determining operation 3-1610 where an event is determined. For example, event detector 3-158 of central control logic 3-150 (FIG. 49) may determine that a specific location has been reached, or detect an acceleration that exceeds a threshold, or other event.

At actuating operation 3-1620, a subset from 12 or more actuatable cushioning elements is actuated, based on the determining an event, to provide cushioning support for an object. For example, central controller 3-154 (FIG. 49), e.g., in response to event detector 3-158 determining or detecting an event, may transmit signals via transceiver 3-152 to 12 or more actuatable cushioning elements, which may cause a stored energy reservoir 3-220 at each of the elements to actuate the associated element.

Figure 65:
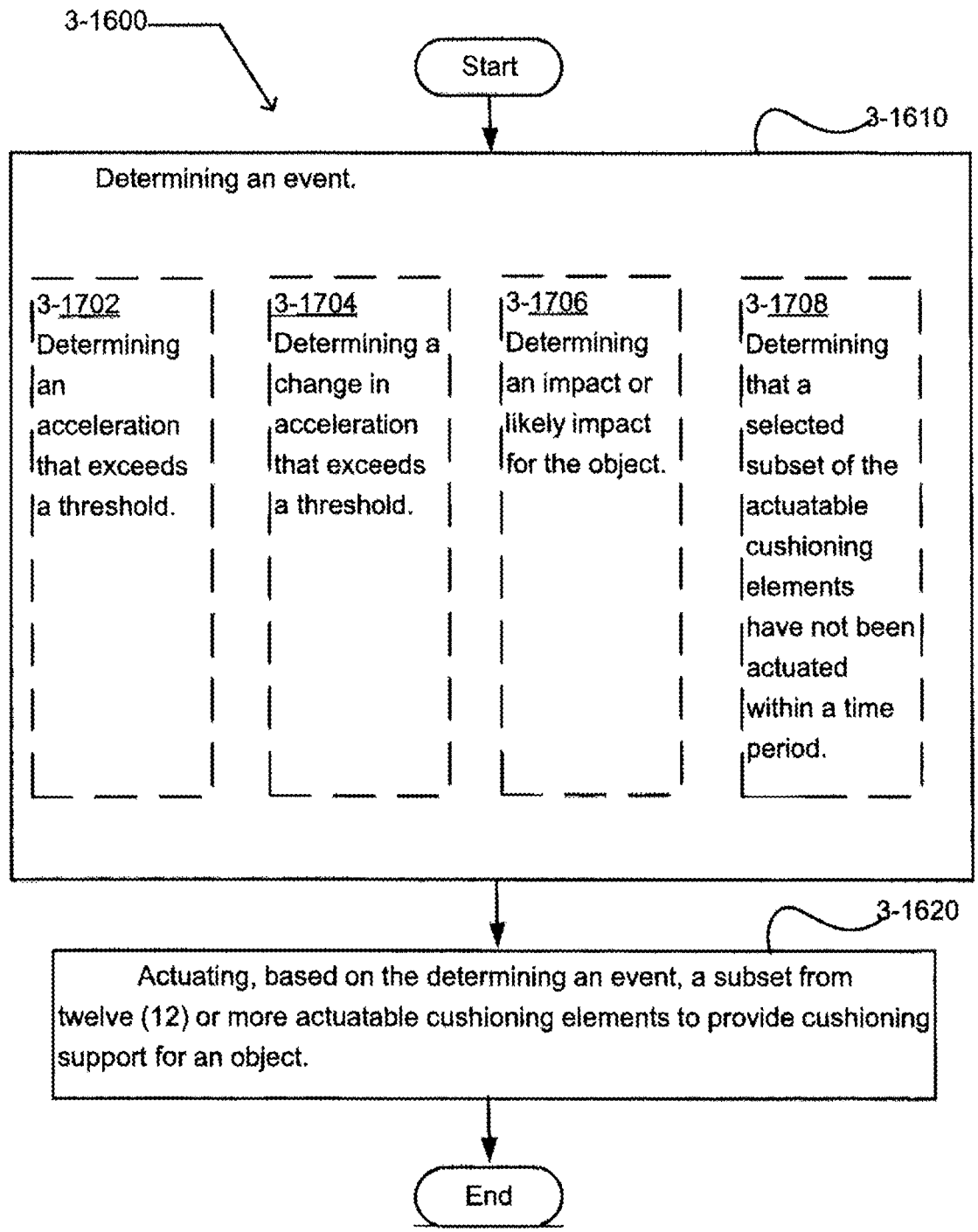
FIG. 65 illustrates an alternative embodiment of the example operational flow of FIG. 64.

FIG. 65 illustrates alternative embodiments of the example operational flow 3-1600 of FIG. 64. FIG. 65 illustrates example embodiments where the determining operation 3-1610 may include at least one additional operation. Additional operations may include operations 3-1702, 3-1704, 3-1706 or 3-1708.

At operation 3-1702, an acceleration that exceeds a threshold is determined. For example, event detector 3-158 (e.g., as an accelerometer) in FIG. 49, may determine that an acceleration has exceeded a threshold, such as 0.4 G, where G indicates a force of gravity. When acceleration exceeds a threshold, this may indicate or suggest that a collision for the container 3-110 is likely, or that the container is in free fall or has been dropped, or other condition which may be damaging to the object inside the container 3-110. Thus, in such case, it may be desirable to increase cushioning support for the object, e.g., by actuating or expanding additional cushioning elements.

At the operation 3-1704, a change in acceleration that exceeds a threshold is determined. For example, event detector 3-158 (FIG. 49) may determine that acceleration has increased from 0 G to 0.3 G within a specific period of time, e.g., which may indicate a likely collision for the container 3-110.

At the operation 3-1706, an impact or likely impact for the object is determined. For example, event detector 3-158 (FIG. 49), e.g., as an accelerometer or other instrument, may measure a sharp increase in force or acceleration due to free fall (e.g., indicating a likely impact) or a sharp force due to an impact on the container, for example.

At the operation 3-1708, it is determined that a selected subset of the actuatable cushioning elements have not been actuated within a time period. For example, central controller 3-154 of central control logic 3-150 (FIG. 49) may determine that less than 20% of the actuatable cushioning elements in container 3-110 have been actuated over the last 2 hours, e.g., based on signals received from the actuatable cushioning elements. This may indicate, for example, that cushioning support for the object is inadequate.

Figure 66:
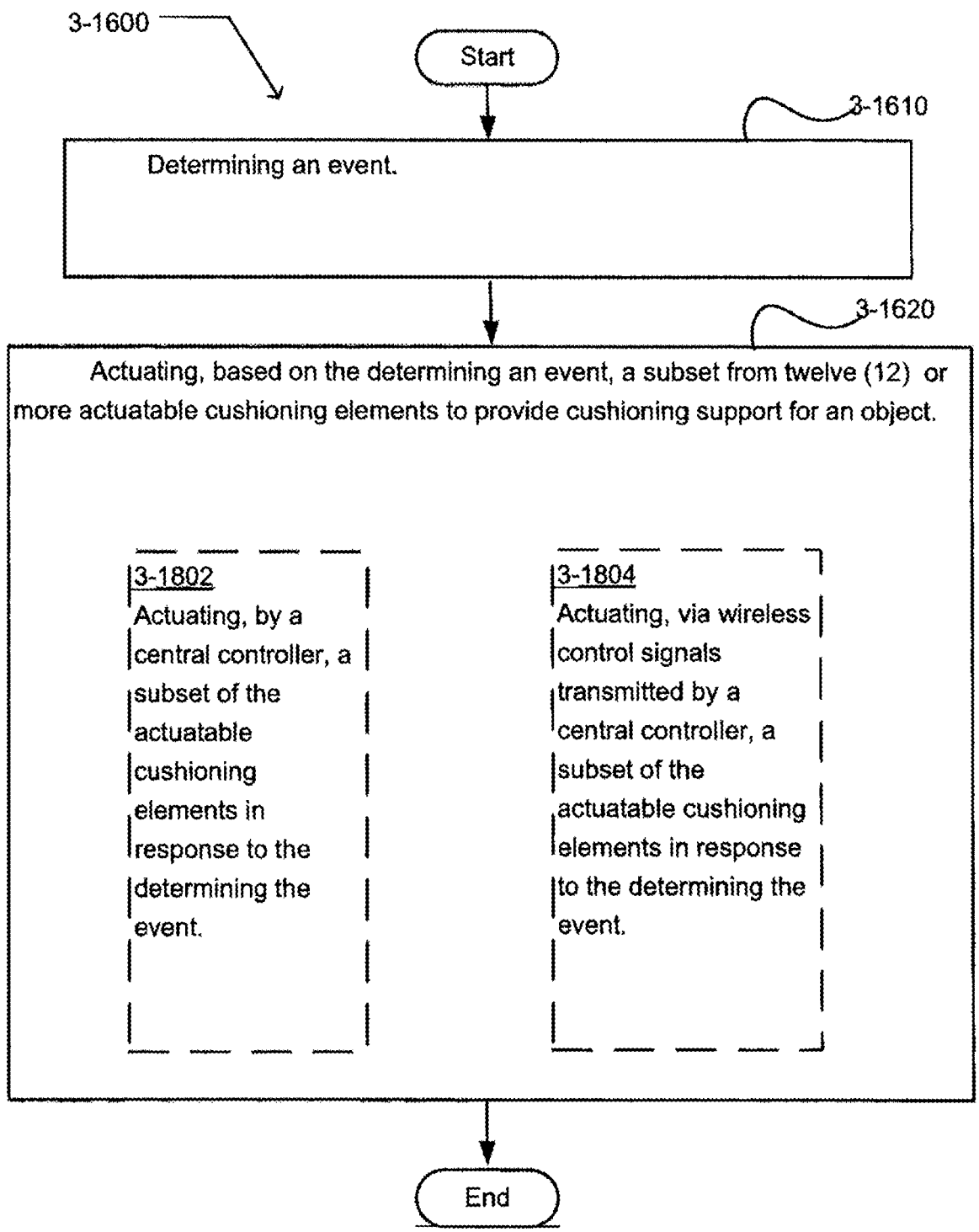
FIG. 66 illustrates an alternative embodiment of the example operational flow of FIG. 64.

FIG. 66 illustrates alternative embodiments of the example operational flow 3-1600 of FIG. 64. FIG. 66 illustrates example embodiments where the actuating operation 3-1620 may include at least one additional operation. Additional operations may include operations 3-1802 or 3-1804.

At operation 3-1802, a central controller actuates a subset of the actuatable cushioning elements in response to the determining the event. For example, central controller 3-154 (FIG. 49), e.g., in response to event detector 3-158 determining or detecting an event, may transmit signals via transceiver 3-152 to a group of actuatable cushioning elements, which may cause a stored energy reservoir 3-220 at each of the elements to actuate the associated element.

At operation 3-1804, a central controller actuates, via transmission of wireless control signals, a subset of the actuatable cushioning elements in response to the determining the event. For example, central controller 3-154 (FIG. 49), e.g., in response to event detector 3-158 determining or detecting an event, may transmit wireless control signals via wireless transceiver 3-152 to one or more actuatable cushioning elements, which may cause a stored energy reservoir 3-220 at the one or more cushioning elements to actuate the associated element.

Figure 67:
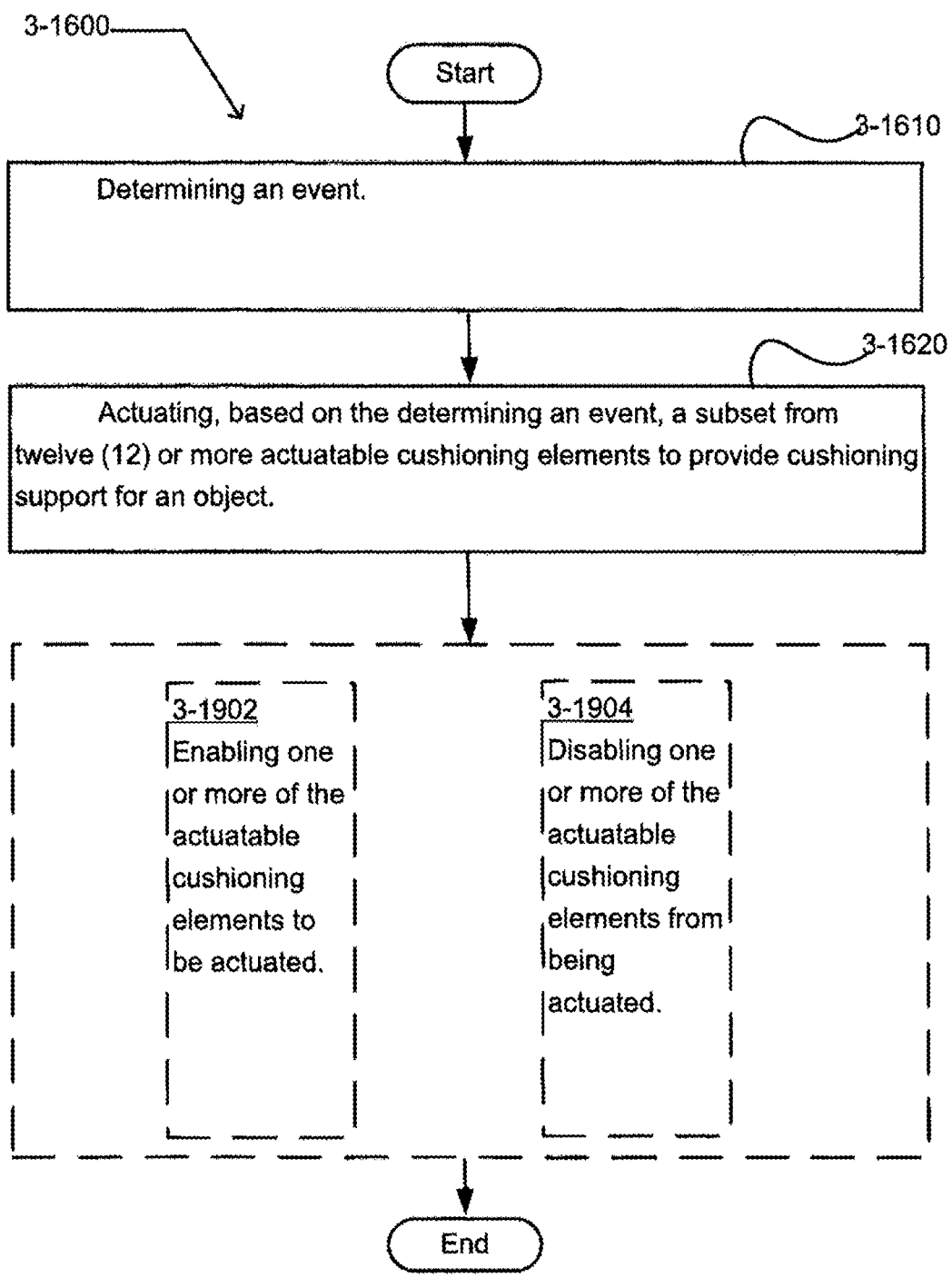
FIG. 67 illustrates an alternative embodiment of the example operational flow of FIG. 64.

FIG. 67 illustrates alternative embodiments of the example operational flow 3-1600 of FIG. 64. FIG. 67 illustrates example embodiments that may include at least one additional operation. Additional operations may include operations 3-1902 or 3-1904.

At operation 3-1902, one or more of the actuatable cushioning elements are enabled to be actuated. For example, central controller 3-154 may transmit signals via wireless transceiver 3-152 to enable actuatable cushioning elements 116 and 118 to be actuated. This may allow, for example, for cushioning elements 116 and 118 to be actuated, e.g., in response to an event.

At operation 3-1904, one or more of the actuatable cushioning elements are disabled from being actuated. For example, central controller 3-154 may transmit signals via wireless transceiver 3-152 to disable actuatable cushioning elements 3-116 and 3-118 from being actuated. This may prevent, for example, for cushioning elements 3-116 and 3-118 from being actuated, e.g., in response to an event.

FIG. 68 illustrates an example apparatus 3-2000 in which embodiments may be implemented. The apparatus 3-2000 may include at least two actuatable cushioning elements 3-2010 configured to provide cushioning support for an object. For example, a system 3-100 (FIG. 49) may include actuatable cushioning elements 3-116 and 3-118.

The at least two actuatable cushioning elements 3-2010 may include a first subset of actuatable cushioning elements 3-2012 enabled to actuate in response to an event during a first time period. For example, actuatable cushioning element 3-116 may be enabled to actuate during a first hour that container 3-110 is in-transit to a destination location.

The at least two actuatable cushioning elements 3-2010 may include a second subset of actuatable cushioning elements 3-2014 enabled to actuate in response to an event during a second time period. For example, actuatable cushioning element 3-118 may be enabled to actuate during a second hour that container 3-110 is in-transit to a destination location.

FIG. 69 illustrates alternative embodiments of the example apparatus 3-2000 of FIG. 68. FIG. 69 illustrates example embodiments that may include at least one additional implementation. Additional implementations may include implementations 3-2102, 3-2104, or 3-2106.

At implementation 3-2102, the actuatable cushioning elements are 2.5 cm in width or less in an unexpanded state. For example, actuatable cushioning elements 3-116 and 3-118 may be 2.0 cm in width in an unexpanded state.

At implementation 3-2104, the actuatable cushioning elements are 2.5 cm in width or more in an unexpanded state. For example, actuatable cushioning elements 3-116 and 3-118 may be 3.7 cm in width in an unexpanded state.

At implementation 3-2106, the actuatable cushioning elements are 8 cm in width or less in an unexpanded state. For example, actuatable cushioning elements 3-116 and 3-118 may be 4.6 cm in width in an unexpanded state.

Figure 70A:
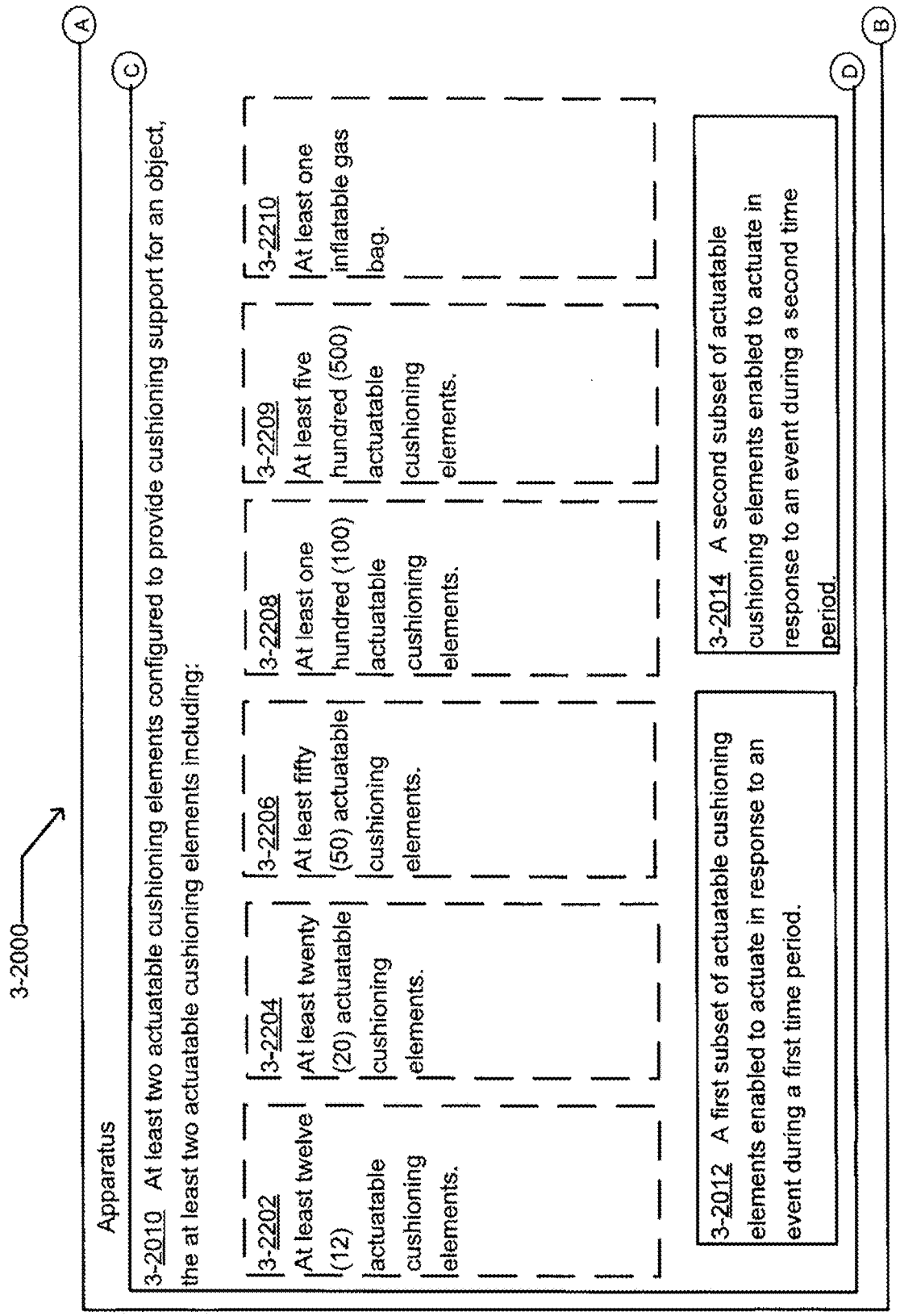

FIGS. 70A and 70B together illustrate an alternative embodiment of the example apparatus 3-2000 of FIG. 68. FIGS. 70A and 70B together illustrate example embodiments that may include at least one additional implementation. Additional implementations may include implementations 3-2202, 3-2204, 3-2206, 3-2208, 3-2209, 3-2210, 3-2212, 3-2214, 3-2216, 3-2217 and/or 3-2219.

At implementation 3-2202, the at least two actuatable cushioning elements include at least 12 actuatable cushioning elements, such as 14 actuatable cushioning elements, for example.

At implementation 3-2204, the at least two actuatable cushioning elements include at least 20 actuatable cushioning elements, such as 25 actuatable cushioning elements, for example.

At implementation 3-2206, the at least two actuatable cushioning elements include at least 50 actuatable cushioning elements, such as 60 actuatable cushioning elements, for example.

At implementation 3-2208, the at least two actuatable cushioning elements include at least 100 actuatable cushioning elements, such as 125 actuatable cushioning elements, for example.

At implementation 3-2209, the at least two actuatable cushioning elements include at least 500 actuatable cushioning elements, such as 525 actuatable cushioning elements, for example.

At implementation 3-2210, the at least two actuatable cushioning elements include at least one inflatable gas bag, such as an inflatable air bag, for example.

At implementation 3-2212, the at least two actuatable cushioning elements include at least one actuatable cushioning element of an expandable cushioning material, such as an expandable cushioning material 3-305 (FIG. 51), for example.

At implementation 3-2214, the at least two actuatable cushioning elements include a plurality actuatable portions of an expandable cushioning material, such as portions 3-310, 3-315, 3-320, 3-325, and/or 3-330 of expandable cushioning material 3-305 (FIG. 51), for example.

At implementation 3-2216, the at least two actuatable cushioning elements include at least two re-usable actuatable cushioning elements 3-2217, and/or at least two disposable actuatable cushioning elements 3-2219. For example, the disposable actuatable cushioning elements may be one-time use elements, whereas the re-usable actuatable cushioning elements may be repeatedly expanded, unexpanded, and re-expanded.

FIG. 71 illustrates a partial view of an example computer program product 3-2300 that includes a computer program 3-2304 for executing a computer process on a computing device. An embodiment of the example computer program product 3-2300 is provided using a signal bearing medium 3-2302, and may include one or more instructions for enabling a first subset of actuatable cushioning elements for a first time period, the signal bearing medium also bearing one or more instructions for enabling a second subset of actuatable cushioning elements for a second time period, the signal bearing medium also bearing one or more instructions for determining an event, and the signal bearing medium also bearing one or more instructions for actuating, based on a time the event is determined, at least one of the first subset actuatable cushioning elements and the second subset of actuatable cushioning elements to provide cushioning support for an object. The one or more instructions may be, for example, computer executable and/or logic-implemented instructions. In one implementation, the signal-bearing medium 3-2302 may include a computer-readable medium 3-2306. In one implementation, the signal bearing medium 3-2302 may include a recordable medium 3-2308. In one implementation, the signal bearing medium 3-2302 may include a communications medium 3-2310.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality.
Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Figure 72:
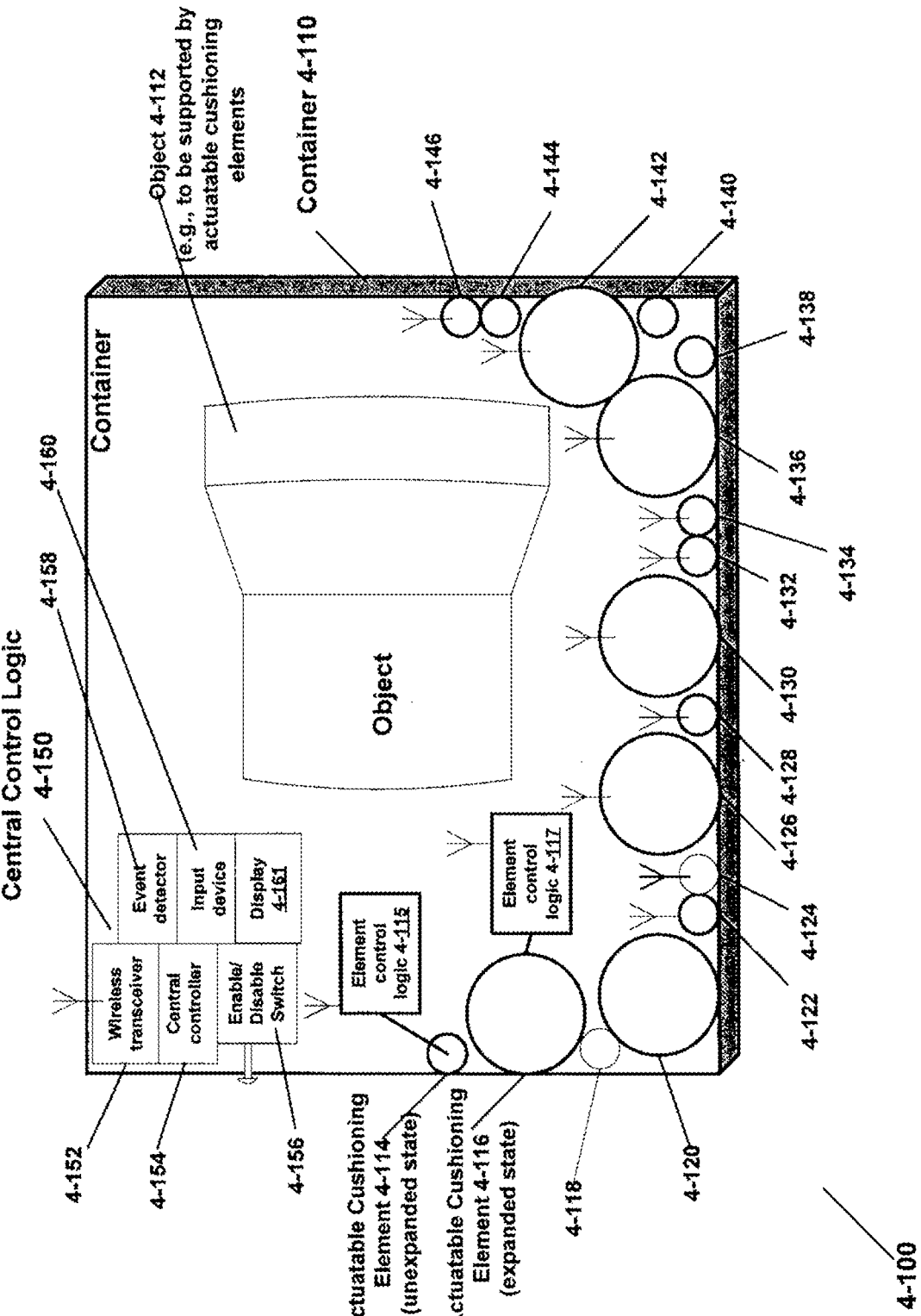
FIG. 72 illustrates an example system in which embodiments may be implemented.

FIG. 72 illustrates an example system 4-100 in which embodiments may be implemented. System 4-100 may include, for example, a container 4-110, which may be any type of container, such as a box, a container for shipping cargo on a vehicle, boat, plane, train or other vehicle, a container for shipping or storing small or large items, a container for shipping fragile items, or any other container. Container 4-110 may be made from any suitable material, such as cardboard, plastic, steel, etc., as a few example materials, but any type of material may be used.

System 4-100 may also include one or more actuatable cushioning elements provided within container 4-110, such as actuatable cushioning elements 4-114, 4-116, 4-118, 4-120, 4-122, 4-124, 4-126, 4-128, 4-130, 4-132, 4-134, 4-136, 4-138, 4-140, 4-142, 4-144, 4-146, etc. The actuatable cushioning elements may provide cushioning support for an item or object, such as object 4-112, for example. Object 4-112 may be any type of object, such as electronics, books, food items, a vehicle (e.g., automobile, boat, train, plane), cargo, fragile or delicate or breakable items which may be in need of cushioning support, people, animals, other organisms, or any other type of object. These are just a few examples of an object which may be supported by actuatable cushioning elements, and the various embodiments are not limited thereto. Actuatable cushioning elements 4-114, 4-116, etc. may spread a force or interaction of an object over a period of time or over an area within container 4-110, which may, at least in some cases, decrease potential impact and/or damage to the object, for example.

For example, one or more actuatable cushioning elements may be actuated (e.g., expanded) in response to an event to protect an object or passenger from damage or harm or collision effects. Also, for example, one or more actuatable cushioning elements may be actuated based upon one or more sensed values in accordance with a model of one or more objects to be protected, the actuatable cushioning elements, and the environment. Also, for example, one or more actuatable cushioning elements may be actuated over a series of events or in response to a series of events to provide a coordinated protection of one or more objects or passengers in a vehicle from harm, damage or other effects from a collision, acceleration or other event. The protection of one or more objects may be based upon a harm function of the actual or predicted damage to subsets or portions of such objects, such as a maximum value, a weighted value, a cumulative value, or other such functions. The harm function may include damage to the environment (e.g., pedestrians or other vehicles in a vehicular collision, higher valued objects in the vicinity of a container collision, etc.) as well as to the one or more nominally protected objects. These are merely a few illustrative examples and the disclosure is not limited thereto.

Additional details and example embodiments are described herein.

Actuatable cushioning elements 4-114, 4-116, etc. may be in either an expanded state, such as shown for actuatable cushioning element 4-116, or an unexpanded state such as for actuatable cushioning element 4-114, for example. Or an actuatable cushioning element may also be partially expanded or partially unexpanded, for example.

In an example embodiment, some types of actuatable cushioning elements may be provided in an expanded state (e.g., inflated) for a limited period of time. For example, one or more actuatable cushioning elements may be actuated (e.g., expanded or unexpanded) in response to an event. In an example embodiment, a subset of actuatable cushioning elements may be actuated in response to an event. In another example embodiment, one or more actuatable cushioning elements may be expanded just prior to shipment and may remain in an expanded state for an extended period of time, or for a duration of transport, for example. In an example embodiment, an actuatable cushioning element may provide greater cushioning support for an object while in an expanded state, as compared to an unexpanded state (e.g., due to a greater volume of flexible or cushioning material or matter to absorb an impact). This is merely an example embodiment, and the disclosure is not limited thereto.

One or more of the actuatable cushioning elements may be actuated, which may include putting an actuatable cushioning element into motion or action. Actuation may include, for example, expanding an actuatable cushioning element from an unexpanded state to an expanded state (e.g., causing an element to expand or increase in size), or unexpanding an actuatable cushioning element from an expanded state to an unexpanded state (e.g., causing an element to shrink or reduce in size or contract), as examples. Actuation may include, for example, causing an airbag or other entity to inflate or deflate. Actuation may include, for example, changing or controlling the shape of an actuatable cushioning element. Actuation may also include partial motions or partial actions, such as partially expanding or partially unexpanding an actuatable cushioning element, for example.

Actuatable cushioning elements 4-114, 4-116, etc. may include any type of expandable element. For example, actuatable cushioning elements 4-114, 4-116, etc., may include expandable gas bags which may expand based on the application of pressurized gas to the bag similar to the airbags used in automobiles and other vehicles. Actuatable cushioning elements 4-114, 4-116, etc. may alternatively include a fluid-expandable bag or entity that may be expanded by fluid. For example, actuatable cushioning elements 4-114, 4-116, etc., may include fluid-actuatable elements, where fluid may be sourced from one or more fluid reservoirs, e.g., via a valving actuation. The fluid reservoirs may, for example, cause the fluid actuatable elements to actuate (e.g., expand and/or unexpand/contract) by causing fluid to flow into or out of the fluid-actuatable elements. For example, actuatable cushioning elements 4-114, 4-116, etc., may include magnetic field-actuatable elements, where magnetic field may be sourced from one or more electric energy sources, e.g., via a capacitor, an inductor, a flux generator, or other means. The electric energy sources may, for example, cause the magnetic field actuatable elements to actuate (e.g., expand and/or unexpand/contract) by causing magnetic fields to apply force to the fluid-actuatable elements. Actuatable cushioning elements 4-114, 4-116, etc. alternatively may include an expandable cushioning material which may expand (or unexpand), for example, through the application of a chemical, gas, liquid, electrical energy, reaction force or other energy or material. Electrical energy may, for example be used to expand (or unexpand) or shape an expandable cushioning material by means of an electric motor, a linear electromagnetic motor, a piezoelectric actuator, or other means. Reaction force may, for example be used to expand (or unexpand) or shape an expandable cushioning material by means of a rocket engine, a pulsed microimpulse reaction engine, a magnetic repulsion coil, or other means. Expandable cushioning material may apply cushioning force by means of pressure, electric/magnetic fields, inertia, compressive stress, tensile force, or shear force, or a combination thereof. Expandable cushioning material may apply cushioning force and/or dissipate interaction energy by means of crushing (e.g., foam or shells), breaking (e.g., fibers or wires), buckling (e.g., struts or plates) or other mechanisms.

In an example embodiment, the actuatable cushioning elements may be re-usable, where the cushioning elements may be expanded to absorb an impact, later fully or partially unexpanded, and then subsequently expanded again to provide cushioning support or protect the object for a second event or impact, or to provide cushioning support in another container, for example. While in another example embodiment, the actuatable cushioning elements may be disposable, wherein the elements, for example, may be expanded or used only once or only a few times.

Any number of actuatable cushioning elements may be used to provide cushioning support for object 4-112. For example, in one embodiment, at least 12 actuatable cushioning elements may be used to provide cushioning support for an object. This may include providing at least 12, 20, 50, 100 or even 500 actuatable cushioning elements (or more) to provide cushioning support, according to different example embodiments.

The actuatable cushioning elements may be any shape (e.g., round, oblong, rectangular, irregular shape) and any size. In an example embodiment, one or more of actuatable cushioning elements 4-114, 4-116, etc. may be 2.5 cm in width or less in an unexpanded state, or may be 2.5 cm in width or more in an unexpanded state, or may be 5 cm or less in an unexpanded state, or may be 8 cm or less in an unexpanded state, as examples. For example, different numbers and/or sizes of cushioning elements may be used, e.g., depending on the application, the type of object to be protected, the type or size of container to be used, or other factors. These are some example numbers and sizes and the disclosure is not limited thereto. In an example embodiment, smaller-sized actuatable cushioning elements may be more applicable for smaller containers, whereas larger actuatable cushioning elements may be more applicable for larger containers, for example.

In another example embodiment, a group of actuatable cushioning elements may be provided within a container, or outside of the container, to provide cushioning support for an object, such as a vase or other object within the container. A first subset of actuatable cushioning elements may be pre-inflated or pre-expanded in response to a first event, e.g., at packing time or just prior to shipment. At some later point, a second subset of actuatable cushioning elements may be actuated (e.g., expanded), in response to a second event (such as an acceleration that exceeds a threshold, or an impact or likely impact), for example. At some point later, a third subset of actuatable cushioning elements may be actuated (e.g., inflated or expanded), in response to a third event, for example. Also, in an example embodiment, upon arrival (which may be considered a fourth event), one or more (or even all) of the actuatable cushioning elements in the container may be actuated (e.g., unexpanded or deflated), to allow the object to be unpacked from the container. The actuatable cushioning elements may also be-reused in another container, for example. In this manner, the group of actuatable cushioning elements may provide cushioning support for an object, e.g., for one or more events.

Actuatable cushioning elements may be actuated outside of a container or outside of the preactivation envelope of a system. For example, such actuation may provide additional cushioning to that provided with interior actuatable cushioning elements alone. For example, such exterior actuation may also act by modification of the dynamics of the interaction with the environment, such as by introducing sliding contacts, aerodynamic lift, sideways steering forces, or by other means. For example, such exterior actuatable cushioning elements may have spherical shapes, cylindrical shapes, high aspect ratio shapes, lifting-body shapes, or other shapes. For example, exterior actuatable cushioning elements may include expandable gas bags, fluid actuatable elements, expandable cushioning materials, skids, reaction engines, drag-inducing devices, anchors, or other such elements. For example, such exterior actuatable cushioning elements may act in a time dependent (e.g., via a specified actuation profile, by stretching, deforming, breaking) and/or time sequenced manner (e.g., by timed activation of one or more exterior actuatable cushioning elements).

According to an example embodiment, one or more actuatable cushioning elements may be actuated (e.g., expanded or unexpanded) for or in response to an event. The event may be any of a variety of different events. For example, the event may include determining an impact or likely impact, determining an acceleration or change in acceleration that exceeds a threshold (such as when a container has been dropped), determining a temperature (e.g., inside or outside the container) that reaches a selected temperature, determining a time that reaches a specific time, determining that a location has been reached or that a selected distance within the location has been reached (e.g., either approaching or leaving the location), determining that a selected subset of actuatable cushioning elements (e.g., some or all of the elements) have not yet been expanded (thus more elements should be expanded to provide support), or other event. These are merely a few examples of events, e.g., events which may cause or result in one or more actuatable cushioning elements to be actuated.

According to an example embodiment, acceleration may include a scalar quantity, or may include a vector quantity. Acceleration may include linear acceleration, angular acceleration, or other type of acceleration. A detected or determined acceleration may include an acceleration having components with varying degrees of interest or relevance (e.g., one or more linear components may be used, or one or more angular components to indicate an event or events to trigger actuation of an actuatable cushioning element). For example, an event may include an acceleration or change in acceleration that may include an acceleration (e.g., one or more acceleration components) or a change in acceleration that may exceed a threshold. Alternatively, the acceleration may be determined in more complex manners, such as ad hoc, time and situation-dependent manners, or other manners. For example, a model may be provided or used to model the operation of a system (e.g., system 4-100), or model the operation of actuatable cushioning elements, or model the free-fall or acceleration or movement of one or more objects or passengers, or the like. For example, one or more actuatable cushioning elements may be actuated (e.g., expanded or unexpanded/contracted) based on the model and/or based on determination of one or more events. For example, the selected actuation of one or more actuatable cushioning elements may be based upon the predicted shift of the time profile of one or more accelerations from a value associated with one actuation state to another value corresponding to the selected actuation state, the value of which is predicted to reduce damage to one or more protected objects. For example, measured and model-forecasted time-integrals of acceleration that may exceed case dependent thresholds may be used, e.g., to identify criteria or likely situations where objects may be damaged or broken. In another example embodiment, a time-history of acceleration may, in some cases, inform the system 4-100 as to the level of protection that may or should be used to protect the object. For example, an extended time-interval of free-fall may result in decelerations of significant magnitudes being purposefully applied to protect objects when, e.g., an event is detected. For example, measured or model-forecasted stresses within the object may be used, e.g., to identify criteria or likely situations where objects may be damaged or broken. Such stress thresholds may include peak values or time-dependent value profiles of a function of one or more elements of the stress tensor, or may include initiation or propagation of fracture. For example, measured or model-forecasted temperatures within the object may be used, e.g., to identify criteria or likely situations where objects may be damaged or broken. Such temperature thresholds may include peak temperature values, or energy deposition values (e.g., a substance that will undergo a phase change—e.g., liquid to gas—after accumulation of a certain energy, which those skilled in the art will appreciate is an example of a more general determination that an energy exceeds a threshold), or time dependent temperature profiles. These are merely a few additional example embodiments relating to acceleration, and the disclosure is not limited thereto.

Referring to FIG. 72 again, in an example embodiment, system 4-100 may include central control logic 4-150, including a central controller 4-154 which may provide overall control for system 4-100. Central control logic 4-150 may include a number of additional blocks coupled to central controller 4-154, which will be briefly described.

A wireless receiver 4-152 may transmit and receive wireless signals such as RF (radio frequency) signals. Wireless signals such as RF signals may include any wireless or other electromagnetic signals, and are not limited to any particular frequency range.

An event detector 4-158 may detect or determine an event (or condition), or a series of events, such as an acceleration or change in acceleration that exceeds a threshold, a temperature that reaches a specific temperature, a location that is within a specific distance of a selected location, or any other event. Event detector 4-158 may include any type of detector or sensor. Event detector 4-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold. In another example embodiment, event detector 4-158 may include a Micro Electro Mechanical System (MEMS) accelerometer, which may, for instance, sense a displacement of a micro-cantilevered beam under acceleration transverse to its displacement-direction, e.g., by capacitive means. An angular accelerometer may determine that an angular acceleration or change in angular acceleration has exceeded a threshold. In another example embodiment, event detector 4-158 may include a Ring Laser Gyro, a Fiber Optic Gyro, a Vibrating Structure Gyro, a MEMS Gyro, or a mechanical gyroscope.

Or, alternatively for event detector 4-158, electrodes may be placed on a suitably shaped and mounted piezoelectric material for sensing a current and/or voltage generated by the piezoelectric material deforming in response to acceleration induced stress. Some examples of materials that may be used in the piezoelectric version of the event detector 4-158 may include lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped PLZT, and Barium zirconate titanate (BZT). These are just a few examples of event detectors.

Event detector 4-158 may also, for example, include a GPS receiver, a speedometer, an accelerometer, Radar, a camera, a Gyro, or any other sensor or device that may allow the detection of one or more of the following: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. The first and second objects in this example may be any type of objects. For example, the detected event or information (e.g., relative location, velocity, acceleration, orientation, angular velocity, angular acceleration) may indicate that a collision between a first object (such as a vehicle) and a second object (e.g., another vehicle, a tree, a railing.) has occurred or is likely to occur.

An enable/disable switch 4-156 may be used to enable or disable system 4-100. For example, enable/disable switch 4-156 may be used to enable the one or more actuatable cushioning elements to be actuated, or may disable the one or more actuatable cushioning elements from being actuated, for example. System 4-100 may also include an input device, such as a mouse, keypad or other input device, which may allow a user to configure operation of system 4-100, for example. For example, enable/disable switch 4-156 and/or input device 4-160 may enable a first subset of actuatable cushioning elements to be actuatable during a first time period (or first time interval), and may enable a second subset of actuatable cushioning elements to be actuatable during a second time period (or second time interval), e.g., to provide cushioning support for an object over (or for) a series of events. The phrase "time period" may, for example, include any time interval, and is not necessarily cyclical or periodic, and may include random, non-periodic and/or non-cyclical time periods or time intervals, as examples.

An output device or display 4-161 may also be provided to display information. Input device 4-160 and display 4-161 may be provided in a position which may be reached or accessed by a user, such as on the outside of the container 4-110, for example.

One or more of the actuatable cushioning elements may include an element control logic to control overall operation and/or actuation of the element(s) to which the control logic is connected. For example, element control logic 4-115 may provide control to actuatable cushioning element 4-114, while element control logic 4-117 may control operation of actuatable cushioning element 4-116.

An element control logic may control a single actuatable cushioning element, or may control multiple cushioning elements, for example. The element control logic for one or more actuatable cushioning elements may communicate with other element control logic to provide a cushioning support for object 4-112 in a coordinated manner, for example. According to an example embodiment, this may include an element control logic transmitting a wireless signal(s) when the associated actuatable cushioning element has been actuated (or otherwise an element control logic for an element transmitting a signal notifying other elements of the cushioning element's state) which may allow the element control logic associated with other actuatable cushioning elements to determine how many or what percentage of cushioning elements are in an expanded state. For example, if an insufficient number of cushioning elements are currently in an expanded state, then one or more actuatable cushioning elements (via their element control logic) may then actuate or move to an expanded state to improve cushioning support for the object. Thus, distributed control may be provided via communication between the element control logic for different actuatable cushioning elements.

In another example embodiment, central controller 4-154 (FIG. 72) of central control logic 4-150 may provide central control for operation of the one or more actuatable cushioning elements within container 4-110. For example, event detector 4-158 may detect an event, and then wireless transceiver 4-152 (e.g., under control of central controller 4-154) may transmit wireless signals to one or more element control logic (e.g., 115, 117 . . . ) to cause one or more actuatable cushioning elements to actuate in response to the event.

FIG. 73 illustrates an actuatable cushioning element according to an example embodiment. An actuatable cushioning element 4-210 may be coupled to (or may include) an associated element control logic 4-212. Although not shown, one or more of the actuatable cushioning elements (e.g., actuatable cushioning elements 4-114, 4-116, 4-118, 4-120, 4-122, 4-124 . . . ) may each include a similar element control logic. For example, element control logic 4-115 and 4-117 may be the same as or similar to element control logic 4-212, for example. In an alternative embodiment, element control logic 4-212 may be omitted.

Element control logic 4-212 may include an element controller 4-214 to provide overall control for an actuatable cushioning element 4-210. An event detector 4-218 may detect or determine an event. Event detector 4-218 may be, for example, the same as or similar to the event detector 4-158. A wireless transceiver 4-216 may transmit and receive wireless signals. Alternatively, actuatable cushioning elements may be coupled together (and/or to central control logic 4-150) via any communications media, such as a wireless media (e.g., via RF or other electromagnetic signals, acoustic signals), a wired communication media, such as cable, wire, fiber optic line, etc., or other media.

A stored energy reservoir 4-220 may store gas, liquid, energy (chemical or electrical energy or the like) or other energy or substance, which may be used to actuate actuatable cushioning element 4-210. For example, stored energy reservoir 4-220 may receive signals from element controller 4-214, causing stored energy reservoir 4-220 to release pressurized liquid or gas to actuatable cushioning element 4-210 to cause element 4-210 to expand or inflate, or may release a chemical or other substance causing an expandable cushioning material to expand, for example. In an example embodiment, actuatable cushioning element 4-210 may include one or more fluid-actuatable elements, where fluid may be sourced from one or more fluid reservoirs (such as from stored energy reservoir 4-220), e.g., via a valving actuation. The fluid reservoirs may, for example, cause the fluid actuatable element(s) to actuate (e.g., expand and/or unexpand/contract) by causing fluid to flow into or out of the fluid-actuatable elements.

One or more actuatable cushioning elements, such as actuatable cushioning element 4-210, may be coupled to an element controller (e.g., element controller 4-214) via any communications media, such as a wireless media (e.g., via RF or other electromagnetic signals, acoustic signals), a wired communication media, such as cable, wire, fiber optic line, etc., or other communications media.

According to an example embodiment, one or more actuatable cushioning elements may include fluid-actuated cushioning elements or structures, or may include gas-actuated or gas-powered cushioning elements, or other types of elements. For example, one or more of the actuatable cushioning elements, when actuated, may have at least one of a size, shape, position, orientation, stress-strain tensor components (or other component) of the cushioning elements changed or modified as a result of one or more actuating actions applied to the cushioning element. For example, an actuating action or sequence of actuating actions which may be applied to an actuatable cushioning element, may, e.g., first change its position (or center of mass), then its orientation, then its size, and/or its rigidity or other characteristic. These changes to the actuatable cushioning element may occur, e.g., in a pre-programmed manner, and may occur, e.g., in response to or based upon an event, such as based on a measurement, signals received from cooperating cushioning elements or a controller(s) in the system 4-100, or other signals or criteria or event. The signals that may be received from other cooperating structures (e.g., elements or controllers) may, for example, describe or indicate their own characteristics, such as size, pressure, orientation, shape, etc. A model (e.g., of the system or operation of the system or objects) may be used to determine one or more actions that may be performed (such as actuation of an element), e.g., to protect one or more objects or passengers from harm or damage.

Also, in another example embodiment, one or more objects or passengers may include one or more associated actuatable cushioning elements on or near each object or passenger, where one or more of the group of associated actuatable cushioning elements may be independently controlled so as to provide cushioning support and/or protection for the associated object or passenger. Also, in another example embodiment, two or more separate objects, each protected by their own sets of actuatable cushioning elements may interact (for instance, by an actual or predicted collision). The actuation of one or more object's actuatable cushioning elements may occur with or without cooperation from that of the actuatable cushioning elements of one or more of the other objects. For example, one or more of the objects may sense the actions or state of the actuatable cushioning elements associated with one or more of the other objects. For example, two or more of the objects may share information on the actual and/or planned actuation histories of their actuatable cushioning elements. For example, one or more of the objects may sense the actions or state of the actuatable cushioning elements associated with one or more of the other objects. For example, one or more objects may base the actuation of one or more of its actuatable cushioning elements upon the sensed or predicted actions of one or more actuatable cushioning elements associated with one or more of the other objects. For example, one or more objects may command the actuation or nonactuation of one or more actuatable cushioning elements associated with one or more of the other objects. This commanded actuation process may be performed by a joint decision process, by a hierarchical process, by a master-slave process, or by other means.

In an example embodiment, the actuatable cushioning element may include one or more tension-bearing members 4-230, such as tension bearing members 4-230A, 4-230B, 4-230C, 4-230D and 4-230E. Tension-bearing members 4-230 may, for example, bear tension or force, and may deform in one or more ways, and/or may stretch, e.g., during a collision or impact to dissipate energy associated with a collision and/or provide cushioning support for an object. The tension-bearing members 4-230 may be provided in a number of different directions, and may, for example, lie on a surface (e.g., interior or exterior surface) of the cushioning element 4-210. Alternatively, one or more of the tension-bearing members 4-230 may be provided within an interior portion of the cushioning element 4-210.

In an example embodiment, one or more of the tension-bearing members 4-230 may deform during a collision between two objects. This deformation of one or more of the tension-bearing members 4-230 may include, for example, stretching of the tension-bearing member(s). The deforming or stretching, may include, for example, at least a portion of one or more tension-bearing members substantially inelastically stretching after the tension-bearing member has reached an elastic limit.

In an example embodiment, the actuatable cushioning element 4-210 may dissipate at least some of an energy (e.g., kinetic energy) associated with a collision based on a deforming or stretching of one or more of the tension-bearing members 4-230. For example, during a collision, at least one tension-bearing member that extends in a direction other than a direction of impact of the collision may stretch beyond an elastic limit, and dissipate at least some of an energy associated with the collision. For example, a tension-bearing member that extends in a direction that is substantially perpendicular to a direction of impact of the collision may stretch or deform during the collision to dissipate energy or provide cushioning support for an object.

By stretching or deforming, the tension-bearing members 4-230 may perform work or have work performed on them, allowing the dissipation of at least some energy associated with a collision. In this manner, the cushioning element 4-210 and associated tension-bearing member(s) 4-230 may, for example, provide cushioning support during a collision for an object or objects, such as a vehicle, person, or other object.

The tension-bearing members may be made of a variety of different materials, and may, for example, have a relatively high tensile strength and/or a high strength to weight ratio.

In an example embodiment, tension-bearing members may be provided as one or more polyaramid fibers (also known as aramid or aromatic polyamide fibers).

Polyaramid fibers may be a class of heat-resistant and high-strength synthetic fibers, such as for example, fibers in which the fiber-forming substance may be a long-chain synthetic polyamide in which at least some of the amide linkages (—CO—NH—) are attached directly to two aromatic rings. Polyaramid fibers have been manufactured under a number of different brand names, and have been used in a number of different aerospace and military applications, such as ballistic rated body armor, for example.

Polyaramid fiber(s) are merely one example of a tension-bearing member. Tension bearing members 4-230 may be made from other material (e.g., which may have relatively high tensile strength) that may perform work (or may allow work to be performed on the fiber or member), e.g., through stretching or deforming, or otherwise may provide cushioning or dissipation of energy associated with a collision or other impact. Yet more specific instances of such materials might include at least one of a graphitic fiber, a carbon fiber, and/or a natural fiber. Yet more specific instances of such material might also include at least one of a poly-benzobisoxazole fiber and/or a synthetic fiber. In some instances of such materials, the various fiber types referred to herein are hyrbridized and/or combined.

FIG. 74A illustrates an actuatable cushioning element according to another example embodiment. Actuatable cushioning element 4-210A is shown in an initial or pre-collision state. Actuatable cushioning element 4-210A may include one or more tension-bearing members, including tension-bearing members 4-230A, 4-230B, 4-230C, 4-230C, 4-230D and/or 4-230E. In an example embodiment, a controller, such as central controller 4-154 or element controller 4-214 may control or cause the actuation of the actuatable cushioning element into an initial or pre-collision state (e.g., in response to detecting or determining an event). A direction of impact 4-239 of a collision is shown. Tension-bearing members 4-230A and 4-230B, at least in part, may be considered to extend in a direction that may be substantially in a direction of the impact of collision 4-239. Other tension-bearing members may extend in other directions. For example, tension-bearing members 4-230C, 4-230D and 4-230E may be considered to extend in directions other than the direction of impact of the collision 4-239. For example, one or more tension-bearing members, such as tension-bearing member 4-230E, may extend in a direction that may be approximately (or substantially) perpendicular to the direction of impact of the collision 4-239.

FIG. 74B illustrates an actuatable cushioning element of FIG. 74A in a post-collision state according to an example embodiment. In an example embodiment, during a collision between two objects, the actuatable cushioning element 4-210 may provide cushioning support for an object (not shown) or dissipate energy associated with the collision via a deforming or stretching of one or more of the tension-bearing members.

For example, tension-bearing members 4-230C, 4-230D and 4-230E may deform or stretch during a collision and dissipate energy associated with a collision.

Figure 75:
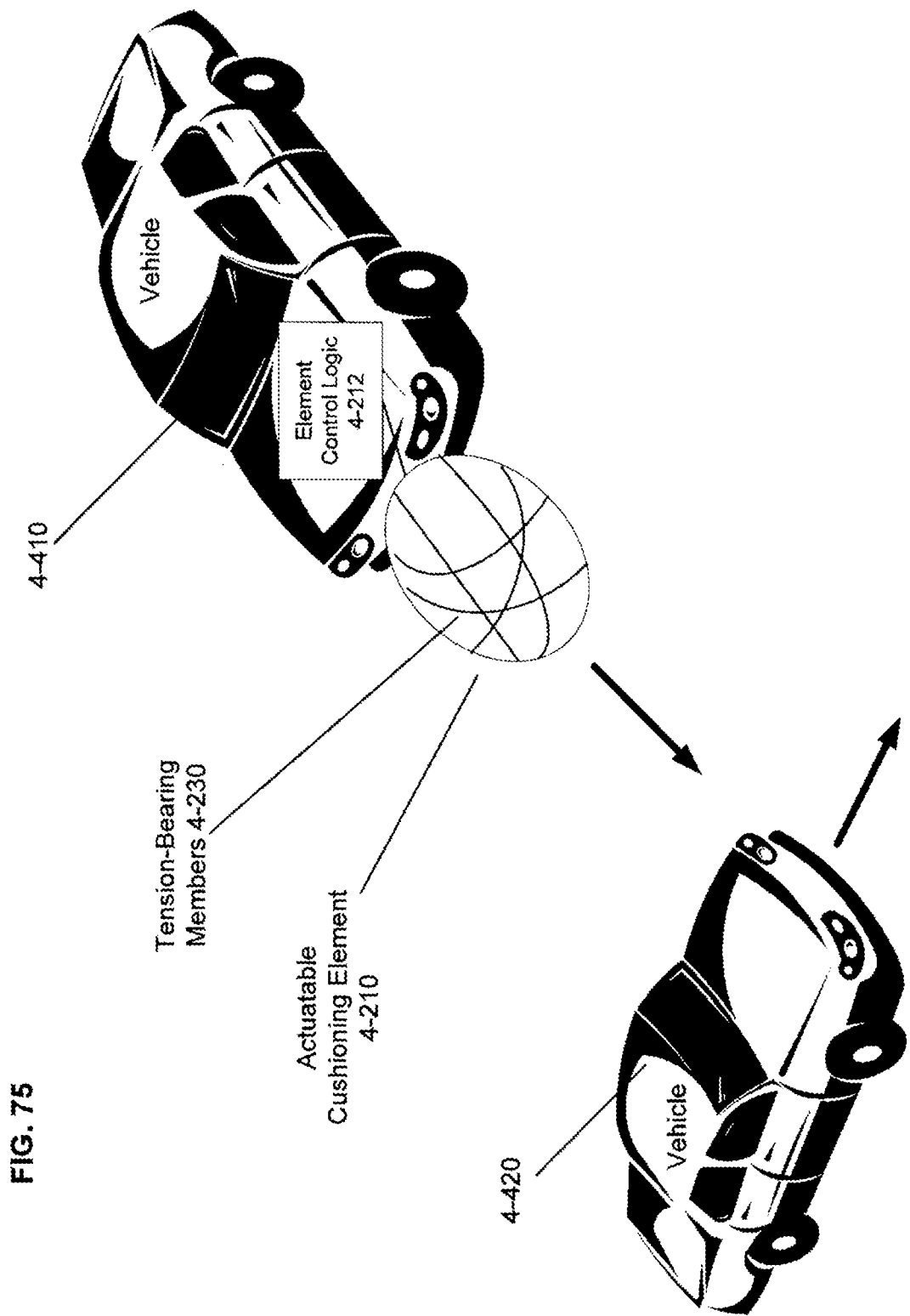
FIG. 75 is a diagram illustrating an operation of an actuatable energy dissipative cushioning element according to an example embodiment.

FIG. 75 is a diagram illustrating an operation of an actuatable energy dissipative cushioning element according to an example embodiment. Two objects are shown in FIG. 75, including vehicle 4-410 and vehicle 4-420, although any type of objects may be used. Vehicle 4-410 may include an actuatable cushioning element 4-210 that includes one or more tension-bearing members 4-230. An element control logic 4-212 may be coupled to the actuatable cushioning element. Event detector 4-218 of element control logic 4-212 (FIG. 73) may determine or detect an event, and element controller or central controller 4-154 may actuate and/or otherwise control actuatable cushioning element 4-210 and/or tension-bearing members 4-230 to dissipate energy associated with a collision between vehicle 4-410 and vehicle 4-420. Event detector 4-218 and/or element control logic 4-212 may detect or determine a number of different events, and may then actuate or deploy the actuatable cushioning element 4-210. Actuatable cushioning element 4-210 is shown as being provided outside of vehicle 4-410, but may be located anywhere, such as inside a cabin or driver's space of vehicle 4-410, for example.

FIG. 76A is a diagram illustrating a tension-bearing member according to an example embodiment. In an example embodiment, a tension-bearing member 4-230 may stretch or deform during a collision to dissipate some of the kinetic energy associated with a collision. This may be performed by, for example, at least in part converting some of the kinetic energy associated with the collision into thermal energy. In an example embodiment, tension-bearing member 4-230 may include a heat capacity material 4-512 associated with the tension-bearing member 4-230 to absorb at least some of the thermal energy associated with the collision, or to increase a capacity of the tension-bearing member 4-230 to perform work or to increase a capacity to have work done on the tension-bearing member 4-230.

For example, the heat capacity material may increase the temperature at which the tension-bearing member fails or breaks, thereby, at least in some cases increasing the capacity of the tension-bearing member 4-230 to perform work or stretch during a collision. This may, for example, increase an amount of kinetic energy that the actuatable cushioning element may dissipate during a collision between two objects.

Although not required, in an example embodiment, heat capacity material 4-512 may use (or may include) a phase-change material that may change phases (e.g., solid-to-liquid, liquid-to-gas, solid-to-gas) while the tension-bearing member is performing work or is stretching or deforming, which may, for example, increase the amount of kinetic energy that the cushioning element may dissipate. This may include, for example, a liquid or other heat capacity material boiling or changing from liquid to gas to dissipate additional energy associated with the collision. For example, water may be used to cool or decrease the temperature of the tension-bearing member during a collision. Thus, using a tension-bearing member having a heat capacity material may increase the temperature at which the tension-bearing member may fail or no longer be able to perform work. Thus, heat capacity material or phase change material may be used to increase or enhance mechanical performance of the tension bearing member 4-230, for example.

In one example embodiment, if phase change is used, the phase change of the heat capacity material may, for example, occur at temperatures that may be well above ordinary environmental temperatures, e.g., greater than 50 degrees Centigrade (50° C.), and may be (for example) less than 300° C. or 400° C. These are merely some examples, and a number of different temperatures may be used for phase change.

The heat capacity material 4-512 may, for example, be provided on a surface of the tension bearing member 4-230, or may be provided within one or more fibers of the tension-bearing member. These are merely some examples.

FIG. 76B is a diagram illustrating a tension-bearing member according to another example embodiment. In this example, a capsule 4-514 may be provided with heat capacity material therein. For example, when the temperature a threshold temperature, the capsule 4-514 may melt or rupture, causing the heat capacity material to be released and applied to the tension-bearing member 4-230. The application of heat capacity material (for example, water or other material) may operate to cool the tension-bearing member 4-230 and/or increase the work capacity of the tension-bearing member 4-230.

A wide variety of materials may be used for a heat capacity material 4-512, or a phase change material. According to an example embodiment, heat capacity materials may, include one or more qualities, such as: non-toxic (as people or objects may come into contact with the material); non-corrosive to its storage environment (e.g., since the material may be in contact with the tension-bearing member or the actuatable cushioning element 4-210); for example, during storage, the material may be non-corrosive for long periods of time, and during operation or at higher temperatures the material may be non-corrosive for shorter periods of time. A comparatively high heat of transformation (e.g., relatively high temperature for boiling or vaporization, fusion), e.g., so that relatively little material may be used to increase the work capacity of the tension bearing member can be readily brought into contact (either in advance or in response to an event, or based on a temperature change, etc.) with high-tensility material (tension-bearing member 4-230) being worked or deformed during a collision; reasonable cost, e.g., sufficient quantities of the heat capacity material would not necessarily dominate the cost of the cushioning element or tension bearing member.

An example of a heat capacity material may be water, although many other materials may be used. The tension-bearing member (e.g., polyaramid fibers) may be soaked in water (or other material), which may increase the amount of work that the tension bearing member may perform, for example. Or, the water, as it is heated and boils or vaporizes, increases the work that may be performed on or by the associated tension-bearing member. As noted, the heat capacity material may use phase change in an example embodiments. In other example embodiments, heat capacity materials may be used that may improve the work capacity of the tension bearing member without necessarily involving a phase change or phase change material.

Figure 77:
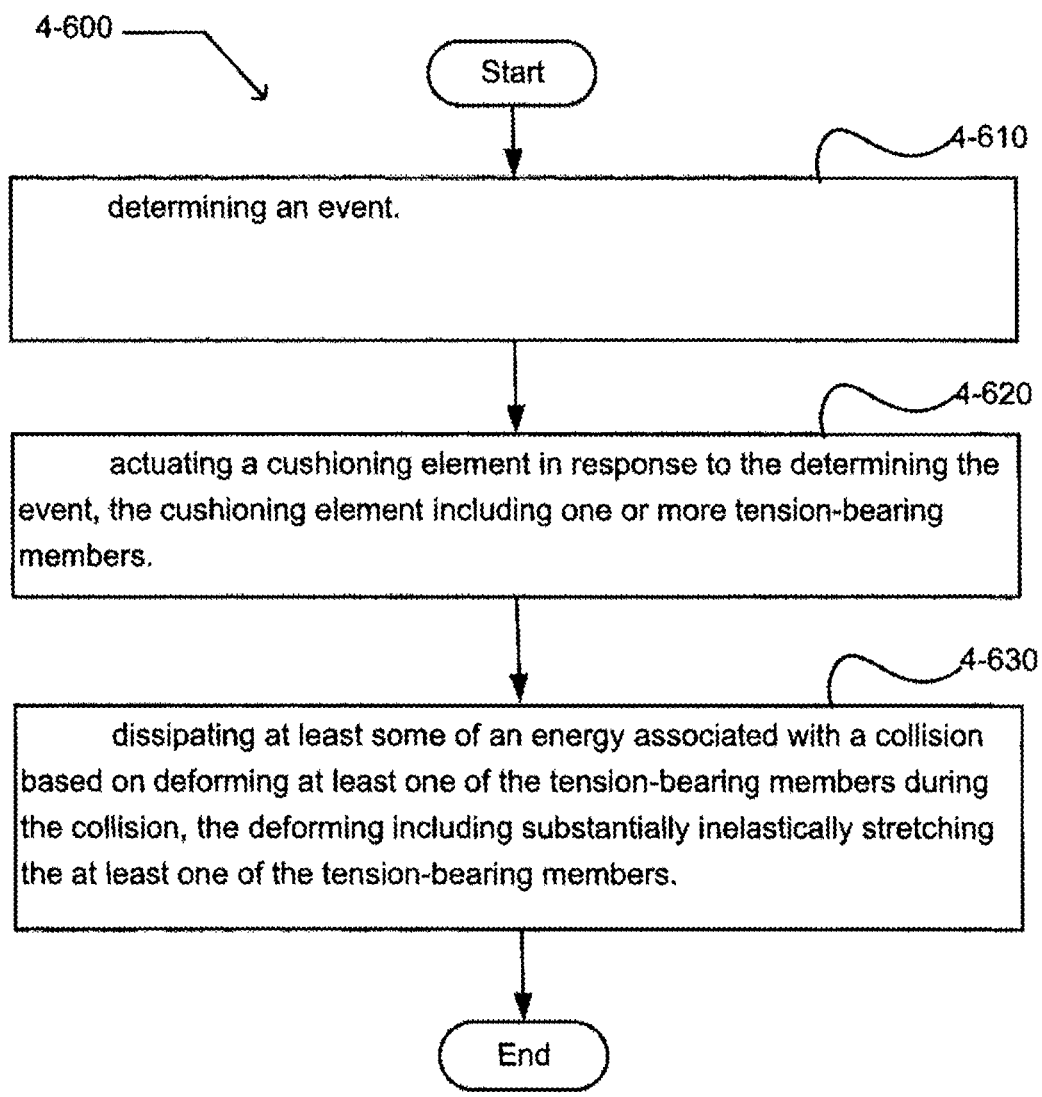
FIG. 77 illustrates an operational flow representing example operations related to actuatable energy dissipative cushioning elements according to an example embodiment.

FIG. 77 illustrates an operational flow 4-600 representing example operations related to actuatable energy dissipative cushioning elements. In FIG. 77 and in following figures that include various examples of operational flows, discussion and explanation may be provided with respect to the above-described examples of FIGS. 76A and 76B, and/or with respect to other examples and contexts. However, it should be understood that the operational flows may be executed in a number of other environments and contexts, and/or in modified versions of FIGS. 76A and 76B. Also, although the various operational flows are presented in the sequence(s) illustrated, it should be understood that the various operations may be performed in other orders than those which are illustrated, or may be performed concurrently.

After a start operation, the operational flow 4-600 moves to a determining operation 4-610 where an event is determined. For example, an event detector 4-158 or 4-218 may detect or determine an event (or condition), or a series of events, such as a velocity that exceeds a threshold, an acceleration that exceeds a threshold, a change in acceleration or change in location or velocity, a relative location, velocity or acceleration of an object with respect to another object that is within a range or exceeds a threshold, etc. These are merely a few examples of events that may be detected, and many other events are possible.

Event detector 4-158 or 4-218 may include any type of detector or sensor. Event detector 4-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold, for example. In another example embodiment, event detector 4-158 may include a Micro Electro Mechanical System (MEMS) accelerometer.

Event detector 4-158 and/or 4-218 may also, for example, include a speedometer, an accelerometer, Radar, a camera, a Gyro, or any other sensor, instrument or device that may allow the detection or determination of one or more of a variety of conditions or events, such as determining, for example: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. These are merely some additional example events, and many other types of events may be detected or determined. The first and second objects in this example may be any type of objects.

Then, in an actuating operation 4-620, a cushioning element is actuated in response to the determining the event, the cushioning element including one or more tension-bearing members. For example, as shown in FIG. 73, element controller 4-214 may actuate actuatable cushioning element 4-210 in response to event detector 4-218 determining the event. This actuating may include element controller 4-214 or central controller 4-154 deploying or placing the actuatable cushioning element 4-210 in an initial or pre-collision state, for example. Actuatable cushioning element 4-210 (FIG. 73) may include one or more tension-bearing members 4-230 (e.g., 230A, 4-230B, 4-230C, 230D, 4-230E . . . ).

Then, in a dissipating operation 4-630, at least some of an energy associated with a collision is dissipated based on deforming at least one of the tension-bearing members during the collision, the deforming including substantially inelastically stretching the at least one of the tension-bearing members. For example, at least some of the energy associated with a collision between two objects (e.g., between vehicles 4-410 and 4-420, FIG. 75) may be dissipated by a tension-bearing member 4-230 deforming and/or stretching during the collision. The deforming or stretching may include the tension-bearing member 4-230 stretching beyond an elastic limit for the tension-bearing member 4-230.

Figure 78:
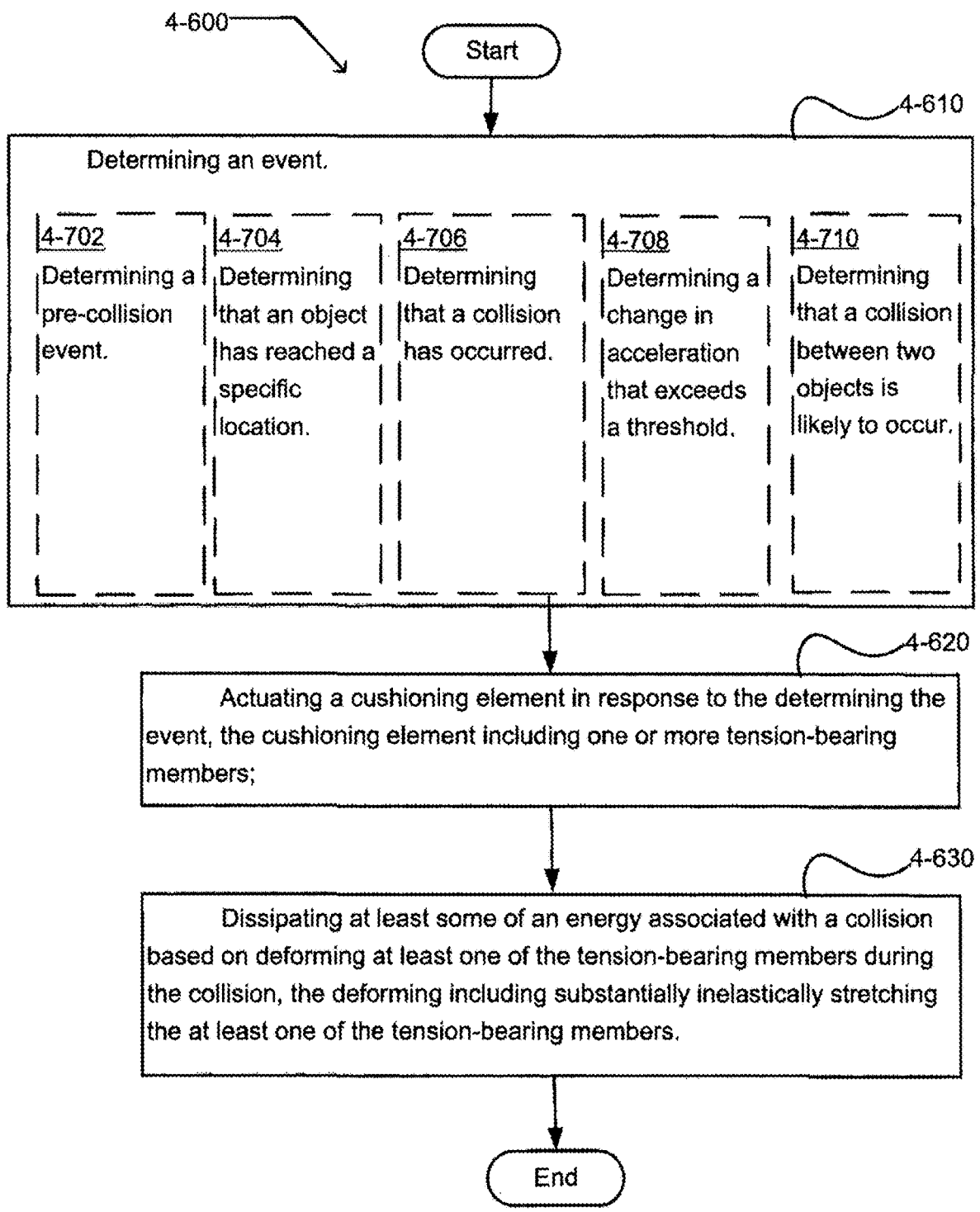
FIG. 78 illustrates an alternative embodiment of the example operational flow of FIG. 77.

FIG. 78 illustrates alternative embodiments of the example operational flow 4-600 of FIG. 77. FIG. 78 illustrates example embodiments where the determining operation 4-610 may include at least one additional operation. Additional operations may include operations 4-702, 4-702, 4-706, 4-708 and/or 4-710

At the operation 4-702, a pre-collision event is determined. For example, event detector 4-158 or 4-218 may determine or detect an event that occurs prior to a collision between two objects. For example, event detector 4-158 or 4-218 may detect that acceleration or velocity for a vehicle has exceeded a specific threshold, or that based on a vehicle's relative location and/or relative velocity with respect to another object (e.g., with respect to a rail, a wall, or another vehicle), a collision is likely to occur between a vehicle and another object.

At the operation 4-704, it is determined that an object has reached a specific location. For example, event detector 4-158 or 4-218 (e.g., as a GPS receiver or other location device) may determine that an automobile or vehicle is within 2 feet of a wall or other object, or has crossed over a median of a highway.

At the operation 4-706, it is determined that a collision has occurred. Event detector 4-158 or 4-218 may have detected a collision or impact based on other sensors on a vehicle 4-410, for example.

At the operation 4-708, a change in acceleration that exceeds a threshold is determined. For example, event detector 4-158 or 4-218 (e.g., as an accelerometer) may determine that an acceleration for vehicle 4-410 has exceeded a threshold (e.g., 0.2 G).

At operation 4-710, it is determined that a collision between two objects is likely to occur. For example, event detector 4-158 or 4-218 (e.g., as GPS receiver or other sensor or instrument) and with controller 4-154 or 4-214, may determine, e.g., based on a location and/or velocity of a vehicle 4-410 with respect to another object (either fixed or moving) that a collision is likely to occur.

Figure 79:
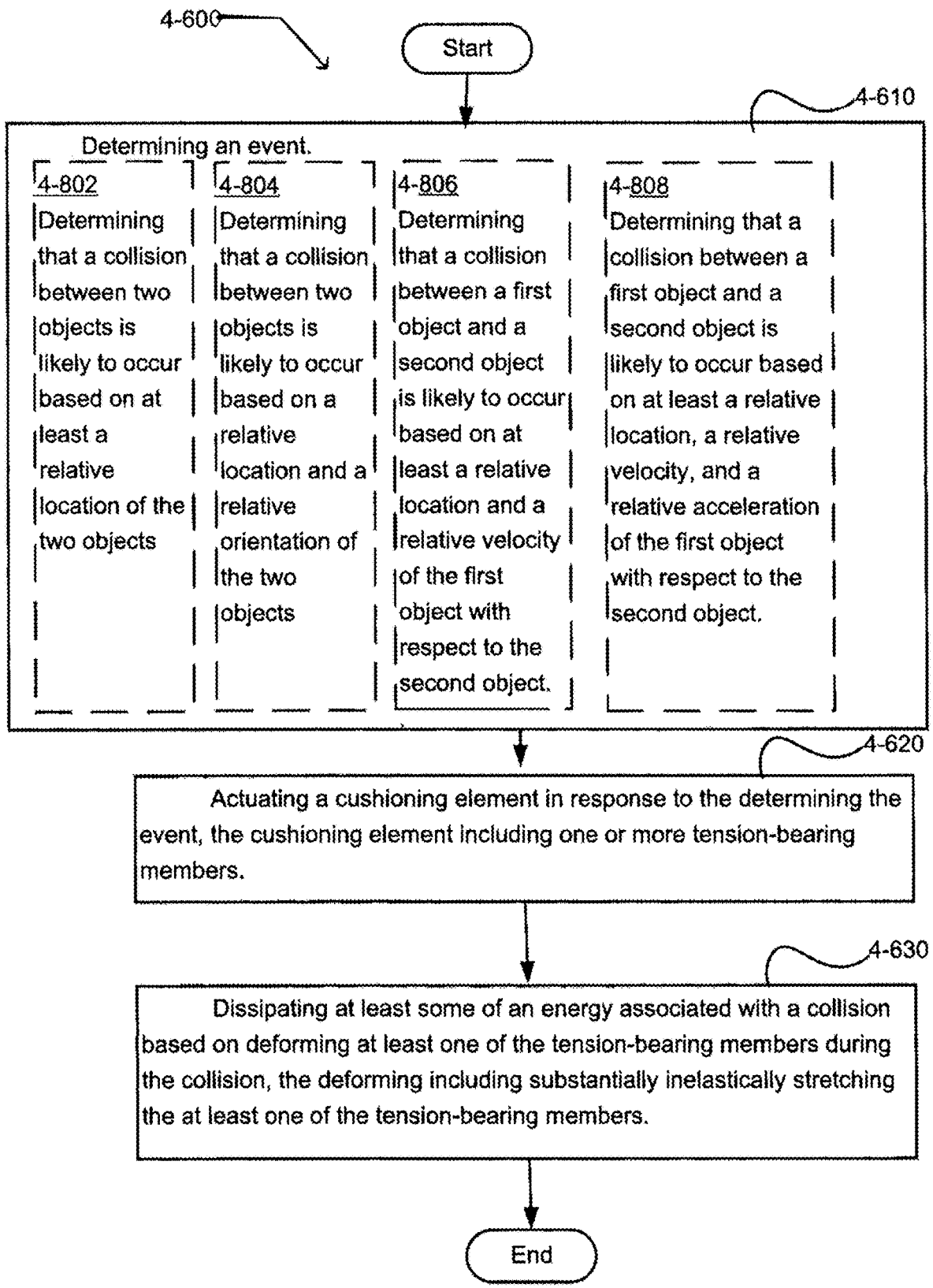
FIG. 79 illustrates an alternative embodiment of the example operational flow of FIG. 77.

FIG. 79 illustrates alternative embodiments of the example operational flow 4-600 of FIG. 77. FIG. 79 illustrates example embodiments where the determining operation 4-610 may include at least one additional operation. Additional operations may include operations 4-802, 4-804, 4-806, and/or 4-808.

At the operation 4-802, it is determined that a collision between two objects is likely to occur based on at least a relative location of the two objects. For example, event detector 4-158 or 4-218, and operating with controller 4-154 or 4-214, within vehicle 4-410 may determine that a collision with vehicle 510 is likely to occur based on the relative location of vehicle 4-410 to vehicle 4-420 (e.g., based on the distance between the two vehicles).

At the operation 4-804, it is determined that a collision between two objects is likely to occur based on a relative location and a relative orientation of the two objects. For example, controller 4-154 or 4-214 and event detector 4-158 or 4-218 may determine that vehicles 4-410 and 4-420 are within 5 feet of each other and are facing each other, and thus, a collision may be likely to occur.

At the operation 4-806, it is determined that a collision between a first object and a second object is likely to occur based on at least a relative location and a relative velocity of the first object with respect to the second object. For example, controller 4-154 or 4-214 and event detector 4-158 or 4-218 may determine that vehicle 4-410 is 10 feet away from vehicle 4-420, and the two vehicles are heading directly toward each other at a total speed (sum of speeds of both vehicles) of 87 MPH (miles per hour), which may indicate that a collision is likely to occur.

At the operation 4-808, it is determined that a collision between a first object and a second object is likely to occur based on at least a relative location, a relative velocity, and a relative acceleration of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on at least a relative location, a relative velocity, and a relative acceleration of vehicle 4-410 with respect to vehicle 4-420.

Figure 80:
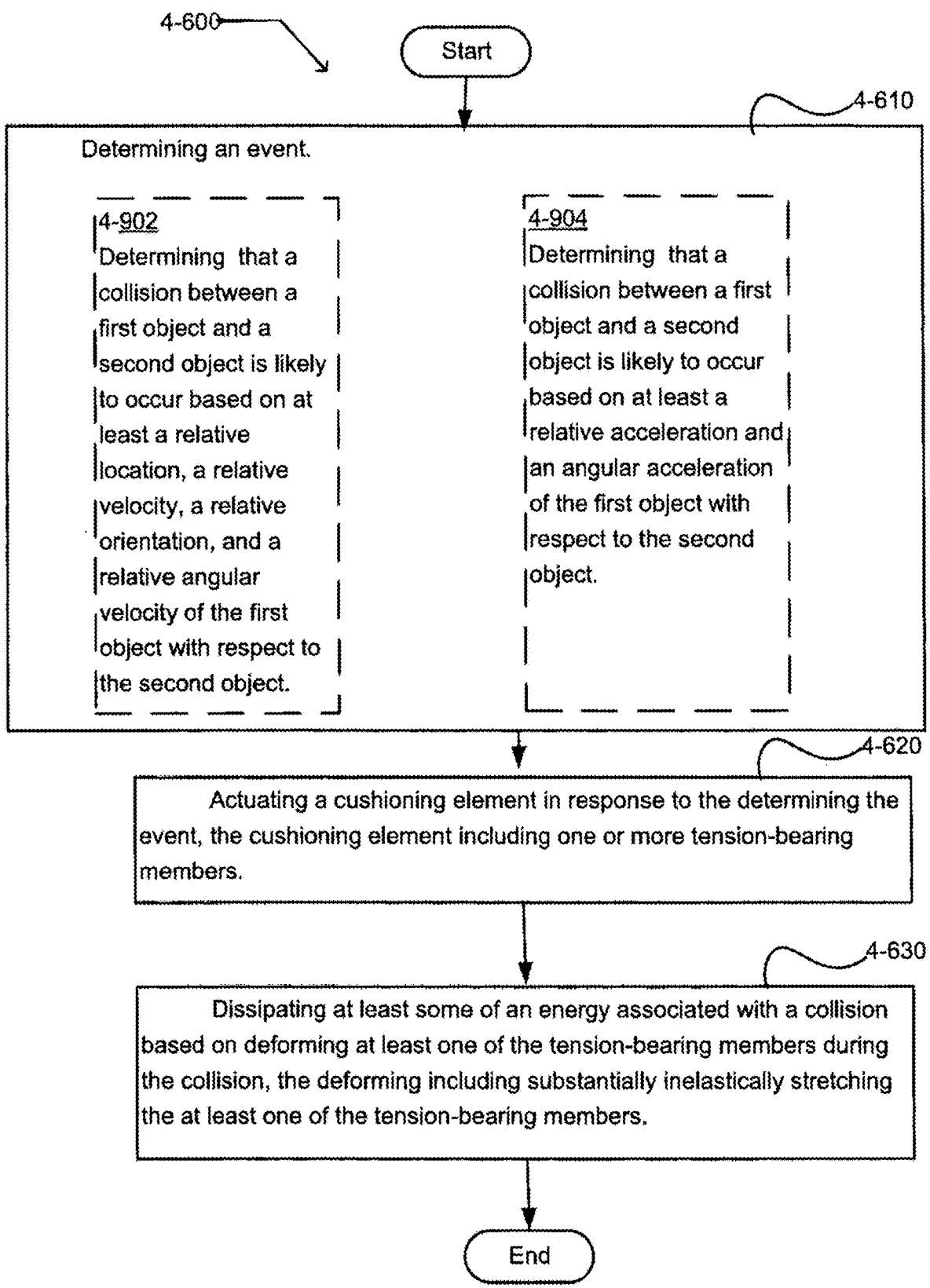
FIG. 80 illustrates an alternative embodiment of the example operational flow of FIG. 77.

FIG. 80 illustrates alternative embodiments of the example operational flow 4-600 of FIG. 77. FIG. 80 illustrates example embodiments where the determining operation 4-610 may include at least one additional operation. Additional operations may include operations 4-902 and/or 4-904.

At the operation 4-902, it is determined that a collision between a first object and a second object is likely to occur based on at least a relative location, a relative velocity, a relative orientation, and a relative angular velocity of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on at least a relative location, a relative velocity, a relative orientation, and a relative angular velocity of vehicle 4-410 with respect to vehicle 4-420 (FIG. 75).

At the operation 4-904, it is determined that a collision between a first object and a second object is likely to occur based on at least a relative acceleration and an angular acceleration of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on at least a relative acceleration and an angular acceleration of vehicle 4-410 with respect to vehicle 4-420 (FIG. 75).

Figure 81:
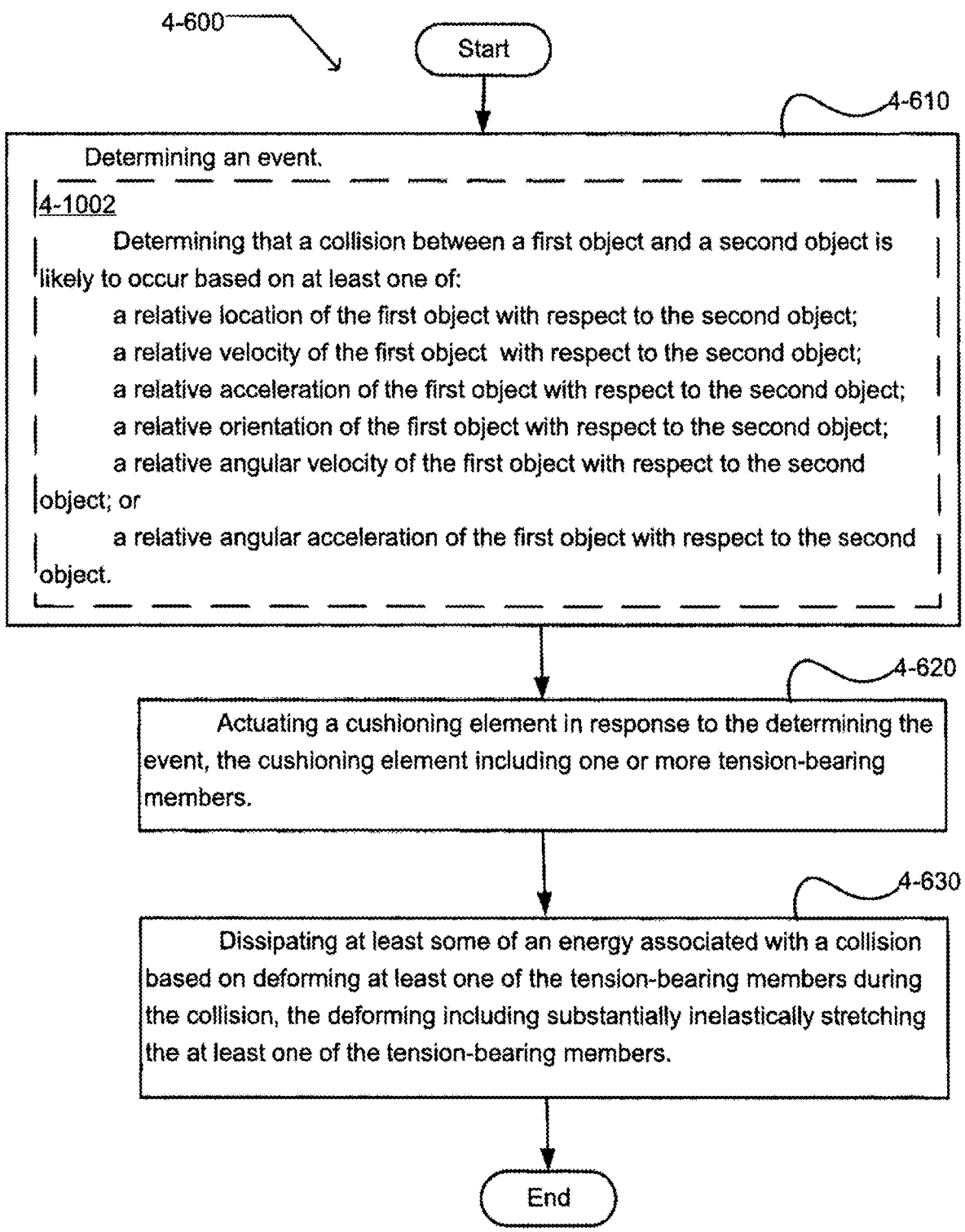
FIG. 81 illustrates an alternative embodiment of the example operational flow of FIG. 77.

FIG. 81 illustrates alternative embodiments of the example operational flow 4-600 of FIG. 77. FIG. 81 illustrates example embodiments where the determining operation 4-610 may include at least one additional operation. Additional operations may include operation 4-1002.

At the operation 4-1002, it is determined that a collision between a first object and a second object is likely to occur based on at least one of a relative location of the first object with respect to the second object, a relative velocity of the first object with respect to the second object, a relative acceleration of the first object with respect to the second object, a relative orientation of the first object with respect to the second object, a relative angular velocity of the first object with respect to the second object, or a relative angular acceleration of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on at least one of a relative location, relative velocity, relative acceleration, a relative orientation, a relative angular velocity, or a relative angular acceleration of vehicle 4-410 with respect to vehicle 4-420 (FIG. 75).

Figure 82:
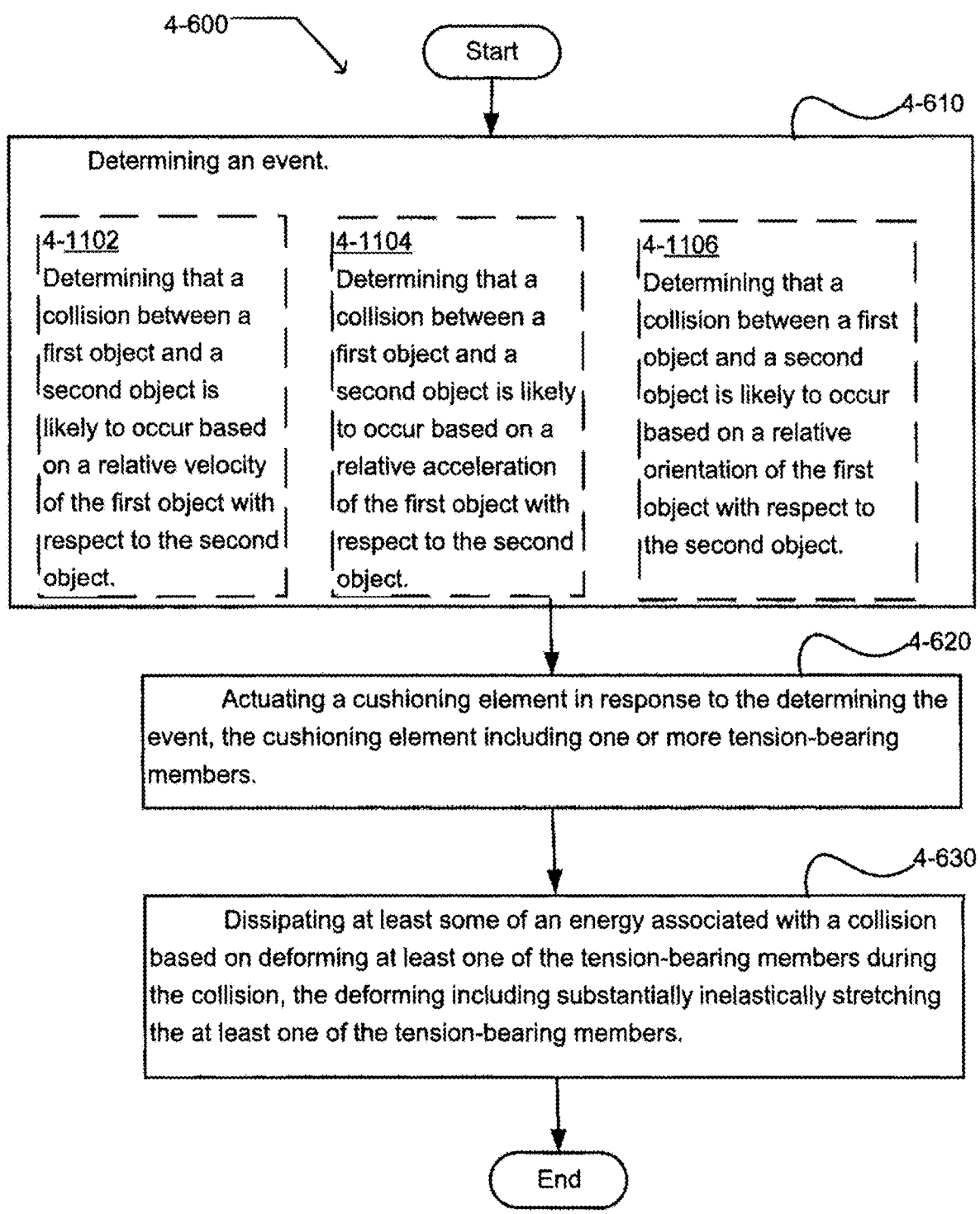
FIG. 82 illustrates an alternative embodiment of the example operational flow of FIG. 77.

FIG. 82 illustrates alternative embodiments of the example operational flow 4-600 of FIG. 77. FIG. 82 illustrates example embodiments where the determining operation 4-610 may include at least one additional operation. Additional operations may include operations 4-1102, 4-1104 and/or 4-1106.

At the operation 4-1102, it is determined that a collision between a first object and a second object is likely to occur based on a relative velocity of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on a relative velocity of vehicle 4-410 with respect to the velocity of vehicle 4-420.

At the operation 4-1104, it is determined that a collision between a first object and a second object is likely to occur based on a relative acceleration of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on a relative acceleration of vehicle 4-410 with respect to the acceleration of vehicle 4-420.

At the operation 4-1106, it is determined that a collision between a first object and a second object is likely to occur based on a relative orientation of the first object with respect to the second object. For example, controller 4-154 or 4-214 and event detector 4-158 or 4-218 within a vehicle 4-410 (FIG. 75) may determine that a collision between a vehicle 4-410 and vehicle 510 is likely to occur based on a relative orientation of vehicle 4-410 with respect to the acceleration and/or orientation of vehicle 4-420.

Figure 83:
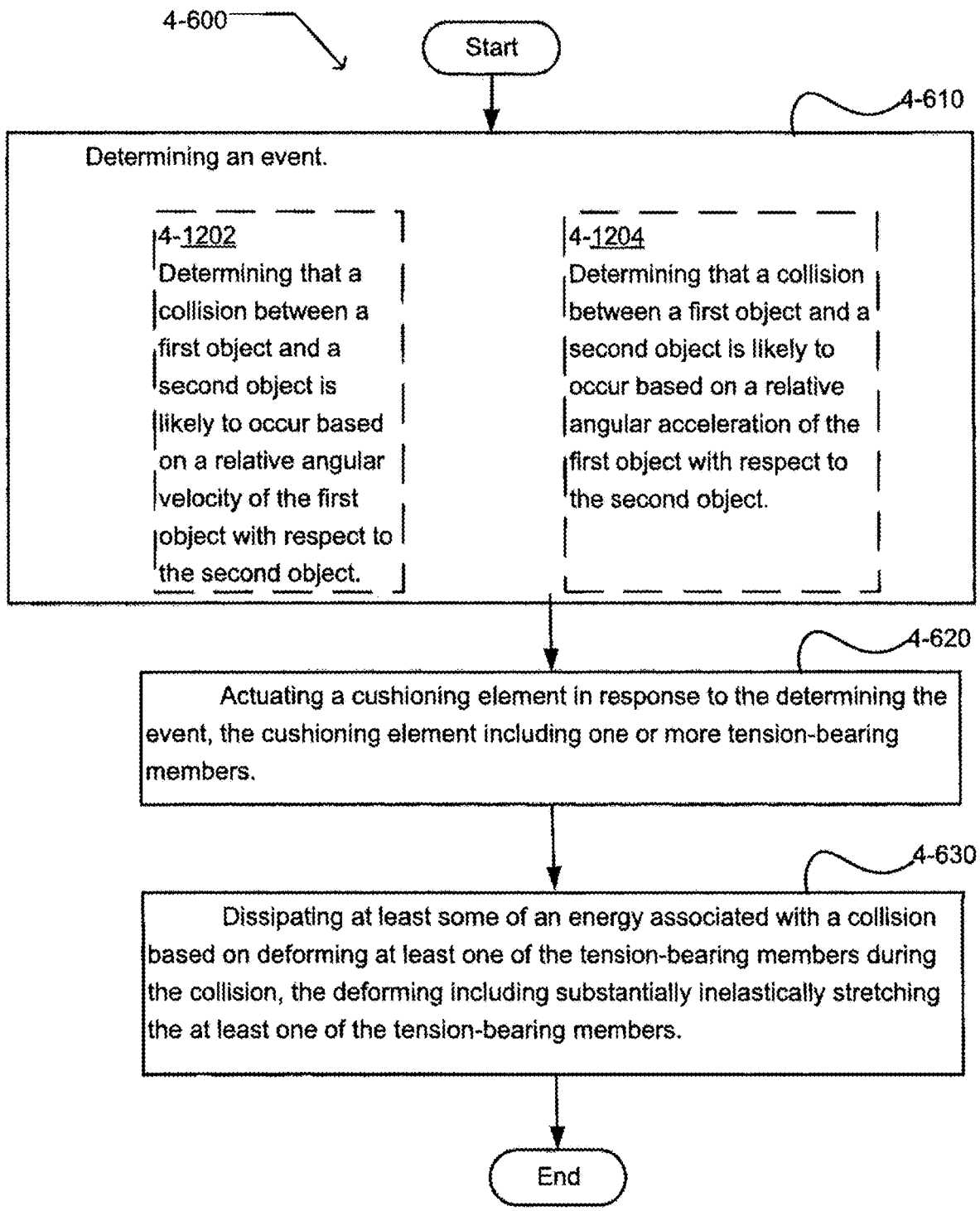
FIG. 83 illustrates an alternative embodiment of the example operational flow of FIG. 77.

FIG. 83 illustrates alternative embodiments of the example operational flow 4-600 of FIG. 77. FIG. 83 illustrates example embodiments where the determining operation 4-610 may include at least one additional operation. Additional operations may include operations 4-1202 and/or 4-1204.

At the operation 4-1202, it is determined that a collision between a first object and a second object is likely to occur based on a relative angular velocity of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on a relative angular velocity of vehicle 4-410 with respect to the angular velocity of vehicle 4-420.

At the operation 4-1204, it is determined that a collision between a first object and a second object is likely to occur based on a relative angular acceleration of the first object with respect to the second object. For example, controller 4-154 or 4-214 and event detector 4-158 or 4-218 within a vehicle 4-410 (FIG. 75) may determine that a collision between a vehicle 4-410 and vehicle 4-420 is likely to occur based on a relative angular acceleration of vehicle 4-410 with respect to the acceleration of vehicle 4-420.

Figure 84:
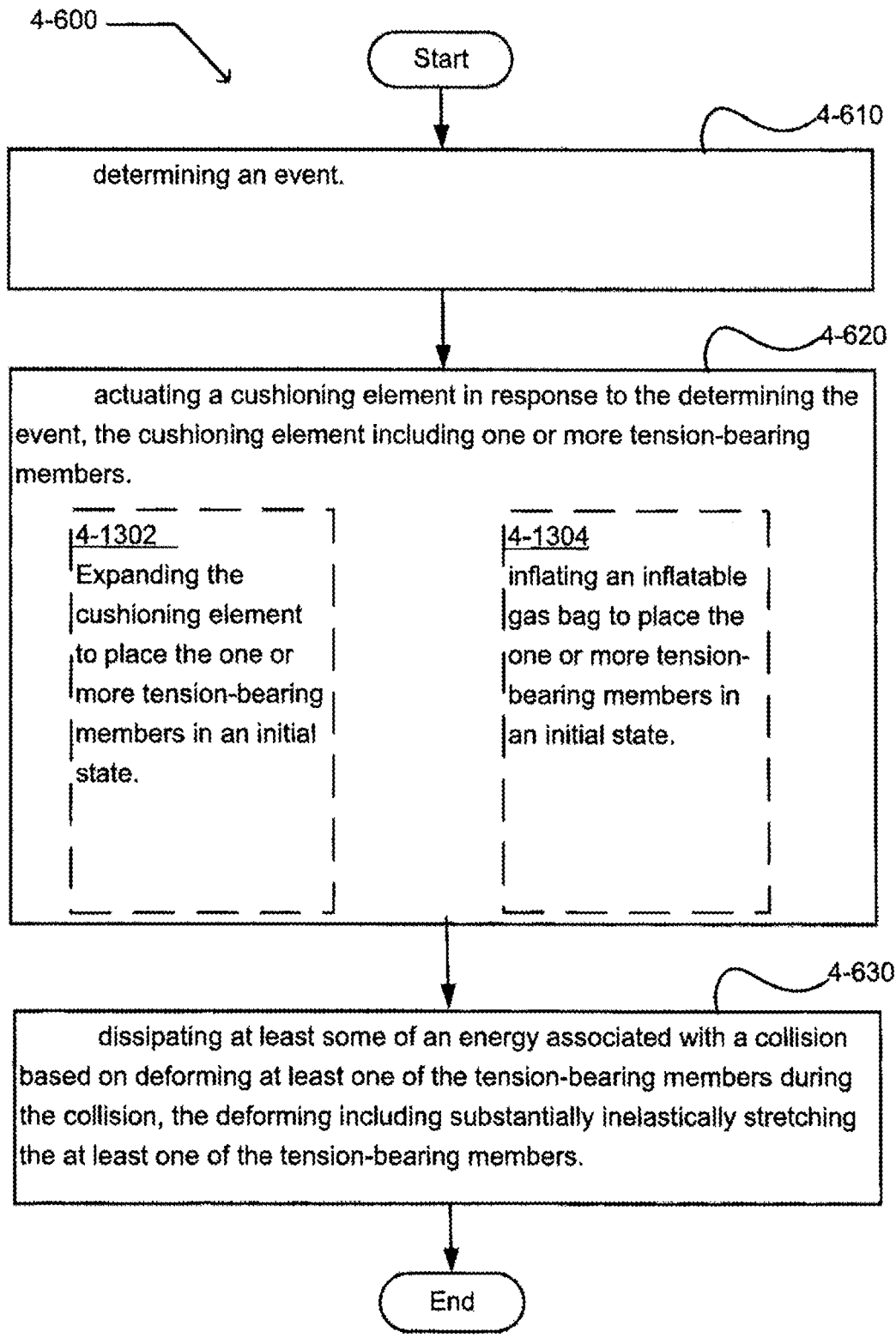
FIG. 84 illustrates an alternative embodiment of the example operational flow of FIG. 77.

FIG. 84 illustrates alternative embodiments of the example operational flow 4-600 of FIG. 77. FIG. 84 illustrates example embodiments where the actuating operation 4-620 may include at least one additional operation. Additional operations may include operations 4-1302 and/or 4-1304.

At the operation 4-1302, the cushioning element is expanded to place the one or more tension-bearing members in an initial state. For example, under operation of element controller 4-214, stored energy reservoir 4-220 (FIG. 73) may expand actuatable cushioning element 4-210 to place one or more tension bearing members 4-230 in an initial (e.g., pre-collision) state. An initial state may, for example, place the tension-bearing members in a position or state where they may be prepared to dissipate energy or perform work during a collision, e.g., by deforming or stretching. This is merely an example initial state, and other initial states may be used.

At the operation 4-1304, an inflatable gas bag is inflated to place the one or more tension-bearing members in an initial state. For example, under operation of element controller 4-214, stored energy reservoir 4-220 (FIG. 73) may pump gas to inflate actuatable cushioning element 4-210 or a gas bag to place one or more tension bearing members 4-230 in an initial state.

Figure 85:
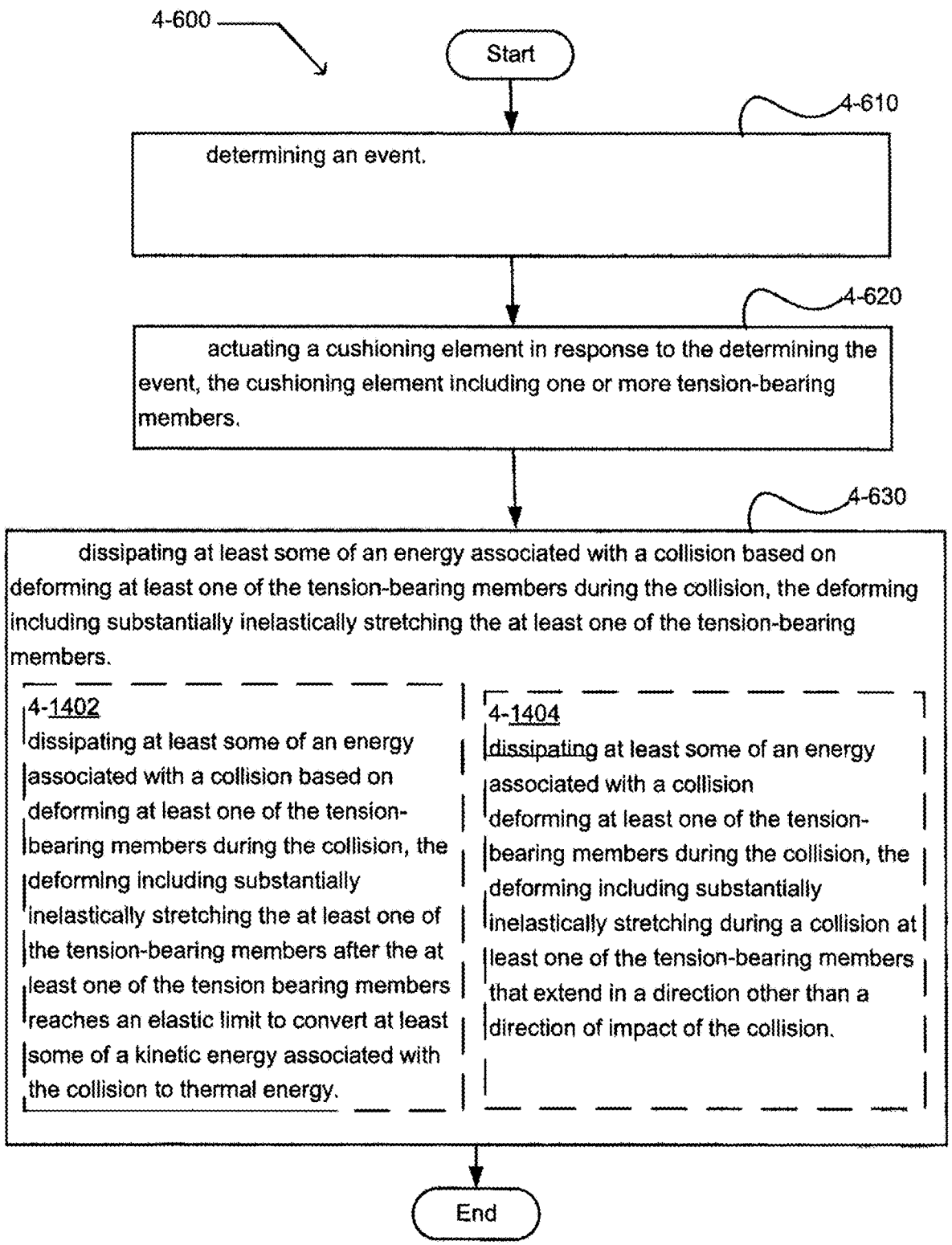
FIG. 85 illustrates an alternative embodiment of the example operational flow of FIG. 77.

FIG. 85 illustrates alternative embodiments of the example operational flow 4-600 of FIG. 77. FIG. 85 illustrates example embodiments where the dissipating operation 4-630 may include at least one additional operation. Additional operations may include operations 4-1402 and/or 4-1404.

At the operation 4-1402, at least some of an energy associated with a collision is dissipated based on deforming at least one of the tension-bearing members during the collision, the deforming including substantially inelastically stretching the at least one of the tension-bearing members after the at least one of the tension bearing members reaches an elastic limit to convert at least some of a kinetic energy associated with the collision to thermal energy. For example, at least some of the energy associated with a collision between vehicles 4-410 and 4-420 may be dissipated based on deforming tension-bearing members 4-230C, 4-230D and 4-230E (FIG. 74B) during the collision. This deforming may include inelastically stretching tension-bearing members 4-230C, 4-230D and/or 4-230E beyond an elastic limit to convert at least some of a kinetic energy associated with the collision to thermal energy.

At the operation 4-1404, at least some of an energy associated with a collision is dissipated based on deforming at least one of the tension-bearing members during the collision, the deforming including substantially inelastically stretching during a collision at least one of the tension-bearing members that extend in a direction other than a direction of impact of the collision. For example, at least some of the energy associated with a collision between vehicles 4-410 and 4-420 may be dissipated based on deforming and inelastically stretching during the collision one or more of tension-bearing members 4-230C, 4-230D and 4-230E, which may extend in a direction other than a direction of impact of the collision 4-239 (FIG. 74B).

For example, a portion of the actuatable cushioning element 4-210 receiving the impact (e.g., along a direction of impact of collision) may become shorter or smaller, which may cause the corresponding tension bearing members 4-230A and 4-230B that extend along the direction of impact to go loose or slack during the collision (e.g., not perform substantial work). While portions of the cushioning element 4-210 that extend or provided in other directions (directions other than the direction of impact 4-239 such as a direction that is substantially perpendicular to the direction of impact) may at least in some cases lengthen (or attempt to lengthen) during the collision, causing the corresponding tension-bearing members 4-230C, 4-230D and 4-230E to stretch or perform work and dissipate some of the kinetic energy associated with the collision. This is merely an example embodiment. In another example embodiment, the actuatable cushioning element may be provided as a web or mesh of tension-bearing members, without a bag to support the tension-bearing members.

Figure 86:
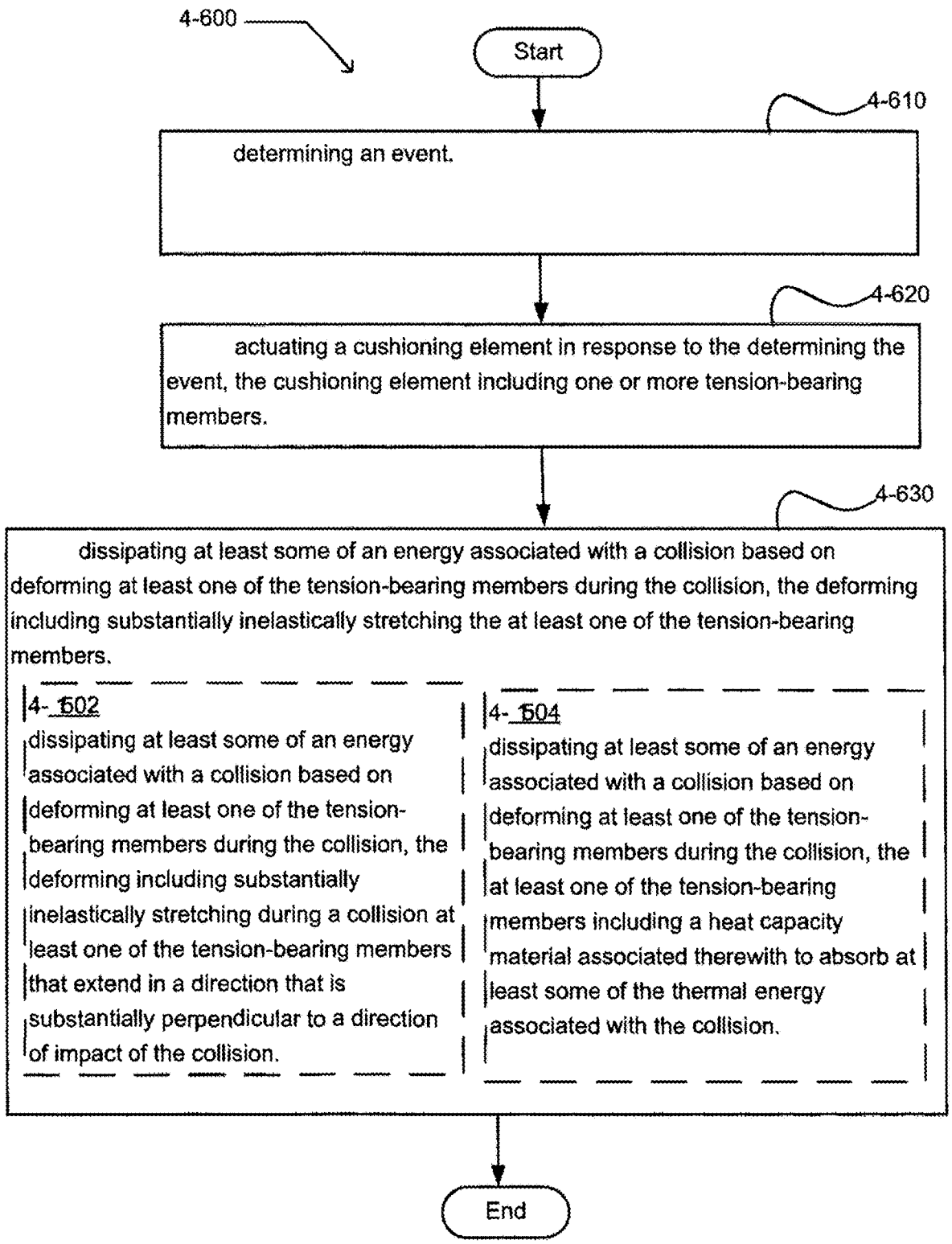
FIG. 86 illustrates an alternative embodiment of the example operational flow of FIG. 77.

FIG. 86 illustrates alternative embodiments of the example operational flow 4-600 of FIG. 77. FIG. 86 illustrates example embodiments where the dissipating operation 4-630 may include at least one additional operation. Additional operations may include operations 4-1502 and/or 4-1504.

At the operation 4-1502, at least some of an energy associated with a collision is dissipated based on deforming at least one of the tension-bearing members during the collision, the deforming including substantially inelastically stretching during a collision at least one of the tension-bearing members that extend in a direction that is substantially perpendicular to a direction of impact of the collision. For example, tension-bearing member 4-230C, which may extend in a direction (FIG. 74B) that is substantially perpendicular to direction of impact of the collision 4-239, may stretch during a collision to dissipate at least some of the energy associated with the collision.

At the operation 4-1504, at least some of an energy associated with a collision is dissipated based on deforming at least one of the tension-bearing members during the collision, the at least one of the tension-bearing members including a heat capacity material associated therewith to absorb at least some of the thermal energy associated with the collision. For example, tension-bearing member 4-230 may include a heat capacity material 4-512 (e.g., FIG. 76A) applied thereto to absorb at least some of the thermal energy that may be generated by the work performed by the tension-bearing member 4-230. Thus, the heat capacity material 4-512 may, at least in some cases, increase the work capacity of the tension-bearing member 4-230.

Figure 87:
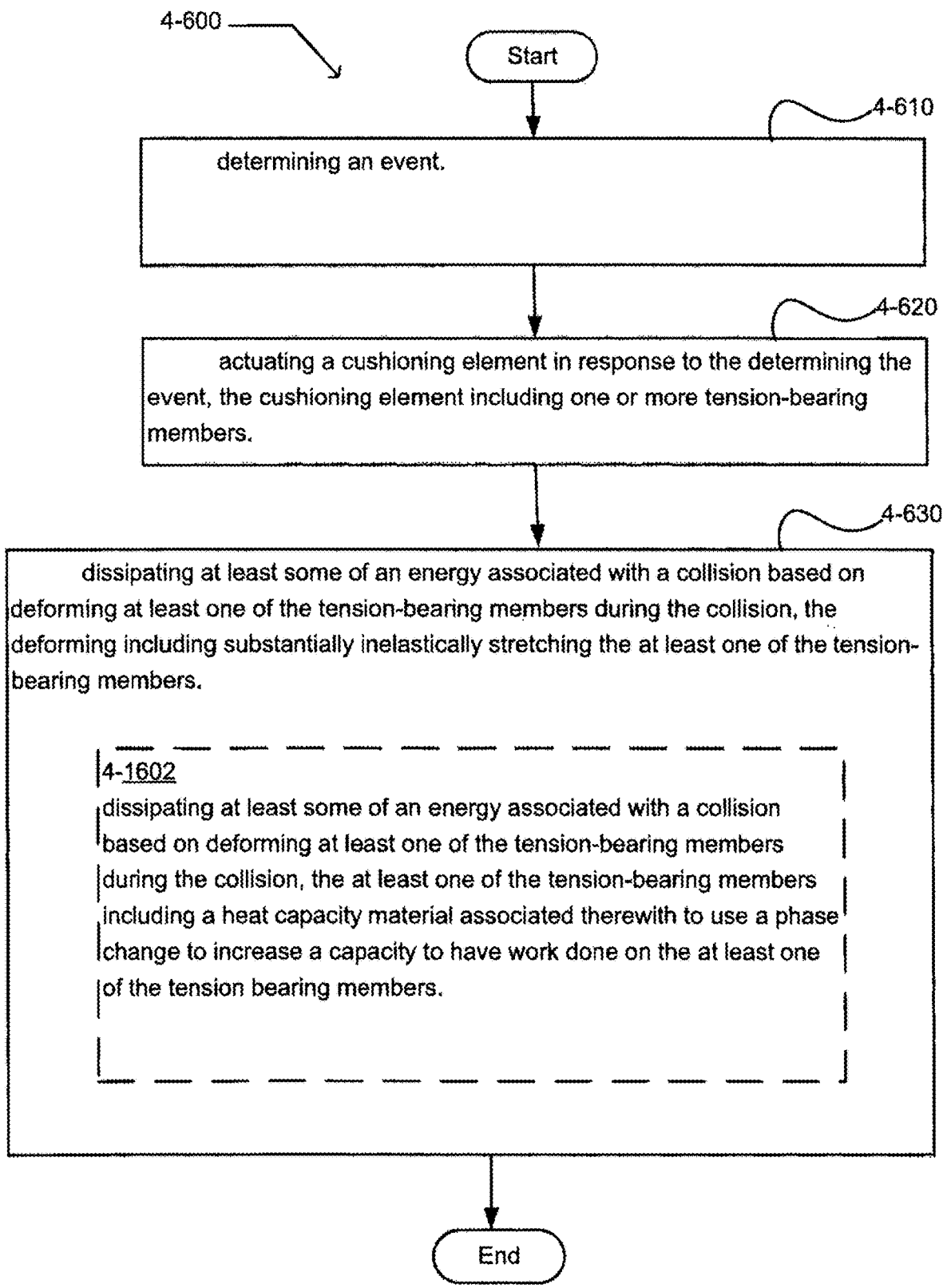
FIG. 87 illustrates an alternative embodiment of the example operational flow of FIG. 77.

FIG. 87 illustrates alternative embodiments of the example operational flow 4-600 of FIG. 77. FIG. 87 illustrates example embodiments where the dissipating operation 4-630 may include at least one additional operation. Additional operations may include operation 4-1602.

At the operation 4-1602, at least some of an energy associated with a collision is dissipated based on deforming at least one of the tension-bearing members during the collision, the at least one of the tension-bearing members including a heat capacity material associated therewith to use a phase change to increase a capacity to have work done on the at least one of the tension bearing members. For example, tension-bearing member 4-230 may include a heat capacity material 4-512 (FIG. 76B), such as water, associated with the tension-bearing member 4-230. For example, the tension-bearing member 4-230 may be soaked in water, or the water may otherwise be applied to a surface of the tension-bearing member 4-230. In an example embodiment, the heat capacity material 4-512, after being applied to the tension-bearing member 4-230, may undergo a phase change, e.g., from water to gas (or other phase change) during the collision, which may increase a capacity to have work done on (or by) the at least one of the tension-bearing members 4-230.

FIG. 88 illustrates a partial view of an example computer program product 4-1700 that includes a computer program 14-704 for executing a computer process on a computing device. An embodiment of the example computer program product 4-1700 is provided using a signal bearing medium 14-702, and may include one or more instructions for one or more instructions for determining an event, the signal bearing medium also bearing one or more instructions for actuating a cushioning element in response to the determining the event, the cushioning element including one or more tension-bearing members, and the signal bearing medium also bearing one or more instructions for providing control sufficient to cause dissipation at least some of an energy associated with a collision based on deforming at least one of the tension-bearing members during the collision, the deforming including substantially inelastically stretching the at least one of the tension-bearing members. The one or more instructions may be, for example, computer executable and/or logic-implemented instructions. In one implementation, the signal-bearing medium 14-702 may include a computer-readable medium 14-706. In one implementation, the signal bearing medium 14-702 may include a recordable medium 14-708. In one implementation, the signal bearing medium 14-702 may include a communications medium 14-710.

Figure 89:
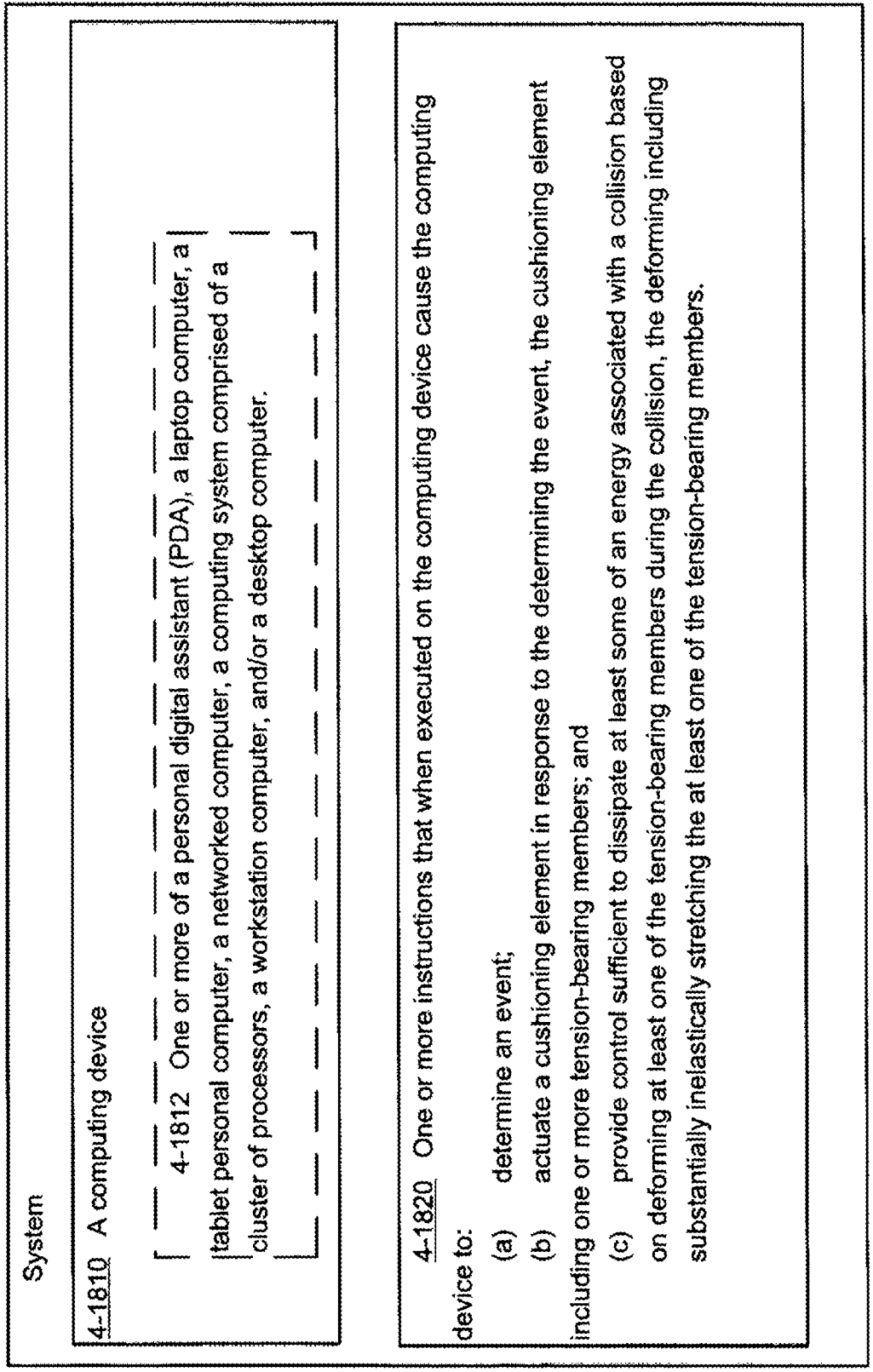
FIG. 89 illustrates an example system 4-1800.

FIG. 89 illustrates an example system 4-1800. The system 4-1800 may include a computing device 1810. The system 4-1800 may also include one or more instructions that when executed on the computing device cause the computing device to:
(a) determine an event; (b) actuate a cushioning element in response to the determining the event, the cushioning element including one or more tension-bearing members; and (c) provide control sufficient to dissipate at least some of an energy associated with a collision based on deforming at least one of the tension-bearing members during the collision, the deforming including substantially inelastically stretching the at least one of the tension-bearing members 4-1820. In some implementations, the computing device 4-1800 may be a computational device embedded in a vehicle, or may be a functionally-dedicated computational device. In some implementations, the computing device 4-1800 may be include a distributed computational device including one or more devices on a vehicle configured to communicate with a remote control plant (e.g., such as communicating with a remote computer via a wireless network).

In an alternative embodiment, the computing device 4-1810 may include one or more of a personal digital assistant (PDA), a laptop computer, a tablet personal computer, a networked computer, a computing system comprised of a cluster of processors, a workstation computer, and/or a desktop computer (4-1812).

FIG. 90 illustrates an example apparatus 4-1900 in which embodiments may be implemented. In implementation 4-1910, the apparatus 4-1900 may include a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. For example, actuatable cushioning element 4-210 (FIG. 76A) may include one or more tension-bearing members 4-230A, 4-230B, 4-230C. The tension-bearing members 4-230 may deform in response to a collision or impact. At least one of the tension-bearing members 4-230 (e.g., 4-230C) may substantially inelastically deform after reaching an elastic limit.

FIG. 90 also illustrates alternative embodiments of the example apparatus 4-1900. FIG. 90 illustrates example embodiments that may include at least one additional implementation. Additional implementations may include implementations 4-1912, 4-1922, 4-1924, 4-1930 and/or 4-1940.

In implementation 4-1912, the implementation 4-1910 may include a cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit. For example, tension-bearing member 4-230C may inelastically stretch during a collision after reaching an elastic limit.

In implementation 4-1922, the apparatus 4-1900 may further include a heat capacity material associated with at least one of the tension-bearing members. For example, a heat capacity material 4-512 (FIG. 76A) associated with tension-bearing member 4-230.

In implementation 4-1924, the apparatus 4-1900 may further include a heat capacity material in contact with at least one of the one or more tension-bearing members to increase a work capacity of the at least one of the one or more tension-bearing members. For example, a heat capacity material 4-512 (FIG. 76A) may be in contact with the tension-bearing member 4-230 to increase a work capacity of the tension-bearing member 4-230.

In implementation 4-1930, the apparatus 4-1900 may further include an element controller configured to control the cushioning element. For example, an element controller 4-214 (FIG. 73) or other controller may control the actuatable cushioning element 4-210, such as providing overall control or controlling the actuation of the actuatable cushioning element 4-210 including, in some cases, providing control over operation of tension-bearing members 4-230.

In implementation 4-1940, the apparatus 4-1900 may further include an event detector coupled to the element controller configured to detect an event. For example, an event detector 4-218 (FIG. 73) may be coupled to an element controller 4-214 to detect an event.

FIG. 91 also illustrates alternative embodiments of the example apparatus 4-1900. FIG. 91 illustrates example embodiments that may include at least one additional implementation. Additional implementations may include implementations 4-2002, 4-2004, 4-2006, 4-2008, 4-2010 and/or 4-2012.

In implementation 4-2002, at least one of the one or more tension-bearing members comprises one or more polyaramid fibers. For example, a tension-bearing member 4-230C may comprise one or more polyaramid fibers.

In implementation 4-2004, one or more of the tension-bearing members (e.g., tension-bearing member 4-230C) comprises at least one of a graphitic fiber, a carbon fiber, and/or a natural fiber.

In implementation 4-2006, one or more of the tension-bearing members (e.g., tension-bearing member 4-230C) comprises at least one of a poly-benzobisoxazole fiber, and/or a synthetic fiber.

In implementation 4-2008, at least one of the one or more tension-bearing members (e.g., 4-230C) lies on a surface of the cushioning element (e.g., cushioning element 4-210, FIGS. 74A and 74B).

In implementation 2010, at least one of the one or more tension-bearing members (e.g., 4-230C) lies within an interior portion of the cushioning element (e.g., 210, FIGS. 74A and 74B).

In implementation 4-2012, at least some of the tension-bearing members have different tension properties than other tension-bearing members. For example, tension-bearing member 4-230C may have a tensile strength, a thickness or size, may be made from a material, or other tension property that may be different from one or more such tension properties of tension bearing members 4-230D and 4-230E (FIG. 73), for example.

Figure 92:
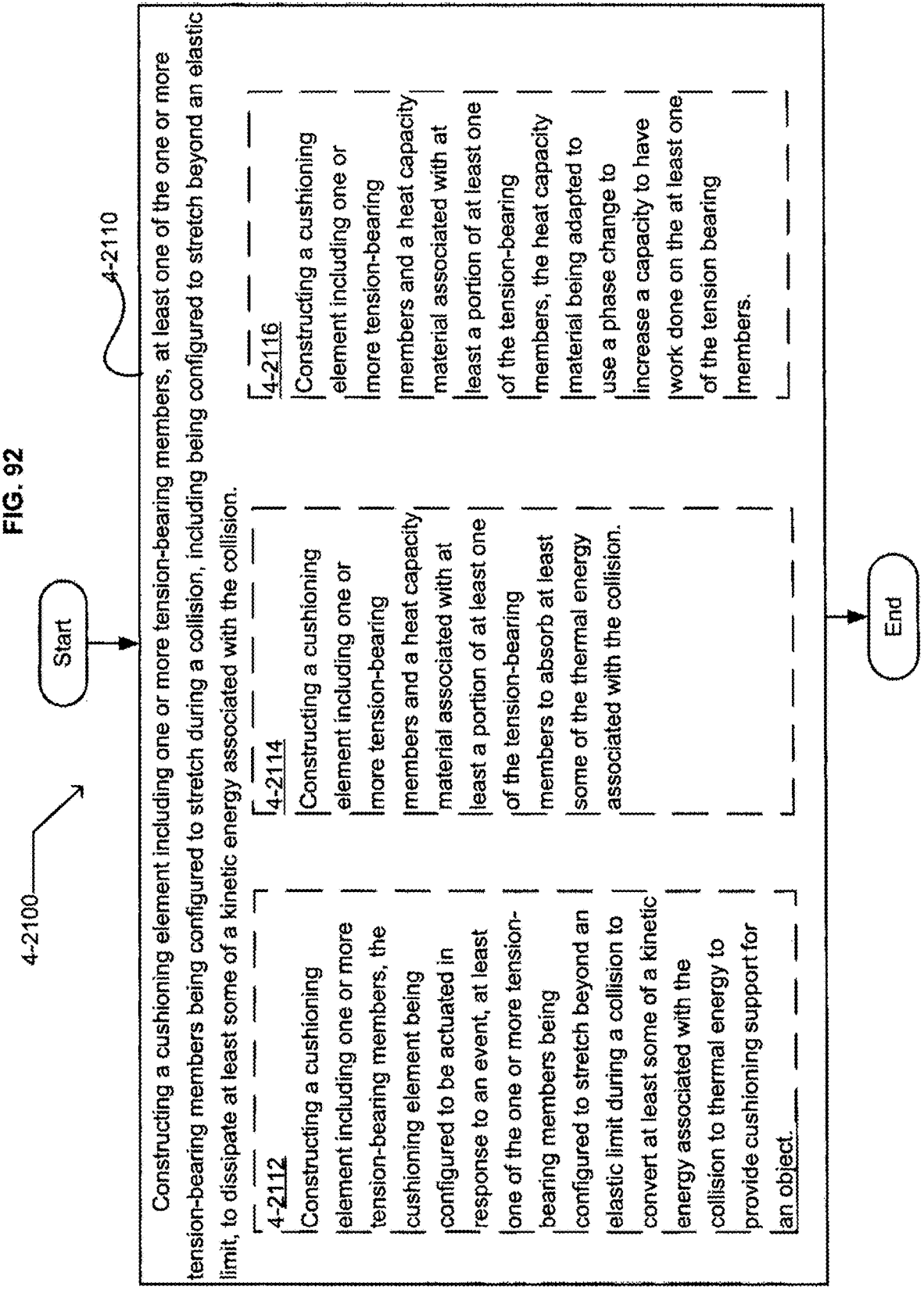
FIG. 92 illustrates an operational flow 4-2100 representing example operations related to cushioning elements.

FIG. 92 illustrates an operational flow 4-2100 representing example operations related to cushioning elements.

At operation 4-2110, a cushioning element is constructed including one or more tension-bearing members, at least one of the one or more tension-bearing members being configured to stretch during a collision, including being configured to stretch beyond an elastic limit, to dissipate at least some of a kinetic energy associated with the collision. For example, an actuatable cushioning element 4-210A, 4-210B (FIGS. 74A and 74B) may be constructed that includes one or more tension-bearing members 4-230A, 4-230B, 4-230C, 4-230D, and/or 4-230E. At least one of these tension bearing members (e.g., tension-bearing member 4-230D) may stretch during a collision, including stretching beyond an elastic limit to dissipate at least some of a kinetic energy associated with a collision, e.g., associated with a collision between vehicles 4-410 and 4-420 (or between two other objects).

FIG. 92 also illustrates alternative embodiments of the example operational flow 4-2100 of FIG. 92. FIG. 92 illustrates example embodiments where the determining operation 4-610 may include at least one additional operation. Additional operations may include operations 4-2112, 4-114 and/or 4-116.

At operation 4-2112, a cushioning element is constructed including one or more tension-bearing members, the cushioning element being configured to be actuated in response to an event, at least one of the one or more tension-bearing members being configured to stretch beyond an elastic limit during a collision to convert at least some of a kinetic energy associated with the collision to thermal energy to provide cushioning support for an object. For example, cushioning element 4-210A (FIG. 74A) may include one or more tension bearing members 4-230. The cushioning element 4-210A may be configured to be actuated in response to an event (e.g., an event detected by an event detector 4-158 or 4-218, FIGS. 72, 73). At least one of the tension bearing members, e.g., tension bearing member 4-230D, may be configured to stretch beyond an elastic limit during a collision (e.g., during a collision between vehicles 4-410 and 4-420) to convert at least some of a kinetic energy associated with the collision to thermal energy to provide cushioning support for an object, such as for vehicle 4-410 (FIG. 75) or passengers therein.

At operation 4-114, a cushioning element is constructed including one or more tension-bearing members and a heat capacity material associated with at least a portion of at least one of the tension-bearing members to absorb at least some of the thermal energy associated with the collision. This thermal energy absorption may limit the temperature rise experienced by tension-bearing member(s) associated with the collision, and may thereby increase a capacity to have work done on the at least one of the tension-bearing members. For example, a cushioning element 4-210 may be constructed that includes one or more tension-bearing members 4-230. The tension-bearing member 4-230 may include a heat capacity material 4-512 (FIG. 76A), which may be water or other heat capacity material, to absorb at least some of the thermal energy associated with the collision.

At operation 4-116, a cushioning element is constructed including one or more tension-bearing members and a heat capacity material associated with at least a portion of at least one of the tension-bearing members, the heat capacity material being adapted to use a phase change to increase a capacity to have work done on the at least one of the tension bearing members. For example, a cushioning element 4-210 (e.g., FIG. 74A) may be constructed to include one or more tension-bearing members 4-230 (FIG. 74A and FIGS. 76A, 4-5B), and a heat capacity material 4-512 associated with at least a portion of one of the tension-bearing members (e.g., tension-bearing member 4-230D).

Heat capacity material 4-512 may be water or other appropriate material. Heat capacity material may be adapted to undergo a phase change (e.g., water to gas, solid to liquid, solid to gas), such as during the collision, increase a capacity to have work done on the at least one of the tension-bearing members 4-230D. For example, water may be utilized to cool the tension-bearing member, and this water or heat capacity material 4-512 may boil off during a collision to increase the work capacity for the tension-bearing member 4-230D. In some instances, thermal energy absorption may limit the temperature rise experienced by the tension-bearing member(s) associated with a collision, and may thereby increase a capacity to have work done on the at least one of the tension-bearing members. This is merely an example, and the disclosure is not limited thereto.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Figure 93:
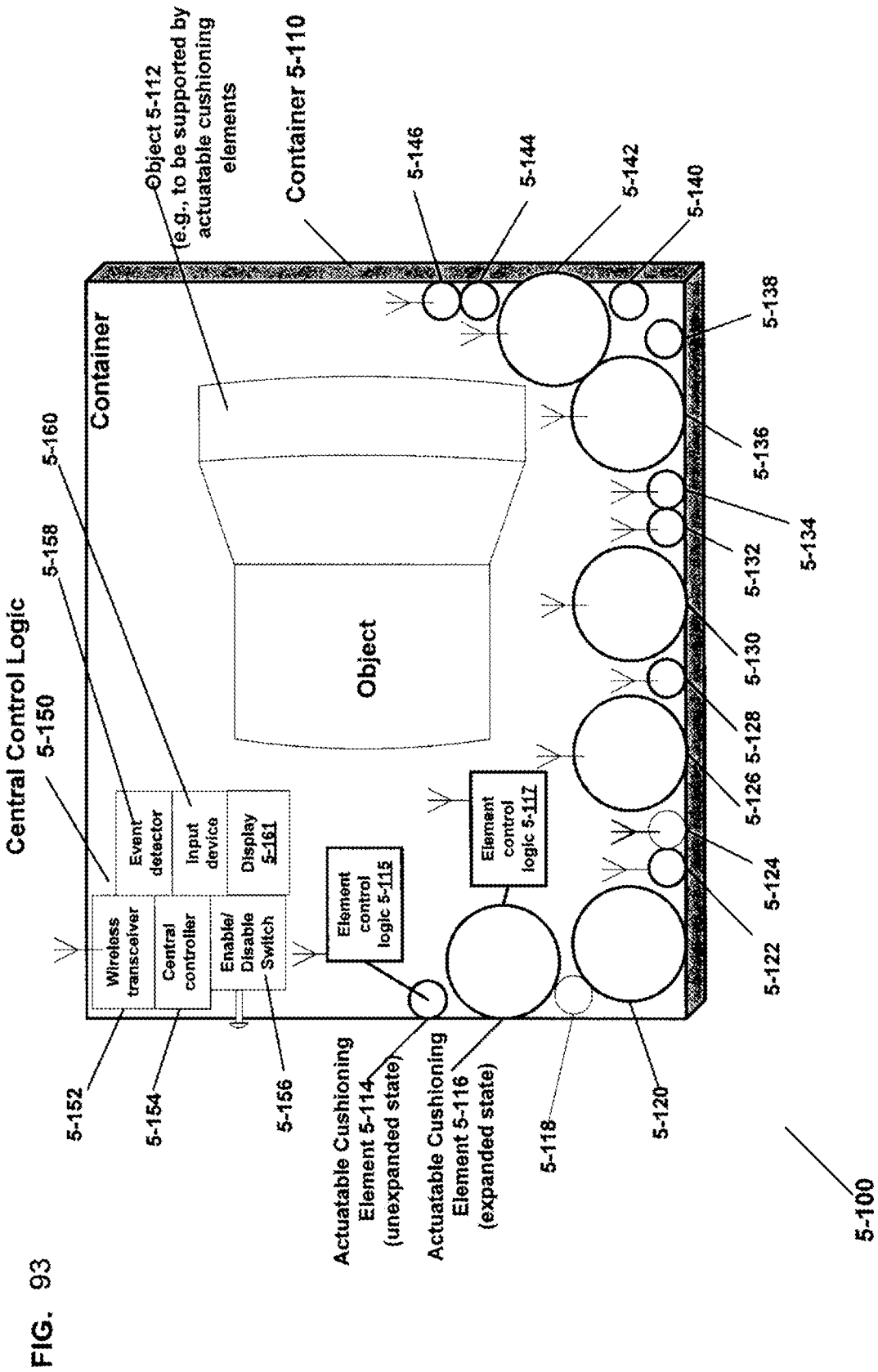
FIG. 93 illustrates an example system in which embodiments may be implemented.

FIG. 93 illustrates an example system 5-100 in which embodiments may be implemented. System 5-100 may include, for example, a container 5-110, which may be any type of container, such as a box, a container for shipping cargo on a vehicle, boat, plane, train or other vehicle, a container for shipping or storing small or large items, a container for shipping fragile items, or any other container. Container 5-110 may be made from any suitable material, such as cardboard, plastic, steel, etc., as a few example materials, but any type of material may be used.

System 5-100 may also include one or more actuatable cushioning elements provided within container 5-110, such as actuatable cushioning elements 5-114, 5-116, 5-118, 5-120, 5-122, 5-124, 5-126, 5-128, 5-130, 5-132, 5-134, 5-136, 5-138, 5-140, 5-142, 5-144, 5-146, etc. The actuatable cushioning elements may provide cushioning support for an item or object, such as object 5-112, for example. Object 5-112 may be any type of object, such as electronics, books, food items, a vehicle (e.g., automobile, boat, train, plane), cargo, fragile or delicate or breakable items which may be in need of cushioning support, people, animals, other organisms, or any other type of object. These are just a few examples of an object which may be supported by actuatable cushioning elements, and the various embodiments are not limited thereto. Actuatable cushioning elements 5-114, 5-116, etc. may spread a force or interaction of an object over a period of time or over an area within container 5-110, which may, at least in some cases, decrease potential impact and/or damage to the object, for example.

For example, one or more actuatable cushioning elements may be actuated (e.g., expanded) in response to an event to protect an object or passenger from damage or harm or collision effects. Also, for example, one or more actuatable cushioning elements may be actuated based upon one or more sensed values in accordance with a model of one or more objects to be protected, the actuatable cushioning elements, and the environment.

Also, for example, one or more actuatable cushioning elements may be actuated over a series of events or in response to a series of events to provide a coordinated protection of one or more objects or passengers in a vehicle from harm, damage or other effects from a collision, acceleration or other event. The protection of one or more objects may be based upon a harm function of the actual or predicted damage to subsets or portions of such objects, such as a maximum value, a weighted value, a cumulative value, or other such functions. The harm function may include damage to the environment (e.g., pedestrians or other vehicles in a vehicular collision, higher valued objects in the vicinity of a container collision, etc.) as well as to the one or more nominally protected objects. These are merely a few illustrative examples and the disclosure is not limited thereto. Additional details and example embodiments are described herein.

Actuatable cushioning elements 5-114, 5-116, etc. may be in either an expanded state, such as shown for actuatable cushioning element 5-116, or an unexpanded state such as for actuatable cushioning element 5-114, for example. Or an actuatable cushioning element may also be partially expanded or partially unexpanded, for example.

In an example embodiment, some types of actuatable cushioning elements may be provided in an expanded state (e.g., inflated) for a limited period of time. For example, one or more actuatable cushioning elements may be actuated (e.g., expanded or unexpanded) in response to an event. In an example embodiment, a subset of actuatable cushioning elements may be actuated in response to an event. In another example embodiment, one or more actuatable cushioning elements may be expanded just prior to shipment and may remain in an expanded state for an extended period of time, or for a duration of transport, for example. In an example embodiment, an actuatable cushioning element may provide greater cushioning support for an object while in an expanded state, as compared to an unexpanded state (e.g., due to a greater volume of flexible or cushioning material or matter to absorb an impact). This is merely an example embodiment, and the disclosure is not limited thereto.

One or more of the actuatable cushioning elements may be actuated, which may include putting an actuatable cushioning element into motion or action. Actuation may include, for example, expanding an actuatable cushioning element from an unexpanded state to an expanded state (e.g., causing an element to expand or increase in size), or unexpanding an actuatable cushioning element from an expanded state to an unexpanded state (e.g., causing an element to shrink or reduce in size or contract), as examples. Actuation may include, for example, causing an airbag or other entity to inflate or deflate. Actuation may include, for example, changing or controlling the shape of an actuatable cushioning element. Actuation may also include partial motions or partial actions, such as partially expanding or partially unexpanding an actuatable cushioning element, for example.

Actuatable cushioning elements 5-114, 5-116, etc. may include any type of expandable element. For example, actuatable cushioning elements 5-114, 5-116, etc., may include expandable gas bags which may expand based on the application of pressurized gas to the bag similar to the airbags used in automobiles and other vehicles. Actuatable cushioning elements 5-114, 5-116, etc. may alternatively include a fluid-expandable bag or entity that may be expanded by fluid. For example, actuatable cushioning elements 5-114, 5-116, etc., may include fluid-actuatable elements, where fluid may be sourced from one or more fluid reservoirs, e.g., via a valving actuation. The fluid reservoirs may, for example, cause the fluid actuatable elements to actuate (e.g., expand and/or unexpand/contract) by causing fluid to flow into or out of the fluid-actuatable elements. For example, actuatable cushioning elements 5-114, 5-116, etc., may include magnetic field-actuatable elements, where magnetic field may be sourced from one or more electric energy sources, e.g., via a capacitor, an inductor, a flux generator, or other means. The electric energy sources may, for example, cause the magnetic field actuatable elements to actuate (e.g., expand and/or unexpand/contract) by causing magnetic fields to apply force to the fluid-actuatable elements. Actuatable cushioning elements 5-114, 5-116, etc. alternatively may include an expandable cushioning material which may expand (or unexpand), for example, through the application of a chemical, gas, liquid, electrical energy, reaction force or other energy or material. Electrical energy may, for example be used to expand (or unexpand) or shape an expandable cushioning material by means of an electric motor, a linear electromagnetic motor, a piezoelectric actuator, or other means. Reaction force may, for example be used to expand (or unexpand) or shape an expandable cushioning material by means of a rocket engine, a pulsed microimpulse reaction engine, a magnetic repulsion coil, or other means. Expandable cushioning material may apply cushioning force by means of pressure, electric/magnetic fields, inertia, compressive stress, tensile force, or shear force, or a combination thereof. Expandable cushioning material may apply cushioning force and/or dissipate interaction energy by means of crushing (e.g., foam or shells), breaking (e.g., fibers or wires), buckling (e.g., struts or plates) or other mechanisms.

In an example embodiment, the actuatable cushioning elements may be re-usable, where the cushioning elements may be expanded to absorb an impact, later fully or partially unexpanded, and then subsequently expanded again to provide cushioning support or protect the object for a second event or impact, or to provide cushioning support in another container, for example. While in another example embodiment, the actuatable cushioning elements may be disposable, wherein the elements, for example, may be expanded or used only once or only a few times.

Any number of actuatable cushioning elements may be used to provide cushioning support for object 5-112. For example, in one embodiment, at least 12 actuatable cushioning elements may be used to provide cushioning support for an object. This may include providing at least 12, 20, 50, 100 or even 500 actuatable cushioning elements (or more) to provide cushioning support, according to different example embodiments.

The actuatable cushioning elements may be any shape (e.g., round, oblong, rectangular, irregular shape) and any size. In an example embodiment, one or more of actuatable cushioning elements 5-114, 5-116, etc. may be 2.5 cm in width or less in an unexpanded state, or may be 2.5 cm in width or more in an unexpanded state, or may be 5 cm or less in an unexpanded state, or may be 8 cm or less in an unexpanded state, as examples. For example, different numbers and/or sizes of cushioning elements may be used, e.g., depending on the application, the type of object to be protected, the type or size of container to be used, or other factors. These are some example numbers and sizes and the disclosure is not limited thereto. In an example embodiment, smaller-sized actuatable cushioning elements may be more applicable for smaller containers, whereas larger actuatable cushioning elements may be more applicable for larger containers, for example.

In another example embodiment, a group of actuatable cushioning elements may be provided within a container, or outside of the container, to provide cushioning support for an object, such as a vase or other object within the container. A first subset of actuatable cushioning elements may be pre-inflated or pre-expanded in response to a first event, e.g., at packing time or just prior to shipment. At some later point, a second subset of actuatable cushioning elements may be actuated (e.g., expanded), in response to a second event (such as an acceleration that exceeds a threshold, or an impact or likely impact), for example. At some point later, a third subset of actuatable cushioning elements may be actuated (e.g., inflated or expanded), in response to a third event, for example. Also, in an example embodiment, upon arrival (which may be considered a fourth event), one or more (or even all) of the actuatable cushioning elements in the container may be actuated (e.g., unexpanded or deflated), to allow the object to be unpacked from the container. The actuatable cushioning elements may also be-reused in another container, for example. In this manner, the group of actuatable cushioning elements may provide cushioning support for an object, e.g., for one or more events.

Actuatable cushioning elements may be actuated outside of a container or outside of the preactivation envelope of a system. For example, such actuation may provide additional cushioning to that provided with interior actuatable cushioning elements alone. For example, such exterior actuation may also act by modification of the dynamics of the interaction with the environment, such as by introducing sliding contacts, aerodynamic lift, sideways steering forces, or by other means. For example, such exterior actuatable cushioning elements may have spherical shapes, cylindrical shapes, high aspect ratio shapes, lifting-body shapes, or other shapes. For example, exterior actuatable cushioning elements may include expandable gas bags, fluid actuatable elements, expandable cushioning materials, skids, reaction engines, drag-inducing devices, anchors, or other such elements. For example, such exterior actuatable cushioning elements may act in a time dependent (e.g., via a specified actuation profile, by stretching, deforming, breaking) and/or time sequenced manner (e.g., by timed activation of one or more exterior actuatable cushioning elements).

According to an example embodiment, one or more actuatable cushioning elements may be actuated (e.g., expanded or unexpanded) for or in response to an event. The event may be any of a variety of different events. For example, the event may include determining an impact or likely impact, determining an acceleration or change in acceleration that exceeds a threshold (such as when a container has been dropped), determining a temperature (e.g., inside or outside the container) that reaches a selected temperature, determining a time that reaches a specific time, determining that a location has been reached or that a selected distance within the location has been reached (e.g., either approaching or leaving the location), determining that a selected subset of actuatable cushioning elements (e.g., some or all of the elements) have not yet been expanded (thus more elements should be expanded to provide support), or other event.
These are merely a few examples of events, e.g., events which may cause or result in one or more actuatable cushioning elements to be actuated.

According to an example embodiment, acceleration may include a scalar quantity, or may include a vector quantity. Acceleration may include linear acceleration, angular acceleration, or other type of acceleration. A detected or determined acceleration may include an acceleration having components with varying degrees of interest or relevance (e.g., one or more linear components may be used, or one or more angular components to indicate an event or events to trigger actuation of an actuatable cushioning element). For example, an event may include an acceleration or change in acceleration that may include an acceleration (e.g., one or more acceleration components) or a change in acceleration that may exceed a threshold. Alternatively, the acceleration may be determined in more complex manners, such as ad hoc, time and situation-dependent manners, or other manners. For example, a model may be provided or used to model the operation of a system (e.g., system 5-100), or model the operation of actuatable cushioning elements, or model the free-fall or acceleration or movement of one or more objects or passengers, or the like. For example, one or more actuatable cushioning elements may be actuated (e.g., expanded or unexpanded/contracted) based on the model and/or based on determination of one or more events. For example, the selected actuation of one or more actuatable cushioning elements may be based upon the predicted shift of the time profile of one or more accelerations from a value associated with one actuation state to another value corresponding to the selected actuation state, the value of which is predicted to reduce damage to one or more protected objects. For example, measured and model-forecasted time-integrals of acceleration that may exceed case dependent thresholds may be used, e.g., to identify criteria or likely situations where objects may be damaged or broken. In another example embodiment, a time-history of acceleration may, in some cases, inform the system 5-100 as to the level of protection that may or should be used to protect the object. For example, an extended time-interval of free-fall may result in decelerations of significant magnitudes being purposefully applied to protect objects when, e.g., an event is detected. For example, measured or model-forecasted stresses within the object may be used, e.g., to identify criteria or likely situations where objects may be damaged or broken. Such stress thresholds may include peak values or time-dependent value profiles of a function of one or more elements of the stress tensor, or may include initiation or propagation of fracture. For example, measured or model-forecasted temperatures within the object may be used, e.g., to identify criteria or likely situations where objects may be damaged or broken. Such temperature thresholds may include peak temperature values, or energy deposition values (e.g., a substance that will undergo a phase change—e.g., liquid to gas—after accumulation of a certain energy, which those skilled in the art will appreciate is an example of a more general determination that an energy exceeds a threshold), or time dependent temperature profiles. These are merely a few additional example embodiments relating to acceleration, and the disclosure is not limited thereto.

Referring to FIG. 93 again, in an example embodiment, system 5-100 may include central control logic 5-150, including a central controller 5-154 which may provide overall control for system 5-100. Central control logic 5-150 may include a number of additional blocks coupled to central controller 5-154, which will be briefly described.

A wireless receiver 5-152 may transmit and receive wireless signals such as RF (radio frequency) signals. Wireless signals such as RF signals may include any wireless or other electromagnetic signals, and are not limited to any particular frequency range.

An event detector 5-158 may detect or determine an event (or condition), or a series of events, such as an acceleration or change in acceleration that exceeds a threshold, a temperature that reaches a specific temperature, a location that is within a specific distance of a selected location, or any other event. Event detector 5-158 may include any type of detector or sensor. Event detector 5-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold. In another example embodiment, event detector 5-158 may include a Micro Electro Mechanical System (MEMS) accelerometer, which may, for instance, sense a displacement of a micro-cantilevered beam under acceleration transverse to its displacement-direction, e.g., by capacitive means. An angular accelerometer may determine that an angular acceleration or change in angular acceleration has exceeded a threshold. In another example embodiment, event detector 5-158 may include a Ring Laser Gyro, a Fiber Optic Gyro, a Vibrating Structure Gyro, a MEMS Gyro, or a mechanical gyroscope.

Or, alternatively for event detector 5-158, electrodes may be placed on a suitably shaped and mounted piezoelectric material for sensing a current and/or voltage generated by the piezoelectric material deforming in response to acceleration induced stress. Some examples of materials that may be used in the piezoelectric version of the event detector 5-158 may include lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped PLZT, and Barium zirconate titanate (BZT). These are just a few examples of event detectors.

Event detector 5-158 may also, for example, include a GPS receiver, a speedometer, an accelerometer, Radar, a camera, a Gyro, or any other sensor or device that may allow the detection of one or more of the following: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. The first and second objects in this example may be any type of objects. For example, the detected event or information (e.g., relative location, velocity, acceleration, orientation, angular velocity, angular acceleration) may indicate that a collision between a first object (such as a vehicle) and a second object (e.g., another vehicle, a tree, a railing.) has occurred or is likely to occur.

An enable/disable switch 5-156 may be used to enable or disable system 5-100. For example, enable/disable switch 5-156 may be used to enable the one or more actuatable cushioning elements to be actuated, or may disable the one or more actuatable cushioning elements from being actuated, for example. System 5-100 may also include an input device, such as a mouse, keypad or other input device, which may allow a user to configure operation of system 5-100, for example. For example, enable/disable switch 5-156 and/or input device 5-160 may enable a first subset of actuatable cushioning elements to be actuatable during a first time period (or first time interval), and may enable a second subset of actuatable cushioning elements to be actuatable during a second time period (or second time interval), e.g., to provide cushioning support for an object over (or for) a series of events. The phrase "time period" may, for example, include any time interval, and is not necessarily cyclical or periodic, and may include random, non-periodic and/or non-cyclical time periods or time intervals, as examples.

An output device or display 5-161 may also be provided to display information. Input device 5-160 and display 5-161 may be provided in a position which may be reached or accessed by a user, such as on the outside of the container 5-110, for example.

One or more of the actuatable cushioning elements may include an element control logic to control overall operation and/or actuation of the element(s) to which the control logic is connected. For example, element control logic 5-115 may provide control to actuatable cushioning element 5-114, while element control logic 5-117 may control operation of actuatable cushioning element 5-116.

An element control logic may control a single actuatable cushioning element, or may control multiple cushioning elements, for example. The element control logic for one or more actuatable cushioning elements may communicate with other element control logic to provide a cushioning support for object 5-112 in a coordinated manner, for example. According to an example embodiment, this may include an element control logic transmitting a wireless signal(s) when the associated actuatable cushioning element has been actuated (or otherwise an element control logic for an element transmitting a signal notifying other elements of the cushioning element's state) which may allow the element control logic associated with other actuatable cushioning elements to determine how many or what percentage of cushioning elements are in an expanded state. For example, if an insufficient number of cushioning elements are currently in an expanded state, then one or more actuatable cushioning elements (via their element control logic) may then actuate or move to an expanded state to improve cushioning support for the object. Thus, distributed control may be provided via communication between the element control logic for different actuatable cushioning elements.

In another example embodiment, central controller 5-154 (FIG. 93) of central control logic 5-150 may provide central control for operation of the one or more actuatable cushioning elements within container 5-110. For example, event detector 5-158 may detect an event, and then wireless transceiver 5-152 (e.g., under control of central controller 5-154) may transmit wireless signals to one or more element control logic (e.g., 115, 117 . . . ) to cause one or more actuatable cushioning elements to actuate in response to the event.

FIG. 94 illustrates an actuatable cushioning element according to an example embodiment. An actuatable cushioning element 5-210 may be coupled to (or may include) an associated element control logic 5-212. Although not shown, one or more of the actuatable cushioning elements (e.g., actuatable cushioning elements 5-114, 5-116, 5-118, 5-120, 5-122, 5-124 . . . ) may each include a similar element control logic. For example, element control logic 5-115 and 5-117 may be the same as or similar to element control logic 5-212, for example. In an alternative embodiment, element control logic 5-212 may be omitted.

Element control logic 5-212 may include an element controller 5-214 to provide overall control for an actuatable cushioning element 5-210. An event detector 5-218 may detect or determine an event. Event detector 5-218 may be, for example, the same as or similar to the event detector 5-158. A wireless transceiver 5-216 may transmit and receive wireless signals. Alternatively, actuatable cushioning elements may be coupled together (and/or to central control logic 5-150) via any communications media, such as a wireless media (e.g., via RF or other electromagnetic signals, acoustic signals), a wired communication media, such as cable, wire, fiber optic line, etc., or other media.

A stored energy reservoir 5-220 may store gas, liquid, energy (chemical or electrical energy or the like) or other energy or substance, which may be used to actuate actuatable cushioning element 5-210. For example, stored energy reservoir 5-220 may receive signals from element controller 5-214, causing stored energy reservoir 5-220 to release pressurized liquid or gas to actuatable cushioning element 5-210 to cause element 5-210 to expand or inflate, or may release a chemical or other substance causing an expandable cushioning material to expand, for example. In an example embodiment, actuatable cushioning element 5-210 may include one or more fluid-actuatable elements, where fluid may be sourced from one or more fluid reservoirs (such as from stored energy reservoir 5-220), e.g., via a valving actuation. The fluid reservoirs may, for example, cause the fluid actuatable element(s) to actuate (e.g., expand and/or unexpand/contract) by causing fluid to flow into or out of the fluid-actuatable elements.

One or more actuatable cushioning elements, such as actuatable cushioning element 5-210, may be coupled to an element controller (e.g., element controller 5-214) via any communications media, such as a wireless media (e.g., via RF or other electromagnetic signals, acoustic signals), a wired communication media, such as cable, wire, fiber optic line, etc., or other communications media.

According to an example embodiment, one or more actuatable cushioning elements may include fluid-actuated cushioning elements or structures, or may include gas-actuated or gas-powered cushioning elements, or other types of elements. For example, one or more of the actuatable cushioning elements, when actuated, may have at least one of a size, shape, position, orientation, stress-strain tensor components (or other component) of the cushioning elements changed or modified as a result of one or more actuating actions applied to the cushioning element. For example, an actuating action or sequence of actuating actions which may be applied to an actuatable cushioning element, may, e.g., first change its position (or center of mass), then its orientation, then its size, and/or its rigidity or other characteristic. These changes to the actuatable cushioning element may occur, e.g., in a pre-programmed manner, and may occur, e.g., in response to or based upon an event, such as based on a measurement, signals received from cooperating cushioning elements or a controller(s) in the system 5-100, or other signals or criteria or event. The signals that may be received from other cooperating structures (e.g., elements or controllers) may, for example, describe or indicate their own characteristics, such as size, pressure, orientation, shape, etc. A model (e.g., of the system or operation of the system or objects) may be used to determine one or more actions that may be performed (such as actuation of an element), e.g., to protect one or more objects or passengers from harm or damage.

Also, in another example embodiment, one or more objects or passengers may include one or more associated actuatable cushioning elements on or near each object or passenger, where one or more of the group of associated actuatable cushioning elements may be independently controlled so as to provide cushioning support and/or protection for the associated object or passenger. Also, in another example embodiment, two or more separate objects, each protected by their own sets of actuatable cushioning elements may interact (for instance, by an actual or predicted collision). The actuation of one or more object's actuatable cushioning elements may occur with or without cooperation from that of the actuatable cushioning elements of one or more of the other objects. For example, one or more of the objects may sense the actions or state of the actuatable cushioning elements associated with one or more of the other objects. For example, two or more of the objects may share information on the actual and/or planned actuation histories of their actuatable cushioning elements. For example, one or more of the objects may sense the actions or state of the actuatable cushioning elements associated with one or more of the other objects. For example, one or more objects may base the actuation of one or more of its actuatable cushioning elements upon the sensed or predicted actions of one or more actuatable cushioning elements associated with one or more of the other objects. For example, one or more objects may command the actuation or nonactuation of one or more actuatable cushioning elements associated with one or more of the other objects. This commanded actuation process may be performed by a joint decision process, by a hierarchical process, by a master-slave process, or by other means.

In an example embodiment, the actuatable cushioning element may include one or more tension-bearing members 5-230, such as tension bearing members 5-230A, 5-230B, 5-230C, 5-230D and 5-230E. Tension-bearing members 5-230 may, for example, bear tension or force, and may deform in one or more ways, and/or may stretch, e.g., during a collision or impact to dissipate energy associated with a collision and/or provide cushioning support for an object. The tension-bearing members 5-230 may be provided in a number of different directions, and may, for example, lie on a surface (e.g., interior or exterior surface) of the cushioning element 5-210. Alternatively, one or more of the tension-bearing members 5-230 may be provided within an interior portion of the cushioning element 5-210.

In an example embodiment, one or more of the tension-bearing members 5-230 may deform during a collision between two objects. This deformation of one or more of the tension-bearing members 5-230 may include, for example, stretching of the tension-bearing member(s). The deforming or stretching, may include, for example, at least a portion of one or more tension-bearing members substantially inelastically stretching after the tension-bearing member has reached an elastic limit.

In an example embodiment, the actuatable cushioning element 5-210 may dissipate at least some of an energy (e.g., kinetic energy) associated with a collision based on a deforming or stretching of one or more of the tension-bearing members 5-230. For example, during a collision, at least one tension-bearing member that extends in a direction other than a direction of impact of the collision may stretch beyond an elastic limit, and dissipate at least some of an energy associated with the collision. For example, a tension-bearing member that extends in a direction that is substantially perpendicular to a direction of impact of the collision may stretch or deform during the collision to dissipate energy or provide cushioning support for an object.

By stretching or deforming, the tension-bearing members 5-230 may perform work or have work performed on them, allowing the dissipation of at least some energy associated with a collision. In this manner, the cushioning element 5-210 and associated tension-bearing member(s) 5-230 may, for example, provide cushioning support during a collision for an object or objects, such as a vehicle, person, or other object.

The tension-bearing members may be made of a variety of different materials, and may, for example, have a relatively high tensile strength and/or a high strength to weight ratio. In an example embodiment, tension-bearing members may be provided as one or more polyaramid fibers (also known as aramid or aromatic polyamide fibers).

Polyaramid fibers may be a class of heat-resistant and high-strength synthetic fibers, such as for example, fibers in which the fiber-forming substance may be a long-chain synthetic polyamide in which at least some of the amide linkages (—CO—NH—) are attached directly to two aromatic rings. Polyaramid fibers have been manufactured under a number of different brand names, and have been used in a number of different aerospace and military applications, such as ballistic rated body armor, for example.

Polyaramid fiber(s) are merely one example of a tension-bearing member. Tension bearing members 5-230 may be made from other material (e.g., which may have relatively high tensile strength) that may perform work (or may allow work to be performed on the fiber or member), e.g., through stretching or deforming, or otherwise may provide cushioning or dissipation of energy associated with a collision or other impact. Yet more specific instances of such materials might include at least one of a graphitic fiber, a carbon fiber, and/or a natural fiber. Yet more specific instances of such material might also include at least one of a poly-benzo-bisoxazole fiber and/or a synthetic fiber. In some instances of such materials, the various fiber types referred to herein are hyrbridized and/or combined.

FIG. 95A illustrates an actuatable cushioning element according to another example embodiment. Actuatable cushioning element 5-210A is shown in an initial or pre-collision state. Actuatable cushioning element 5-210A may include one or more tension-bearing members, including tension-bearing members 5-230A, 5-230B, 5-230C, 5-230C, 5-230D and/or 5-230E. In an example embodiment, a controller, such as central controller 5-154 or element controller 5-214 may control or cause the actuation of the actuatable cushioning element into an initial or pre-collision state (e.g., in response to detecting or determining an event). A direction of impact 5-239 of a collision is shown. Tension-bearing members 5-230A and 5-230B, at least in part, may be considered to extend in a direction that may be substantially in a direction of the impact of collision 5-239. Other tension-bearing members may extend in other directions. For example, tension-bearing members 5-230C, 5-230D and 5-230E may be considered to extend in directions other than the direction of impact of the collision 5-239. For example, one or more tension-bearing members, such as tension-bearing member 5-230E, may extend in a direction that may be approximately (or substantially) perpendicular to the direction of impact of the collision 5-239.

FIG. 95B illustrates an actuatable cushioning element of FIG. 95A in a post-collision state according to an example embodiment. In an example embodiment, during a collision between two objects, the actuatable cushioning element 5-210 may provide cushioning support for an object (not shown) or dissipate energy associated with the collision via a deforming or stretching of one or more of the tension-bearing members. For example, tension-bearing members 5-230C, 5-230D and 5-230E may deform or stretch during a collision and dissipate energy associated with a collision.

Figure 96:
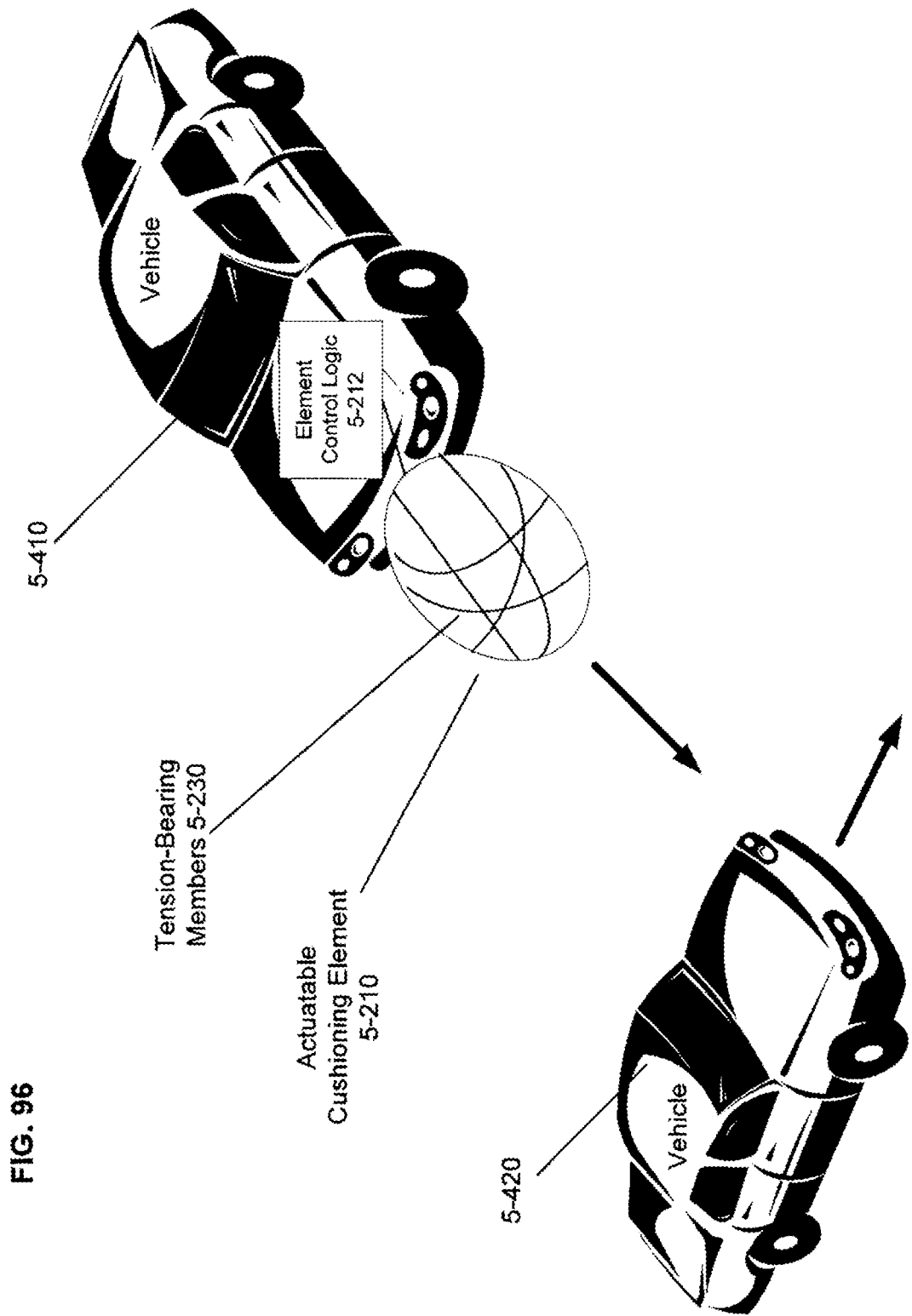
FIG. 96 is a diagram illustrating an operation of an actuatable energy dissipative cushioning element according to an example embodiment.

FIG. 96 is a diagram illustrating an operation of an actuatable energy dissipative cushioning element according to an example embodiment. Two objects are shown in FIG. 96, including vehicle 5-410 and vehicle 5-420, although any type of objects may be used. Vehicle 5-410 may include an actuatable cushioning element 5-210 that includes one or more tension-bearing members 5-230. An element control logic 5-212 may be coupled to the actuatable cushioning element. Event detector 5-218 of element control logic 5-212 (FIG. 94) may determine or detect an event, and element controller or central controller 5-154 may actuate and/or otherwise control actuatable cushioning element 5-210 and/or tension-bearing members 5-230 to dissipate energy associated with a collision between vehicle 5-410 and vehicle 5-420. Event detector 5-218 and/or element control logic 5-212 may detect or determine a number of different events, and may then actuate or deploy the actuatable cushioning element 5-210. Actuatable cushioning element 5-210 is shown as being provided outside of vehicle 5-410, but may be located anywhere, such as inside a cabin or driver's space of vehicle 5-410, for example.

FIG. 97A is a diagram illustrating a tension-bearing member according to an example embodiment. In an example embodiment, a tension-bearing member 5-230 may stretch or deform during a collision to dissipate some of the kinetic energy associated with a collision. This may be performed by, for example, at least in part converting some of the kinetic energy associated with the collision into thermal energy. In an example embodiment, tension-bearing member 5-230 may include a heat capacity material 5-512 associated with the tension-bearing member 5-230 to absorb at least some of the thermal energy associated with the collision, or to increase a capacity of the tension-bearing member 5-230 to perform work or to increase a capacity to have work done on the tension-bearing member 5-230.

For example, the heat capacity material may increase the temperature at which the tension-bearing member fails or breaks, thereby, at least in some cases increasing the capacity of the tension-bearing member 5-230 to perform work or stretch during a collision. This may, for example, increase an amount of kinetic energy that the actuatable cushioning element may dissipate during a collision between two objects.

Although not required, in an example embodiment, heat capacity material 5-512 may use (or may include) a phase-change material that may change phases (e.g., solid-to-liquid, liquid-to-gas, solid-to-gas) while the tension-bearing member is performing work or is stretching or deforming, which may, for example, increase the amount of kinetic energy that the cushioning element may dissipate. This may include, for example, a liquid or other heat capacity material boiling or changing from liquid to gas to dissipate additional energy associated with the collision. For example, water may be used to cool or decrease the temperature of the tension-bearing member during a collision. Thus, using a tension-bearing member having a heat capacity material may increase the temperature at which the tension-bearing member may fail or no longer be able to perform work. Thus, heat capacity material or phase change material may be used to increase or enhance mechanical performance of the tension bearing member 5-230, for example.

In one example embodiment, if phase change is used, the phase change of the heat capacity material may, for example, occur at temperatures that may be well above ordinary environmental temperatures, e.g., greater than 50 degrees Centigrade (50° C.), and may be (for example) less than 300° C. or 400° C. These are merely some examples, and a number of different temperatures may be used for phase change.

The heat capacity material 5-512 may, for example, be provided on a surface of the tension bearing member 5-230, or may be provided within one or more fibers of the tension-bearing member. These are merely some examples.

FIG. 97B is a diagram illustrating a tension-bearing member according to another example embodiment. In this example, a capsule 5-514 may be provided with heat capacity material therein. For example, when the temperature a threshold temperature, the capsule 5-514 may melt or rupture, causing the heat capacity material to be released and applied to the tension-bearing member 5-230. The application of heat capacity material (for example, water or other material) may operate to cool the tension-bearing member 5-230 and/or increase the work capacity of the tension-bearing member 5-230.

A wide variety of materials may be used for a heat capacity material 5-512, or a phase change material. According to an example embodiment, heat capacity materials may, include one or more qualities, such as:

non-toxic (as people or objects may come into contact with the material);

non-corrosive to its storage environment (e.g., since the material may be in contact with the tension-bearing member or the actuatable cushioning element 5-210); for example, during storage, the material may be non-corrosive for long periods of time, and during operation or at higher temperatures the material may be non-corrosive for shorter periods of time. A comparatively high heat of transformation (e.g., relatively high temperature for boiling or vaporization, fusion), e.g., so that relatively little material may be used to increase the work capacity of the tension bearing member can be readily brought into contact (either in advance or in response to an event, or based on a temperature change, etc.) with high-tensility material (tension-bearing member 5-230) being worked or deformed during a collision; reasonable cost, e.g., sufficient quantities of the heat capacity material would not necessarily dominate the cost of the cushioning element or tension bearing member.

An example of a heat capacity material may be water, although many other materials may be used. The tension-bearing member (e.g., polyaramid fibers) may be soaked in water (or other material), which may increase the amount of work that the tension bearing member may perform, for example. Or, the water, as it is heated and boils or vaporizes, increases the work that may be performed on or by the associated tension-bearing member. As noted, the heat capacity material may use phase change in an example embodiments. In other example embodiments, heat capacity materials may be used that may improve the work capacity of the tension bearing member without necessarily involving a phase change or phase change material.

Figure 98:
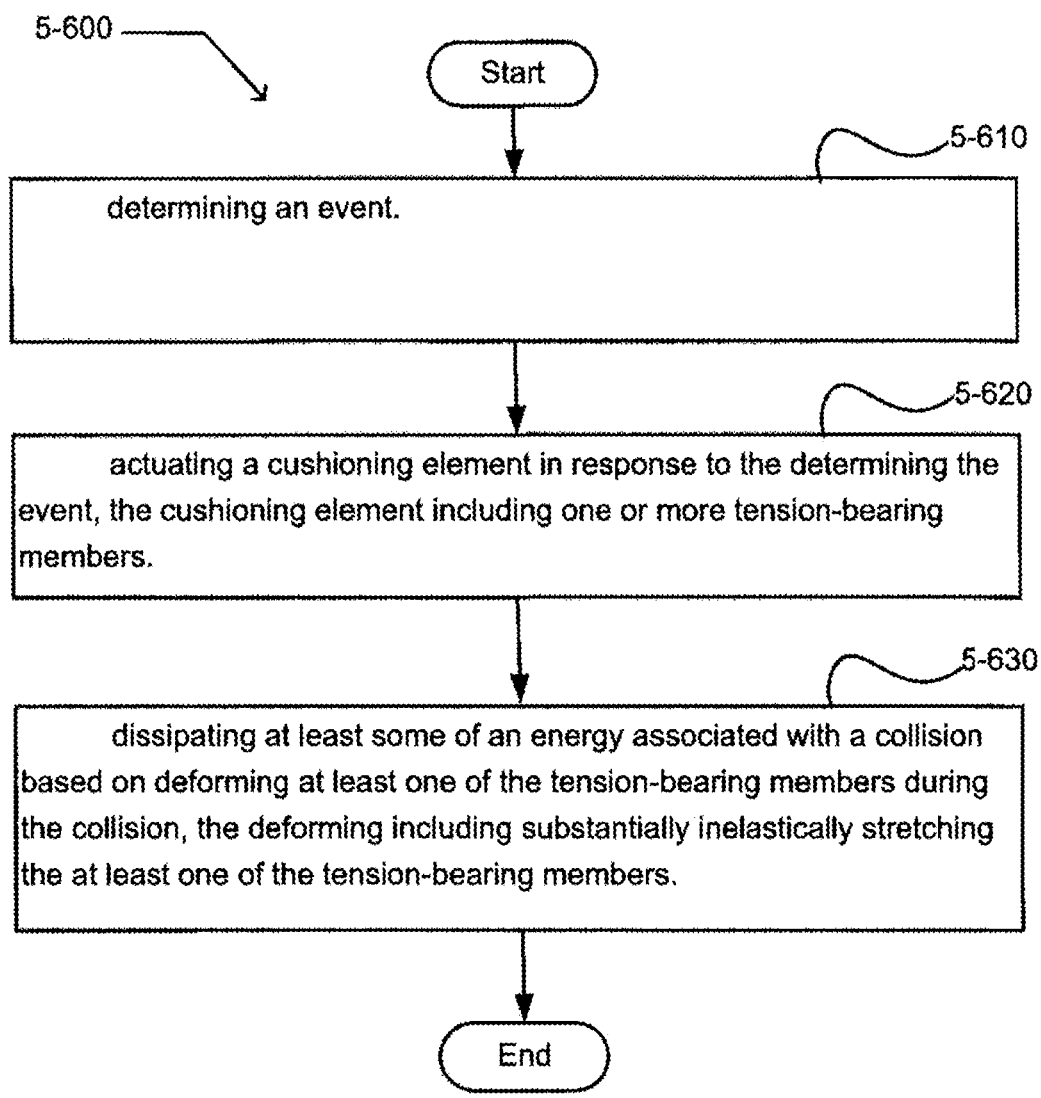
FIG. 98 illustrates an operational flow representing example operations related to actuatable energy dissipative cushioning elements according to an example embodiment.

FIG. 98 illustrates an operational flow 5-600 representing example operations related to actuatable energy dissipative cushioning elements. In FIG. 98 and in following figures that include various examples of operational flows, discussion and explanation may be provided with respect to the above-described examples of FIGS. 97A and 97B, and/or with respect to other examples and contexts. However, it should be understood that the operational flows may be executed in a number of other environments and contexts, and/or in modified versions of FIGS. 97A and 97B. Also, although the various operational flows are presented in the sequence(s) illustrated, it should be understood that the various operations may be performed in other orders than those which are illustrated, or may be performed concurrently.

After a start operation, the operational flow 5-600 moves to a determining operation 5-610 where an event is determined. For example, an event detector 5-158 or 5-218 may detect or determine an event (or condition), or a series of events, such as a velocity that exceeds a threshold, an acceleration that exceeds a threshold, a change in acceleration or change in location or velocity, a relative location, velocity or acceleration of an object with respect to another object that is within a range or exceeds a threshold, etc. These are merely a few examples of events that may be detected, and many other events are possible.

Event detector 5-158 or 5-218 may include any type of detector or sensor. Event detector 5-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold, for example. In another example embodiment, event detector 5-158 may include a Micro Electro Mechanical System (MEMS) accelerometer.

Event detector 5-158 and/or 5-218 may also, for example, include a speedometer, an accelerometer, Radar, a camera, a Gyro, or any other sensor, instrument or device that may allow the detection or determination of one or more of a variety of conditions or events, such as determining, for example: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. These are merely some additional example events, and many other types of events may be detected or determined. The first and second objects in this example may be any type of objects.

Then, in an actuating operation 5-620, a cushioning element is actuated in response to the determining the event, the cushioning element including one or more tension-bearing members. For example, as shown in FIG. 94, element controller 5-214 may actuate actuatable cushioning element 5-210 in response to event detector 5-218 determining the event. This actuating may include element controller 5-214 or central controller 5-154 deploying or placing the actuatable cushioning element 5-210 in an initial or pre-collision state, for example. Actuatable cushioning element 5-210 (FIG. 94) may include one or more tension-bearing members 5-230 (e.g., 230A, 5-230B, 5-230C, 230D, 5-230E . . . ).

Then, in a dissipating operation 5-630, at least some of an energy associated with a collision is dissipated based on deforming at least one of the tension-bearing members during the collision, the deforming including substantially inelastically stretching the at least one of the tension-bearing members. For example, at least some of the energy associated with a collision between two objects (e.g., between vehicles 5-410 and 5-420, FIG. 96) may be dissipated by a tension-bearing member 5-230 deforming and/or stretching during the collision. The deforming or stretching may include the tension-bearing member 5-230 stretching beyond an elastic limit for the tension-bearing member 5-230.

Figure 99:
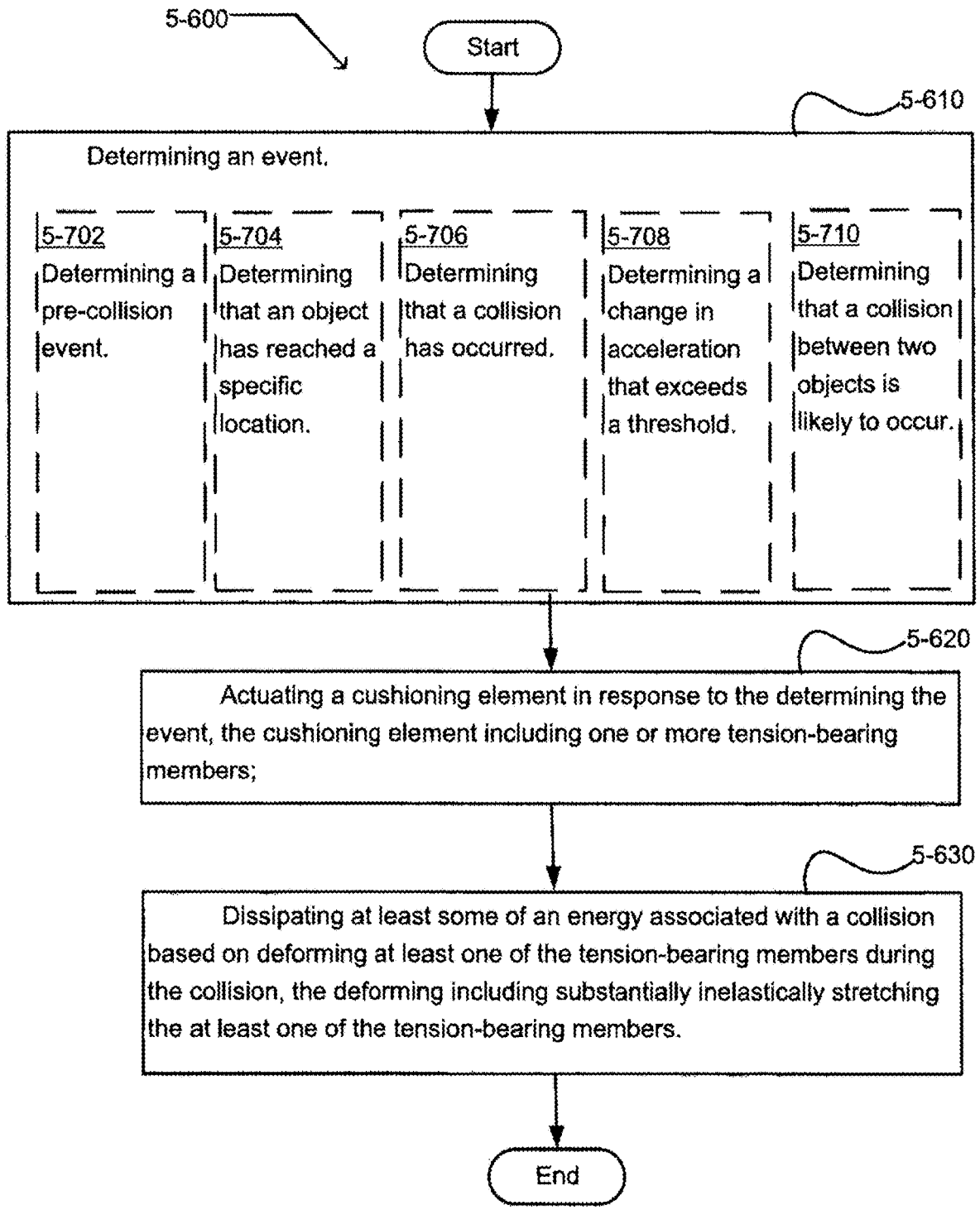
FIG. 99 illustrates an alternative embodiment of the example operational flow of FIG. 98.

FIG. 99 illustrates alternative embodiments of the example operational flow 5-600 of FIG. 98. FIG. 99 illustrates example embodiments where the determining operation 5-610 may include at least one additional operation. Additional operations may include operations 5-702, 5-702, 5-706, 5-5-708 and/or 5-710

At the operation 5-702, a pre-collision event is determined. For example, event detector 5-158 or 5-218 may determine or detect an event that occurs prior to a collision between two objects. For example, event detector 5-158 or 5-218 may detect that acceleration or velocity for a vehicle has exceeded a specific threshold, or that based on a vehicle's relative location and/or relative velocity with respect to another object (e.g., with respect to a rail, a wall, or another vehicle), a collision is likely to occur between a vehicle and another object.

At the operation 5-704, it is determined that an object has reached a specific location. For example, event detector 5-158 or 5-218 (e.g., as a GPS receiver or other location device) may determine that an automobile or vehicle is within 2 feet of a wall or other object, or has crossed over a median of a highway.

At the operation 5-706, it is determined that a collision has occurred. Event detector 5-158 or 5-218 may have detected a collision or impact based on other sensors on a vehicle 5-410, for example.

At the operation 5-708, a change in acceleration that exceeds a threshold is determined. For example, event detector 5-158 or 5-218 (e.g., as an accelerometer) may determine that an acceleration for vehicle 5-410 has exceeded a threshold (e.g., 0.2 G).

At operation 5-710, it is determined that a collision between two objects is likely to occur. For example, event detector 5-158 or 5-218 (e.g., as GPS receiver or other sensor or instrument) and with controller 5-154 or 5-214, may determine, e.g., based on a location and/or velocity of a vehicle 5-410 with respect to another object (either fixed or moving) that a collision is likely to occur.

Figure 100:
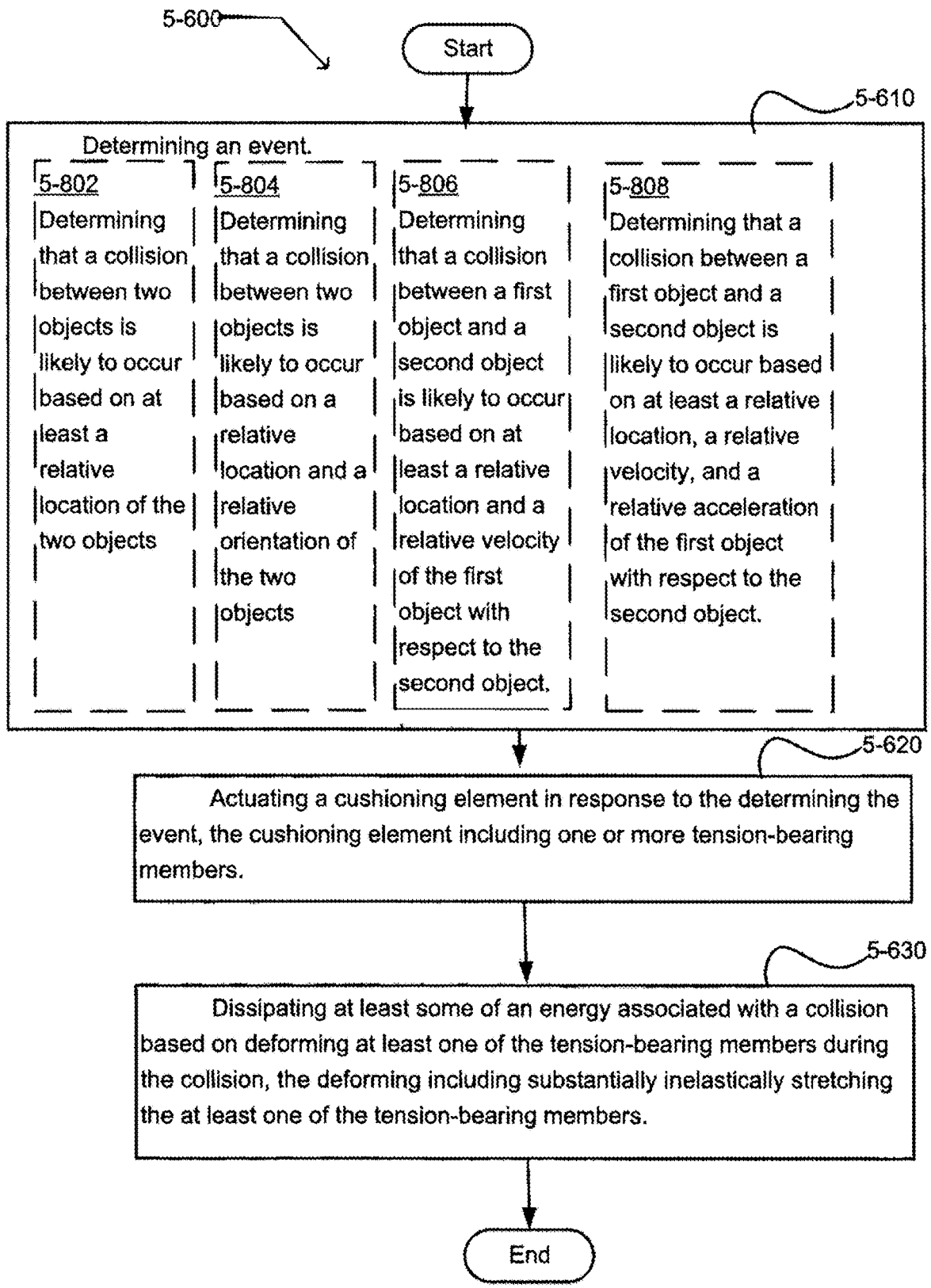
FIG. 100 illustrates an alternative embodiment of the example operational flow of FIG. 98.

FIG. 100 illustrates alternative embodiments of the example operational flow 5-600 of FIG. 98. FIG. 100 illustrates example embodiments where the determining operation 5-610 may include at least one additional operation. Additional operations may include operations 5-802, 5-804, 5-806, and/or 5-808.

At the operation 5-802, it is determined that a collision between two objects is likely to occur based on at least a relative location of the two objects. For example, event detector 5-158 or 5-218, and operating with controller 5-154 or 5-214, within vehicle 5-410 may determine that a collision with vehicle 510 is likely to occur based on the relative location of vehicle 5-410 to vehicle 5-420 (e.g., based on the distance between the two vehicles).

At the operation 5-804, it is determined that a collision between two objects is likely to occur based on a relative location and a relative orientation of the two objects. For example, controller 5-154 or 5-214 and event detector 5-158 or 5-218 may determine that vehicles 5-410 and 5-420 are within 5 feet of each other and are facing each other, and thus, a collision may be likely to occur.

At the operation 5-806, it is determined that a collision between a first object and a second object is likely to occur based on at least a relative location and a relative velocity of the first object with respect to the second object. For example, controller 5-154 or 5-214 and event detector 5-158 or 5-218 may determine that vehicle 5-410 is 10 feet away from vehicle 5-420, and the two vehicles are heading directly toward each other at a total speed (sum of speeds of both vehicles) of 87 MPH (miles per hour), which may indicate that a collision is likely to occur.

At the operation 5-808, it is determined that a collision between a first object and a second object is likely to occur based on at least a relative location, a relative velocity, and a relative acceleration of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on at least a relative location, a relative velocity, and a relative acceleration of vehicle 5-410 with respect to vehicle 5-420.

Figure 101:
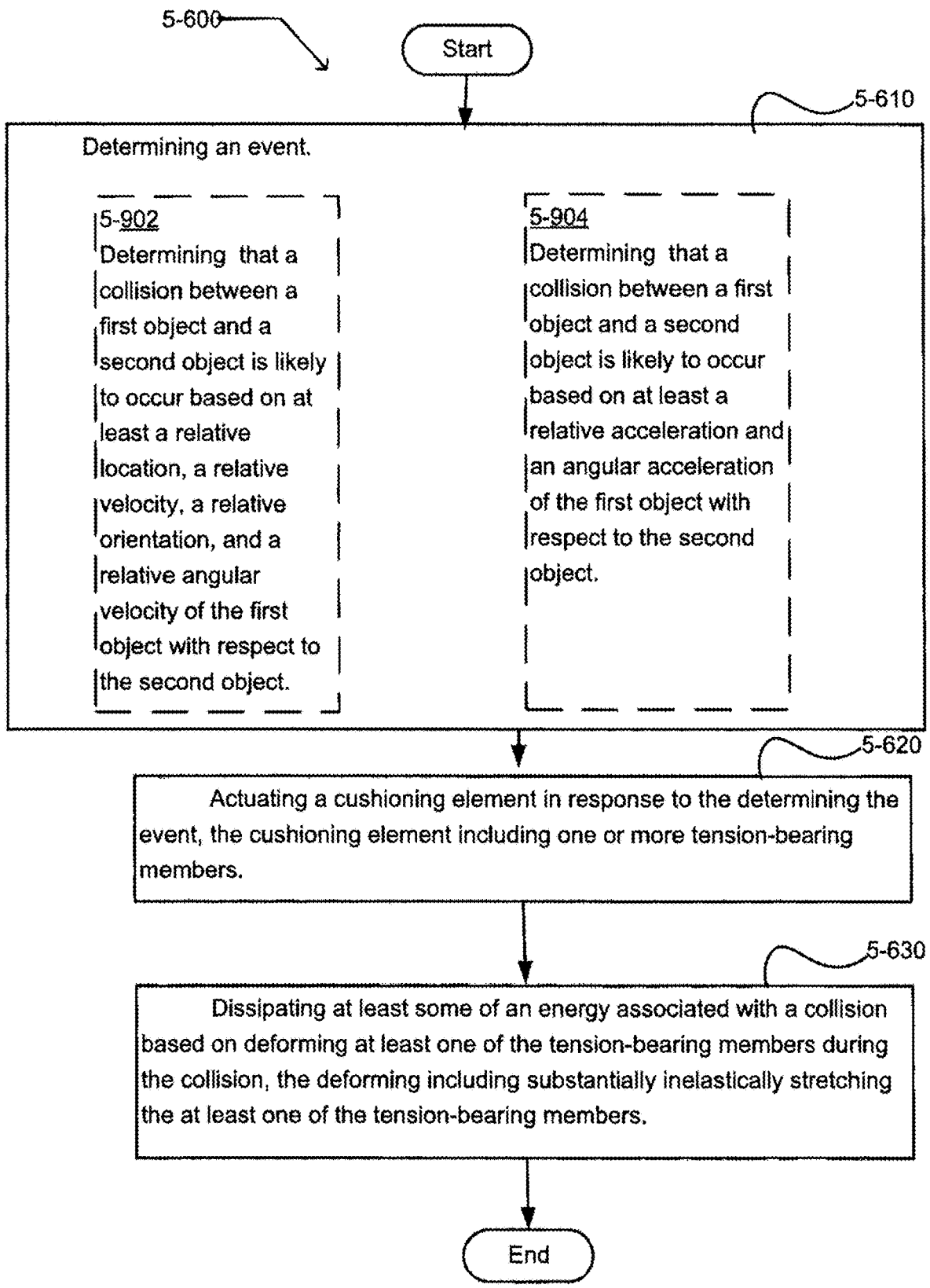
FIG. 101 illustrates an alternative embodiment of the example operational flow of FIG. 98.

FIG. 101 illustrates alternative embodiments of the example operational flow 5-600 of FIG. 98. FIG. 101 illustrates example embodiments where the determining operation 5-610 may include at least one additional operation. Additional operations may include operations 5-902 and/or 5-904.

At the operation 5-902, it is determined that a collision between a first object and a second object is likely to occur based on at least a relative location, a relative velocity, a relative orientation, and a relative angular velocity of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on at least a relative location, a relative velocity, a relative orientation, and a relative angular velocity of vehicle 5-410 with respect to vehicle 5-420 (FIG. 96).

At the operation 5-904, it is determined that a collision between a first object and a second object is likely to occur based on at least a relative acceleration and an angular acceleration of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on at least a relative acceleration and an angular acceleration of vehicle 5-410 with respect to vehicle 5-420 (FIG. 96).

Figure 102:
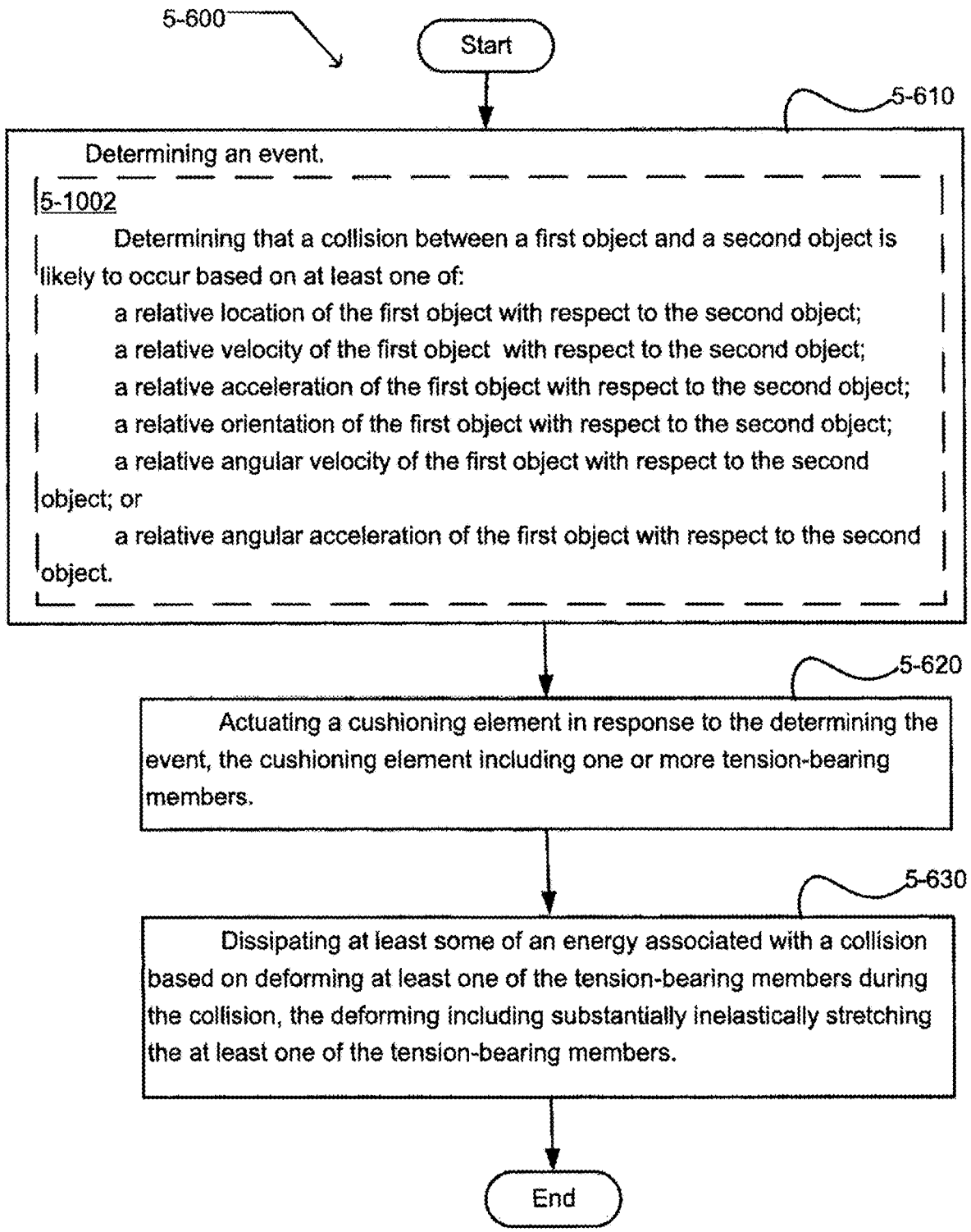
FIG. 102 illustrates an alternative embodiment of the example operational flow of FIG. 98.

FIG. 102 illustrates alternative embodiments of the example operational flow 5-600 of FIG. 98. FIG. 102 illustrates example embodiments where the determining operation 5-610 may include at least one additional operation. Additional operations may include operation 5-1002.

At the operation 5-1002, it is determined that a collision between a first object and a second object is likely to occur based on at least one of a relative location of the first object with respect to the second object, a relative velocity of the first object with respect to the second object, a relative acceleration of the first object with respect to the second object, a relative orientation of the first object with respect to the second object, a relative angular velocity of the first object with respect to the second object, or a relative angular acceleration of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on at least one of a relative location, relative velocity, relative acceleration, a relative orientation, a relative angular velocity, or a relative angular acceleration of vehicle 5-410 with respect to vehicle 5-420 (FIG. 96).

Figure 103:
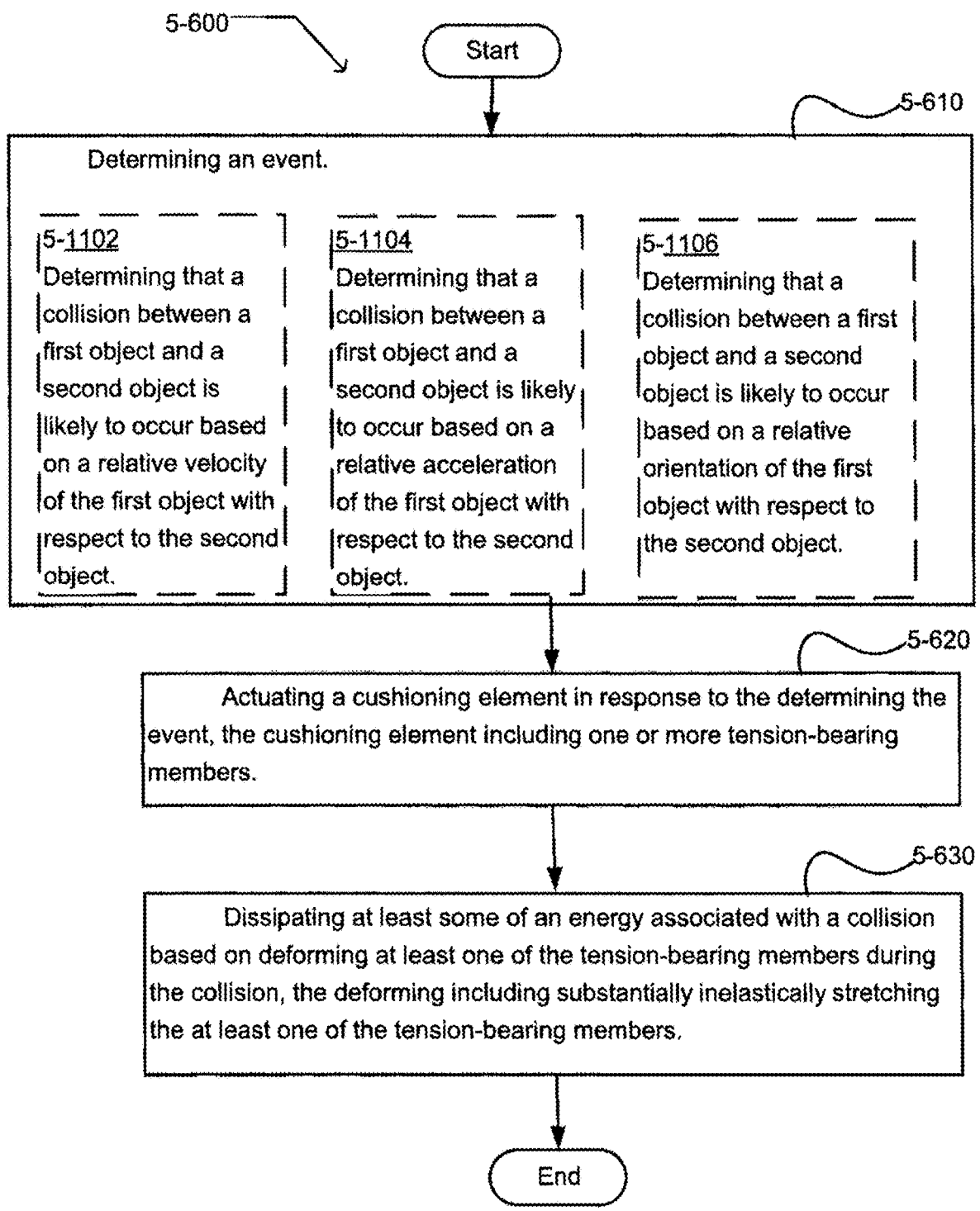
FIG. 103 illustrates an alternative embodiment of the example operational flow of FIG. 98.

FIG. 103 illustrates alternative embodiments of the example operational flow 5-600 of FIG. 98. FIG. 103 illustrates example embodiments where the determining operation 5-610 may include at least one additional operation. Additional operations may include operations 5-1102, 5-5-1104 and/or 5-1106.

At the operation 5-1102, it is determined that a collision between a first object and a second object is likely to occur based on a relative velocity of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on a relative velocity of vehicle 5-410 with respect to the velocity of vehicle 5-420.

At the operation 5-1104, it is determined that a collision between a first object and a second object is likely to occur based on a relative acceleration of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on a relative acceleration of vehicle 5-410 with respect to the acceleration of vehicle 5-420.

At the operation 5-1106, it is determined that a collision between a first object and a second object is likely to occur based on a relative orientation of the first object with respect to the second object. For example, controller 5-154 or 5-214 and event detector 5-158 or 5-218 within a vehicle 5-410 (FIG. 96) may determine that a collision between a vehicle 5-410 and vehicle 510 is likely to occur based on a relative orientation of vehicle 5-410 with respect to the acceleration and/or orientation of vehicle 5-420.

Figure 104:
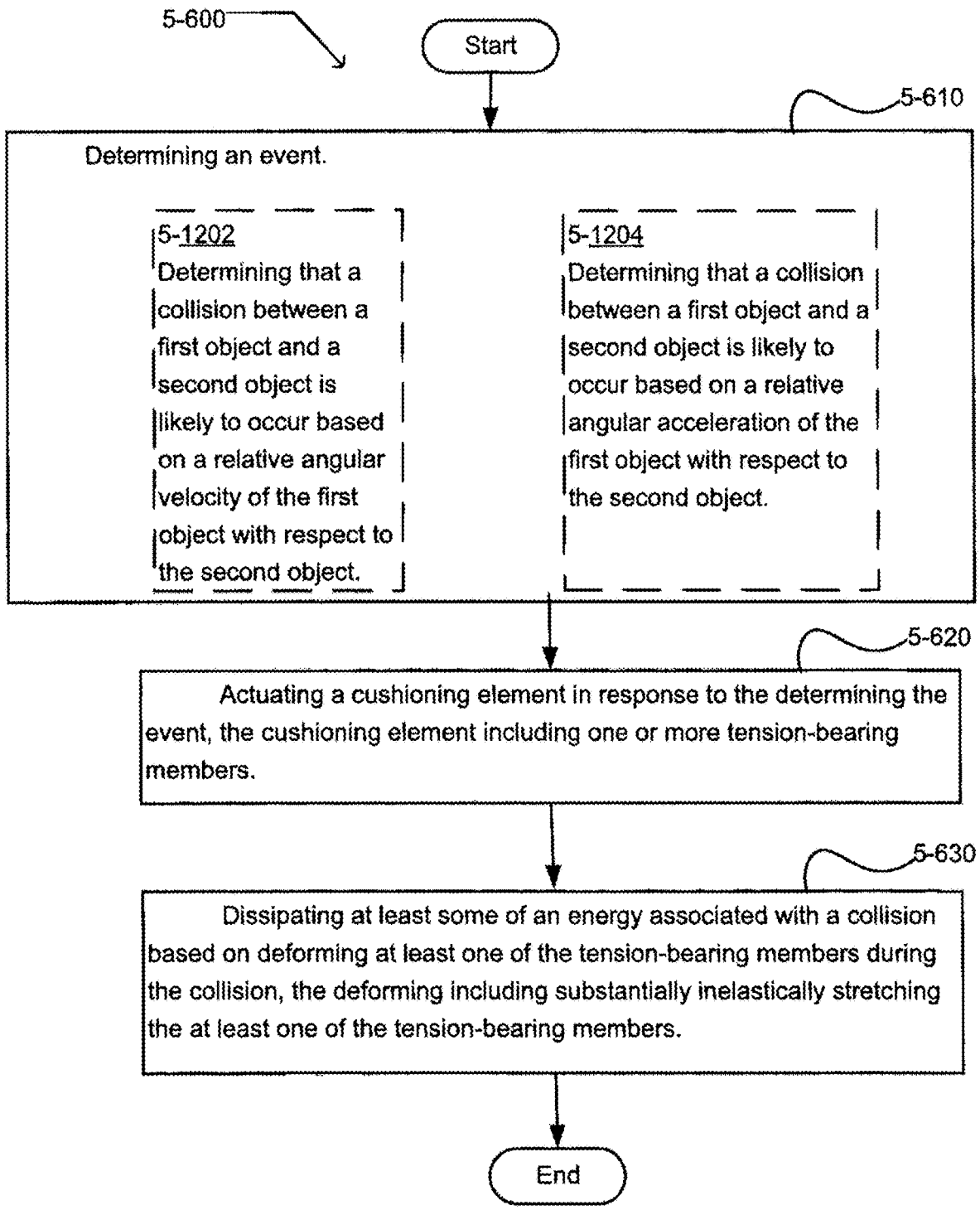
FIG. 104 illustrates an alternative embodiment of the example operational flow of FIG. 98.

FIG. 104 illustrates alternative embodiments of the example operational flow 5-600 of FIG. 98. FIG. 104 illustrates example embodiments where the determining operation 5-610 may include at least one additional operation. Additional operations may include operations 5-1202 and/or 5-1204.

At the operation 5-1202, it is determined that a collision between a first object and a second object is likely to occur based on a relative angular velocity of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on a relative angular velocity of vehicle 5-410 with respect to the angular velocity of vehicle 5-420.

At the operation 5-1204, it is determined that a collision between a first object and a second object is likely to occur based on a relative angular acceleration of the first object with respect to the second object. For example, controller 5-154 or 5-214 and event detector 5-158 or 5-218 within a vehicle 5-410 (FIG. 96) may determine that a collision between a vehicle 5-410 and vehicle 5-420 is likely to occur based on a relative angular acceleration of vehicle 5-410 with respect to the acceleration of vehicle 5-420.

Figure 105:
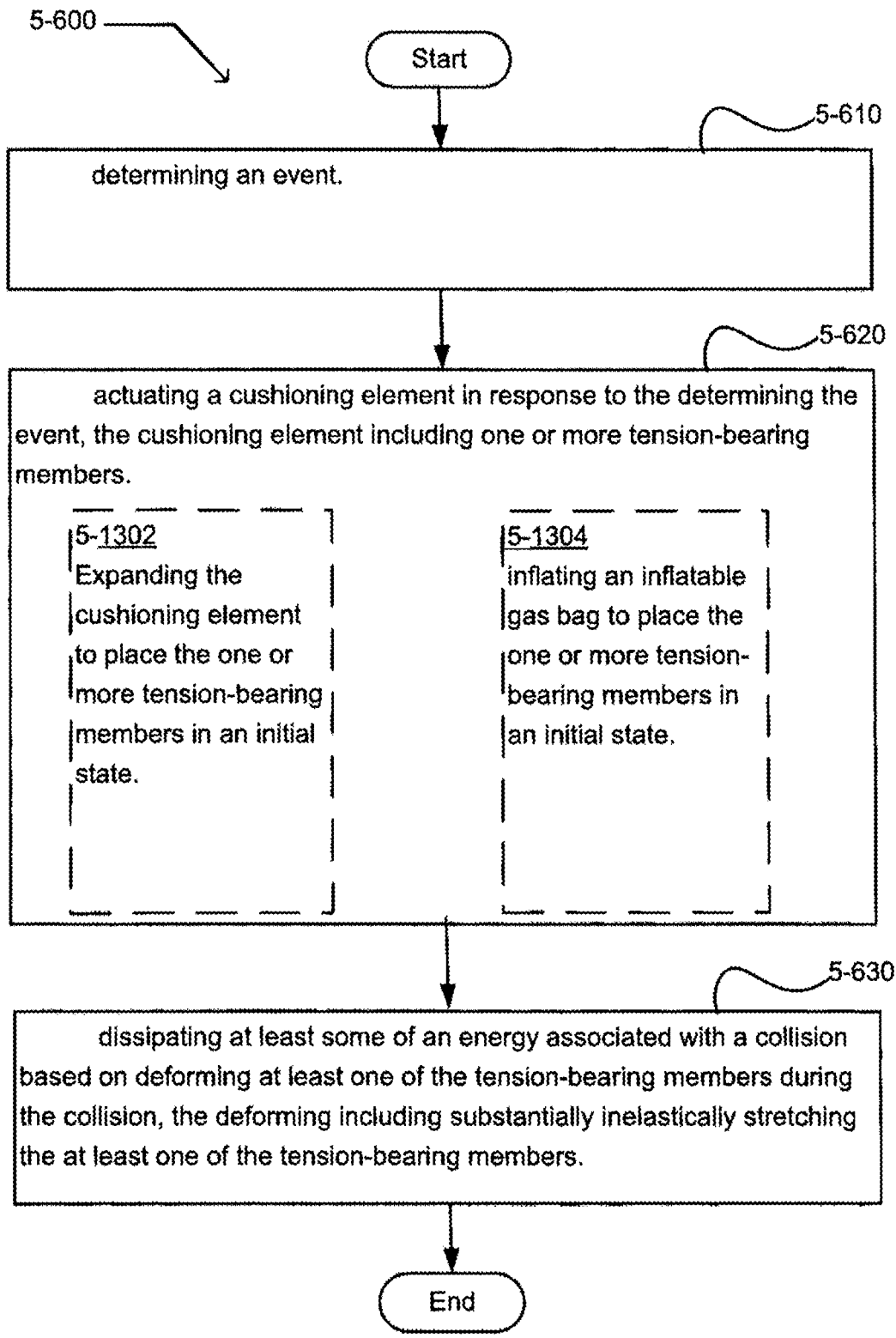
FIG. 105 illustrates an alternative embodiment of the example operational flow of FIG. 98.

FIG. 105 illustrates alternative embodiments of the example operational flow 5-600 of FIG. 98. FIG. 105 illustrates example embodiments where the actuating operation 5-620 may include at least one additional operation. Additional operations may include operations 5-1302 and/or 5-1304.

At the operation 5-1302, the cushioning element is expanded to place the one or more tension-bearing members in an initial state. For example, under operation of element controller 5-214, stored energy reservoir 5-220 (FIG. 94) may expand actuatable cushioning element 5-210 to place one or more tension bearing members 5-230 in an initial (e.g., pre-collision) state. An initial state may, for example, place the tension-bearing members in a position or state where they may be prepared to dissipate energy or perform work during a collision, e.g., by deforming or stretching. This is merely an example initial state, and other initial states may be used.

At the operation 5-1304, an inflatable gas bag is inflated to place the one or more tension-bearing members in an initial state. For example, under operation of element controller 5-214, stored energy reservoir 5-220 (FIG. 94) may pump gas to inflate actuatable cushioning element 5-210 or a gas bag to place one or more tension bearing members 5-230 in an initial state.

Figure 106:
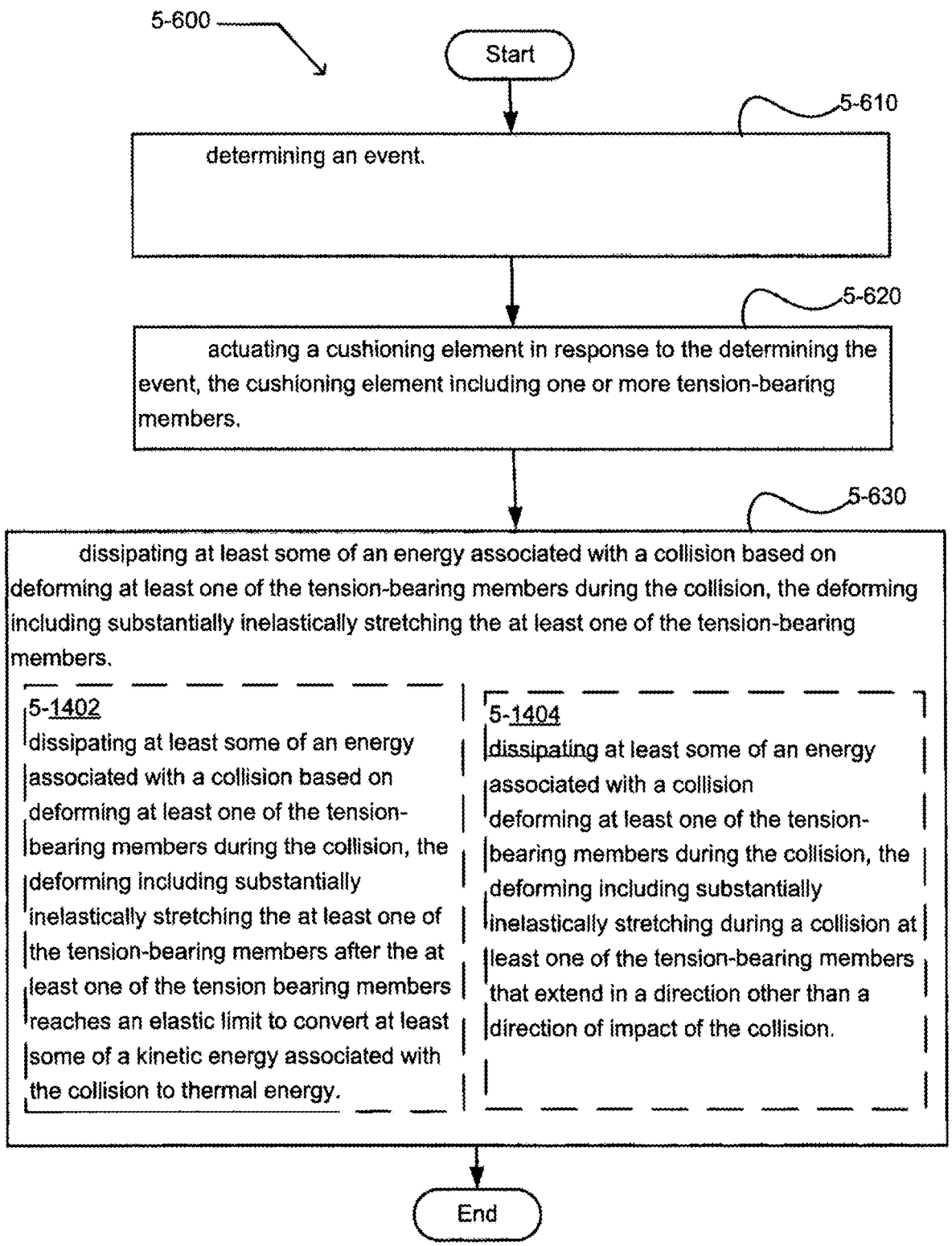

FIG. 106 illustrates alternative embodiments of the example operational flow 5-600 of FIG. 98. FIG. 106 illustrates example embodiments where the dissipating operation 5-630 may include at least one additional operation. Additional operations may include operations 5-1402 and/or 5-1404.

At the operation 5-1402, at least some of an energy associated with a collision is dissipated based on deforming at least one of the tension-bearing members during the collision, the deforming including substantially inelastically stretching the at least one of the tension-bearing members after the at least one of the tension bearing members reaches an elastic limit to convert at least some of a kinetic energy associated with the collision to thermal energy. For example, at least some of the energy associated with a collision between vehicles 5-410 and 5-420 may be dissipated based on deforming tension-bearing members 5-230C, 5-230D and 5-230E (FIG. 95B) during the collision. This deforming may include inelastically stretching tension-bearing members 5-230C, 5-230D and/or 5-230E beyond an elastic limit to convert at least some of a kinetic energy associated with the collision to thermal energy.

At the operation 5-1404, at least some of an energy associated with a collision is dissipated based on deforming at least one of the tension-bearing members during the collision, the deforming including substantially inelastically stretching during a collision at least one of the tension-bearing members that extend in a direction other than a direction of impact of the collision. For example, at least some of the energy associated with a collision between vehicles 5-410 and 5-420 may be dissipated based on deforming and inelastically stretching during the collision one or more of tension-bearing members 5-230C, 5-230D and 5-230E, which may extend in a direction other than a direction of impact of the collision 5-239 (FIG. 95B).

For example, a portion of the actuatable cushioning element 5-210 receiving the impact (e.g., along a direction of impact of collision) may become shorter or smaller, which may cause the corresponding tension bearing members 5-230A and 5-230B that extend along the direction of impact to go loose or slack during the collision (e.g., not perform substantial work). While portions of the cushioning element 5-210 that extend or provided in other directions (directions other than the direction of impact 5-239 such as a direction that is substantially perpendicular to the direction of impact) may at least in some cases lengthen (or attempt to lengthen) during the collision, causing the corresponding tension-bearing members 5-230C, 5-230D and 5-230E to stretch or perform work and dissipate some of the kinetic energy associated with the collision. This is merely an example embodiment. In another example embodiment, the actuatable cushioning element may be provided as a web or mesh of tension-bearing members, without a bag to support the tension-bearing members.

Figure 107:
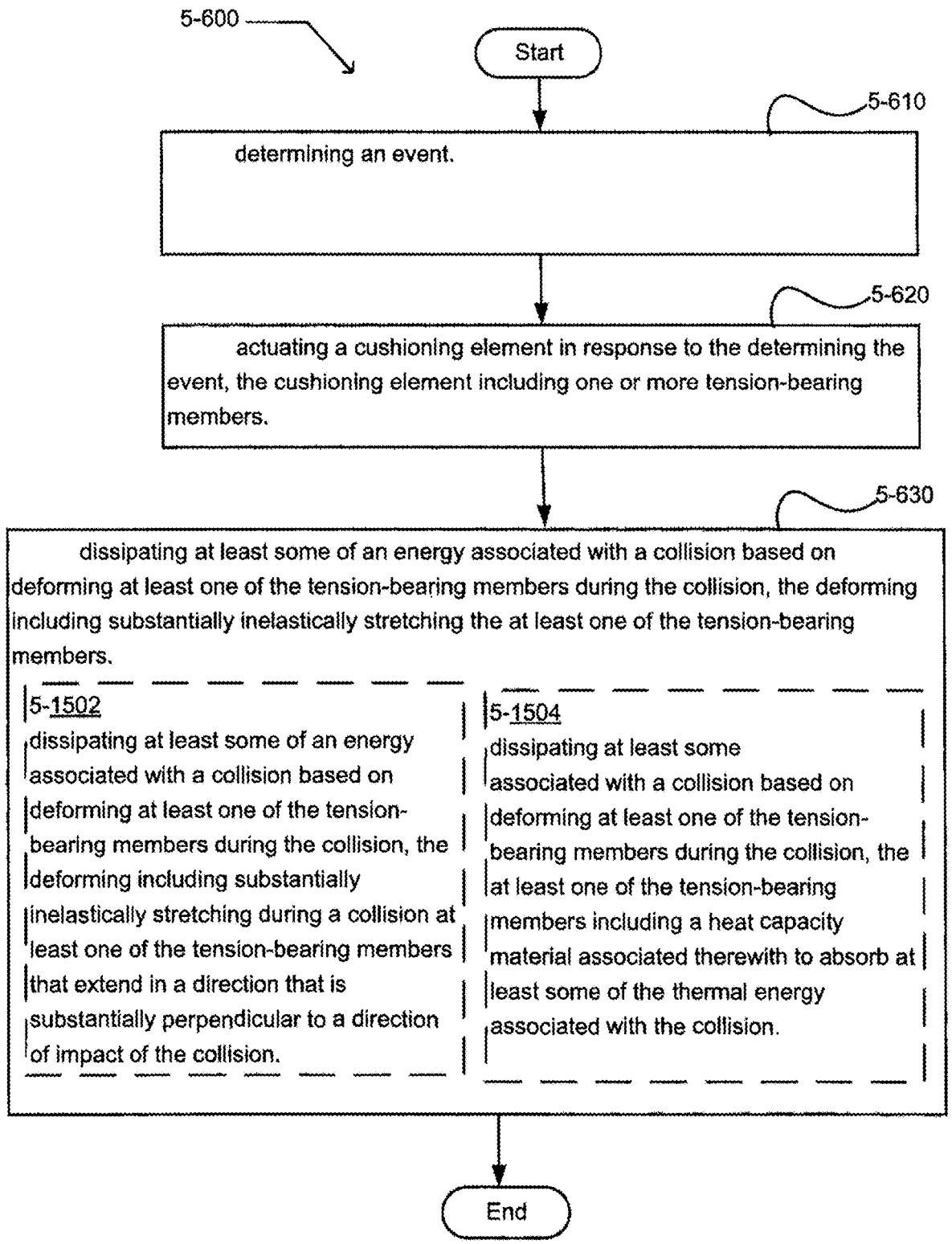

FIG. 107 illustrates alternative embodiments of the example operational flow 5-600 of FIG. 98. FIG. 107 illustrates example embodiments where the dissipating operation 5-630 may include at least one additional operation. Additional operations may include operations 5-1502 and/or 5-1504.

At the operation 5-1502, at least some of an energy associated with a collision is dissipated based on deforming at least one of the tension-bearing members during the collision, the deforming including substantially inelastically stretching during a collision at least one of the tension-bearing members that extend in a direction that is substantially perpendicular to a direction of impact of the collision. For example, tension-bearing member 5-230C, which may extend in a direction (FIG. 95B) that is substantially perpendicular to direction of impact of the collision 5-239, may stretch during a collision to dissipate at least some of the energy associated with the collision.

At the operation 5-1504, at least some of an energy associated with a collision is dissipated based on deforming at least one of the tension-bearing members during the collision, the at least one of the tension-bearing members including a heat capacity material associated therewith to absorb at least some of the thermal energy associated with the collision. For example, tension-bearing member 5-230 may include a heat capacity material 5-512 (e.g., FIG. 97A) applied thereto to absorb at least some of the thermal energy that may be generated by the work performed by the tension-bearing member 5-230. Thus, the heat capacity material 5-512 may, at least in some cases, increase the work capacity of the tension-bearing member 5-230.

Figure 108:
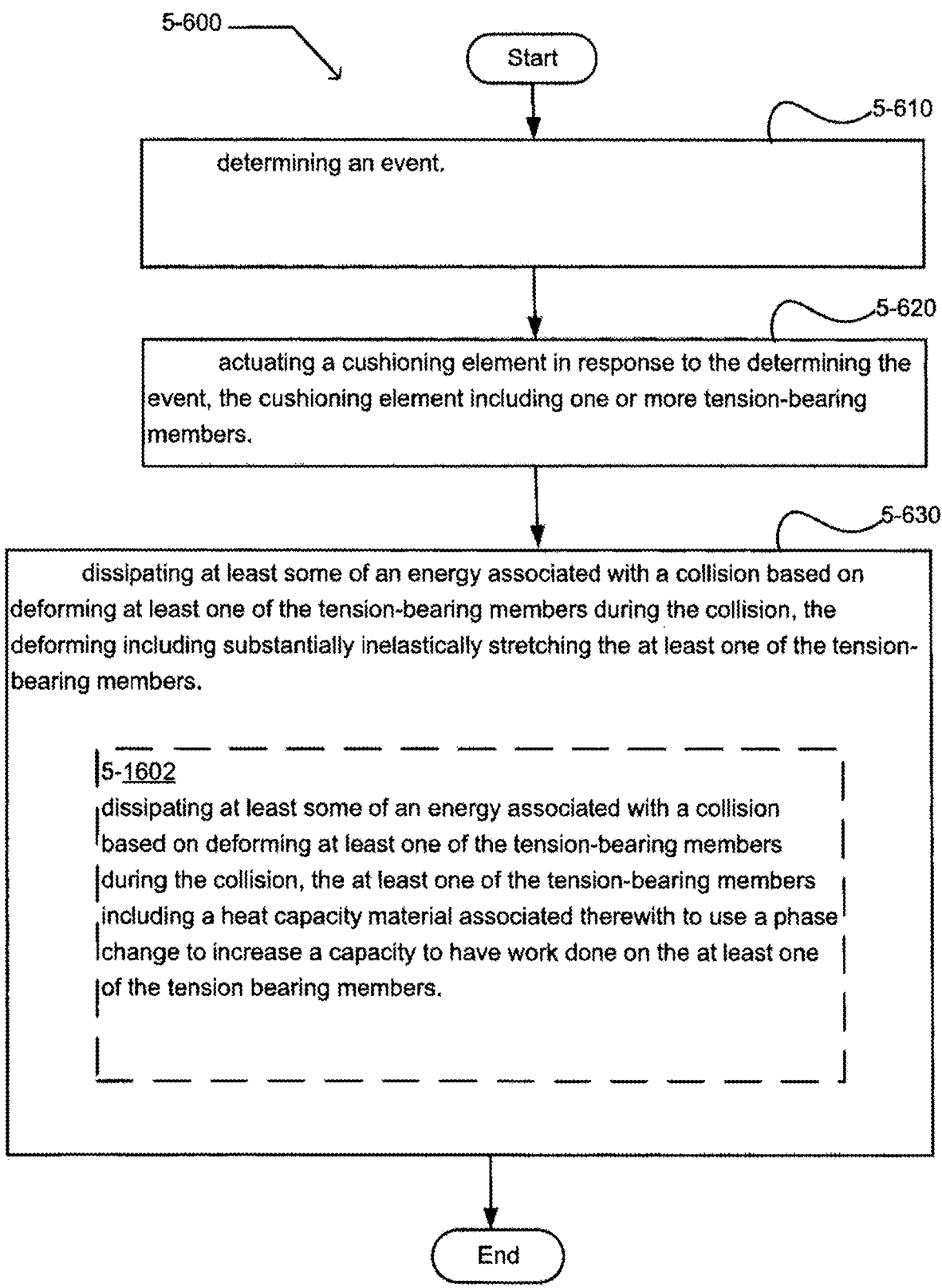

FIG. 108 illustrates alternative embodiments of the example operational flow 5-600 of FIG. 98. FIG. 108 illustrates example embodiments where the dissipating operation 5-630 may include at least one additional operation. Additional operations may include operation 5-1602.

At the operation 5-1602, at least some of an energy associated with a collision is dissipated based on deforming at least one of the tension-bearing members during the collision, the at least one of the tension-bearing members including a heat capacity material associated therewith to use a phase change to increase a capacity to have work done on the at least one of the tension bearing members. For example, tension-bearing member 5-230 may include a heat capacity material 5-512 (FIG. 97B), such as water, associated with the tension-bearing member 5-230. For example, the tension-bearing member 5-230 may be soaked in water, or the water may otherwise be applied to a surface of the tension-bearing member 5-230. In an example embodiment, the heat capacity material 5-512, after being applied to the tension-bearing member 5-230, may undergo a phase change, e.g., from water to gas (or other phase change) during the collision, which may increase a capacity to have work done on (or by) the at least one of the tension-bearing members 5-230.

FIG. 109 illustrates a partial view of an example computer program product 5-1700 that includes a computer program 15-704 for executing a computer process on a computing device. An embodiment of the example computer program product 5-1700 is provided using a signal bearing medium 15-702, and may include one or more instructions for one or more instructions for determining an event, the signal bearing medium also bearing one or more instructions for actuating a cushioning element in response to the determining the event, the cushioning element including one or more tension-bearing members, and the signal bearing medium also bearing one or more instructions for providing control sufficient to cause dissipation at least some of an energy associated with a collision based on deforming at least one of the tension-bearing members during the collision, the deforming including substantially inelastically stretching the at least one of the tension-bearing members. The one or more instructions may be, for example, computer executable and/or logic-implemented instructions. In one implementation, the signal-bearing medium 15-702 may include a computer-readable medium 15-706. In one implementation, the signal bearing medium 15-702 may include a recordable medium 15-708. In one implementation, the signal bearing medium 15-702 may include a communications medium 15-710.

FIG. 110 illustrates an example system 5-1800. The system 5-5-1800 may include a computing device 1810. The system 5-5-1800 may also include one or more instructions that when executed on the computing device cause the computing device to:

(a) determine an event; (b) actuate a cushioning element in response to the determining the event, the cushioning element including one or more tension-bearing members; and (c) provide control sufficient to dissipate at least some of an energy associated with a collision based on deforming at least one of the tension-bearing members during the collision, the deforming including substantially inelastically stretching the at least one of the tension-bearing members 5-1820. In some implementations, the computing device 5-1800 may be a computational device embedded in a vehicle, or may be a functionally-dedicated computational device. In some implementations, the computing device 5-1800 may be include a distributed computational device including one or more devices on a vehicle configured to communicate with a remote control plant (e.g., such as communicating with a remote computer via a wireless network).

In an alternative embodiment, the computing device 5-1810 may include one or more of a personal digital assistant (PDA), a laptop computer, a tablet personal computer, a networked computer, a computing system comprised of a cluster of processors, a workstation computer, and/or a desktop computer (5-1812).

FIG. 111 illustrates an example apparatus 5-1900 in which embodiments may be implemented. In implementation 5-1910, the apparatus 5-1900 may include a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. For example, actuatable cushioning element 5-210 (FIG. 97A) may include one or more tension-bearing members 5-230A, 5-230B, 5-230C. The tension-bearing members 5-230 may deform in response to a collision or impact. At least one of the tension-bearing members 5-230 (e.g., 5-230C) may substantially inelastically deform after reaching an elastic limit.

FIG. 111 also illustrates alternative embodiments of the example apparatus 5-1900. FIG. 111 illustrates example embodiments that may include at least one additional implementation. Additional implementations may include implementations 5-1912, 5-1922, 5-1924, 5-5-1930 and/or 5-1940.

In implementation 5-1912, the implementation 5-1910 may include a cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit. For example, tension-bearing member 5-230C may inelastically stretch during a collision after reaching an elastic limit.

In implementation 5-1922, the apparatus 5-1900 may further include a heat capacity material associated with at least one of the tension-bearing members. For example, a heat capacity material 5-512 (FIG. 97A) associated with tension-bearing member 5-230.

In implementation 5-1924, the apparatus 5-1900 may further include a heat capacity material in contact with at least one of the one or more tension-bearing members to increase a work capacity of the at least one of the one or more tension-bearing members. For example, a heat capacity material 5-512 (FIG. 97A) may be in contact with the tension-bearing member 5-230 to increase a work capacity of the tension-bearing member 5-230.

In implementation 5-1930, the apparatus 5-1900 may further include an element controller configured to control the cushioning element. For example, an element controller 5-214 (FIG. 94) or other controller may control the actuatable cushioning element 5-210, such as providing overall control or controlling the actuation of the actuatable cushioning element 5-210 including, in some cases, providing control over operation of tension-bearing members 5-230.

In implementation 5-1940, the apparatus 5-1900 may further include an event detector coupled to the element controller configured to detect an event. For example, an event detector 5-218 (FIG. 94) may be coupled to an element controller 5-214 to detect an event.

FIG. 112 also illustrates alternative embodiments of the example apparatus 5-1900. FIG. 112 illustrates example embodiments that may include at least one additional implementation. Additional implementations may include implementations 5-2002, 5-2004, 5-2006, 5-2008, 5-2010 and/or 5-2012.

In implementation 5-2002, at least one of the one or more tension-bearing members comprises one or more polyaramid fibers. For example, a tension-bearing member 5-230C may comprise one or more polyaramid fibers.

In implementation 5-2004, one or more of the tension-bearing members (e.g., tension-bearing member 5-230C) comprises at least one of a graphitic fiber, a carbon fiber, and/or a natural fiber.

In implementation 5-2006, one or more of the tension-bearing members (e.g., tension-bearing member 5-230C) comprises at least one of a poly-benzobisoxazole fiber, and/or a synthetic fiber.

In implementation 5-2008, at least one of the one or more tension-bearing members (e.g., 5-230C) lies on a surface of the cushioning element (e.g., cushioning element 5-210, FIGS. 95A and 95B).

In implementation 2010, at least one of the one or more tension-bearing members (e.g., 5-230C) lies within an interior portion of the cushioning element (e.g., 210, FIGS. 95A and 95B).

In implementation 5-2012, at least some of the tension-bearing members have different tension properties than other tension-bearing members. For example, tension-bearing member 5-230C may have a tensile strength, a thickness or size, may be made from a material, or other tension property that may be different from one or more such tension properties of tension bearing members 5-230D and 5-230E (FIG. 94), for example.

FIG. 113 illustrates an operational flow 5-2100 representing example operations related to cushioning elements.

At operation 5-2110, a cushioning element is constructed including one or more tension-bearing members, at least one of the one or more tension-bearing members being configured to stretch during a collision, including being configured to stretch beyond an elastic limit, to dissipate at least some of a kinetic energy associated with the collision. For example, an actuatable cushioning element 5-210A, 5-210B (FIGS. 95A and 95B) may be constructed that includes one or more tension-bearing members 5-230A, 5-230B, 5-230C, 5-230D, and/or 5-230. The at least one of these tension bearing members (e.g., tension-bearing member 5-230D) may stretch during a collision, including stretching beyond an elastic limit to dissipate at least some of a kinetic energy associated with a collision, e.g., associated with a collision between vehicles 5-410 and 5-420 (or between two other objects).

FIG. 113 also illustrates alternative embodiments of the example operational flow 5-2100 of FIG. 113. FIG. 113 illustrates example embodiments where the determining operation 5-610 may include at least one additional operation. Additional operations may include operations 5-2112, 5-114 and/or 5-116.

At operation 5-2112, a cushioning element is constructed including one or more tension-bearing members, the cushioning element being configured to be actuated in response to an event, at least one of the one or more tension-bearing members being configured to stretch beyond an elastic limit during a collision to convert at least some of a kinetic energy associated with the collision to thermal energy to provide cushioning support for an object. For example, cushioning element 5-210A (FIG. 95A) may include one or more tension bearing members 5-230. The cushioning element 5-210A may be configured to be actuated in response to an event (e.g., an event detected by an event detector 5-158 or 5-218, FIGS. 93, 94). At least one of the tension bearing members, e.g., tension bearing member 5-230D, may be configured to stretch beyond an elastic limit during a collision (e.g., during a collision between vehicles 5-410 and 5-420) to convert at least some of a kinetic energy associated with the collision to thermal energy to provide cushioning support for an object, such as for vehicle 5-410 (FIG. 96) or passengers therein.

At operation 5-114, a cushioning element is constructed including one or more tension-bearing members and a heat capacity material associated with at least a portion of at least one of the tension-bearing members to absorb at least some of the thermal energy associated with the collision. This thermal energy absorption may limit the temperature rise experienced by tension-bearing member(s) associated with the collision, and may thereby increase a capacity to have work done on the at least one of the tension-bearing members. For example, a cushioning element 5-210 may be constructed that includes one or more tension-bearing members 5-230. The tension-bearing member 5-230 may include a heat capacity material 5-512 (FIG. 97A), which may be water or other heat capacity material, to absorb at least some of the thermal energy associated with the collision.

At operation 5-116, a cushioning element is constructed including one or more tension-bearing members and a heat capacity material associated with at least a portion of at least one of the tension-bearing members, the heat capacity material being adapted to use a phase change to increase a capacity to have work done on the at least one of the tension bearing members. For example, a cushioning element 5-210 (e.g., FIG. 95A) may be constructed to include one or more tension-bearing members 5-230 (FIG. 95A and FIG. 97A, 97B), and a heat capacity material 5-512 associated with at least a portion of one of the tension-bearing members (e.g., tension-bearing member 5-230D).

Heat capacity material 5-512 may be water or other appropriate material. Heat capacity material may be adapted to undergo a phase change (e.g., water to gas, solid to liquid, solid to gas), such as during the collision, increase a capacity to have work done on the at least one of the tension-bearing members 5-230D. For example, water may be utilized to cool the tension-bearing member, and this water or heat capacity material 5-512 may boil off during a collision to increase the work capacity for the tension-bearing member 5-230D. In some instances, thermal energy absorption may limit the temperature rise experienced by the tension-bearing member(s) associated with a collision, and may thereby increase a capacity to have work done on the at least one of the tension-bearing members. This is merely an example, and the disclosure is not limited thereto.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 114 illustrates an example system 6-100 in which embodiments may be implemented. System 6-100 may include, for example, a container 6-110, which may be any type of container, such as a box, a container for shipping cargo on a vehicle, boat, plane, train or other vehicle, a container for shipping or storing small or large items, a container for shipping fragile items, or any other container. Container 6-110 may be made from any suitable material, such as cardboard, plastic, steel, etc., as a few example materials, but any type of material may be used.

System 6-100 may also include one or more actuatable cushioning elements provided within container 6-110, such as actuatable cushioning elements 6-114, 6-116, 6-118, 6-120, 6-122, 6-124, 6-126, 6-128, 6-130, 6-132, 6-134, 6-136, 6-138, 6-140, 6-142, 6-144, 6-146, etc. The actuatable cushioning elements may provide cushioning support for an item or object, such as object 6-112, for example. Object 6-112 may be any type of object, such as electronics, books, food items, a vehicle (e.g., automobile, boat, train, plane), cargo, fragile or delicate or breakable items which may be in need of cushioning support, people, animals, other organisms, or any other type of object. These are just a few examples of an object which may be supported by actuatable cushioning elements, and the various embodiments are not limited thereto. Actuatable cushioning elements 6-114, 6-116, etc. may spread a force or interaction of an object over a period of time or over an area within container 6-110, which may, at least in some cases, decrease potential impact and/or damage to the object, for example.

For example, one or more actuatable cushioning elements may be actuated (e.g., expanded) in response to an event to protect an object or passenger from damage or harm or collision effects. Also, for example, one or more actuatable cushioning elements may be actuated based upon one or more sensed values in accordance with a model of one or more objects to be protected, the actuatable cushioning elements, and the environment. Also, for example, one or more actuatable cushioning elements may be actuated over a series of events or in response to a series of events to provide a coordinated protection of one or more objects or passengers in a vehicle from harm, damage or other effects from a collision, acceleration or other event. The protection of one or more objects may be based upon a harm function of the actual or predicted damage to subsets or portions of such objects, such as a maximum value, a weighted value, a cumulative value, or other such functions. The harm function may include damage to the environment (e.g., pedestrians or other vehicles in a vehicular collision, higher valued objects in the vicinity of a container collision, etc.) as well as to the one or more nominally protected objects. These are merely a few illustrative examples and the disclosure is not limited thereto.

Additional details and example embodiments are described herein.

Actuatable cushioning elements 6-114, 6-116, etc. may be in either an expanded state, such as shown for actuatable cushioning element 6-116, or an unexpanded state such as for actuatable cushioning element 6-114, for example. Or an actuatable cushioning element may also be partially expanded or partially unexpanded, for example.

In an example embodiment, some types of actuatable cushioning elements may be provided in an expanded state (e.g., inflated) for a limited period of time. For example, one or more actuatable cushioning elements may be actuated (e.g., expanded or unexpanded) in response to an event. In an example embodiment, a subset of actuatable cushioning elements may be actuated in response to an event. In another example embodiment, one or more actuatable cushioning elements may be expanded just prior to shipment and may remain in an expanded state for an extended period of time, or for a duration of transport, for example. In an example embodiment, an actuatable cushioning element may provide greater cushioning support for an object while in an expanded state, as compared to an unexpanded state (e.g., due to a greater volume of flexible or cushioning material or matter to absorb an impact). This is merely an example embodiment, and the disclosure is not limited thereto.

One or more of the actuatable cushioning elements may be actuated, which may include putting an actuatable cushioning element into motion or action. Actuation may include, for example, expanding an actuatable cushioning element from an unexpanded state to an expanded state (e.g., causing an element to expand or increase in size), or unexpanding an actuatable cushioning element from an expanded state to an unexpanded state (e.g., causing an element to shrink or reduce in size or contract), as examples.

Actuation may include, for example, causing an airbag or other entity to inflate or deflate. Actuation may include, for example, changing or controlling the shape of an actuatable cushioning element. Actuation may also include partial motions or partial actions, such as partially expanding or partially unexpanding an actuatable cushioning element, for example.

Actuatable cushioning elements 6-114, 6-116, etc. may include any type of expandable element. For example, actuatable cushioning elements 6-114, 6-116, etc., may include expandable gas bags which may expand based on the application of pressurized gas to the bag similar to the airbags used in automobiles and other vehicles. Actuatable cushioning elements 6-114, 6-116, etc. may alternatively include a fluid-expandable bag or entity that may be expanded by fluid. For example, actuatable cushioning elements 6-114, 6-116, etc., may include fluid-actuatable elements, where fluid may be sourced from one or more fluid reservoirs, e.g., via a valving actuation. The fluid reservoirs may, for example, cause the fluid actuatable elements to actuate (e.g., expand and/or unexpand/contract) by causing fluid to flow into or out of the fluid-actuatable elements. For example, actuatable cushioning elements 6-114, 6-116, etc., may include magnetic field-actuatable elements, where magnetic field may be sourced from one or more electric energy sources, e.g., via a capacitor, an inductor, a flux generator, or other means. The electric energy sources may, for example, cause the magnetic field actuatable elements to actuate (e.g., expand and/or unexpand/contract) by causing magnetic fields to apply force to the fluid-actuatable elements. Actuatable cushioning elements 6-114, 6-116, etc. alternatively may include an expandable cushioning material which may expand (or unexpand), for example, through the application of a chemical, gas, liquid, electrical energy, reaction force or other energy or material. Electrical energy may, for example be used to expand (or unexpand) or shape an expandable cushioning material by means of an electric motor, a linear electromagnetic motor, a piezoelectric actuator, or other means. Reaction force may, for example be used to expand (or unexpand) or shape an expandable cushioning material by means of a rocket engine, a pulsed microimpulse reaction engine, a magnetic repulsion coil, or other means. Expandable cushioning material may apply cushioning force by means of pressure, electric/magnetic fields, inertia, compressive stress, tensile force, or shear force, or a combination thereof. Expandable cushioning material may apply cushioning force and/or dissipate interaction energy by means of crushing (e.g., foam or shells), breaking (e.g., fibers or wires), buckling (e.g., struts or plates) or other mechanisms.

In an example embodiment, the actuatable cushioning elements may be re-usable, where the cushioning elements may be expanded to absorb an impact, later fully or partially unexpanded, and then subsequently expanded again to provide cushioning support or protect the object for a second event or impact, or to provide cushioning support in another container, for example. While in another example embodiment, the actuatable cushioning elements may be disposable, wherein the elements, for example, may be expanded or used only once or only a few times.

Any number of actuatable cushioning elements may be used to provide cushioning support for object 6-112. For example, in one embodiment, at least 12 actuatable cushioning elements may be used to provide cushioning support for an object. This may include providing at least 12, 20, 50, 100 or even 500 actuatable cushioning elements (or more) to provide cushioning support, according to different example embodiments.

The actuatable cushioning elements may be any shape (e.g., round, oblong, rectangular, irregular shape) and any size. In an example embodiment, one or more of actuatable cushioning elements 6-114, 6-116, etc. may be 2.5 cm in width or less in an unexpanded state, or may be 2.5 cm in width or more in an unexpanded state, or may be 5 cm or less in an unexpanded state, or may be 8 cm or less in an unexpanded state, as examples. For example, different numbers and/or sizes of cushioning elements may be used, e.g., depending on the application, the type of object to be protected, the type or size of container to be used, or other factors. These are some example numbers and sizes and the disclosure is not limited thereto. In an example embodiment, smaller-sized actuatable cushioning elements may be more applicable for smaller containers, whereas larger actuatable cushioning elements may be more applicable for larger containers, for example.

In another example embodiment, a group of actuatable cushioning elements may be provided within a container, or outside of the container, to provide cushioning support for an object, such as a vase or other object within the container. A first subset of actuatable cushioning elements may be pre-inflated or pre-expanded in response to a first event, e.g., at packing time or just prior to shipment. At some later point, a second subset of actuatable cushioning elements may be actuated (e.g., expanded), in response to a second event (such as an acceleration that exceeds a threshold, or an impact or likely impact), for example. At some point later, a third subset of actuatable cushioning elements may be actuated (e.g., inflated or expanded), in response to a third event, for example. Also, in an example embodiment, upon arrival (which may be considered a fourth event), one or more (or even all) of the actuatable cushioning elements in the container may be actuated (e.g., unexpanded or deflated), to allow the object to be unpacked from the container. The actuatable cushioning elements may also be-reused in another container, for example. In this manner, the group of actuatable cushioning elements may provide cushioning support for an object, e.g., for one or more events.

Actuatable cushioning elements may be actuated outside of a container or outside of the preactivation envelope of a system. For example, such actuation may provide additional cushioning to that provided with interior actuatable cushioning elements alone. For example, such exterior actuation may also act by modification of the dynamics of the interaction with the environment, such as by introducing sliding contacts, aerodynamic lift, sideways steering forces, or by other means. For example, such exterior actuatable cushioning elements may have spherical shapes, cylindrical shapes, high aspect ratio shapes, lifting-body shapes, or other shapes. For example, exterior actuatable cushioning elements may include expandable gas bags, fluid actuatable elements, expandable cushioning materials, skids, reaction engines, drag-inducing devices, anchors, or other such elements. For example, such exterior actuatable cushioning elements may act in a time dependent (e.g., via a specified actuation profile, by stretching, deforming, breaking) and/or time sequenced manner (e.g., by timed activation of one or more exterior actuatable cushioning elements).

According to an example embodiment, one or more actuatable cushioning elements may be actuated (e.g., expanded or unexpanded) for or in response to an event. The event may be any of a variety of different events. For example, the event may include determining an impact or likely impact, determining an acceleration or change in acceleration that exceeds a threshold (such as when a container has been dropped), determining a temperature (e.g., inside or outside the container) that reaches a selected temperature, determining a time that reaches a specific time, determining that a location has been reached or that a selected distance within the location has been reached (e.g., either approaching or leaving the location), determining that a selected subset of actuatable cushioning elements (e.g., some or all of the elements) have not yet been expanded (thus more elements should be expanded to provide support), or other event. These are merely a few examples of events, e.g., events which may cause or result in one or more actuatable cushioning elements to be actuated.

According to an example embodiment, acceleration may include a scalar quantity, or may include a vector quantity. Acceleration may include linear acceleration, angular acceleration, or other type of acceleration. A detected or determined acceleration may include an acceleration having components with varying degrees of interest or relevance (e.g., one or more linear components may be used, or one or more angular components to indicate an event or events to trigger actuation of an actuatable cushioning element). For example, an event may include an acceleration or change in acceleration that may include an acceleration (e.g., one or more acceleration components) or a change in acceleration that may exceed a threshold. Alternatively, the acceleration may be determined in more complex manners, such as ad hoc, time and situation-dependent manners, or other manners. For example, a model may be provided or used to model the operation of a system (e.g., system 6-100), or model the operation of actuatable cushioning elements, or model the free-fall or acceleration or movement of one or more objects or passengers, or the like. For example, one or more actuatable cushioning elements may be actuated (e.g., expanded or unexpanded/contracted) based on the model and/or based on determination of one or more events. For example, the selected actuation of one or more actuatable cushioning elements may be based upon the predicted shift of the time profile of one or more accelerations from a value associated with one actuation state to another value corresponding to the selected actuation state, the value of which is predicted to reduce damage to one or more protected objects. For example, measured and model-forecasted time-integrals of acceleration that may exceed case dependent thresholds may be used, e.g., to identify criteria or likely situations where objects may be damaged or broken. In another example embodiment, a time-history of acceleration may, in some cases, inform the system 6-100 as to the level of protection that may or should be used to protect the object. For example, an extended time-interval of free-fall may result in decelerations of significant magnitudes being purposefully applied to protect objects when, e.g., an event is detected. For example, measured or model-forecasted stresses within the object may be used, e.g., to identify criteria or likely situations where objects may be damaged or broken. Such stress thresholds may include peak values or time-dependent value profiles of a function of one or more elements of the stress tensor, or may include initiation or propagation of fracture. For example, measured or model-forecasted temperatures within the object may be used, e.g., to identify criteria or likely situations where objects may be damaged or broken. Such temperature thresholds may include peak temperature values, or energy deposition values (e.g., a substance that will undergo a phase change—e.g., liquid to gas—after accumulation of a certain energy, which those skilled in the art will appreciate is an example of a more general determination that an energy exceeds a threshold), or time dependent temperature profiles. These are merely a few additional example embodiments relating to acceleration, and the disclosure is not limited thereto.

Referring to FIG. 114 again, in an example embodiment, system 6-100 may include central control logic 6-150, including a central controller 6-154 which may provide overall control for system 6-100. Central control logic 6-150 may include a number of additional blocks coupled to central controller 6-154, which will be briefly described.

A wireless receiver 6-152 may transmit and receive wireless signals such as RF (radio frequency) signals. Wireless signals such as RF signals may include any wireless or other electromagnetic signals, and are not limited to any particular frequency range.

An event detector 6-158 may detect or determine an event (or condition), or a series of events, such as an acceleration or change in acceleration that exceeds a threshold, a temperature that reaches a specific temperature, a location that is within a specific distance of a selected location, or any other event. Event detector 6-158 may include any type of detector or sensor. Event detector 6-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold. In another example embodiment, event detector 6-158 may include a Micro Electro Mechanical System (MEMS) accelerometer, which may, for instance, sense a displacement of a micro-cantilevered beam under acceleration transverse to its displacement-direction, e.g., by capacitive means. An angular accelerometer may determine that an angular acceleration or change in angular acceleration has exceeded a threshold. In another example embodiment, event detector 6-158 may include a Ring Laser Gyro, a Fiber Optic Gyro, a Vibrating Structure Gyro, a MEMS Gyro, or a mechanical gyroscope.

Or, alternatively for event detector 6-158, electrodes may be placed on a suitably shaped and mounted piezoelectric material for sensing a current and/or voltage generated by the piezoelectric material deforming in response to acceleration induced stress. Some examples of materials that may be used in the piezoelectric version of the event detector 6-158 may include lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped PLZT, and Barium zirconate titanate (BZT). These are just a few examples of event detectors.

Event detector 6-158 may also, for example, include a GPS receiver, a speedometer, an accelerometer, Radar, a camera, a Gyro, or any other sensor or device that may allow the detection of one or more of the following: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. The first and second objects in this example may be any type of objects. For example, the detected event or information (e.g., relative location, velocity, acceleration, orientation, angular velocity, angular acceleration) may indicate that a collision between a first object (such as a vehicle) and a second object (e.g., another vehicle, a tree, a railing.) has occurred or is likely to occur.

An enable/disable switch 6-156 may be used to enable or disable system 6-100. For example, enable/disable switch 6-156 may be used to enable the one or more actuatable cushioning elements to be actuated, or may disable the one or more actuatable cushioning elements from being actuated, for example. System 6-100 may also include an input device, such as a mouse, keypad or other input device, which may allow a user to configure operation of system 6-100, for example. For example, enable/disable switch 6-156 and/or input device 6-160 may enable a first subset of actuatable cushioning elements to be actuatable during a first time period (or first time interval), and may enable a second subset of actuatable cushioning elements to be actuatable during a second time period (or second time interval), e.g., to provide cushioning support for an object over (or for) a series of events. The phrase "time period" may, for example, include any time interval, and is not necessarily cyclical or periodic, and may include random, non-periodic and/or non-cyclical time periods or time intervals, as examples.

An output device or display 6-161 may also be provided to display information. Input device 6-160 and display 6-161 may be provided in a position which may be reached or accessed by a user, such as on the outside of the container 6-110, for example.

One or more of the actuatable cushioning elements may include an element control logic to control overall operation and/or actuation of the element(s) to which the control logic is connected. For example, element control logic 6-115 may provide control to actuatable cushioning element 6-114, while element control logic 6-117 may control operation of actuatable cushioning element 6-116.

An element control logic may control a single actuatable cushioning element, or may control multiple cushioning elements, for example. The element control logic for one or more actuatable cushioning elements may communicate with other element control logic to provide a cushioning support for object 6-112 in a coordinated manner, for example. According to an example embodiment, this may include an element control logic transmitting a wireless signal(s) when the associated actuatable cushioning element has been actuated (or otherwise an element control logic for an element transmitting a signal notifying other elements of the cushioning element's state) which may allow the element control logic associated with other actuatable cushioning elements to determine how many or what percentage of cushioning elements are in an expanded state. For example, if an insufficient number of cushioning elements are currently in an expanded state, then one or more actuatable cushioning elements (via their element control logic) may then actuate or move to an expanded state to improve cushioning support for the object. Thus, distributed control may be provided via communication between the element control logic for different actuatable cushioning elements.

In another example embodiment, central controller 6-154 (FIG. 114) of central control logic 6-150 may provide central control for operation of the one or more actuatable cushioning elements within container 6-110. For example, event detector 6-158 may detect an event, and then wireless transceiver 6-152 (e.g., under control of central controller 6-154) may transmit wireless signals to one or more element control logic (e.g., 115, 117 . . . ) to cause one or more actuatable cushioning elements to actuate in response to the event.

FIG. 115 illustrates an actuatable cushioning element according to an example embodiment. An actuatable cushioning element 6-210 may be coupled to (or may include) an associated element control logic 6-212. Although not shown, one or more of the actuatable cushioning elements (e.g., actuatable cushioning elements 6-114, 6-116, 6-118, 6-120, 6-122, 6-124 . . . ) may each include a similar element control logic. For example, element control logic 6-115 and 6-117 may be the same as or similar to element control logic 6-212, for example. In an alternative embodiment, element control logic 6-212 may be omitted.

Element control logic 6-212 may include an element controller 6-6-214 to provide overall control for an actuatable cushioning element 6-210. An event detector 6-218 may detect or determine an event. Event detector 6-218 may be, for example, the same as or similar to the event detector 6-158. A wireless transceiver 6-216 may transmit and receive wireless signals. Alternatively, actuatable cushioning elements may be coupled together (and/or to central control logic 6-150) via any communications media, such as a wireless media (e.g., via RF or other electromagnetic signals, acoustic signals), a wired communication media, such as cable, wire, fiber optic line, etc., or other media.

A stored energy reservoir 6-220 may store gas, liquid, energy (chemical or electrical energy or the like) or other energy or substance, which may be used to actuate actuatable cushioning element 6-210. For example, stored energy reservoir 6-220 may receive signals from element controller 6-6-214, causing stored energy reservoir 6-220 to release pressurized liquid or gas to actuatable cushioning element 6-210 to cause element 6-210 to expand or inflate, or may release a chemical or other substance causing an expandable cushioning material to expand, for example. In an example embodiment, actuatable cushioning element 6-210 may include one or more fluid-actuatable elements, where fluid may be sourced from one or more fluid reservoirs (such as from stored energy reservoir 6-220), e.g., via a valving actuation. The fluid reservoirs may, for example, cause the fluid actuatable element(s) to actuate (e.g., expand and/or unexpand/contract) by causing fluid to flow into or out of the fluid-actuatable elements.

One or more actuatable cushioning elements, such as actuatable cushioning element 6-210, may be coupled to an element controller (e.g., element controller 6-6-214) via any communications media, such as a wireless media (e.g., via RF or other electromagnetic signals, acoustic signals), a wired communication media, such as cable, wire, fiber optic line, etc., or other communications media.

According to an example embodiment, one or more actuatable cushioning elements may include fluid-actuated cushioning elements or structures, or may include gas-actuated or gas-powered cushioning elements, or other types of elements. For example, one or more of the actuatable cushioning elements, when actuated, may have at least one of a size, shape, position, orientation, stress-strain tensor components (or other component) of the cushioning elements changed or modified as a result of one or more actuating actions applied to the cushioning element. For example, an actuating action or sequence of actuating actions which may be applied to an actuatable cushioning element, may, e.g., first change its position (or center of mass), then its orientation, then its size, and/or its rigidity or other characteristic. These changes to the actuatable cushioning element may occur, e.g., in a pre-programmed manner, and may occur, e.g., in response to or based upon an event, such as based on a measurement, signals received from cooperating cushioning elements or a controller(s) in the system 6-100, or other signals or criteria or event. The signals that may be received from other cooperating structures (e.g., elements or controllers) may, for example, describe or indicate their own characteristics, such as size, pressure, orientation, shape, etc. A model (e.g., of the system or operation of the system or objects) may be used to determine one or more actions that may be performed (such as actuation of an element), e.g., to protect one or more objects or passengers from harm or damage.

Also, in another example embodiment, one or more objects or passengers may include one or more associated actuatable cushioning elements on or near each object or passenger, where one or more of the group of associated actuatable cushioning elements may be independently controlled so as to provide cushioning support and/or protection for the associated object or passenger. Also, in another example embodiment, two or more separate objects, each protected by their own sets of actuatable cushioning elements may interact (for instance, by an actual or predicted collision). The actuation of one or more object's actuatable cushioning elements may occur with or without cooperation from that of the actuatable cushioning elements of one or more of the other objects. For example, one or more of the objects may sense the actions or state of the actuatable cushioning elements associated with one or more of the other objects. For example, two or more of the objects may share information on the actual and/or planned actuation histories of their actuatable cushioning elements. For example, one or more of the objects may sense the actions or state of the actuatable cushioning elements associated with one or more of the other objects. For example, one or more objects may base the actuation of one or more of its actuatable cushioning elements upon the sensed or predicted actions of one or more actuatable cushioning elements associated with one or more of the other objects. For example, one or more objects may command the actuation or nonactuation of one or more actuatable cushioning elements associated with one or more of the other objects. This commanded actuation process may be performed by a joint decision process, by a hierarchical process, by a master-slave process, or by other means.

In an example embodiment, the actuatable cushioning element may include one or more tension-bearing members 6-230, such as tension bearing members 6-230A, 6-230B, 6-230C, 6-230D and 6-230E. Tension-bearing members 6-230 may, for example, bear tension or force, and may deform in one or more ways, and/or may stretch, e.g., during a collision or impact to dissipate energy associated with a collision and/or provide cushioning support for an object. The tension-bearing members 6-230 may be provided in a number of different directions, and may, for example, lie on a surface (e.g., interior or exterior surface) of the cushioning element 6-210. Alternatively, one or more of the tension-bearing members 6-230 may be provided within an interior portion of the cushioning element 6-210.

In an example embodiment, one or more of the tension-bearing members 6-230 may deform during a collision between two objects. This deformation of one or more of the tension-bearing members 6-230 may include, for example, stretching of the tension-bearing member(s). The deforming or stretching, may include, for example, at least a portion of one or more tension-bearing members substantially inelastically stretching after the tension-bearing member has reached an elastic limit.

In an example embodiment, the actuatable cushioning element 6-210 may dissipate at least some of an energy (e.g., kinetic energy) associated with a collision based on a deforming or stretching of one or more of the tension-bearing members 6-230. For example, during a collision, at least one tension-bearing member that extends in a direction other than a direction of impact of the collision may stretch beyond an elastic limit, and dissipate at least some of an energy associated with the collision. For example, a tension-bearing member that extends in a direction that is substantially perpendicular to a direction of impact of the collision may stretch or deform during the collision to dissipate energy or provide cushioning support for an object.

By stretching or deforming, the tension-bearing members 6-230 may perform work or have work performed on them, allowing the dissipation of at least some energy associated with a collision. In this manner, the cushioning element 6-210 and associated tension-bearing member(s) 6-230 may, for example, provide cushioning support during a collision for an object or objects, such as a vehicle, person, or other object.

The tension-bearing members may be made of a variety of different materials, and may, for example, have a relatively high tensile strength and/or a high strength to weight ratio. In an example embodiment, tension-bearing members may be provided as one or more polyaramid fibers (also known as aramid or aromatic polyamide fibers).

Polyaramid fibers may be a class of heat-resistant and high-strength synthetic fibers, such as for example, fibers in which the fiber-forming substance may be a long-chain synthetic polyamide in which at least some of the amide linkages (—CO—NH—) are attached directly to two aromatic rings. Polyaramid fibers have been manufactured under a number of different brand names, and have been used in a number of different aerospace and military applications, such as ballistic rated body armor, for example.

Polyaramid fiber(s) are merely one example of a tension-bearing member. Tension bearing members 6-230 may be made from other material (e.g., which may have relatively high tensile strength) that may perform work (or may allow work to be performed on the fiber or member), e.g., through stretching or deforming, or otherwise may provide cushioning or dissipation of energy associated with a collision or other impact. Yet more specific instances of such materials might include at least one of a graphitic fiber, a carbon fiber, and/or a natural fiber. Yet more specific instances of such material might also include at least one of a poly-benzo-bisoxazole fiber and/or a synthetic fiber. In some instances of such materials, the various fiber types referred to herein are hyrbridized and/or combined.

FIG. 116A illustrates an actuatable cushioning element according to another example embodiment. Actuatable cushioning element 6-210A is shown in an initial or pre-collision state. Actuatable cushioning element 6-210A may include one or more tension-bearing members, including tension-bearing members 6-230A, 6-230B, 6-230C, 6-230C, 6-230D and/or 6-230E. In an example embodiment, a controller, such as central controller 6-154 or element controller 6-6-214 may control or cause the actuation of the actuatable cushioning element into an initial or pre-collision state (e.g., in response to detecting or determining an event). A direction of impact 6-239 of a collision is shown. Tension-bearing members 6-230A and 6-230B, at least in part, may be considered to extend in a direction that may be substantially in a direction of the impact of collision 6-239. Other tension-bearing members may extend in other directions. For example, tension-bearing members 6-230C, 6-230D and 6-230E may be considered to extend in directions other than the direction of impact of the collision 6-239. For example, one or more tension-bearing members, such as tension-bearing member 6-230E, may extend in a direction that may be approximately (or substantially) perpendicular to the direction of impact of the collision 6-239.

FIG. 116B illustrates an actuatable cushioning element of FIG. 116A in a post-collision state according to an example embodiment. In an example embodiment, during a collision between two objects, the actuatable cushioning element 6-210 may provide cushioning support for an object (not shown) or dissipate energy associated with the collision via a deforming or stretching of one or more of the tension-bearing members.

For example, tension-bearing members 6-230C, 6-230D and 6-230E may deform or stretch during a collision and dissipate energy associated with a collision.

FIG. 117 is a diagram illustrating an operation of an actuatable energy dissipative cushioning element according to an example embodiment. Two objects are shown in FIG. 117, including vehicle 6-410 and vehicle 6-420, although any type of objects may be used. Vehicle 6-410 may include an actuatable cushioning element 6-210 that includes one or more tension-bearing members 6-230. An element control logic 6-212 may be coupled to the actuatable cushioning element. Event detector 6-218 of element control logic 6-212 (FIG. 115) may determine or detect an event, and element controller or central controller 6-154 may actuate and/or otherwise control actuatable cushioning element 6-210 and/or tension-bearing members 6-230 to dissipate energy associated with a collision between vehicle 6-410 and vehicle 6-420. Event detector 6-218 and/or element control logic 6-212 may detect or determine a number of different events, and may then actuate or deploy the actuatable cushioning element 6-210. Actuatable cushioning element 6-210 is shown as being provided outside of vehicle 6-410, but may be located anywhere, such as inside a cabin or driver's space of vehicle 6-410, for example.

FIG. 118A is a diagram illustrating a tension-bearing member according to an example embodiment. In an example embodiment, a tension-bearing member 6-230 may stretch or deform during a collision to dissipate some of the kinetic energy associated with a collision. This may be performed by, for example, at least in part converting some of the kinetic energy associated with the collision into thermal energy. In an example embodiment, tension-bearing member 6-230 may include a heat capacity material 6-512 associated with the tension-bearing member 6-230 to absorb at least some of the thermal energy associated with the collision, or to increase a capacity of the tension-bearing member 6-230 to perform work or to increase a capacity to have work done on the tension-bearing member 6-230.

For example, the heat capacity material may increase the temperature at which the tension-bearing member fails or breaks, thereby, at least in some cases increasing the capacity of the tension-bearing member 6-230 to perform work or stretch during a collision. This may, for example, increase an amount of kinetic energy that the actuatable cushioning element may dissipate during a collision between two objects.

Although not required, in an example embodiment, heat capacity material 6-512 may use (or may include) a phase-change material that may change phases (e.g., solid-to-liquid, liquid-to-gas, solid-to-gas) while the tension-bearing member is performing work or is stretching or deforming, which may, for example, increase the amount of kinetic energy that the cushioning element may dissipate. This may include, for example, a liquid or other heat capacity material boiling or changing from liquid to gas to dissipate additional energy associated with the collision. For example, water may be used to cool or decrease the temperature of the tension-bearing member during a collision. Thus, using a tension-bearing member having a heat capacity material may increase the temperature at which the tension-bearing member may fail or no longer be able to perform work. Thus, heat capacity material or phase change material may be used to increase or enhance mechanical performance of the tension bearing member 6-230, for example.

In one example embodiment, if phase change is used, the phase change of the heat capacity material may, for example, occur at temperatures that may be well above ordinary environmental temperatures, e.g., greater than 50 degrees Centigrade (50° C.), and may be (for example) less than 300° C. or 400° C. These are merely some examples, and a number of different temperatures may be used for phase change.

The heat capacity material 6-512 may, for example, be provided on a surface of the tension bearing member 6-230, or may be provided within one or more fibers of the tension-bearing member. These are merely some examples.

FIG. 118B is a diagram illustrating a tension-bearing member according to another example embodiment. In this example, a capsule 6-514 may be provided with heat capacity material therein. For example, when the temperature a threshold temperature, the capsule 6-514 may melt or rupture, causing the heat capacity material to be released and applied to the tension-bearing member 6-230. The application of heat capacity material (for example, water or other material) may operate to cool the tension-bearing member 6-230 and/or increase the work capacity of the tension-bearing member 6-230.

A wide variety of materials may be used for a heat capacity material 6-512, or a phase change material. According to an example embodiment, heat capacity materials may, include one or more qualities, such as: non-toxic (as people or objects may come into contact with the material); non-corrosive to its storage environment (e.g., since the material may be in contact with the tension-bearing member or the actuatable cushioning element 6-210); for example, during storage, the material may be non-corrosive for long periods of time, and during operation or at higher temperatures the material may be non-corrosive for shorter periods of time. A comparatively high heat of transformation (e.g., relatively high temperature for boiling or vaporization, fusion), e.g., so that relatively little material may be used to increase the work capacity of the tension bearing member can be readily brought into contact (either in advance or in response to an event, or based on a temperature change, etc.) with high-tensility material (tension-bearing member 6-230) being worked or deformed during a collision; reasonable cost, e.g., sufficient quantities of the heat capacity material would not necessarily dominate the cost of the cushioning element or tension bearing member.

An example of a heat capacity material may be water, although many other materials may be used. The tension-bearing member (e.g., polyaramid fibers) may be soaked in water (or other material), which may increase the amount of work that the tension bearing member may perform, for example. Or, the water, as it is heated and boils or vaporizes, increases the work that may be performed on or by the associated tension-bearing member. As noted, the heat capacity material may use phase change in an example embodiments. In other example embodiments, heat capacity materials may be used that may improve the work capacity of the tension bearing member without necessarily involving a phase change or phase change material.

FIG. 119 illustrates an operational flow 6-600 representing example operations related to actuatable energy dissipative cushioning elements. In FIG. 119 and in following figures that include various examples of operational flows, discussion and explanation may be provided with respect to the above-described examples of FIGS. 118A and 118B, and/or with respect to other examples and contexts. However, it should be understood that the operational flows may be executed in a number of other environments and contexts, and/or in modified versions of FIGS. 118A and 118B. Also, although the various operational flows are presented in the sequence(s) illustrated, it should be understood that the various operations may be performed in other orders than those which are illustrated, or may be performed concurrently.

After a start operation, the operational flow 6-600 moves to a determining operation 6-610 where an event is determined. For example, an event detector 6-158 or 6-218 may detect or determine an event (or condition), or a series of events, such as a velocity that exceeds a threshold, an acceleration that exceeds a threshold, a change in acceleration or change in location or velocity, a relative location, velocity or acceleration of an object with respect to another object that is within a range or exceeds a threshold, etc. These are merely a few examples of events that may be detected, and many other events are possible.

Event detector 6-158 or 6-218 may include any type of detector or sensor. Event detector 6-158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold, for example. In another example embodiment, event detector 6-158 may include a Micro Electro Mechanical System (MEMS) accelerometer.

Event detector 6-158 and/or 6-218 may also, for example, include a speedometer, an accelerometer, Radar, a camera, a Gyro, or any other sensor, instrument or device that may allow the detection or determination of one or more of a variety of conditions or events, such as determining, for example: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. These are merely some additional example events, and many other types of events may be detected or determined. The first and second objects in this example may be any type of objects.

Then, in an actuating operation 6-620, a cushioning element is actuated in response to the determining the event, the cushioning element including one or more tension-bearing members. For example, as shown in FIG. 115, element controller 6-6-214 may actuate actuatable cushioning element 6-210 in response to event detector 6-218 determining the event. This actuating may include element controller 6-6-214 or central controller 6-154 deploying or placing the actuatable cushioning element 6-210 in an initial or pre-collision state, for example. Actuatable cushioning element 6-210 (FIG. 115) may include one or more tension-bearing members 6-230 (e.g., 230A, 6-230B, 6-230C, 230D, 6-230E . . . ).

Then, in a dissipating operation 6-630, at least some of an energy associated with a collision is dissipated based on deforming at least one of the tension-bearing members during the collision, the deforming including substantially inelastically stretching the at least one of the tension-bearing members. For example, at least some of the energy associated with a collision between two objects (e.g., between vehicles 6-410 and 6-420, FIG. 117) may be dissipated by a tension-bearing member 6-230 deforming and/or stretching during the collision. The deforming or stretching may include the tension-bearing member 6-230 stretching beyond an elastic limit for the tension-bearing member 6-230.

FIG. 120 illustrates alternative embodiments of the example operational flow 6-600 of FIG. 119. FIG. 120 illustrates example embodiments where the determining operation 6-610 may include at least one additional operation. Additional operations may include operations 6-702, 6-702, 6-706, 6-6-708 and/or 6-710

At the operation 6-702, a pre-collision event is determined. For example, event detector 6-158 or 6-218 may determine or detect an event that occurs prior to a collision between two objects. For example, event detector 6-158 or 6-218 may detect that acceleration or velocity for a vehicle has exceeded a specific threshold, or that based on a vehicle's relative location and/or relative velocity with respect to another object (e.g., with respect to a rail, a wall, or another vehicle), a collision is likely to occur between a vehicle and another object.

At the operation 6-704, it is determined that an object has reached a specific location. For example, event detector 6-158 or 6-218 (e.g., as a GPS receiver or other location device) may determine that an automobile or vehicle is within 2 feet of a wall or other object, or has crossed over a median of a highway.

At the operation 6-706, it is determined that a collision has occurred. Event detector 6-158 or 6-218 may have detected a collision or impact based on other sensors on a vehicle 6-410, for example.

At the operation 6-708, a change in acceleration that exceeds a threshold is determined. For example, event detector 6-158 or 6-218 (e.g., as an accelerometer) may determine that an acceleration for vehicle 6-410 has exceeded a threshold (e.g., 0.2 G).

At operation 6-710, it is determined that a collision between two objects is likely to occur. For example, event detector 6-158 or 6-218 (e.g., as GPS receiver or other sensor or instrument) and with controller 6-154 or 6-214, may determine, e.g., based on a location and/or velocity of a vehicle 6-410 with respect to another object (either fixed or moving) that a collision is likely to occur.

FIG. 121 illustrates alternative embodiments of the example operational flow 6-600 of FIG. 119. FIG. 121 illustrates example embodiments where the determining operation 6-610 may include at least one additional operation. Additional operations may include operations 6-802, 6-804, 6-806, and/or 6-808.

At the operation 6-802, it is determined that a collision between two objects is likely to occur based on at least a relative location of the two objects. For example, event detector 6-158 or 6-218, and operating with controller 6-154 or 6-214, within vehicle 6-410 may determine that a collision with vehicle 510 is likely to occur based on the relative location of vehicle 6-410 to vehicle 6-420 (e.g., based on the distance between the two vehicles).

At the operation 6-804, it is determined that a collision between two objects is likely to occur based on a relative location and a relative orientation of the two objects. For example, controller 6-154 or 6-214 and event detector 6-158 or 6-218 may determine that vehicles 6-410 and 6-420 are within 5 feet of each other and are facing each other, and thus, a collision may be likely to occur.

At the operation 6-806, it is determined that a collision between a first object and a second object is likely to occur based on at least a relative location and a relative velocity of the first object with respect to the second object. For example, controller 6-154 or 6-214 and event detector 6-158 or 6-218 may determine that vehicle 6-410 is 10 feet away from vehicle 6-420, and the two vehicles are heading directly toward each other at a total speed (sum of speeds of both vehicles) of 87 MPH (miles per hour), which may indicate that a collision is likely to occur.

At the operation 6-808, it is determined that a collision between a first object and a second object is likely to occur based on at least a relative location, a relative velocity, and a relative acceleration of the first object with respect to the second object.

For example, controller 6-154 or 6-214 and event detector 6-158 or 6-218 within a vehicle 6-410 (FIG. 117) may determine that a collision between a vehicle 6-410 and vehicle 6-420 is likely to occur based on at least a relative location, a relative velocity, and a relative acceleration of vehicle 6-410 with respect to vehicle 6-420.

FIG. 122 illustrates alternative embodiments of the example operational flow 6-600 of FIG. 119. FIG. 122 illustrates example embodiments where the determining operation 6-610 may include at least one additional operation. Additional operations may include operations 6-902 and/or 6-904.

At the operation 6-902, it is determined that a collision between a first object and a second object is likely to occur based on at least a relative location, a relative velocity, a relative orientation, and a relative angular velocity of the first object with respect to the second object. For example, controller 6-154 or 6-214 and event detector 6-158 or 6-218 within a vehicle 6-410 (FIG. 117) may determine that a collision between a vehicle 6-410 and vehicle 6-420 is likely to occur based on at least a relative location, a relative velocity, a relative orientation, and a relative angular velocity of vehicle 6-410 with respect to vehicle 6-420 (FIG. 117).

At the operation 6-904, it is determined that a collision between a first object and a second object is likely to occur based on at least a relative acceleration and an angular acceleration of the first object with respect to the second object. For example, controller 6-154 or 6-214 and event detector 6-158 or 6-218 within a vehicle 6-410 (FIG. 117) may determine that a collision between a vehicle 6-410 and vehicle 6-420 is likely to occur based on at least a relative acceleration and an angular acceleration of vehicle 6-410 with respect to vehicle 6-420 (FIG. 117).

FIG. 122 illustrates alternative embodiments of the example operational flow 6-600 of FIG. 119. FIG. 122 illustrates example embodiments where the determining operation 6-610 may include at least one additional operation. Additional operations may include operation 6-1002.

At the operation 6-1002, it is determined that a collision between a first object and a second object is likely to occur based on at least one of a relative location of the first object with respect to the second object, a relative velocity of the first object with respect to the second object, a relative acceleration of the first object with respect to the second object, a relative orientation of the first object with respect to the second object, a relative angular velocity of the first object with respect to the second object, or a relative angular acceleration of the first object with respect to the second object. For example, controller 6-154 or 6-214 and event detector 6-158 or 6-218 within a vehicle 6-410 (FIG. 117) may determine that a collision between a vehicle 6-410 and vehicle 6-420 is likely to occur based on at least one of a relative location, relative velocity, relative acceleration, a relative orientation, a relative angular velocity, or a relative angular acceleration of vehicle 6-410 with respect to vehicle 6-420 (FIG. 117).

FIG. 124 illustrates alternative embodiments of the example operational flow 6-600 of FIG. 119. FIG. 124 illustrates example embodiments where the determining operation 6-610 may include at least one additional operation. Additional operations may include operations 6-1102, 6-6-1104 and/or 6-1106.

At the operation 6-1102, it is determined that a collision between a first object and a second object is likely to occur based on a relative velocity of the first object with respect to the second object. For example, controller 6-154 or 6-214 and event detector 6-158 or 6-218 within a vehicle 6-410 (FIG. 117) may determine that a collision between a vehicle 6-410 and vehicle 6-420 is likely to occur based on a relative velocity of vehicle 6-410 with respect to the velocity of vehicle 6-420.

At the operation 6-1104, it is determined that a collision between a first object and a second object is likely to occur based on a relative acceleration of the first object with respect to the second object. For example, controller 6-154 or 6-214 and event detector 6-158 or 6-218 within a vehicle 6-410 (FIG. 117) may determine that a collision between a vehicle 6-410 and vehicle 6-420 is likely to occur based on a relative acceleration of vehicle 6-410 with respect to the acceleration of vehicle 6-420.

At the operation 6-1106, it is determined that a collision between a first object and a second object is likely to occur based on a relative orientation of the first object with respect to the second object. For example, controller 6-154 or 6-214 and event detector 6-158 or 6-218 within a vehicle 6-410 (FIG. 117) may determine that a collision between a vehicle 6-410 and vehicle 510 is likely to occur based on a relative orientation of vehicle 6-410 with respect to the acceleration and/or orientation of vehicle 6-420.

FIG. 125 illustrates alternative embodiments of the example operational flow 6-600 of FIG. 119. FIG. 125 illustrates example embodiments where the determining operation 6-610 may include at least one additional operation. Additional operations may include operations 6-1202 and/or 6-1204.

At the operation 6-1202, it is determined that a collision between a first object and a second object is likely to occur based on a relative angular velocity of the first object with respect to the second object. For example, controller 6-154 or 6-214 and event detector 6-158 or 6-218 within a vehicle 6-410 (FIG. 117) may determine that a collision between a vehicle 6-410 and vehicle 6-420 is likely to occur based on a relative angular velocity of vehicle 6-410 with respect to the angular velocity of vehicle 6-420.

At the operation 6-1204, it is determined that a collision between a first object and a second object is likely to occur based on a relative angular acceleration of the first object with respect to the second object. For example, controller 6-154 or 6-214 and event detector 6-158 or 6-218 within a vehicle 6-410 (FIG. 117) may determine that a collision between a vehicle 6-410 and vehicle 6-420 is likely to occur based on a relative angular acceleration of vehicle 6-410 with respect to the acceleration of vehicle 6-420.

FIG. 126 illustrates alternative embodiments of the example operational flow 6-600 of FIG. 119. FIG. 126 illustrates example embodiments where the actuating operation 6-620 may include at least one additional operation. Additional operations may include operations 6-1302 and/or 6-1304.

At the operation 6-1302, the cushioning element is expanded to place the one or more tension-bearing members in an initial state. For example, under operation of element controller 6-6-214, stored energy reservoir 6-220 (FIG. 115) may expand actuatable cushioning element 6-210 to place one or more tension bearing members 6-230 in an initial (e.g., pre-collision) state. An initial state may, for example, place the tension-bearing members in a position or state where they may be prepared to dissipate energy or perform work during a collision, e.g., by deforming or stretching. This is merely an example initial state, and other initial states may be used.

At the operation 6-1304, an inflatable gas bag is inflated to place the one or more tension-bearing members in an initial state. For example, under operation of element controller 6-6-214, stored energy reservoir 6-220 (FIG. 115) may pump gas to inflate actuatable cushioning element 6-210 or a gas bag to place one or more tension bearing members 6-230 in an initial state.

FIG. 127 illustrates alternative embodiments of the example operational flow 6-600 of FIG. 119. FIG. 127 illustrates example embodiments where the dissipating operation 6-630 may include at least one additional operation. Additional operations may include operations 6-1402 and/or 6-1404.

At the operation 6-1402, at least some of an energy associated with a collision is dissipated based on deforming at least one of the tension-bearing members during the collision, the deforming including substantially inelastically stretching the at least one of the tension-bearing members after the at least one of the tension bearing members reaches an elastic limit to convert at least some of a kinetic energy associated with the collision to thermal energy. For example, at least some of the energy associated with a collision between vehicles 6-410 and 6-420 may be dissipated based on deforming tension-bearing members 6-230C, 6-230D and 6-230E (FIG. 116B) during the collision. This deforming may include inelastically stretching tension-bearing members 6-230C, 6-230D and/or 6-230E beyond an elastic limit to convert at least some of a kinetic energy associated with the collision to thermal energy.

At the operation 6-1404, at least some of an energy associated with a collision is dissipated based on deforming at least one of the tension-bearing members during the collision, the deforming including substantially inelastically stretching during a collision at least one of the tension-bearing members that extend in a direction other than a direction of impact of the collision. For example, at least some of the energy associated with a collision between vehicles 6-410 and 6-420 may be dissipated based on deforming and inelastically stretching during the collision one or more of tension-bearing members 6-230C, 6-230D and 6-230E, which may extend in a direction other than a direction of impact of the collision 6-239 (FIG. 116B).

For example, a portion of the actuatable cushioning element 6-210 receiving the impact (e.g., along a direction of impact of collision) may become shorter or smaller, which may cause the corresponding tension bearing members 6-230A and 6-230B that extend along the direction of impact to go loose or slack during the collision (e.g., not perform substantial work). While portions of the cushioning element 6-210 that extend or provided in other directions (directions other than the direction of impact 6-239 such as a direction that is substantially perpendicular to the direction of impact) may at least in some cases lengthen (or attempt to lengthen) during the collision, causing the corresponding tension-bearing members 6-230C, 6-230D and 6-230E to stretch or perform work and dissipate some of the kinetic energy associated with the collision. This is merely an example embodiment. In another example embodiment, the actuatable cushioning element may be provided as a web or mesh of tension-bearing members, without a bag to support the tension-bearing members.

FIG. 128 illustrates alternative embodiments of the example operational flow 6-600 of FIG. 119. FIG. 128 illustrates example embodiments where the dissipating operation 6-630 may include at least one additional operation. Additional operations may include operations 6-1502 and/or 6-1504.

At the operation 6-1502, at least some of an energy associated with a collision is dissipated based on deforming at least one of the tension-bearing members during the collision, the deforming including substantially inelastically stretching during a collision at least one of the tension-bearing members that extend in a direction that is substantially perpendicular to a direction of impact of the collision. For example, tension-bearing member 6-230C, which may extend in a direction (FIG. 116B) that is substantially perpendicular to direction of impact of the collision 6-239, may stretch during a collision to dissipate at least some of the energy associated with the collision.

At the operation 6-1504, at least some of an energy associated with a collision is dissipated based on deforming at least one of the tension-bearing members during the collision, the at least one of the tension-bearing members including a heat capacity material associated therewith to absorb at least some of the thermal energy associated with the collision. For example, tension-bearing member 6-230 may include a heat capacity material 6-512 (e.g., FIG. 118A) applied thereto to absorb at least some of the thermal energy that may be generated by the work performed by the tension-bearing member 6-230. Thus, the heat capacity material 6-512 may, at least in some cases, increase the work capacity of the tension-bearing member 6-230.

FIG. 129 illustrates alternative embodiments of the example operational flow 6-600 of FIG. 119. FIG. 129 illustrates example embodiments where the dissipating operation 6-630 may include at least one additional operation. Additional operations may include operation 6-1602.

At the operation 6-1602, at least some of an energy associated with a collision is dissipated based on deforming at least one of the tension-bearing members during the collision, the at least one of the tension-bearing members including a heat capacity material associated therewith to use a phase change to increase a capacity to have work done on the at least one of the tension bearing members. For example, tension-bearing member 6-230 may include a heat capacity material 6-512 (FIG. 118B), such as water, associated with the tension-bearing member 6-230. For example, the tension-bearing member 6-230 may be soaked in water, or the water may otherwise be applied to a surface of the tension-bearing member 6-230. In an example embodiment, the heat capacity material 6-512, after being applied to the tension-bearing member 6-230, may undergo a phase change, e.g., from water to gas (or other phase change) during the collision, which may increase a capacity to have work done on (or by) the at least one of the tension-bearing members 6-230.

FIG. 130 illustrates a partial view of an example computer program product 6-1700 that includes a computer program 16-704 for executing a computer process on a computing device. An embodiment of the example computer program product 6-1700 is provided using a signal bearing medium 16-702, and may include one or more instructions for one or more instructions for determining an event, the signal bearing medium also bearing one or more instructions for actuating a cushioning element in response to the determining the event, the cushioning element including one or more tension-bearing members, and the signal bearing medium also bearing one or more instructions for providing control sufficient to cause dissipation at least some of an energy associated with a collision based on deforming at least one of the tension-bearing members during the collision, the deforming including substantially inelastically stretching the at least one of the tension-bearing members. The one or more instructions may be, for example, computer executable and/or logic-implemented instructions. In one implementation, the signal-bearing medium 16-702 may include a computer-readable medium 16-706. In one implementation, the signal bearing medium 16-702 may include a recordable medium 16-708. In one implementation, the signal bearing medium 16-702 may include a communications medium 16-710.

FIG. 131 illustrates an example system 6-1800. The system 6-6-1800 may include a computing device 1810. The system 6-6-1800 may also include one or more instructions that when executed on the computing device cause the computing device to: (a) determine an event; (b) actuate a cushioning element in response to the determining the event, the cushioning element including one or more tension-bearing members; and (c) provide control sufficient to dissipate at least some of an energy associated with a collision based on deforming at least one of the tension-bearing members during the collision, the deforming including substantially inelastically stretching the at least one of the tension-bearing members 6-1820. In some implementations, the computing device 6-1800 may be a computational device embedded in a vehicle, or may be a functionally-dedicated computational device. In some implementations, the computing device 6-1800 may be include a distributed computational device including one or more devices on a vehicle configured to communicate with a remote control plant (e.g., such as communicating with a remote computer via a wireless network).

In an alternative embodiment, the computing device 6-1810 may include one or more of a personal digital assistant (PDA), a laptop computer, a tablet personal computer, a networked computer, a computing system comprised of a cluster of processors, a workstation computer, and/or a desktop computer (6-1812).

FIG. 132 illustrates an example apparatus 6-1900 in which embodiments may be implemented. In implementation 6-1910, the apparatus 6-1900 may include a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. For example, actuatable cushioning element 6-210 (FIG. 118A) may include one or more tension-bearing members 6-230A, 6-230B, 6-230C. The tension-bearing members 6-230 may deform in response to a collision or impact. At least one of the tension-bearing members 6-230 (e.g., 6-230C) may substantially inelastically deform after reaching an elastic limit.

FIG. 132 also illustrates alternative embodiments of the example apparatus 6-1900. FIG. 132 illustrates example embodiments that may include at least one additional implementation. Additional implementations may include implementations 6-1912, 6-1922, 6-1924, 6-6-1930 and/or 6-1940.

In implementation 6-1912, the implementation 6-1910 may include a cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit. For example, tension-bearing member 6-230C may inelastically stretch during a collision after reaching an elastic limit.

In implementation 6-1922, the apparatus 6-1900 may further include a heat capacity material associated with at least one of the tension-bearing members. For example, a heat capacity material 6-512 (FIG. 118A) associated with tension-bearing member 6-230.

In implementation 6-1924, the apparatus 6-1900 may further include a heat capacity material in contact with at least one of the one or more tension-bearing members to increase a work capacity of the at least one of the one or more tension-bearing members. For example, a heat capacity material 6-512 (FIG. 118A) may be in contact with the tension-bearing member 6-230 to increase a work capacity of the tension-bearing member 6-230.

In implementation 6-1930, the apparatus 6-1900 may further include an element controller configured to control the cushioning element. For example, an element controller 6-6-214 (FIG. 115) or other controller may control the actuatable cushioning element 6-210, such as providing overall control or controlling the actuation of the actuatable cushioning element 6-210 including, in some cases, providing control over operation of tension-bearing members 6-230.

In implementation 6-1940, the apparatus 6-1900 may further include an event detector coupled to the element controller configured to detect an event. For example, an event detector 6-218 (FIG. 115) may be coupled to an element controller 6-6-214 to detect an event.

FIG. 133 also illustrates alternative embodiments of the example apparatus 6-1900. FIG. 133 illustrates example embodiments that may include at least one additional implementation. Additional implementations may include implementations 6-2002, 6-2004, 6-2006, 6-2008, 6-2010 and/or 6-2012.

In implementation 6-2002, at least one of the one or more tension-bearing members comprises one or more polyaramid fibers. For example, a tension-bearing member 6-230C may comprise one or more polyaramid fibers.

In implementation 6-2004, one or more of the tension-bearing members (e.g., tension-bearing member 6-230C) comprises at least one of a graphitic fiber, a carbon fiber, and/or a natural fiber.

In implementation 6-2006, one or more of the tension-bearing members (e.g., tension-bearing member 6-230C) comprises at least one of a poly-benzobisoxazole fiber, and/or a synthetic fiber.

In implementation 6-2008, at least one of the one or more tension-bearing members (e.g., 6-230C) lies on a surface of the cushioning element (e.g., cushioning element 6-210, FIGS. 116A and 116B).

In implementation 2010, at least one of the one or more tension-bearing members (e.g., 6-230C) lies within an interior portion of the cushioning element (e.g., 210, FIGS. 116A and 116B).

In implementation 6-2012, at least some of the tension-bearing members have different tension properties than other tension-bearing members. For example, tension-bearing member 6-230C may have a tensile strength, a thickness or size, may be made from a material, or other tension property that may be different from one or more such tension properties of tension bearing members 6-230D and 6-230E (FIG. 115), for example.

FIG. 134 illustrates an operational flow 6-2100 representing example operations related to cushioning elements.

At operation 6-2110, a cushioning element is constructed including one or more tension-bearing members, at least one of the one or more tension-bearing members being configured to stretch during a collision, including being configured to stretch beyond an elastic limit, to dissipate at least some of a kinetic energy associated with the collision. For example, an actuatable cushioning element 6-210A, 6-210B (FIGS. 116A and 116B) may be constructed that includes one or more tension-bearing members 6-230A, 6-230B, 6-230C, 6-230D, and/or 6-230E. At least one of these tension bearing members (e.g., tension-bearing member 6-230D) may stretch during a collision, including stretching beyond an elastic limit to dissipate at least some of a kinetic energy associated with a collision, e.g., associated with a collision between vehicles 6-410 and 6-420 (or between two other objects).

FIG. 134 also illustrates alternative embodiments of the example operational flow 6-2100 of FIG. 134. FIG. 134 illustrates example embodiments where the determining operation 6-610 may include at least one additional operation. Additional operations may include operations 6-2112, 6-114 and/or 6-116.

At operation 6-2112, a cushioning element is constructed including one or more tension-bearing members, the cushioning element being configured to be actuated in response to an event, at least one of the one or more tension-bearing members being configured to stretch beyond an elastic limit during a collision to convert at least some of a kinetic energy associated with the collision to thermal energy to provide cushioning support for an object. For example, cushioning element 6-210A (FIG. 116A) may include one or more tension bearing members 6-230. The cushioning element 6-210A may be configured to be actuated in response to an event (e.g., an event detected by an event detector 6-158 or 6-218, FIGS. 114, 115). At least one of the tension bearing members, e.g., tension bearing member 6-230D, may be configured to stretch beyond an elastic limit during a collision (e.g., during a collision between vehicles 6-410 and 6-420) to convert at least some of a kinetic energy associated with the collision to thermal energy to provide cushioning support for an object, such as for vehicle 6-410 (FIG. 117) or passengers therein.

At operation 6-114, a cushioning element is constructed including one or more tension-bearing members and a heat capacity material associated with at least a portion of at least one of the tension-bearing members to absorb at least some of the thermal energy associated with the collision. This thermal energy absorption may limit the temperature rise experienced by tension-bearing member(s) associated with the collision, and may thereby increase a capacity to have work done on the at least one of the tension-bearing members. For example, a cushioning element 6-210 may be constructed that includes one or more tension-bearing members 6-230. The tension-bearing member 6-230 may include a heat capacity material 6-512 (FIG. 118A), which may be water or other heat capacity material, to absorb at least some of the thermal energy associated with the collision.

At operation 6-116, a cushioning element is constructed including one or more tension-bearing members and a heat capacity material associated with at least a portion of at least one of the tension-bearing members, the heat capacity material being adapted to use a phase change to increase a capacity to have work done on the at least one of the tension bearing members. For example, a cushioning element 6-210 (e.g., FIG. 116A) may be constructed to include one or more tension-bearing members 6-230 (FIG. 116A and FIG. 118A, 118B), and a heat capacity material 6-512 associated with at least a portion of one of the tension-bearing members (e.g., tension-bearing member 6-230D). Heat capacity material 6-512 may be water or other appropriate material. Heat capacity material may be adapted to undergo a phase change (e.g., water to gas, solid to liquid, solid to gas), such as during the collision, increase a capacity to have work done on the at least one of the tension-bearing members 6-230D. For example, water may be utilized to cool the tension-bearing member, and this water or heat capacity material 6-512 may boil off during a collision to increase the work capacity for the tension-bearing member 6-230D. In some instances, thermal energy absorption may limit the temperature rise experienced by the tension-bearing member(s) associated with a collision, and may thereby increase a capacity to have work done on the at least one of the tension-bearing members. This is merely an example, and the disclosure is not limited thereto.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A non-transitory computer-readable medium storing therein computer-executable instructions to cause a user computing system to:
maintain a computational model of at least one portion of a body;
receive data indicative of an acceleration of the at least one portion of the body;
determine, based on the received data, a trajectory of the at least one portion of the body according to a model;
predict, based on the determined trajectory, that the at least one portion of the body will collide with one or more objects;
prior to the predicted collision, actuate one or more cushioning elements in response to the prediction, the one or more cushioning elements including one or more tension-bearing members;
receive data indicative of a collision of the one or more cushioning elements with the one or more objects; and
deform at least one of the one or more tension-bearing members during the collision of the one or more cushioning elements with the one or more objection to dissipate at least some of an energy associated with the collision, wherein the deforming includes inelastically stretching the one or more tension-bearing members.

2. The non-transitory computer-readable medium of claim 1, wherein the acceleration comprises at least one element selected from a group comprising a linear acceleration and an angular acceleration.

3. The non-transitory computer-readable medium of claim 1, wherein the data indicative of the acceleration includes data indicative of a change in acceleration.

4. The non-transitory computer-readable medium of claim 1, further comprising instructions to predict that the at least one portion of the body will collide with one or more objects in response to the data indicative of the acceleration exceeding a threshold.

5. The non-transitory computer-readable medium of claim 1, wherein the model includes the computational model of the at least one portion of the body.

6. The non-transitory computer-readable medium of claim 5, wherein the computational model includes information about the at least one portion of the body that is selected from a group comprising:
mass;
inertial moments;
skeletal distribution; and
vulnerability to damage.

7. The non-transitory computer-readable medium of claim 6, wherein the information is generic to a class of bodies.

8. The non-transitory computer-readable medium of claim 6, wherein the information is specific to a body of an individual.

9. The non-transitory computer-readable medium of claim 8, wherein the information is collected from at least one member of a group comprising:
the individual;
a physician; and
a course of operation.

10. A method, comprising:
determining, based on data indicative of an acceleration of at least one portion of a body, a trajectory of the at least one portion of the body according to a model of the at least one portion of the body;
predicting, based on the determined trajectory, that the at least one portion of the body will collide with one or more objects;
prior to the predicted collision, actuating one or more cushioning elements in response to the prediction, the one or more cushioning elements including one or more tension-bearing members;
receiving data indicative of a collision of the one or more cushioning elements with the one or more objects; and
deforming at least one of the tension-bearing members during the collision of the one or more cushioning elements with the one or more objects to dissipate at least some of the energy associated with the collision, wherein the deforming includes inelastically stretching the at least one of the tension-bearing members.

11. The method of claim 10, further comprising receiving the data indicative of the acceleration of the at least one portion of the body.

12. The method of claim 11, wherein the acceleration comprises at least one element selected from a group comprising a linear acceleration and an angular acceleration.

13. The method of claim 11, wherein the data indicative of the acceleration includes data indicative of a change in acceleration.

14. The method of claim 11, wherein predicting that the at least one portion of the body will collide with one or more objects is in response to the data indicative of the acceleration exceeding a threshold.

* * * * *